United States Patent [19]
Pascucci et al.

[11] Patent Number: 5,550,980
[45] Date of Patent: Aug. 27, 1996

[54] NETWORKED FACILITIES MANAGEMENT SYSTEM WITH OPTICAL COUPLING OF LOCAL NETWORK DEVICES

[75] Inventors: Gregory A. Pascucci, Waukesha; David E. Rasmussen, Wales; Gaylon M. Decious, Milwaukee; James R. Garbe, Greenfield; Susan M. Hyzer, Brown Deer; Karen L. Woest, Wauwatosa; Vairavan Vairavan, Milwaukee; David L. Koch, Fox Point; Donald A. Gottschalk, Jr., Milwaukee; Dennis E. Burkhardt, Franklin; Darrell E. Standish, New Berlin; Paul W. Madaus, Oak Creek; Dan J. Spacek, Cudahy; Clay G. Nesler, New Berlin; James K. Stark, Wauwatosa; Otto M. Mageland, Greenfield; Robert R. Singers, Brown Deer; Michael E. Wagner, Delafield, all of Wis.

[73] Assignee: Johnson Service Company, Milwaukee, Wis.

[21] Appl. No.: 178,970

[22] Filed: Jan. 7, 1994

Related U.S. Application Data

[62] Division of Ser. No. 476,031, Jan. 30, 1990, abandoned.

[51] Int. Cl.$^6$ ......................................................... G06F 3/00
[52] U.S. Cl. ............................... 395/200.05; 364/DIG. 1; 364/DIG. 2; 364/228; 364/228.4; 364/230; 364/230.4; 364/238.2; 364/238.3; 364/240; 364/240.6
[58] Field of Search ........................ 364/DIG. 1 MS File, 364/DIG. 2 MS File; 395/200, 250, 375, 500, 750, 800, 200.01, 200.02, 200.05; 323/902; 340/854.3, 854.7, 854.8, 854.9; 372/43, 50, 703

[56] References Cited

U.S. PATENT DOCUMENTS 4,485,764  3/1984  El-Gohary ........................... 395/800
4,941,084  7/1990  Terada et al. ....................... 364/DIG. 1
5,175,852  12/1992 Johnson et al. ........................ 395/600

OTHER PUBLICATIONS

Proceedings Of The Seventh Annual Joint Conference Of The IEEE Computer And Communication Societies, IEEE Infocom '88, New Orleans, Louisana, 27th–31st Mar. 1988, pp. 1050–1059, IEEE New York, U.S.; M. H. Ammar et al.: "Using Hint Tables to Locate Resources in Distributed Systems".

(List continued on next page.)

*Primary Examiner*—Robert B. Harrell
*Attorney, Agent, or Firm*—Harness, Dickey & Pierce, P.L.C.

[57] ABSTRACT

A networked system having a wide variety of applications and particularly applicable to facilities management systems has multiple levels of software in processing nodes. The levels include a "features" processing level which communicates requests for data to a software object level containing databases of processes and attributes and database managers. The database managers in the software object level operate to provide data to the high level features in the same format. The software object level communicates with a hardware object level which also contains databases and database managers to mask differences between operational hardware units. By categorizing operational units by type, additional units of a known type can be added with only low level hardware object database changes. Adding units of a new type is facilitated by software changes confined to the lower level hardware and software objects, avoiding software changes at high level features. Individual software objects are tailored for typical types of inputs and output devices encountered by facilities management systems. Universal drive circuitry also provides applicability to a broad range of devices. An optical isolator is connected between signal line outputs from a node and a line driver connected to a pair of lines on a bus. Similarly, an optical isolator is connected between signal line receiving inputs and a line receiver. The signal lines can be biased to predetermined levels to reduce node sensitivity to noise.

20 Claims, 83 Drawing Sheets

OTHER PUBLICATIONS

Proceedings Of The 6th International Conference On Distributed Computing Systems, Cambridge, Massachusetts, 19th–23rd May 1986, pp. 515–522, IEEE, New York, U.S.; A. B. Sheltzer et al.: "Name Service Locality and Cache Design in a Distributed Operating System".

Usenix Association Summer Conference Proceedings Atlanta 1986, Atlanta, Georgia, 9th–13th Jun. 1986, pp. 172–181 J. M. Bloom, et al.: "Experiences Implementing Bind, a Distributed Name Server for the DARPA Internet".

J. M. Bloom, et al.: "Experiences Implementing Bind, a Distriubuted Name Server for the DARPA Internet".

A Multilayered Operating System For Microcomputers, F. Eliassen et al, Microprocessing and Microprograming 14 (1984) Sep., No. 2, Amsterdam, Netherlands, pp. 45–54.

1988 International Conference On Computer Languages, J. P. Diaz–Gonzalez et al, Oct. 9–13, 1988, Florida, IEEE, "Language Aspects of Envisager: An object–oriented environment for the specification of re–time systems", pp. 214–225.

CONIC: An Integrated Approach To Distributed Computer Control Systems, Kramer et al, IEE Proceedings Section A a I, vol. 130, No. 1, Jan. 1983 (Old Working Surrey, GB), pp. 1–10.

|     | NCM | NCM<br>XM | NCM<br>2DCM<br>2XM |
|---|---|---|---|
|     |     | NCM<br>DCM | NCM<br>DCM<br>1-3XM |
|     |     |     | NCM<br>1-4XM |

*FIG. 7*

|     | XM | 2XM | OPEN<br>2DCM<br>2XM |
|---|---|---|---|
|     |     | DCM<br>XM | OPEN<br>DCM<br>1-3XM |
|     |     |     | 1-4XM |

*FIG. 8*

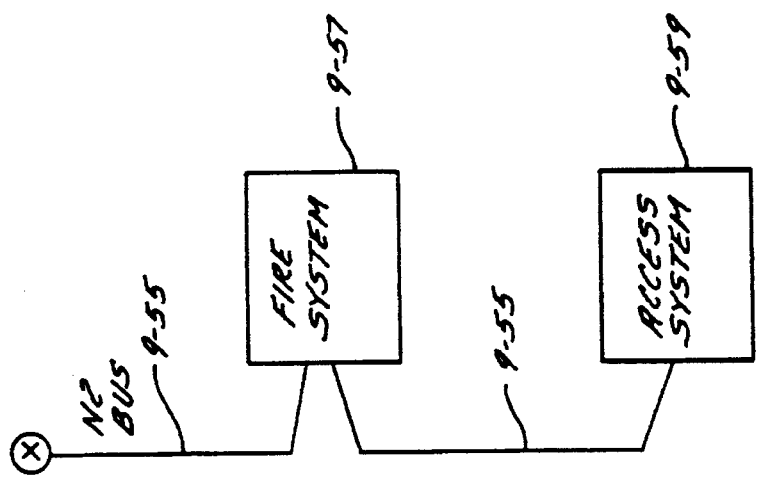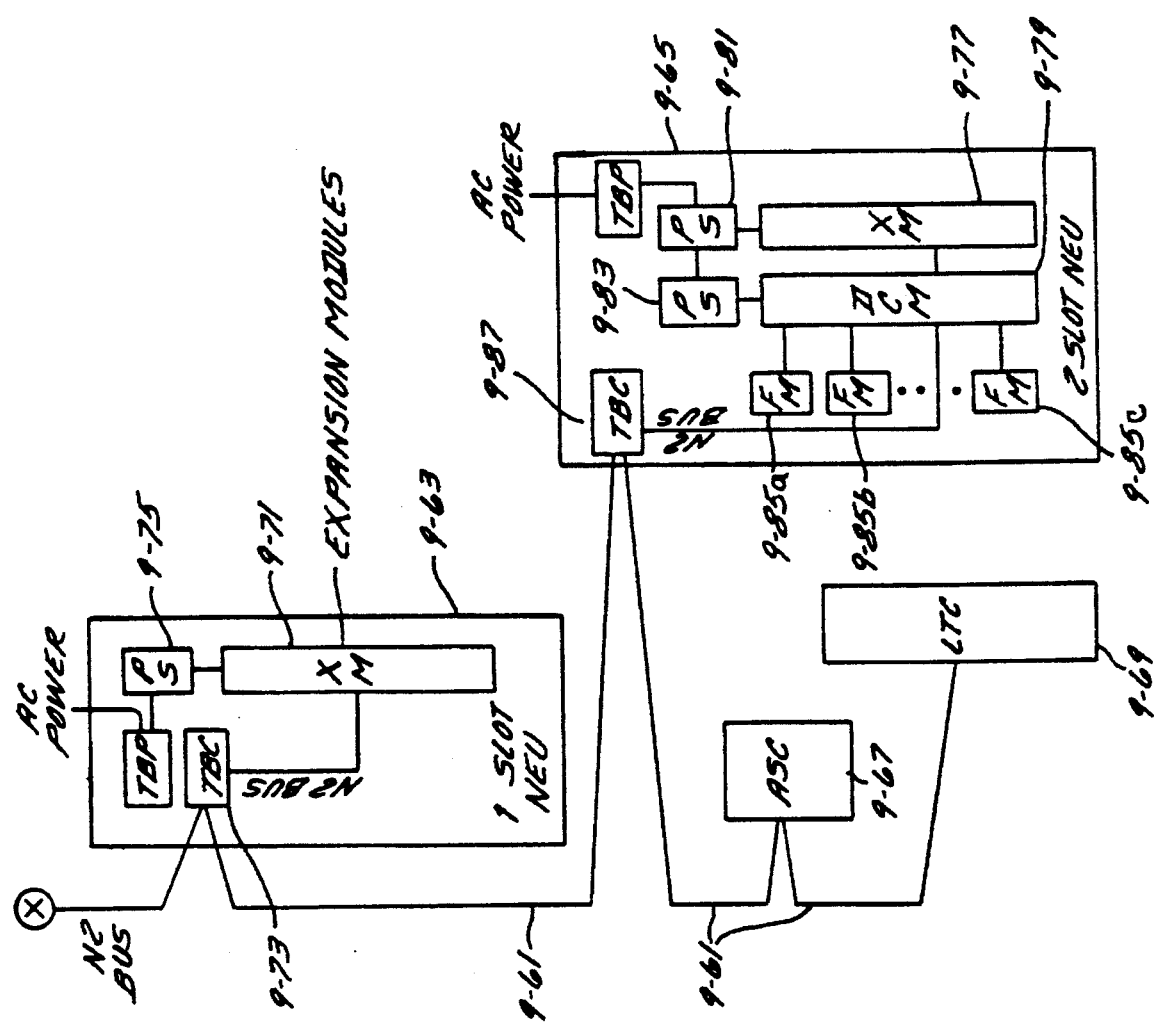
FIG. 9B

LIGHTING CONTROLLER

ACCESS CONTROLLER

FIRE CONTROLLER

FIG. 14 FACILITIES MANAGEMENT—MID-SIZE BUILDINGS

POINTS & PSEUDO-POINTS

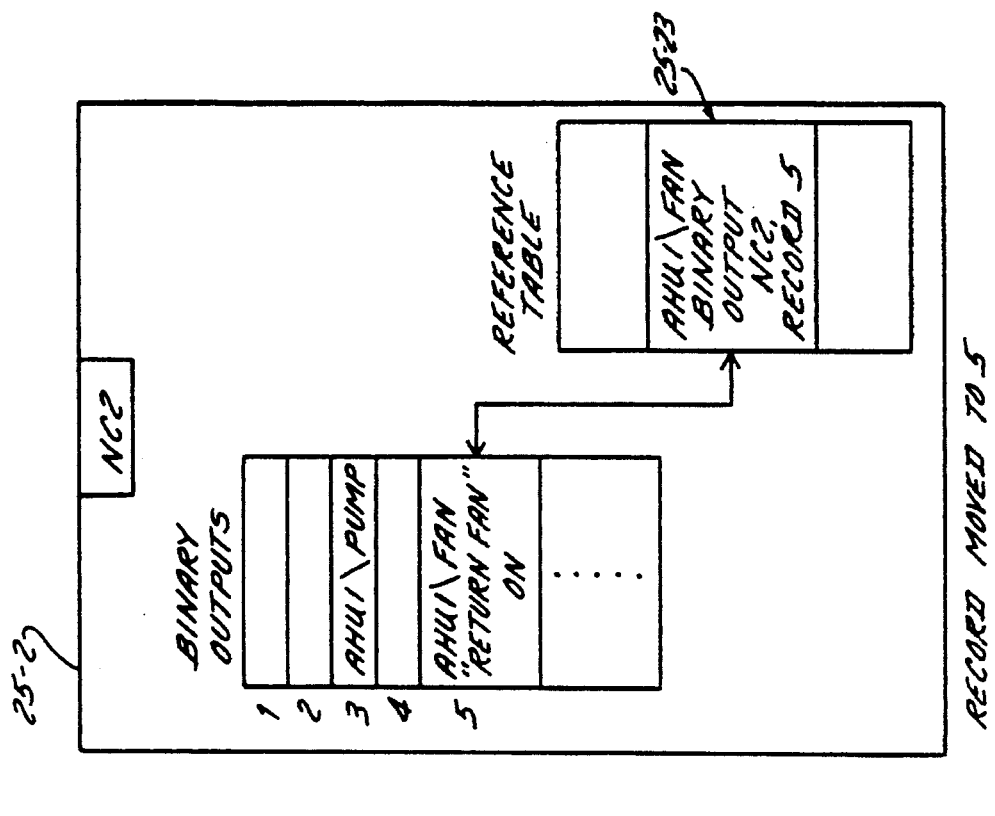
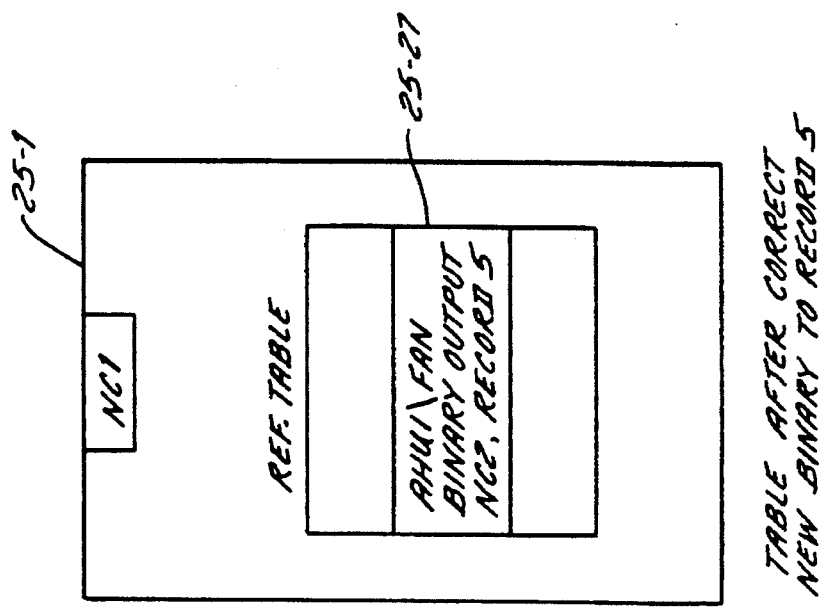
FIG. 25

|  | SRC | DEST. | INT_SRC | OS-INFO |
|---|---|---|---|---|
| 1:1-SEND | | | | |
| NEW MESSAGE: | 1:1:0 | 2:4:0 | 1:1:0 | 1:2:0 |
| 1:2-RECEIVE | | | | |
| MESSAGE: | 1:1:0 | 2:4:0 | 1:1:0 | |
| 1:2-RESEND | | | | |
| MESSAGE: | 1:1:0 | 2:4:0 | 1:2:0 | 2:3:1 |
| 2:3-RECEIVE | | | | |
| MESSAGE: | 1:1:0 | 2:4:0 | 1:2:2 | |
| 2:3-RESEND | | | | |
| MESSAGE: | 1:1:0 | 2:4:0 | 2:3:0 | 2:4:0 |
| 2:4-RECEIVE | | | | |
| MESSAGE: | 1:1:0 | 2:4:0 | 2:3:0 | |
| 2:4-SEND | | | | |
| REPLY MESSAGE: | 2:4:0 | 1:1:0 | 2:4:0 | 2:3:0 |
| 2:3-RECEIVE | | | | |
| REPLY MESSAGE: | 2:4:0 | 1:1:0 | 2:4:0 | |
| 2:3-RESEND | | | | |
| REPLY MESSAGE: | 2:4:0 | 1:1:0 | 2:3:0 | 1:2:2 |
| 1:2-RECEIVE | | | | |
| REPLY MESSAGE: | 2:4:0 | 1:1:0 | 2:3:1 | |
| 1:2-RESEND | | | | |
| REPLY MESSAGE: | 2:4:0 | 1:1:0 | 1:2:0 | 1:1:0 |
| 1:1: RECEIVE | | | | |
| REPLY MESSAGE: | 2:4:0 | 1:1:0 | 1:2:0 | |

*FIG. 31*

|  | SRC | DEST. | INT_SRC | OS-INFO |
|---|---|---|---|---|
| 2:4-SEND | | | | |
| MESSAGE: | 2:4:0 | 1:1:0 | 2:4:0 | 2:3:0 |
| 2:3-RECEIVE | | | | |
| MESSAGE: | 2:4:0 | 1:1:0 | 2:4:0 | |
| 2:3-RESEND | | | | |
| MESSAGE: | 2:4:0 | 1:1:0 | 2:3:0 | 1:2:2 |
| 1:2-RECEIVE | | | | |
| MESSAGE: | 2:4:0 | 1:1:0 | 2:3:1 | |
| 1:2-RESEND | | | | |
| MESSAGE: | 2:4:0 | 1:1:0 | 1:2:0 | 1:1:0 |
| 1:1-RECEIVE | | | | |
| MESSAGE: | 2:4:0 | 1:1:0 | 1:2:0 | |

FIG. 32

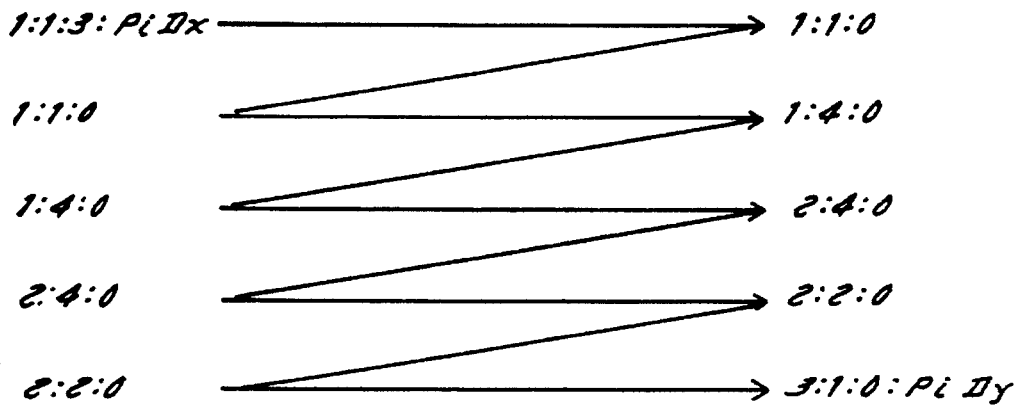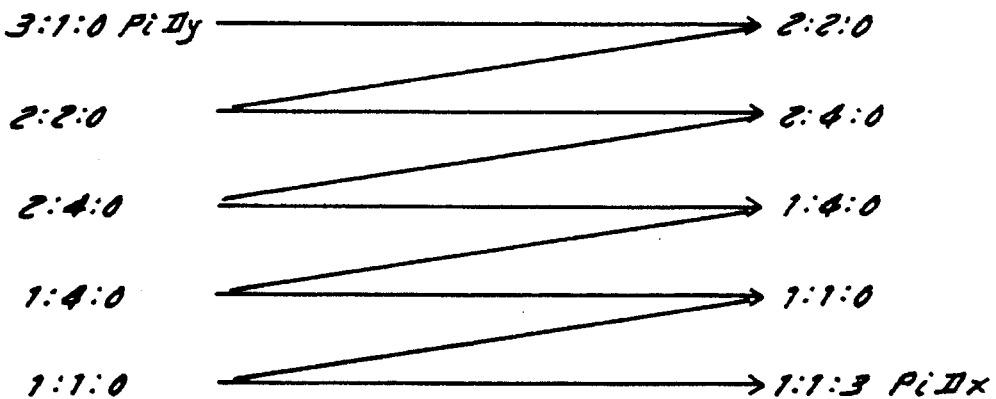
FIG. 41

ANALOG INPUT OBJECT

ANALOG INPUT OBJECT

BINARY INPUT OBJECT

BI OBJ. USED IN FB LOOP

NETWORKED FACILITIES MANAGEMENT SYSTEM WITH OPTICAL COUPLING OF LOCAL NETWORK DEVICES

This is a divisional of U.S. Ser. No. 07/476,031 filed on Jan. 30, 1990 entitled NETWORKED FACILITIES MANAGEMENT SYSTEM, now abandoned.

BACKGROUND OF THE INVENTION

1. Field of the Invention

The invention relates to automated processing systems which can operate independently or be interconnected to form a network. In particular the invention can be used in a Facilities Management Systems (FMS), although it is not limited to such systems.

2. Related Art

State of the art automated systems operating under processor control pass data to and from processors, operational units such as sensors and other physical parameter monitoring units, and other data acquisition and control instruments implemented in hardware. Facilities Management Systems (FMS) performing automated industrial and environmental control are among such contemporary systems. Since there is no uniformity among various types of data acquisition and control instruments, automated system must be compatible with a multitude of nonstandard operational units. To achieve compatibility, such systems have often relied on software tailored to specific interface requirements. This requires numerous compromises in software design. In addition, when new operational units are added, or existing operational units are changed, it often becomes necessary to rewrite one or more entire software packages. This is because requirements of new operational units are often incompatible with software written for earlier units. Since the interfaces among various portions of the software and between operational units and the processor are an integral part of the software, the entire software package must be rewritten.

One approach to reducing the extent of software affected by changes in operational units is the use of logical point information nodes. This is a modular approach which seeks to isolate high level software features from operational unit specific characteristics. However, this approach remains relatively dependent on the physical or logical location of operational units and on their individual characteristics. While some level of isolation of high level software features could be achieved by such a modular approach, it is still necessary to write operational unit specific software to accommodate inputs and outputs. Thus, using known technology, it has not been possible to provide software which would be relatively unaffected by the differences in operational unit hardware. As a result, it has also not been possible to produce software which need not be extensively modified when new operational units are added or existing data acquisition units are substantially changed.

A further limitation of the related art, especially in systems employing data acquisition and other remotely controlled hardware, is the limited data constructs available. Data acquisition and other remotely controlled hardware typically provide and require specifically formatted data and often do not allow convenient access to desired portions of the data. As a result, in current systems it is sometimes necessary to duplicate data to be used for different purposes or again access data previously obtained. Similarly, it is sometimes difficult in such systems to access intermediate data developed by a processing apparatus rather than data gathered directly by a data acquisition device.

Automated systems, including those used for facilities management, can operate using centralized or distributed processing techniques. As a result, data at a host node can be accessed for processing at another node (a referencing node) connected to the host node over a network. In distributed real time processing systems, processor nodes operating relatively independently communicate over one or more data buses to exchange information. In order for a referencing node to access a data element within the data base of a host node, a convention must be established whereby the referencing node can identify the host node whose data base contains the required data element and the specific location of the data element within the host node.

Such a convention should avoid relying on a central node to translate a data access request to the appropriate host node address or address within the host node. This is because a failure of the central node performing this function would prevent operation of the entire system.

It would also be unacceptable to search an entire real time network or even the data base of one node for a particular data element. This is because the time consumed by such a search would be excessive. Thus, a direct access mechanism to obtain the required data from within the host node is needed. Moreover, the data base at each node of the distributed system should be independent of data bases at other nodes of the system. It should not be necessary to synchronize the nodes by downloading new data into referencing nodes each time a host data base is changed. Data that was available previously from a host node should, if still present, be available to referencing nodes regardless of how the host node data base addresses are changed. Moreover, the data should still be available to the referencing node, even when the data element moves from one node to another.

Conventional techniques for referencing data between nodes on such distributed real time systems cannot meet all of the above requirements simultaneously. One known approach is the use of hard memory addresses. A referencing node maintains in its data base a fixed memory address of the data within the host data base. The address is normally bound to a named element of data when the referencing data base is generated, usually in an off-line generation device. The results are then downloaded to the on-line nodes to allow direct access to the data within the host node. While this technique provides quick access to data and does not require a central node to translate addresses, there is no adaptability to changes in the host node data base.

Host node data base changes that result in address changes within the node cause fixed memory addresses associated with the data elements in the referencing nodes to become obsolete. The same problem arises when a data element moves from one node to another. As a result, all the referencing nodes must be re-synchronized to the new addresses of the data elements. Especially in large systems, this is a time consuming task which causes the referencing nodes to be taken off line until the update is complete. In a facilities management system (FMS), the referencing nodes perform industrial and environmental control functions which often can no longer be maintained when the node is off line.

A second technique uses a "soft" address or record number to locate a data element within the host node. Using this technique, the relative position within a logical data base structure or a unique identifying number is assigned to a data element. As with the hard memory address technique, high speed and reliable access to the data is achieved. However, if the host node data base changes so that the relative position of the element in the data base is now different, the reference nodes are again obsolete and new information must be downloaded to the referencing devices. An additional problem occurs when attempting to assign a unique identifying number to a data item. Without further processing, it is impossible to guarantee that the same identifying number is not used by more than one host in the distributed system. This would create an intolerable conflict on the network. Finally, after referencing nodes are updated, it would not be possible to download an old data base to the host node since this would now invalidate the information in the referencing nodes.

A third conventional approach involves assigning a name to each data element in the system. The names are stored in a central node which is used to locate the data. While this allows increased flexibility because data elements can move at will, this central node containing the mapping of names to physical locations becomes a reliability problem. This is because a failure in the central node would eliminate all communication on the network.

The fourth conventional approach also assigns a name to each data element but avoids the central lookup node by searching the network each time the reference is made. However, in most systems, searching an entire network for a data element each time it is requested would result in an intolerable data communication and processing burden.

Networked systems with a plurality of nodes further require synchronizing time and global data for consistent operation. This is especially true in a facilities management system in which scheduled activities, such as temperature control of areas of a building, may operate routinely based on time of day and other variables. Thus, one of the nodes on the system must accurately track time and coordinate the time information among the other nodes. However, current systems employing master nodes risk losing time coordination should the master node fail.

As additional nodes are brought onto a networked system, it also becomes necessary to synchronize the data base of each new node with the most current data base of global variables. Traditional systems which employ a master node to perform these functions also risk reliability problem in this area should the master node fail.

Similarly, operational units communicating with individual nodes or intermediate processors between the nodes and the operational units can be connected to the nodes using data bus networks or similar structures. For consistency, it is necessary that operational and processing units connected to the individual nodes receive the most current values of system variables. Networked systems under master node control introduce similar reliability risks at this level.

In automatic processing systems, high level software features and routines may be triggered by events occurring in other processors at the same level or in lower level processors controlled by one of the nodes on the system. However, data base changes occurring from down-loading new information into one of the nodes could result in errors in such event triggering. Current systems which do not track these event triggering synchronization problems are unable to guarantee that important software functions will be performed after downloading new information into one of the nodes.

Similarly, reports of results produced by processes performed in the system, or of commands issued by the system, must be routed to appropriate display or storage devices. Current systems which do not accommodate changing the locations of such devices are severely restricted in dynamic environments. Similarly, current systems which do not synchronize changes in the location data of such devices downloaded into the nodes cannot guarantee that reports or messages will arrive at the correct device. Indeed, in some systems, messages which cannot be routed are discarded. This is a potentially serious limitation to applying such designs to facilities management systems.

Often, especially in facilities management systems, displays and reports include standardized summarizes of system data. In a typical approach to generating standard summaries, a processor retrieves individual records, either in response to a command or as part of routine polling of devices for data awaiting transmission. The processor must then test the retrieved data to determine if incorporation into the data summary being assembled is appropriate. Such dedicated summary report generation tests occupy the processors and intensify data communications, resulting in reducing achievable processing speeds.

In some cases, it is desirable to obtain reports by routing messages to devices which were not part of the network when configured. For example, ease of maintenance may be enhanced by allowing connection of a personal computer (PC) to an unoccupied port on a network node. It may also be desirable to provide other non-configured devices, such as printers, access to the nodes on the network. Traditional systems restrict the use of such non-configured devices, since there is no way to communicate with a device whose presence has not previously been made known to the network, for example, by assignment and storage of an address.

As previously noted, networked systems have at least 2 nodes with components for performing processing functions appropriate to the system and communicating with each other over communication links. In a facilities management system (FMS) such nodes can contain processors, A/D and D/A converters and other equipment interface circuits to obtain sensor data required for processes implemented in the node and to issue equipment commands. The communication links include various communication media facilitating communication among nodes on the same bus, subnet or network or between nodes on different networks over gateways. Nodes are configured on a system when they are defined in one or more storage devices as members of a network. Node configuration may occur by storing data defining a path to the node. Thus, the system has knowledge of the node's existence. Depending on the system, storage of configuration information may be centralized or distributed. Such configuration information may include data indicating the type of node, its location on the system, and other information defining a path to the node.

A number of techniques for communicating among nodes interconnected on a networked system currently exist. In broadcast communications methods, all nodes on a network receive a broadcast message or pass the message sequentially from one node to the next. Inefficient communications result from each node's handling of the broadcast message. Thus, other routing strategies have been developed to improve network efficiency.

Routing strategies may be adaptive or nonadaptive and systems may contain elements of both strategies. Nonadaptive routing strategies route messages independently of measurements or estimates of current traffic or topology. These may include flooding or broadcast, selective flooding, and static routing. One such non-adaptive routing strategy involves building a graph of communication paths from every node to every other node within the network and between networks interconnected by a gateway. Graph analysis techniques for determining the shortest path between pairs of nodes are employed and this information is then programmed into a static routing table. In one such routing table, each node stores partial path data identifying the next intermediate destination for a message ultimately targeted for a final destination node. Since each node has a static routing table which is defined at the time of node configuration, it is inconvenient to alter the routing table to facilitate communications by temporary or extraneous nodes which are not normally part of the network. This is because only nodes listed in the routing table are available for use in the data communications path.

Dynamic or adaptive routing strategies route messages over communications links in response to message traffic and topology. Adaptive strategies include centralized, isolated or decentralized, and dynamic routing. Centralized routing strategies have a central node monitoring the number and length of messages transmitted over communications links and dynamically issuing routing strategies based on message traffic patterns. This is usually accomplished by updating and changing routing tables in response to the changing traffic patterns. Decentralized strategies distribute partial routing tables among the nodes. For example, when a message is routed to an intermediate node along a path to its final destination, the intermediate node examines the traffic pattern among alternative remaining paths to the destination node and dynamically selects one of the several alternatives according to certain measures of efficiency. Thus, adaptive strategies provide for reconfiguring routing tables in response to changed conditions, including the addition of new devices. However, in many cases it is not possible to incorporate non-configured devices. Even where this is possible, the temporary incorporation of a previously non-configured device often does not justify the added processing required for dynamically adjusting routing tables. Such processing increases message transmission time and reduces overall system efficiency.

Regardless of the routing strategy employed by various parts of the system, in certain applications, such as maintenance, diagnostics, and administrative functions, it is desirable to allow data communications between a node on one of the communications links in the system and a temporary node or processing device. This is particularly true in automated networked control systems. Such systems often have need for emergency maintenance and diagnostic activities and for temporary load analysis. Present techniques are cumbersome because these require temporarily disabling at least portions of the network while a new node is configured onto the network. Configuring new nodes on a network is difficult since new data communication path strategies must be worked out. Moreover, developing temporary data path strategies could result in inefficient communication strategies between the temporary or non-configured device and the nodes configured on the network.

In networked automated processing or computer systems multiple processors requiring access to the same data may exist. Often this data is acquired by one of the processors which communicates with a particular sensor. Other processors requiring the same data communicate with the processor containing the data, either directly or through an intermediary, over a data bus. Using currently existing methods, a processor requiring sensor data not available through its own sensors, communicates over the data bus to signal the processor interfacing with the sensor that data is required. In response, the processor connected to the sensor polls the sensor and retrieves the data. It then transmits this data to the requesting processor for use in the remote processing routine. In another known arrangement, the remote processors signal a master node that data is required from a sensor controlled by a different processor. The master node then signals the sensor controlling processor which then retrieves the data and transmits it to the master node. The master node then provides the data to the requesting remote processor. Thus, each time a processor requires data from a sensor, the sensor controlling processor must access the sensor and transmit the information either to the requesting processor or the master node. If numerous processors request frequent access to sensor information, the data bus connecting the remote processors to each other and/or to a master node quickly becomes bogged down with message traffic.

In another known method, slave sensors connected on a bus to a master sensor are set up with a filtering increment. When a filtering increment is used, the slave processor controlling the sensor defines a certain "delta" value that the sensor must change before the slave will report the new value to the master. The master keeps a copy of the data as the slave transmits it. When a filtering increment is employed, the slave processor determines how often data is sent to the master. Thus, even if the master processor has no requirement for updated sensor information, the slave processor signals the master that the information is to be transmitted. If the sensor parameter is one which changes frequently, the slave processor may inordinately occupy the data bus with unnecessary updates of information to the master processor.

In another known method, the master regularly polls each processor for sensor updates. This also results in excessive message traffic on the interconnecting bus, since data is transmitted automatically, even when updates are not needed. In addition, polling systems risk missing important transient data transitions which might occur in a sensor while the master is polling another sensor.

In each of the above cases, unnecessary message traffic on the data bus tends to create bottlenecks and reduces the ability of the data bus to respond quickly to higher priority message traffic.

Presently known systems usually operate according to a fixed set of instructions forming one or more programs. Temporary or permanent variations to a program are accomplished using a software patch. A software patch directs the program to jump to another memory location, execute the steps beginning at that location and return either to the location following the calling location or to a different memory location, thereby skipping a portion of the program. Known systems using software patch techniques do not provide an easy mechanism for implementing the transfer of control. For example, one must leave intermediate memory available for possible insertion of the jump prior to the instructions to be by-passed. More importantly, if the jump is somehow missed, the incorrect code with its unfortunate consequences will be executed. Thus, in currently available systems, it is desirable to improve the certainty of executing a revised set of instructions.

Another factor often not considered in modern automated processing and data communication systems is the reliability or integrity of data acquired and communicated among the elements of the system. The level of data integrity and reliability is especially important to facilities management systems which seek to achieve robust control of an environment or process by updating manipulated variables to desired states based on measured parameters of the process.

Current systems fail to develop and effectively use reliability or data integrity indicators to produce controlled variations of system performance based on the quality of measured data.

Numerous computerized systems exist which perform high-level functions based on data obtained from various data acquisition devices. A facilities management system (FMS) used for industrial and environment control is one example of such a computerized system. Due to the wide variety of data acquisition and control hardware used in such systems, standard functional interfaces usually do not exist. In conventional systems, different software implementations are required to accomplish the different functions performed by the hardware to which interfaces are made. For example, programming required to receive data from a counter is different from that required to receive data from a voltmeter. Conventional systems with proportional and integral and derivative (PID) controllers also do not have prepackaged software functions which can interface to a variety of physical instruments. Programming required to obtain specific functions results in software individually tailored for specific pieces of hardware. In addition, some PID controllers require additional hardware to interface with specific systems. Thus, conventional systems do not provide a convenient means for transferring information between a hardware device performing data acquisition functions and a controller.

In the case of operating hardware which provides a binary input having two possible states to the computer (binary input hardware), various debouncing functions may be required, a normally open or normally closed state may be reversed from one apparatus to another, and alarm processing and triggering may be different depending on a function being performed by higher level software. In addition, some systems may require displaying the state of a binary input or overriding such inputs under certain circumstances. Additionally, some higher level software features may also require maintaining a history of binary input hardware states, a function which cannot be performed by many binary input type devices. Thus, conventional systems do not provide a convenient means for transforming binary input information between an operating binary input hardware device and a controller.

Output drive requirements of numerous analog and digital devices present similar difficulties. For example, programming required to drive a counter is different from that required to drive a voltmeter. Conventional systems with proportional and integral and derivative (PID) controllers also do not have prepackaged software functions which can interface to a variety of physical instruments. Programming required to obtain specific functions results in software individually tailored for specific pieces of hardware. In addition, some PID controllers require additional hardware to interface with specific systems.

Different priority queues, different minimum on and off times, different delay features and different alarm reporting requirements result in multiple software implementations. In addition, various output devices which can be driven to one of two states may require either a momentary signal or a maintained signal on a single line or on different lines to remain in the desired state. Programming required to obtain specific functions results in software individually tailored for specific pieces of hardware. As a result, when the hardware is changed, numerous software changes are also required. Thus, conventional systems do not provide a convenient means for driving binary output hardware units.

In a conventional system, operation of proportional plus integral plus derivative controllers used in Facilities Management Systems has traditionally involved control of one loop at a time. Multiple instances of such PID loops have not been controlled using a single software approach due to the variations in such loops.

Another factor in the design of facilities management and other systems is the design of control systems which are tolerant of system component failures which has been an objective for decades. The motivations for increasing levels of fault tolerance include improved human safety, equipment safety, and control of system performance. The most basic form of fault tolerance involves the application of fail-safe system components. In the traditional pneumatic HVAC controls industry, this often involves the use of normally open valves for heating applications and normally closed actuators for mixed air damper applications. Under these circumstances, a system failure (e.g., loss of compressed air, temperature transmitter failure) returns the mechanical system to a safe, although potentially uncomfortable and uneconomic state. In electronic control systems, electric actuators can be specified with automatic spring returns to provide a similar fail-safe functionality.

With the introduction of digital control systems, a higher degree of fault tolerance is possible. The digital controller has the ability to trap specific input signal fault conditions, such as a sensor malfunction, and can then partially compensate for that failure in software. The flexible software response is referred to as a fail-soft feature. Examples of fail-soft functionality in the event of a sensor failure include: 1) maintaining the current control signal, 2) commanding the control device to an intermediate safe position, or 3) computing an appropriate control signal based on an alternative strategy.

Aside from the application of redundant components, the use of an alternative or backup control strategy provides the best opportunity for simultaneously maintaining equipment safety, occupant comfort, and energy efficiency in the event of an instrumentation failure. An extension of the fail-soft concept involves the application of an intelligent strategy which individually adapts to a specific controlled process and can satisfy nominal system performance requirements over extended periods of time in the event of a failure. Some intelligent strategies are currently applied in advanced military aircraft and nuclear power plants. The method and apparatus described below is an intelligent backup control strategy to be applied in the HVAC industry.

Facilities management systems employ both demand limiting and load rolling for energy optimization. The demand limiting feature monitors the current energy consumption over a sliding interval of time corresponding to the demand interval used by the power company. This feature controls the system to maintain an average energy consumption below an established limit. Conventional systems which do not use historical data to predict future demand, tend to overreact to sudden peaks in energy consumption, and as a result shed excessive loads. The load rolling feature reduces total energy consumption by periodically shutting loads off for short periods of time. The user specifies a target amount of load to remain off. Systems that do not accommodate environmental conditions may cause extremes in areas controlled by loads that are shed for too long a period of time.

In a distributed facilities management system, loads might be distributed over multiple control nodes. However, one node runs the demand limiting and load rolling features, shedding loads on its and other nodes in the system. After shedding a load, a problem can occur where communications can be lost between the node issuing the shed command and the node that contains the load. In such a situation the load could remain shed indefinitely causing environmental extremes in areas controlled by the load. The node commanding the load shedding may also experience time delays and information bottlenecks in its attempt to monitor every load and its environmental overrides.

Conventional structures of program instructions used in facilities management systems have several drawbacks. Program statements and instructions requiring data must access that data from addressable storage locations. Thus a two step process involving identifying the address and later accessing the data in the address is required. In addition, conventional program structures do not permit immediate response to changing system conditions. Presently the program must specifically test a variable periodic intervals. Similarly it is difficult to share variables among processes. The resulting limitations of these program language constraints reduce processing through put.

Motors, actuators, dampers, positioning type mechanisms, and other devices and transducers in control applications often require an analog drive signal. Such analog drive signals may be either voltage or current sources depending on the requirements of the driven device. Generally, such analog output signals have their voltage or current outputs referenced to a common ground and are thus single ended. Large physical distances often exist between the analog signal source and the driven device. Cable mismatches and noisy environments through which cables interconnecting the analog source and the driven device pass introduce a path for entry of noise and ground current loops in such multi-port control systems. Often, the noise introduced has a summing effect relative to a common node, such as circuit ground, resulting in distorting the system control and operation. While there have been some attempts to eliminate such problems in analog voltage output circuits, a more comprehensive approach addressing both analog voltage and analog current outputs is needed.

Another important factor in achieving high level performance of facilities management systems is reducing effects of both external and self-induced noise. In addition, it is necessary for a system to provide immunity to external electromagnetic interference (EMI) and prevent the generation of unwanted levels of EMI which may effect other systems. This is particularly critical where wide dynamic range is required, for example, to accommodate both extremely low level sensor signals and much larger digital and binary signals. Systems which employ a single power supply and other known power supply filtering techniques may fail to provide sufficient isolation from spurious signals or sufficient reliability, due to their reliance on a sole power supply. Similarly, many contemporary systems also fail to sufficiently isolate digital signal lines from sensors which are subject to extremes of environmentally induced spurious signals. This is particularly important in systems employing bus structures and networks. An unpredictable variation in a single sensor on a network can result in systemic problems, if the signal is communicated to other devices connected to the same communications media. A further need for isolation from effects of failures of devices interconnected on a common communications media also exist. Omitting such isolation exposes networks and sub-networks to complete breakdown should a failure occur in a single node. Thus, it is desirable at all levels of system interconnection to provide for isolating interconnected system components from each other. Similarly, as mentioned above, it is also desirable to provide graceful system degradation in the presence of a failure.

Other limitations of facilities management systems arise in the connections of various devices to control nodes. Multiple devices, especially if connected on a bus, introduce noise on the transmission medium. In addition, the transmission medium may be susceptible to noise from other internal and external sources. Both differential noise, in which opposite polarity voltages appear on two leads of a transmission medium, e.g., a twisted pair, and common mode noise, in which the same noise is induced on both lines of the bus, are possible. Even where optical coupling of devices to the bus is used, it may be necessary to take steps to further reduce noise effects.

SUMMARY AND OBJECTS OF THE INVENTION

In view of the limitations of the related art described above, it is an object of the invention to provide a method for substantially isolating the software providing the interface between higher level software features and operational units.

It is a further object of the invention to provide a method and apparatus for allowing changes to operational units without requiring extensive higher level software changes.

It is a further object of the invention to provide an intermediate level of software which treats all inputs and outputs in the same way independent of the characteristics of the operational units.

It is a further object of the invention to provide a further intermediate level of software 15 which controls interfaces between a higher software level and operational unit hardware.

It is a further object of the invention that the first intermediate level of software treat all higher level software requests for data from operational units in the same way.

It is a further object of the invention that the further intermediate level of software categorize hardware units into types which can be manipulated according to a standardized approach for the type.

It is a further object of the invention that all intermediate levels of software have a database of attributes and a common method and set of messages for manipulating the attributes.

It is still another object of the invention to provide broad data constructs for accommodating remotely controlled operational units.

It is still another object of the invention to provide data constructs minimizing the need to reproduce the same data or data attributes for multiple operational units.

It is another object of the invention to provide data constructs with attributes defining paths to at least one other data construct.

It is still a further object of the invention to provide data constructs containing attributes of an associated data construct.

In another aspect, it is an object of the invention to provide a flexible, reliable method of accessing data among nodes in a distributed system.

It is a further object of the invention to provide a method of accessing data in a distributed system without requiring a central look up node.

It is a further object of the invention to provide a method for providing data in a distributed system without requiring a search of the entire network on every reference to the data.

It is a further object of the invention to provide a method of accessing data within a distributed system by assigning a unique name to the data element when it is first defined.

It is a further object of the invention to bind the unique name of the data element to a host node at the time the data element is first accessed.

It is a further object of the invention to provide a method of accessing data in a distributed network using a multi-level naming convention based on a user defined name and the physical location of the data element on the network.

It is a further object of the invention to provide a naming convention in which a user assigns names to data elements independent of where the data element is located on a network.

It is a further object of the invention to provide a naming convention in which a name is bound to a unique address, such as a physical location and data base location within the node, when it is referenced for the first time in the running network.

It is a further object of the invention to provide for subsequent references to data elements using the user assigned name bound to the unique address.

It is a further object of the invention to provide a distributed system having time synchronization of system nodes.

It is another object of the invention to provide a distributed system having synchronized databases of global variables among the nodes.

It is a further object of the invention to provide a system with nodes which periodically broadcast their presence on a system using time stamps indicating when the nodes' database of global variables was last updated.

It is a further object of the invention to coordinate all nodes on a network to incorporate the global database of the node having the most recently updated global database.

It is a further object of the invention to detect and report inconsistencies and duplication of data constructs in their respective databases.

It is a further object of the invention for the system to recognize directory entries in the nodes' databases which have multiple definitions in other locations on the system.

It is a further object of the invention to provide nodes without routing tables the ability to identify other nodes with routing tables in order to identify paths to route download requests from the nodes without routing tables to devices containing download information.

It is a further object of the invention to provide a system wherein data constructs allow high level features in the nodes to be notified or triggered by changes of state in attributes and objects on other nodes.

It is a further object of the invention to detect changes in locations of object and attributes in the system and to notify features activated or triggered by the objects or attributes.

It is another object of the invention to report results produced by system processes to appropriate display and storage devices.

It is another object of the invention to detect changes in physical locations of display and storage devices and route reports to the correct devices.

It is another object of the invention to reduce the volume of data traffic required to produce standard or predefined summaries of data for storage or display.

It is a further object of the invention to filter data used in producing standard summaries by defining criteria for data retrieval in a high level feature directory routed to a task in the same node as a directory of the data to be retrieved.

It is a further object of the invention to retrieve standard summary data according to nodes identified in a directory and to assemble the data in the node containing the directory into a message for transmission to a feature generating the summary.

In another aspect, it is an object of the invention to provide a system allowing devices not included in the original network configuration to communicate with configured nodes on the network.

It is another object of the invention to allow such non-configured devices to receive messages from configured nodes on the network.

It is yet another object of the invention to allow such non-configured devices access to networks which employ either adaptive or non-adaptive routing strategies.

It is a further object of the invention to allow such non-configured devices access to the network without requiring the down loading or updating of static or dynamic routing tables in existing nodes.

It is a further object of the invention to allow such non-configured devices to be attached to a first configured node on a network using one of either an adaptive or non-adaptive routing strategy and to receive messages from other nodes on other networks using the same or a different routing strategy.

It is a still further object of the invention to allow such non-configured devices access to a network without requiring shutdown of the system.

It is yet another object of the invention to provide access to a communication system on demand by processing devices without requiring their membership in a network on the system.

It is a further object of the invention to provide such processing devices access to a system to perform diagnostics, maintenance, and administrative functions from anywhere in the system.

It is a still further object of the invention to provide a processing device access to a data communication system on demand without requiring changes to global variables or static or dynamic routing tables or directories.

It is also an object of the invention to provide a data communications approach which allows access to data remote from the requesting processor without creating unnecessary message traffic.

It is a further object of the invention to reduce unnecessary access to sensor data in a facilities management system.

It is still a further object of the invention to prevent slave controllers from providing unnecessary information to a master controller which does not require it.

It is a further object of the invention to control access to sensor information based on the expected rate of change of the parameter measured by the sensor.

It is a further object of the invention to provide a master controller which regulates access to sensor information by remote slave controllers according to the validity of the sensor and the data transfer needs of the system.

It is a further object of the invention to regulate access to data by remote master controllers connected on a network bus to a master controller regulating the data producing processor on a local bus.

It is still another object of the invention to provide a system with programs which can be easily modified by routing control to different portions of firmware memories.

It is another object of the invention to provide such routing in firmware memory by executing calls to program segments through erasable pointers identifying the next section of code to be executed.

It is a further object of the invention to store and execute software patches containing revised or additional code from an area of memory within a node as identified by an erasable pointer within the node.

It is another object of the invention to implement such erasable pointers in erasable memory in the form of a pointer table accessed by each subroutine call in a main program.

It is still another object of the invention to test reliability of data elements and tag a status of the tested data with an indicator of its reliability.

It is a further object of the invention to report the reliability indicators associated with data elements throughout the system. It is a further object of the invention to associate a reliability indicator with data used in intermediate calculations throughout a system to determine a reliability indication of a result obtained through one or more calculations.

In another aspect it is an object of the invention to receive signals from hardware operating units operated by control systems and convert these signals to appropriate data formats for use by high-level software features in the control system.

It is a further object of the invention to provide a unified approach to transferring information between the controller and a variety of types of data acquisition devices.

It is still a further object of the invention to convert raw data in the form of analog to digital (A/D) counts into floating point values that represent characteristics of an analog signal, e.g. amplitude, polarity, frequency, periodicity, etc.

Another object of the invention is to provide a software object at an intermediate level of a system to interface to analog input hardware residing on a variety of operational input hardware devices.

It is a further object of the invention to provide an analog input software object residing in software which performs signal conditioning operations on inputs from analog hardware in order to provide a common format of variables supplied to higher-level software features.

It is still another object of the invention to provide an analog input software object which performs alarm detection and reporting independent of the operation of higher-level software features.

It is a still further object of the invention to provide an analog input software object which performs a variety of specific prepackaged functions applicable to a particular system, e.g., a facilities management system.

It is another object of the invention to provide the ability to override a value reported by an operational input hardware device.

It is a further object of the invention to provide a status indication of the operational input hardware device identifying when the hardware device is off-line or unreliable.

It is a further object of the invention to provide an analog input software object which can map to different hardware types and provide required information to higher-level software features independent of the hardware used to obtain the raw data value.

It is a still further object of the invention to provide an analog input software object which performs functions on data and has attributes accessible to the functions.

It is a further object of the invention to provide an analog input software object located in a network controller or having functions distributed over multiple pieces of equipment.

It is a further object of the invention to provide an analog input software object which can be used in closed loop control associated with facilities management systems.

In a further aspect it is an object of the invention to provide an apparatus with means to sense the state of an external contact or a means to sense the presence or absence of a signal.

It is a further object of the invention to provide a means for "debouncing" a binary input hardware signal.

It is a further object of the invention to provide a means to display the state of binary input hardware whose state would otherwise be unknown.

It is still another object of the invention to provide an override feature allowing an operator to select a desired state of binary input hardware to be communicated to a higher level software function.

It is a further object of the invention to provide alarm detection when a binary input value produced by the hardware varies from a user specified normal condition.

It is a still further object of the invention to provide an alarm delay timer which prevents alarm reports for user specified time periods.

It is still another object of the invention to provide a means for archiving and displaying a history of a binary input hardware point based on sample point data.

It is also an object of the invention to translate commands from control systems and convert these commands to appropriate signals which result in activation of physical hardware.

It is a further object of the invention to provide a unified approach to transferring information from the controller to achieve control of different physical devices.

It is a still another object of the invention to convert commands from floating point values representing a percentage of full scale deflection into individual signals capable of moving actuators or developing voltages or currents as required by attached physical devices.

It is a further object of the invention to implement a built-in set of priorities among several sources of commands to aid a user in configuring a system.

It is still another object of the invention to provide a closed loop control method which can maintain a single set point using multiple devices by providing separate outputs derived from a single control loop output.

It is a further object of the invention to provide a span function which allows appropriate sequencing of multiple devices wherein each device performs a function over a specified range so that devices appear as a single device to a PID controller.

It is still a further object of the invention to allow a PID controller to provide a standard set of outputs independent of the requirements of the physical output device.

It is a further object of the invention to provide an apparatus and method which handles proportional analog outputs.

It is a further object of the invention to provide an apparatus and method which handles incremental or delta modulation type outputs.

It is a further object of the invention to provide a control system which supports a hardware override function.

It is a further object of the invention to report the status of a hardware override throughout the system.

It is a further object of the invention to provide a control system which can be used with an analog input in tandem to detect alarm conditions.

In an additional aspect, it is an object of the invention to provide software in the form of a generalized binary output object which can translate commands from high-level software features in control systems and convert these commands to appropriate signals which activate binary hardware output devices.

It is a further object of the invention to provide in such a software object a database having both methods and attributes controlled by a database manager to carry out translation and other functions.

It a further object of the invention to provide built in levels of priority to allow coordination of commands issued by various high-level software features.

It is a further object of the invention to allow a user, during system configuration, to specify levels of priority which are automatically implemented during system operation..

It is a further object of the invention to verify that a binary output command has been acted on by the device by associating a binary output object with a binary input object also implemented in software.

It is still another object of the invention to prevent stress on equipment driven by binary output objects by programming a minimum on and off time and the maximum number of starts per hour of the equipment connected to a binary output. It is a further object of the invention to provide a delay between starting successive equipment connected to binary outputs to avoid power surges.

It is another object of the invention to provide for specifying either a normally open or a normally closed contact for both start and stop conditions.

It is a further object of the invention to provide control of maintained binary output devices which are energized by a signal in a start state and de-energized by a signal in a stop state.

It is a further object of the invention to provide control of momentary binary output hardware devices energized by a start pulse applied to one portion of the device and a stop pulse applied to a second portion of the device.

It is a further object of the invention to provide an override capability to manually turn a binary output on or off.

It a further object of the invention to broadcast throughout the system an indication of an override condition.

It is a further object of the invention to allow a user to select between reporting and locking out reporting of change of status of a binary output.

It is a further object of the invention to record a timed stamped history of commands executed.

It is another object of the invention to provide software in the form of a generalized proportional plus integral plus derivative control object to translate commands from high-level software features in control systems and convert these commands to appropriate signals which activate and control a proportional plus integral plus derivative (PID) control loop (e.g., activate and control devices as part of a closed loop control process).

It is a further object of the invention to provide a predictable and controlled transfer from control by a scheme outside a PID loop to control by PID automatic control means.

It is a further object of the invention to eliminate the hysteresis effect that a controller may experience between the output controlling a process and a sensed feedback from the process.

It is a further object of the invention to provide an adjustable dead band to PID control.

It is a further object of the invention to provide software mechanism in the form of a PID device object to interface actual PID hardware to other software objects.

It is a further object of the invention to provide scheduling means for PID loops.

In view of desirability of implementing improved back-up control strategies in HVAC applications, it is an object of the invention to provide an HVAC control system with the ability to maintain control over a process when an input variable becomes unreliable.

It is a still further object of the invention to provide operation of a process, even when feedback from the process is lost or unreliable, based on a model of the system or process and other system inputs.

It is a still further object of the invention to employ a set of parameters locked at the time that the system or feedback becomes unreliable.

It is a still further object of the invention to adjust a manipulated variable based on the state of process variables just prior to the system or process becoming unreliable and based on current status of process variables.

It is a still further object of the invention to control response of an HVAC system to a changing setpoint in the presence of an unreliable variable.

It is still another object of the invention to predict energy demand in a future demand time period based on the current demand and historical collected data.

It is a further object of the invention to automatically vary on and off times of a load to accommodate the predicted energy demand thereby maintaining average demand below the target.

It is a further object of the invention to adjust operating time of a load to minimize costs by shifting energy consumption from expensive periods of high demand to less expensive periods of lower demand.

It is a further object of the invention to adjust the operating time of a load to also accommodate environmental conditions in areas affected by the load.

In another aspect, it is an object of the invention to ensure that communications between demand limiting and load rolling features in one node and objects in other nodes do not become impaired by excessive traffic.

It is a further object of the invention that loads shed as a result of demand limiting remain shed until communications with the demand limiting feature are restored.

It is a further object of the invention to assure that a load shed as a result of load rolling be restored even if communication with the node containing the load rolling feature are not restored.

It is a further object of the invention to provide shed and restore characteristics as attributes as part of an object rather than as part of a higher level software feature.

It is a further object of the invention to provide a message to an object manager to redirect load related characteristics for the load local to the node using a restore task localized within the node.

In another aspect, it is an object of the invention to provide a means for programming predefined features into a facilities management system.

It is a further object of the invention to provide a data construct in the programming language which allows remembering data values in programming statements rather than variables.

It is a further object of the invention to provide a programming language with a plurality of executable statements which remember values from one execution of the statement to a next execution of the statement.

It is a further object of the invention to provide a data construct which allows a facilities management system to trigger execution of a process based on a change to an element in the system.

It is a further object of the invention to provide data constructs which automatically sign-up to be informed of changes in any triggerable attribute of any object.

It is a further object of the invention to provide data constructs that are not dependent on objects in the facilities management system and are independent of the types of controllers or objects on the system and create a substantially generic interface to system objects.

It is a further object of the invention to provide data constructs for sharing variables among algorithms.

It is a further object of the invention to provide a data construct in which a change to a Boolean shared variable can be used to trigger a process.

It is a further object of the invention to provide a software function which resets a set point in a closed loop system by means of a proportional plus integral plus derivative calculation.

In another aspect, it is an object of the invention to provide a universal analog output circuit which allows selecting a balanced output voltage or balanced output current.

It is a still further object of the invention to provide an analog output circuit which maintains high accuracy of the output driver.

It is a still further object of the invention to provide an analog output circuit which decouples its outputs from ground loop currents induced when load grounds are connected together.

It is a still further object of the invention to provide an analog output circuit with a sample and hold feature such that a single D/A output can drive multiple circuits.

It is a still further object of the invention to integrate a sample and hold circuit within a closed control loop of a analog output circuit, so that compensation for multiple sources of errors can be effected.

It is a still further object of the invention to provide an analog output control circuit with a current sense network for sensing the current at the analog output whether the output is a voltage or current drive type.

It is a still further object of the invention to provide a current sense network which, in the current drive case, senses an analog output current as part of a feedback to control the current output of an analog output circuit.

It is a still further object of the invention to provide an analog output circuit with a current sense network which, in a voltage drive case, protects against a short circuit load at the output.

It is a still further object of the invention to provide an analog output circuit with balanced differential outputs.

It is a still further object of the invention to provide an analog output circuit which is not destroyed by the misapplication of large voltages to either of a pair of outputs.

It is a still further object of the invention to provide an analog output circuit with a pair of outputs having a positive side and a negative side linked together.

It is a still further object of the invention to provide an analog output circuit with an open a common emitter configuration in both outputs to provide for high reverse breakdown voltages protection.

It is a still further object of the invention to provide an analog output circuit a pair of balanced outputs with one of the outputs being an inverted image of the other output.

It is a still further object of the invention to provide electronic selection of a balanced voltage output or a balanced current output.

It is an object of the invention to reduce noise coupling among local devices connected to a node.

It is another object of the invention to provide optical coupling of signals between the nodes and local devices connected to a local bus.

It is another object of the invention to ameliorate effects of differential mode noise induced on the bus by biasing the leads of the bus to a predetermined voltage.

It is a further object of the invention to protect optical isolators from large common mode voltages by using tranzorbs and metal oxide varistors to shunt such high voltages safely to ground.

It is a further object of the invention to provide indicators of when a node is transmitting and receiving data.

It is a further object of the invention to provide separate digital and communications power supplies to portions of the local bus interface circuits.

It is a further objective to provide an optocoupler to isolate the digital and communications power supplies.

It is a still further object of the invention to operate a system with no ill effects with up to 2500 volts, peak, noise on the communication power supply.

To accomplish the above objects of the invention, software is organized into multiple levels. The highest or "features" level communicates with a software object level containing software object database managers and databases. The software object level treats all inputs and outputs to and from the features level the same way. In addition, the software object level communicates with a lower intermediate level, the hardware object level. The hardware object level contains a hardware object database manager and databases. The hardware object level operates to mask the differences between individual operational units to the software object level. The hardware object level categorizes data acquisition units so that additional units of a known type can be added with no more than a minor database change. Additional types of operational units can also be added while software changes are confined to the hardware object level. Thus, new units can be incorporated without any major impact on overall system software.

To accomplish the above objects of the invention software also employs points and pseudo points. One or more attributes define a point as a vector quantity. The values of the attributes which characterize the vector quantity are obtained from operational units, such as sensors. Each individual point is an independent vector quantity which is defined without reference to any other point in the system. A pseudo point is also a vector quantity defined by attributes. However, at least one of the attributes of a pseudo point identifies an associated point or attribute of a point. Additional attributes of the pseudo point are then obtained from the identified point to facilitate intermediate calculations without requiring repeated access to the operational unit associated with the point.

Other aspects of the above objects of the invention are also accomplished by a multi-level naming convention. First, each data element is assigned a name unique to the system, so that it is a unique identifier which is used only for that piece of data. The name assignment is done when the data element is created in a network generation process. When the name is referenced the first time in the running network, the name is assigned or bound to a unique address identifying both the node location and the data base location within the node. This is done by searching the network for the data element by name the first time it is referenced. Thereafter, this bound reference is used to locate the data element at each subsequent reference to that data element during run time.

In another aspect, the objects of the invention are accomplished by maintaining consistency among global variables in the nodes. At regular intervals each node broadcasts its presence and a time stamp indicating the most recent update of its data base of global variables. The nodes receiving the broadcast compare their time stamps with the one most recently broadcast. If the time stamps are not the same, the receiving node requests the broadcasting node with the latest data to download the more recent global variable data base. This occurs so that all the nodes have the most recent global variables.

In another aspect, the objects of the invention are accomplished by dividing a facilities management system into a plurality of individual systems with each of a plurality of nodes having a list of all the names in systems defined on the nodes. In order to allow the systems to be distributed over one or more interconnected networks, the system definitions include a directory of objects for the system stored on the system defining node. The directory defines which node the object is located on so that it is not necessary for all the objects of the system to be resident on a single node. When objects are moved around from the control of one node to another, the directories are updated.

Another aspect of the above objects of the invention is accomplished by using a single node to coordinate timing within the system. The time keeping node monitors calendar date and time of day to assure that regularly scheduled activities take place as required. In addition, should the node monitoring calendar date and time become disabled, a second node performs this function.

Another aspect of the above objects of the invention is accomplished by maintaining calendar date and time of day information in all the nodes distributed on a system. The nodes are time synchronized by redistributing to all the nodes date and time information at a fixed time everyday under normal operating conditions. This permits routine updating and synchronization on a regular basis of the plurality of nodes.

In another aspect, the above objects of the invention is accomplished by providing nodes the ability to cascade download requests through other nodes. A node without a routing table identifies another node with a routing table which can identify a path to route a download request. Thus, once a first node contains a routing table a second node without a routing table can receive download information from an external device through the node with the routing table.

Another aspect of the above objects of the invention is accomplished by triggering attributes of objects in response to changes of state. Object managers and high level software features "sign-up" to be notified when specific events occur. For example, an alarm might be triggered when a sensor exceeds a known threshold. It is not necessary that the object manager which handles the sensor information and the feature be located at the same node. The feature need only "sign-up" to be notified by the appropriate object manager. However, in the event that the object manager is changed the sign-up becomes invalid. This is detected and the feature is notified.

In another aspect, the objects of the invention are accomplished by distributing the routing of reports. Routing information is retained within each node on the network as global data. Reports emanating from the node are routed through a report router task for ultimate distributions to the destination device. The report routing task acts as intermediary between input/output routines of the nodes. The report router determines if the input/output routine can route the report to a destination device. If not, the report router determines if a second or default device is available. If not the message is discarded and the report routers are so notified. If a default device is available, the report is routed to the default device.

In another aspect, the above objects of the invention are accomplished by reducing the volume of data traffic required to produce the standard or predefined summaries of data for storage or display. This is accomplished by localizing filtering of data at the node of which the particular object directory of interest is located. Standard summary data is obtained from the nodes identified in a directory of a first node. The data need not be obtained from devices connected to the first node, but obtained from the nodes identified in the directory. When the data is obtained it is assembled in the node containing the directory into a message for transmission to the high level software feature generating the summary. The high level software feature may be located in any node.

The above objects of the invention are further accomplished by attaching a non-configured device to a port on a configured node of a network. The non-configured device, which contains its own process identifiers, communicates via that port with the configured network node. The configured network node communicates with other configured network nodes to route messages from the non-configured device to their destinations. Destination nodes recognize the message source as the configured network node or as a non-configured device dropped from a port on a configured node. Thus, at the destination node, responses generated are transparent to the status of the source as a non-configured device. The final destination node. responds as though the message is from a configured node and the response message follows the same or an alternate data communication path back to the configured node having the non-configured device connected to its port. Based on communications over a drop between the non-configured node and the configured node, the configured node provides the message to the non-configured device which delivers it to a process identified in the message. This allows any configured node to respond to data requests made by a non-configured device.

Other aspects of the above objects of the invention are accomplished by a method and apparatus in which a master controller stores sensor values in a data aging table and associates each sensor value with a valid time frame. All requests for data during the valid time frame are serviced by transmitting the value from the data aging table in the master controller. This prevents further data requests to the slave controller and reduces message traffic on either the local or the network bus. This also allows matching the aging timer value to the characteristics of the sensor data.

In another aspect, the objects of the invention are accomplished by a memory system in which every call to a subroutine results in accessing a pointer stored in a erasable section of memory. The pointer identifies the next section of code to be executed. Since the pointer is erasable, the next section of code to be executed for each subroutine call can be altered electronically. Thus control can be transferred to a section of memory other than that originally programmed. This allows additional flexibility in operating the system by providing for easy incorporation of software patches. Since every call to a subroutine results in accessing the pointers, it is not necessary to provide blank spaces of memory to accommodate jumps to previously undefined memory locations. Control is easily transferred by changing the value of the pointer to the newly desired memory location.

In another aspect, the objects of the invention are accomplished by providing an indicator to detect the status of data reliability. Each data element is assigned a reliability indicator which is propagated throughout all the calculations involving the data element. As a result, it is possible to determine an overall certainty of the accuracy of a calculation, since each intermediate calculation also considers the reliability of the data elements.

The above objects of the invention are further accomplished by an analog input software object which interfaces to analog input hardware residing on a variety of hardware devices. The analog hardware input is received and ranged using an equation and parameters unique to the operational hardware device. Optional filtering, square root, and span functions can then be performed on the ranged value to provide information in a format compatible with higher-level software features. The analog input software object then checks the final value against the warning and/or alarm limits to determine the current status of the object. In addition, a point history can be stored to provide trend analysis. The final value is in the form of a floating point value representative of the physical system. Using the alarm features, the software object detects and reports excursions from the normal state and provides an override of the current value to force the parameter to a specified value.

The above objects of the invention are also accomplished by a binary input software object which interfaces to binary input operating hardware residing on a variety of hardware devices. A signal from the binary input hardware is received and a contact condition determined. A debounce filter produces a filtered binary input and the current state of the binary input is examined for alarm analysis by the binary input software object. In addition, the point's history can be stored to provide trend analysis. Using the alarm features, the software object detects and reports excursions from the normal state and provides an override of the current value to force a binary parameter to a specified state.

The above objects of the invention are further accomplished by a prepackaged analog output object software function to accomplish the objectives outlined above. The prepackaged software functions require no specialized additional hardware and provide a unified approach to device control independent of hardware. The software resides either in PID hardware and/or in a network controller which supports an object manager. Local commands from a PID loop are represented in percentages of full scale deflection of the driven device. The command is translated into a current command and a span range is selected. Fixed span outputs in the form of digital counts are provided as are output pulses whose duration is a function of the difference in the change in command, thus reflecting the change in the full scale output required.

The above objects of the invention are further accomplished by a binary output object software function residing either in binary output hardware or in a network controller which supports a binary output software object manager. The binary output software object manager receives commands from high-level software features and access methods and attributes to control binary outputs directed to output devices having two stable states.

The above objects of the invention are accomplished by a proportional and integral and derivative controller software object which is based on sampling a feedback value at consistent time intervals. The object incorporates the proportional, integral, and derivative terms independently so that the individual terms may be removed. This facilitates having any combination of proportional, integral and derivative controls. The PID software object employs points and pseudo points on which input conditioning is performed and which are processed according to a sample period, proportional band, and other parameters. By outputting a percentage of full scale deflection of a variable, the corresponding output port may be driven.

The above objects of the invention are also accomplished using a fault tolerant control strategy to predict steady state change in a controlled variable for a given change in inlet process conditions. Applying a simplified model based on measures of effectiveness, the change in effectiveness due to a change in a process variable is derived. Further assuming that the process model will only be valid for a limited region around the current operating point allows calculation of a manipulated variable value based on previous values of the manipulated variable, other manipulated variables, primary and secondary process variables, the initial value of the controlled variable, and a setpoint. By incorporating the setpoint and primary and secondary process variables into a system dependent only on the initial value of the controlled variable, a variable can be manipulated based on current inputs and system history, even though the controlled variable or feedback signal is presently unreliable.

In another aspect, the above objects of the invention are accomplished by incorporating a programming language which is enhanced over other languages used in facilities management systems. The language includes the ability to transmit data through executable statements themselves rather than through variables, and automatically sign-up for executing statements when such variables reach their trigger points. In addition to providing a generic interface to the objects in a facilities management system such that data values can be read through the name of the object and the name of the data field to be read, similar constructs are applied for writing values and commanding objects. Moreover, the data constructs provide for sharing variables between two or more algorithms so that multiple algorithms may read and update the data value. Another data construct in the language allows for resetting a set point by means of a proportional plus calculation.

In another aspect the above objects of the invention are accomplished by predicting energy demand in a future demand period based on a window of previous energy consumption. In response to the predicted energy demand, commands can be issued to shed loads contributing to the demand so that a demand limit is not exceeded. Loads that are shed either by the demand limiting or load rolling feature will be restored either due to a defineable time period expiring or as a result of an extreme in an environmental condition being detected in an area affected by the load.

A high level feature which sheds a load may lose communication with the load since loads are distributed over multiple nodes in a system. To be certain that a load shed as a result of a load rolling command is restored after a prescribed time interval for that load, a restore task is localized within each node. Specific shed and restore characteristics are stored as attributes of the object in the node with the load and not as part of the demand limit/load rolling high level software feature. This allows high level software features in one node to shed loads distributed over the system without requiring that communications be maintained with the load in order to restore the load at the proper time.

A localized-restore task also will monitor environmental conditions affected by the load and, thus, eliminate the extra traffic on the network by removing that task from the node running the demand limit/load rolling feature.

The above objects of the invention are further accomplished by an analog output circuit with a current sense network, a switchable feedback stage, and a balancing network. In one embodiment, a voltage input and a voltage feedback signal are applied through a buffer to a sample and hold circuit, the output of the sample and hold is summed with the feedback signal and the result is amplified and passed to the current sense network. The output of the current sense network provides a first of the balanced outputs. A mirroring circuit connected to the first output provides a balanced second output equal in magnitude but opposite in plurality from the signal at the first output. Since the signals track each other precisely, errors introduced by ground loops and other noisy effects are eliminated. The feedback stage is switchable so that the voltage output from a voltage driver is fed back and so that the current output from a current driver is converted to a voltage output for feedback purposes.

Still other aspects of the above objects of the invention are accomplished by a customized optical interface to a local optical bus compatible with the RS/485 Electronic Industries Association specification. The interface employs bias circuitry which is used to "swamp out" differential mode noise on the leads of the bus and transorb and MOV circuitry to shunt common mode voltage and excessive differential-mode noise to ground. Optical isolators provide isolation between digital and communications power supplies and retriggerable one shots are used to activate data transmission and reception indicators such as LEDs.

BRIEF DESCRIPTION OF THE DRAWINGS

The above objects of the invention are accomplished as described below in accordance with the following figures:

FIG. 7 tabulates modules used in one, two, and five slot configurations of a network control unit.

FIG. 8 tabulates modules used in one, two, and five slot configurations of a network expansion unit.

FIGS. 9A and 9B illustrate a sample facilities management system configuration.

FIG. 25 illustrates an example of the invention when a name changes its address within a node.

FIG. 31 is a table showing transmission of messages when a download request originates from an archive unit.

FIG. 32 is a table illustrating a sequence of message passing when a node without a routing table initiates a download request.

FIG. 41 tabulates a possible routing strategy for messages between the non-configured device and a configured node.

DETAILED DESCRIPTION OF THE PREFERRED EMBODIMENTS

Figure 1:
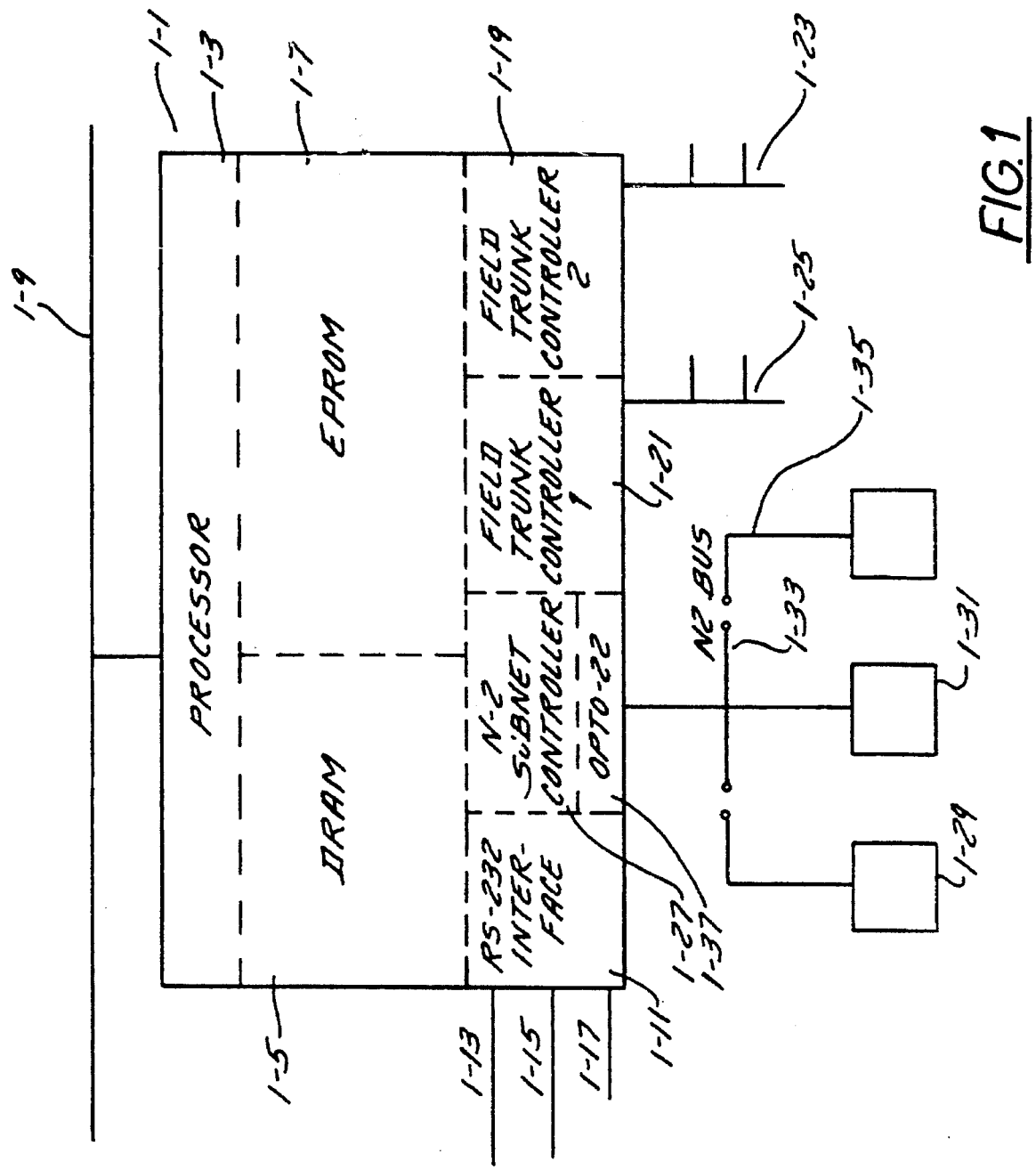
FIG. 1 is a network control module according to the invention.

FIG. 1 shows generally network control module 1-1 which has a processor 1-3, dynamic random access memory 1-5, and electronically programmable read only memory 1-7. Network control module 1-1 communicates with high speed bus 1-9, the N1 bus, so that network control module 1-1 can be interconnected in a local area network configuration to other network control modules. A plurality of network control modules 1-1 connected over high speed bus 1-9 form a network which can be interconnected through gateways to other networks of network control modules interconnected on high speed buses. Network control module 1-1 further has standard RS-232 interface 1-11 with a plurality of ports to provide communication through a modem over port 1-13, a specialized network terminal over port 1-15 and a computer, or printer over port 1-17. Field trunk controllers 1-19 and 1-21 allow network control module 1-1 to communicate with field devices interconnected on communications media 1-23 and 1-25.

Subnet controller 1-27 allows devices 1-29, 1-31, 1-33 to communicate with network control module 1-1 over N2 bus 1-35. To isolate network control module 1-1 from spurious signals and power surges which may become impressed on N2 bus 1-35, N2 subnet controller 1-27 incorporates an opto-22 interface 1-37, as shown. A network control module according to the invention functions as a central part of a network control unit described below. Network control modules, either alone or as part of network control units, function as controllers for nodes interconnected by the high speed N1 bus 1-9. Thus, a primary function of the network control module is to supervise peer-to-peer communications with other network control modules or network control units and operator work stations on high speed bus 1-9.

In a facilities management system (FMS) the network control module performs supervisory control of an area of a building. Thus, in accordance with specialized programs, the network control module supervises maintaining environmental conditions according to program parameters and communicating with operational units, such as sensors and other devices connected to the network control module 1-1 via N2 bus 1-35. Network control module 1-1 further manages communications over a RS-232 interface 1-11 to various person machine interfaces (PMI). Specialized devices in the facilities management system can be connected via field trunk controllers 1-21 and 1-19 and corresponding communication media 1-25 and 1-23. In a facilities management system (FMS) according to the invention, the network control module 1-1, which is sometimes referred to as a network controller, is configured as a plug in module which mates with a connector on a backplane.

Figure 2:
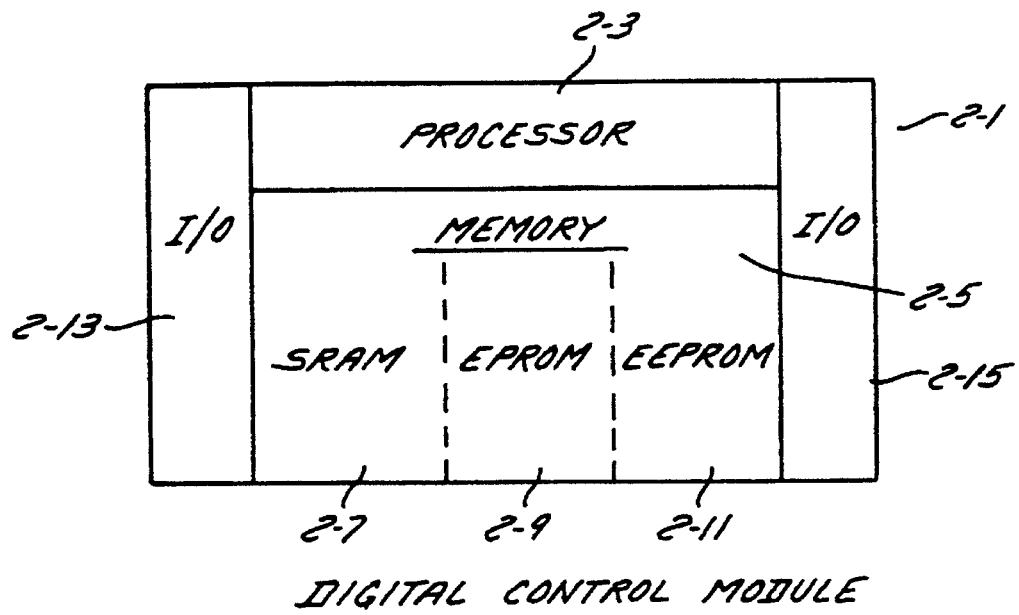
FIG. 2 shows a digital control module according to the invention.

FIG. 2 shows digital control module 2-1 which also interfaces with a connector on a backplane. Digital control module 2-1 includes processor 2-3 and memory 2-5. Memory 2-5 is divided into a static random access memory section 2-7, and electronically programmable read only memory (EPROM) section 2-9, and an electronically erasable programmable read only memory (EEPROM) 2-11. In addition, digital control module 2-1 has input/output sections 2-13 and 2-15. A digital control module 2-1 may also be incorporated into a network control unit according to the invention, as discussed below. A digital control module conditions sensor inputs received through input/output sections 2-13 and 2-15 and reports changes to the network controller or network control module 1-1. In addition, in a facilities management system (FMS) the digital control module performs closed loop control for a plurality of control loops. Thus, closed loop control can be accomplished without a network control module. In addition, the digital control module 2-1 executes commands received from network control module 1-1. Digital control module 2-1 further may accept inputs either directly or through a function module. A function module (FM) also performs conditioning of an input or output signal. While a digital control module according to the invention can accept inputs directly (100–1,000 ohms, RTD (resistive temperance device) 4–20 mA, 0–10 volts DC) or through an input function module, all outputs from a digital control module 2-1 are characterized by function module selection. A function module (not shown) conditions signals but does not perform sophisticated processing. Such function modules, according to the invention, are tailored to accommodate the specific conditioning function required. Thus, a function module may contain sophisticated electronics tailored to perform a specific task or may be as simple as a single resistor.

Network control module 1-1 also performs numerous background tasks, as discussed below, to assure that each of the nodes on the system is operating with the same global variables, is time synchronized, and has consistent directories of system names. In addition, software in the network control modules 1-1 to reduce data communications, to track the aging of data, and to provide a uniform means of isolating high level software features from specialized operational units is discussed below.

Typical input function modules in a facilities management system include pressure/electric transducers, binary input contacts or AC line voltage conditioners, differential pressure inputs, and binary frequency inputs. Typical output function modules include analog outputs, analog outputs with isolated grounds, electric/pressure transducers, binary polarity reversing, triac incremental function modules, motor start/motor stop function modules, electrically maintained relay outputs, magnetically latched relay outputs, and solenoid air valve function modules.

Figure 3:
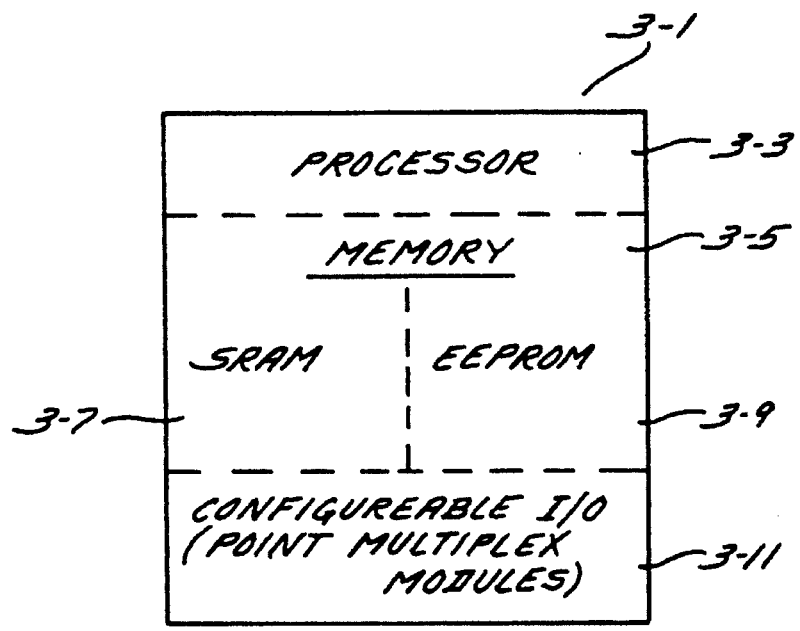
FIG. 3 shows an expansion module according to the invention.

As shown in FIG. 3, expansion module (XM) 3-1 according to the invention, includes processor 3-3 and memory 3-5. The memory is typically divided into static random access memory (SRAM) 3-7 and electronically erasable programmable read only memory (EEPROM) 3-9. Point multiplex modules 3-11 provide a configurable input/output for the expansion modules. The expansion module is also a plug in module which plugs into a connector on a back plane in a node of a facilities management system. The expansion modules condition binary, analog and pulse inputs and report changes to the network controller or network control module 1-1. In addition, the expansion module executes binary output commands from network controller 1-1. Point multiplex modules 3-11 provide five configurations of expansion modules. These include a first configuration having 32 binary inputs, a second configuration having 8 binary inputs and 8 pairs of outputs using momentary relays, a third configuration having 8 binary inputs and 8 magnetically latched relay outputs, a fourth configuration having 8 analog inputs and a fifth configuration having 8 binary inputs and 8 electrically maintained relay outputs.

Network control modules, digital control modules, and expansion modules, can be combined in various configurations to form a network control unit according to the invention. A network control unit (NCU) in a facilities management system monitors and supervises heating ventilating and air conditioning (HVAC), lighting, and building functions. Network control units are interconnected by the N1 bus 1-9. As part of an N1 network, the NCU shares all data with all other NCUs in a dynamic data access relationship. A distributed system is formed because peer-to-peer communications allow each network control unit to access and use data acquired under the control of any other network control unit. Thus, information at any level is accessible to every NCU to integrate and optimize all components within a building. Network control units can also be interconnected to perform other control functions involving the use and monitoring of diverse physical sensors and equipment, such as a broad array of industrial control processes and other processes involving control systems.

Figure 4:
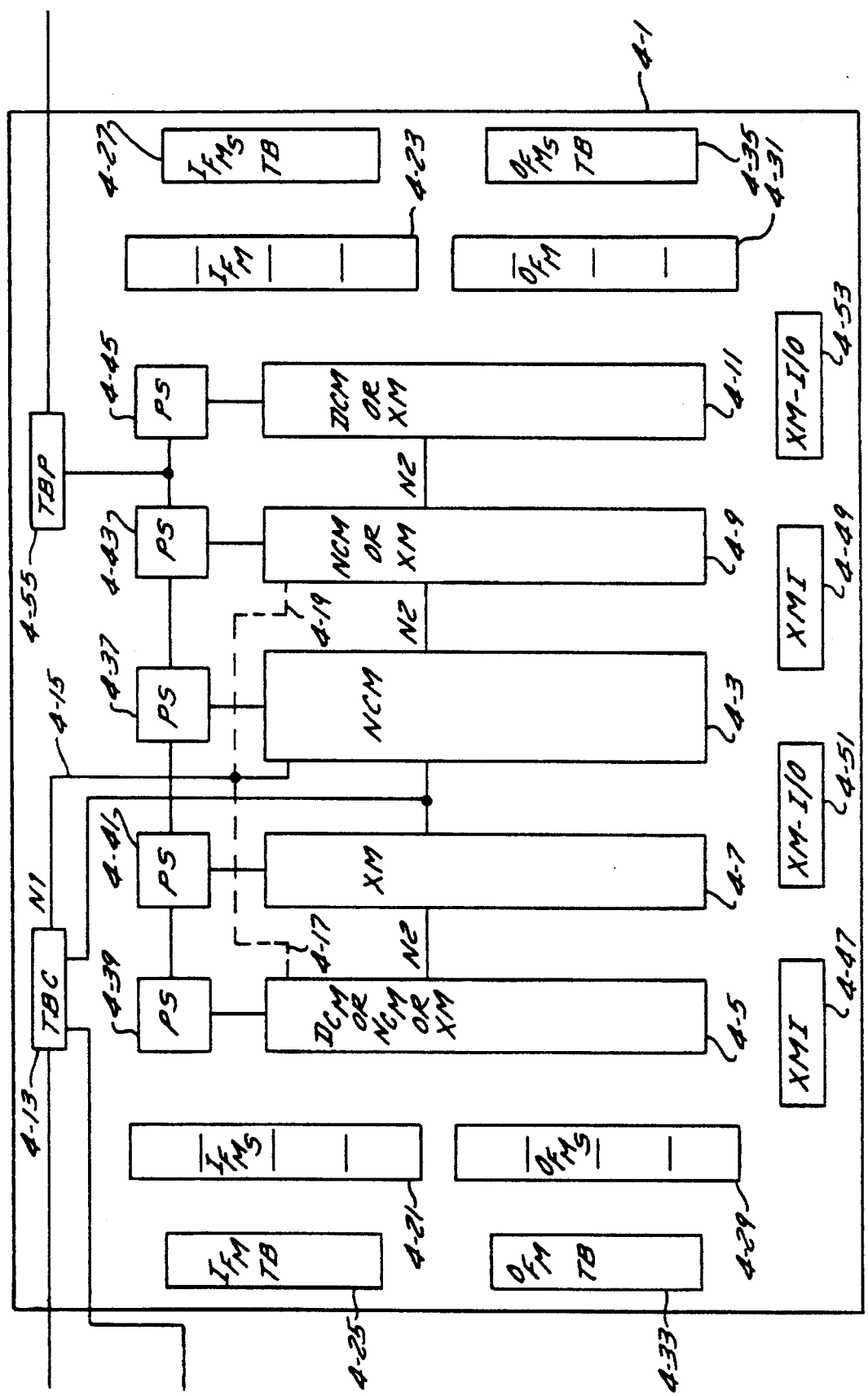
FIG. 4 shows a network control unit in a five slot configuration.

FIG. 4 shows one configuration of an NCU 4-1 in which five slots 4-3, 4-5, 4-7, 4-9 and 4-11 are available. Slot 4-3 contains a network control module as previously discussed relative to FIG. 1. The network control module provides the sole means of communication along the high speed N1 bus through communication terminal board 4-13. It should be noted that only a network control module can communicate on the high speed N1 bus. Slots 4-5 through 4-11 can be occupied by digital control modules, expansion modules, or additional network control modules as shown. Communications between these devices and with the network control module is via the N2 bus. Slots 4-5 and 4-9 can also accommodate network control modules. These network control modules may also communicate over the N1 bus 4-15 as indicated by dotted lines 4-17 and 4-19 in FIG. 4.

As shown in FIG. 1, network control unit 4-1 is provided an interface to an operator through RS-232 interface portion 1-11 of network control module 1-1. Using a dial-up modem 1-13, specialized network terminal 1-15 or an operator work station such as a personal computer, an operator may generate or respond to commands and provide program changes and organizing data to user specified data bases.

The five slot NCU configuration in FIG. 4 also shows connectors 4-21 and 4-23 for a plurality of input function modules and corresponding input function module terminal boards 4-27 and 4-25. Similarly, connectors 4-29 and 4-31 accommodate a plurality of output function modules and corresponding output function module terminal boards 4-33 and 4-35 are provided. It should also be noted that each individual slot 4-3 through 4-11 is provided with its own power supply 4-37 through 4-45. Expansion module input terminal boards are provided at 4-47 and 4-49 and expansion module inputs/output terminal boards are provided at 4-51 and 4-53. Line voltage is applied to the power terminal board 4-55.

Figure 5:
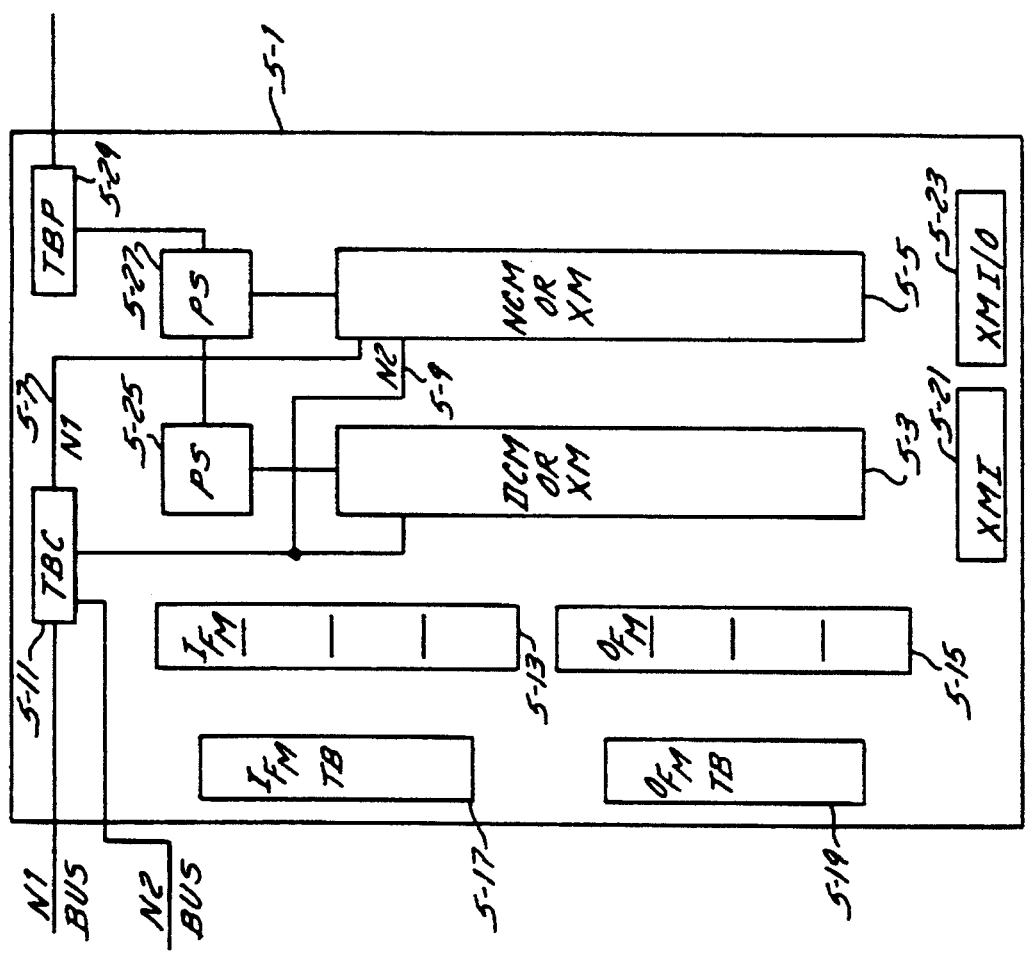
FIG. 5 shows a network control unit in a two slot configuration.

An alternative configuration of a network control unit is the two slot configuration 5-1 shown in FIG. 5. Slots 5-3 and 5-5 can each accommodate an expansion module. Slot 5-3 can also accommodate a digital control module while slot 5-5 can also accommodate a network control module. It should be noted that in order to constitute a network control unit, at least one network control module is required. This is because, as previously noted, it is only a network control module which can communicate in a peer-to-peer relationship with other network control units over the N1 bus. Thus, slot 5-5 has a connection to the N1 bus 5-7. Devices installed in slots 5-3 and 5-5 communicate with each other over N2 bus 5-9. Both the N1 and N2 buses are connected to communications terminal board 5-11 to provide further communications with the remaining parts of the system.

In a manner analogous to that discussed in FIG. 4, a plurality of input function modules can be located at connectors 5-13 and the plurality of output function modules can be located at connectors 5-15. Input function module terminal board 5-17 and a corresponding output function module terminal board 5-19 are also provided. Similarly, expansion module input terminal board 5-21 and expansion module input/output terminal board 5-23 provide access to the expansion module. It should be further noted that devices in slots 5-3 and 5-5 also have independent power supplies 5-25 and 5-27. Line voltage is provided to power terminal board 5-29.

Figure 6:
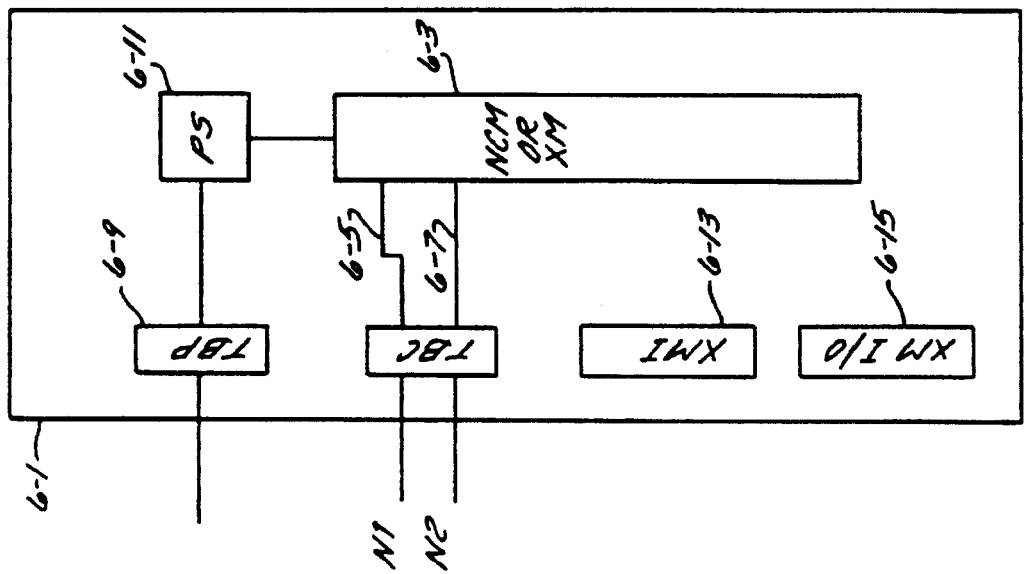
FIG. 6 shows a single slot configuration network control unit.

FIG. 6 shows a single slot configuration according to the invention. Slot 6-3 can contain a network control module in which case the device operates as a network control unit with the ability to communicate on a peer-to-peer basis with other devices via the N1 bus 6-5. Communication with devices on the N2 bus external to the NCU 6-1 is over N2 bus 6-7.

As FIG. 6 shows, line voltage is connected to power terminal board 6-9 and power supply 6-11 supplies the device in slot 6-3. FIG. 6 also shows that device in slot 6-3 can be an expansion module. Thus, the single slot configuration in FIG. 6 also has expansion module input terminal board 6-13 and expansion module input/output terminal board 6-15.

As previously stated, a network control unit must have a network control module in order to accomplish peer-to-peer communications over the N1 bus. However, as the single slot configuration in FIG. 6 shows, it is possible for a device to be constructed having an expansion module without a network control module. Since an expansion module could not communicate over the N1 bus, the device can not be a network control unit. It is possible, according to the invention, to construct in either the 5 slot back plane shown in FIG. 4, the two slot back plane shown in FIG. 5 and the one slot back plane shown in FIG. 6 a device which does not have the capability of communicating over the N1 bus. Such devices are called network expansion units (NEU). Network expansion units serve two functions. First, they serve as a collection platform for I/O points in order to increase the point and control loop capacity of an NCU. Second, network expansion units can be remotely located from an NCU to monitor and distribute control to points and then transfer the data from these points back to the NCU over the N2 bus.

Since the back planes can be used to construct either a network control unit or a network expansion unit, alternative configurations are possible. FIG. 7 shows fully loaded alternative configurations possible for network control units having 1, 2 and 5 slot back planes. FIG. 8 shows fully-loaded possible configurations of network expansion units having 1, 2 and 5 slot back planes.

Figure 9A:
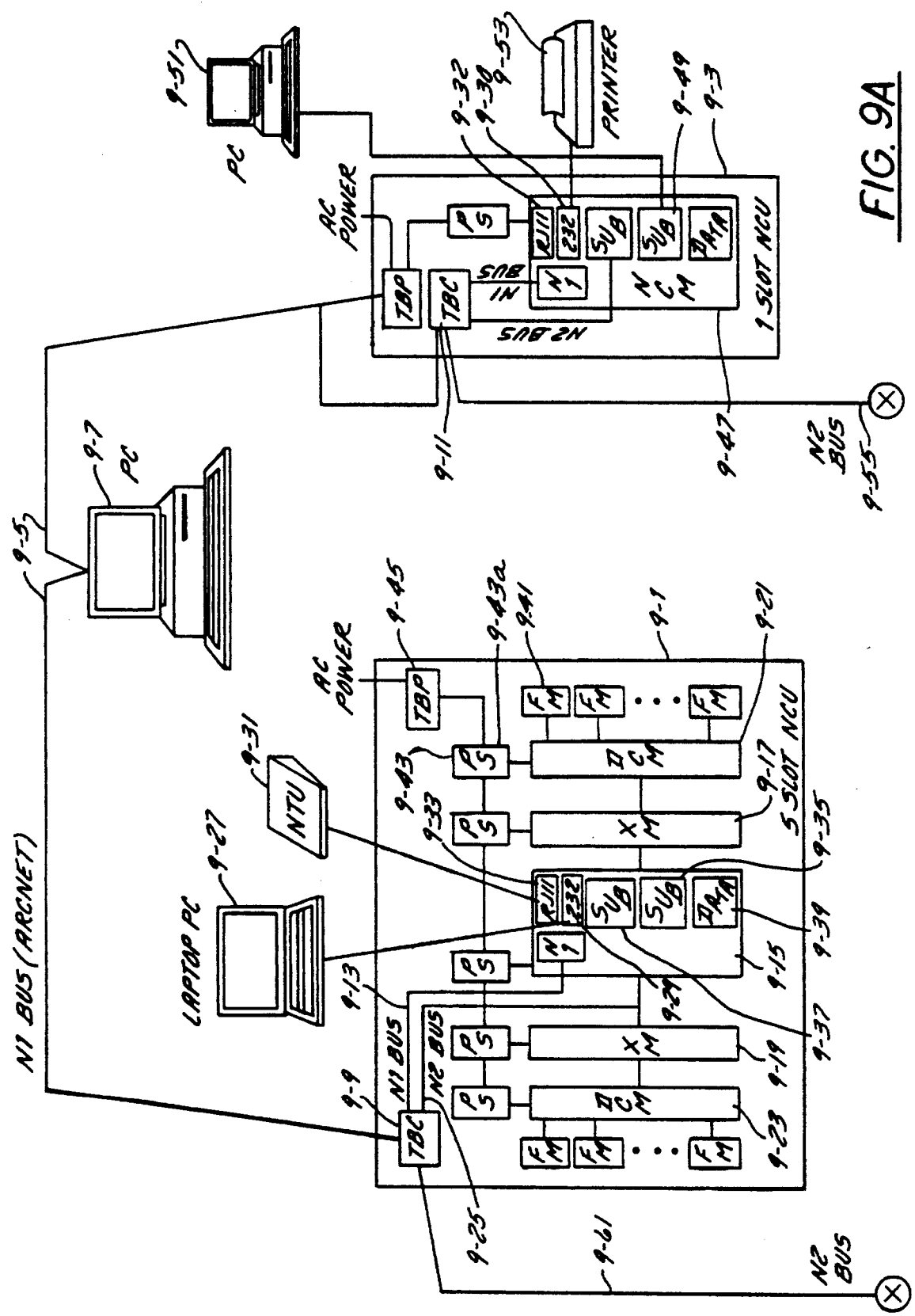

FIG. 9 illustrates a possible configuration of a facilities management system according to the invention. Five slot NCU 9-1 communicates with one slot NCU 9-3 over N1 bus 9-5. N1 bus 9-5 is also connected to personal computer 9-7. Personal computer 9-7 can be used as a download device to download new information and data bases to NCUs 9-1 and 9-3 and other devices connected to NCUs 9-1 and 9-3. N1 bus 9-5 is connected to communication terminal board 9-9 in NCU 9-1 and terminal communication board 9-11 in NCU 9-3. Within NCU 9-1 N1 bus 9-13 is connected to network control module 9-15. Since this is the only network control module shown in five slot NCU 9-1, there are no further connections within the five slot NCU to the N1 bus 9-13. Five slot NCU 9-1 also has expansion modules 9-17 and 9-19 and digital control modules 9-21 and 9-23. These modules perform the functions discussed previously and are interconnected with the five slot NCU via N2 bus 9-25. An interface communicates directly with the five slot NCU 9-1, N1 bus 9-13 and devices on its N2 bus via lap-top PC 9-27. As FIG. 9 shows, lap-top 9-27 is connected to an RS-232 interface 9-29 which is part of network control module 9-15. A network terminal unit for specialized network terminal 9-31 is also accommodated on RJ-11 interface 9-33. Network control module 9-15 also has sub-modules 9-35 and 9-37. Such sub-modules may include devices such as subnet controller 1-27, field truck controller 1-21 and RS-232 interface 1-11. Function modules, for example, 9-41 are also used in the five slot NCU 9-1. As FIG. 9 shows, each device in the five slots has its own power supply, for example, 9-43. The power supplies all receive line voltage or AC power through power terminal board 9-45. The individual power supplies exist to isolate spurious signals and noise in one device from being communicated via the power supply lines into a second device.

One slot NCU 9-3 is formed from a single network control module 9-47. Within network control module 9-47 sub-module 9-49 provides an interface to a personal computer 9-51 and RS-232 interface is provided to printer 9-53. Network control module 9-47 communicates from network control unit 9-3 over N2 bus 9-55 to fire system 9-57 and access control system 9-59. Fire system 9-57 is used to detect dangerous smoke and fire conditions in the building and access control system 9-59 is used to provide security services. Such systems are known in the art and are shown to illustrate the capabilities of a facilities management system according to the invention.

Five slot NCU 9-1 communicates over N2 bus 9-61 with one slot expansion unit 9-63, two slot network expansion unit 9-65, application specific controller 9-67 and lighting controller 9-69.

One slot network expansion unit 9-63 has an expansion module 9-71 which communicates with the N2 bus 9-61 via communication terminal board 9-73 within the one slot NCU 9-63. Expansion module 9-71 has its own power supply 9-75. As with expansion modules 9-19 and 9-17 in five slot NCU 9-1, expansion module 9-71 may have any of the five configurations previously described. As previously noted, the expansion modules condition binary, analog and pulse inputs, report changes to the network controller and execute binary output commands, which command a connected operational unit to one of two stable states, from the network controller.

Two slot network expansion unit 9-65 has expansion module 9-77 and digital control module 9-79, each with its own power supply 9-81 and 9-83, respectively. Function modules, for example, 9-85 interface with digital control module 9-79. Both the expansion module 9-77 and the digital control module 9-79 are connected to N2 bus 9-87 within the two slot network expansion unit 9-65 to communication terminal board 9-87. This provides access to N2 bus 9-61 for communications with the rest of the sample FMS configuration shown in FIG. 9.

Specialized lighting controller 9-69 is also attached to the N2 bus 9-61 in order to receive commands and provide lighting status information to five slot network control unit 9-1. Known application specific controllers, for example, 9-67 can also be attached to N2 bus 9-61, according to the invention. Such application specific controllers perform dedicated tasks while communicating over N2 bus 9-61. The overall software structure to accommodate various network expansion units and application specific controllers is discussed below.

Figure 10:
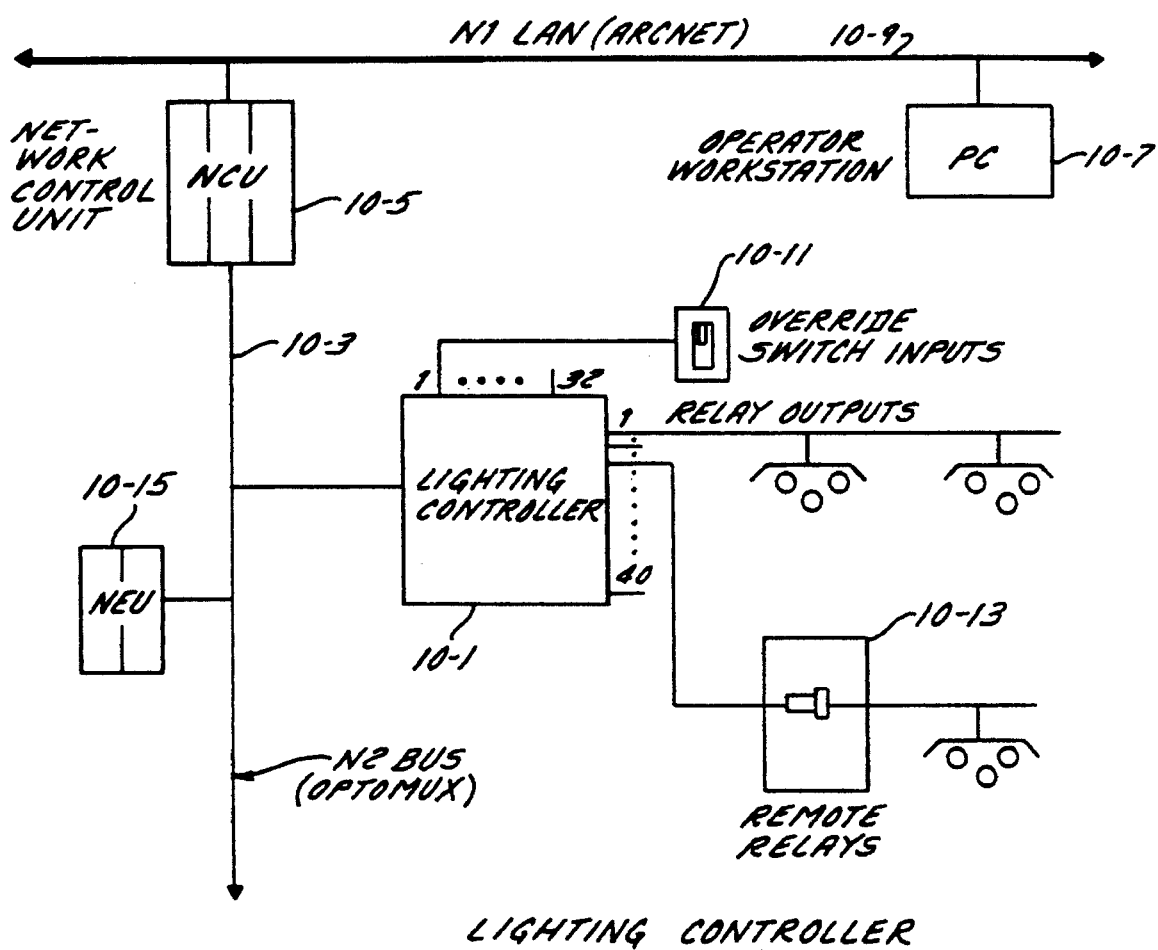
FIG. 10 illustrates a lighting controller used in a network according to the invention.

FIG. 10 is an expanded view of lighting controller 9-69 in operation on the system. FIG. 10 shows lighting controller 10-1 connected over N2 bus 10-3 to network control unit 10-5 which communicates with operator work station 10-7 over N1 bus 10-9. The lighting controller has 32 override switch inputs 10-11 and forty relay outputs. Forty latching relays are possible or 20 remote relays via a low voltage cable connect are also possible.

Figure 11:
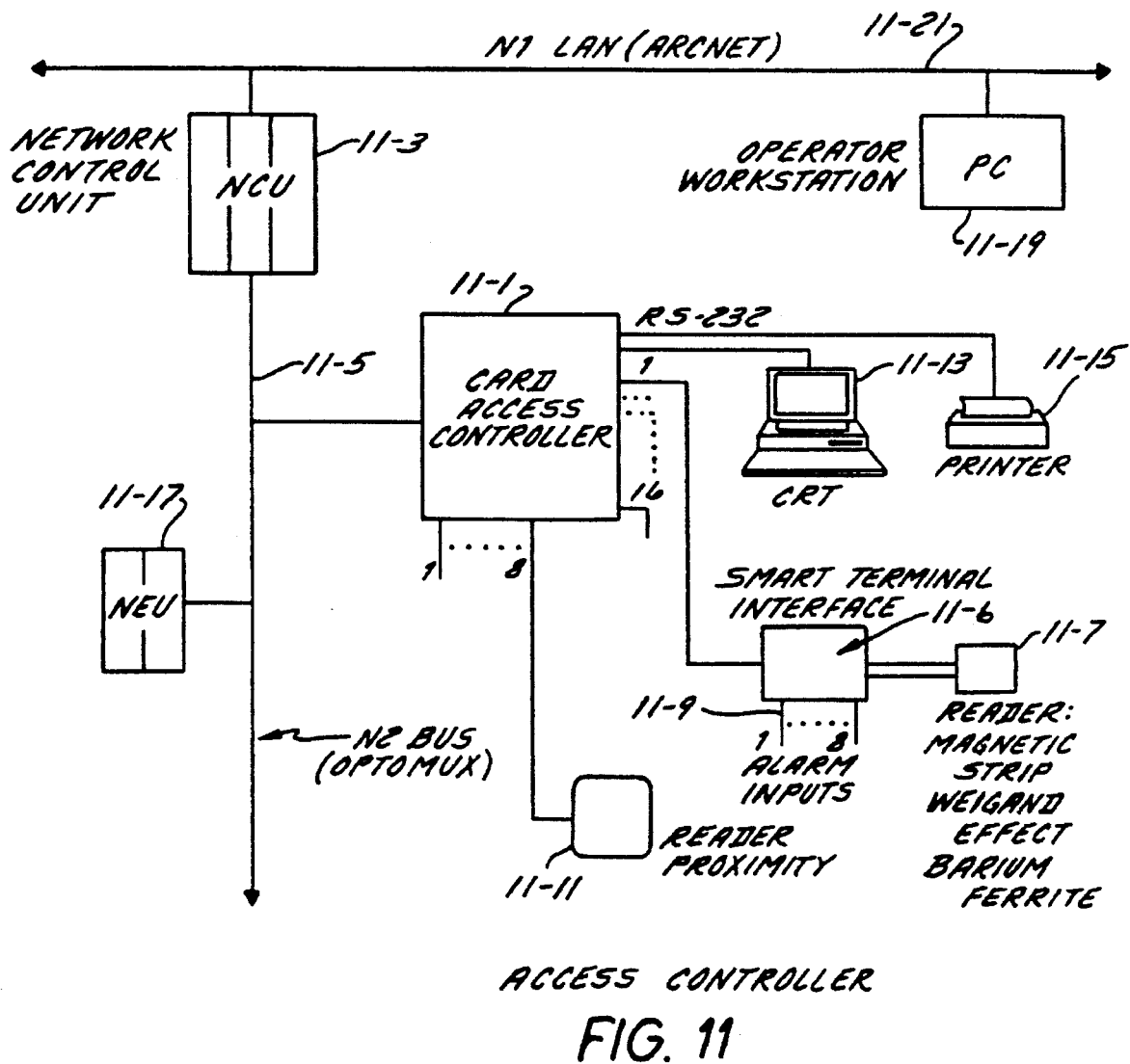
FIG. 11 illustrates a card access controller used in a network according to the invention.

FIG. 11 further illustrates an access system such as that described at FIG. 9, 9-59. Here card access controller 11-1 communicates with network control unit 11-3 via N2 bus 11-5. To provide security, the card access controller 11-1 is connected to a smart terminal interface with a reader 11-7 and 8 alarm inputs 11-9. The card access controller also accommodates 8 proximity readers 11-11 and communicates over RS-232 interfaces to CRT display 11-13 and printer 11-15. Typically, one access controller would be used for each network control unit.

Figure 12:
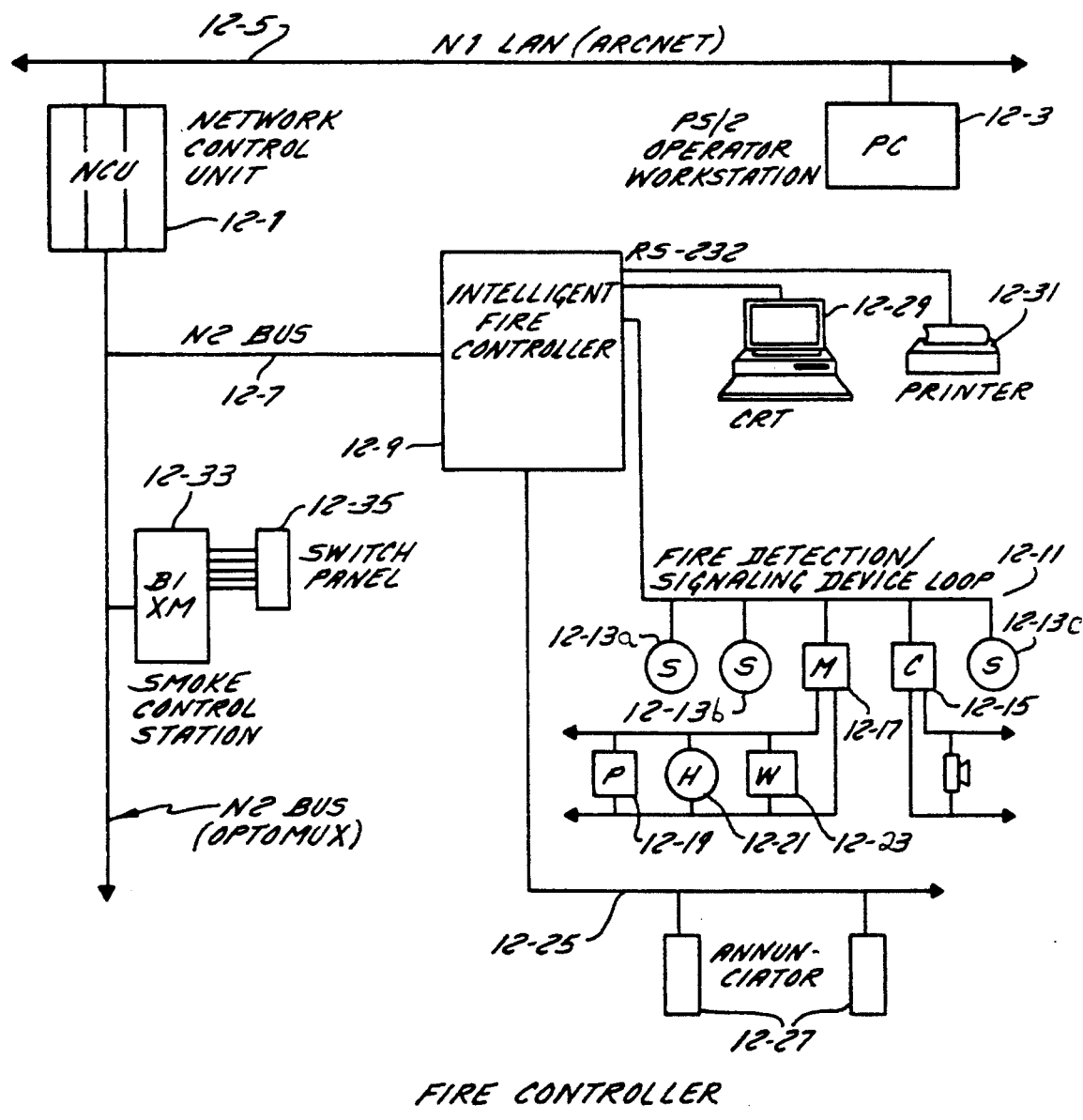
FIG. 12 illustrates a intelligent fire controller used in a network according to the invention.

FIG. 12 shows a fire system as in 9-57 operating on a facilities management system. Network control unit 12-1 communicates with operator work station 12-3 and other network control units over N1 bus 12-5. N2 bus 12-7 is connected to intelligent fire controller 12-9 which receives inputs from a fire detection/signalling loop 12-11. Smart detectors, for example, 12-13, detect smoke, thermal conditions and alarms activated at pull stations. Also connected to the fire detection signal loop 12-11 is control module 12-15 which activates a signalling device. Monitor module 12-17 monitors the status of pull stations 12-19, heat detectors 12-21 and water flow alarm switches 12-23. Intelligent fire controller 12-9 is also connected over an RS-485 bus 12-25 to annunciators 12-27. Similarly, intelligent fire controller 12-9 communicates over RS-232 interface to CRT display 12-29 and printer 12-31. The N2 bus 12-7 can also be connected to binary input expansion module 12-33 which itself is connected to switch panel 12-35. The binary expansion module 12-33 and switch panel 12-35 can operate together to form a smoke control station which transmits information to network control unit 12-1 and intelligent fire controller 12-9 over N2 bus 12-7.

Figure 13:
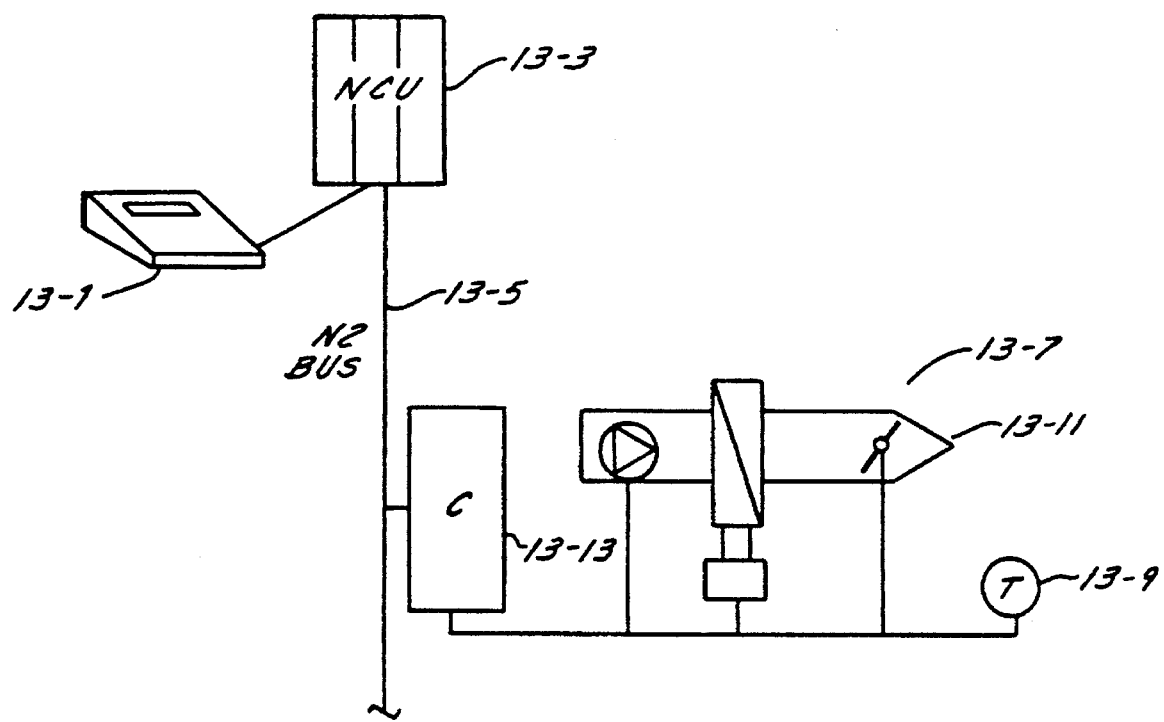
FIG. 13 illustrates a facilities management configuration for small buildings.

FIGS. 13-16 illustrate the use of various configurations according to the invention in different size buildings. FIG. 13 shows a facilities management system configured for a small building. This is a stand-alone configuration in which the network control unit automatically controls and optimizes heating, ventilating, air conditioning and other electro/mechanical building systems with directly connected input/output points. Using a local I/O device 13-1, such as a network terminal, an operator can set up a network control unit 13-3, having functions and schedules, with adjustment and override capabilities. N2 bus 13-5 provides communication from the network control unit to the controlled system shown generally at 13-7. Such a system may have temperature sensor 13-9, flow controller 13-11 and chiller 13-13.

Figure 14:
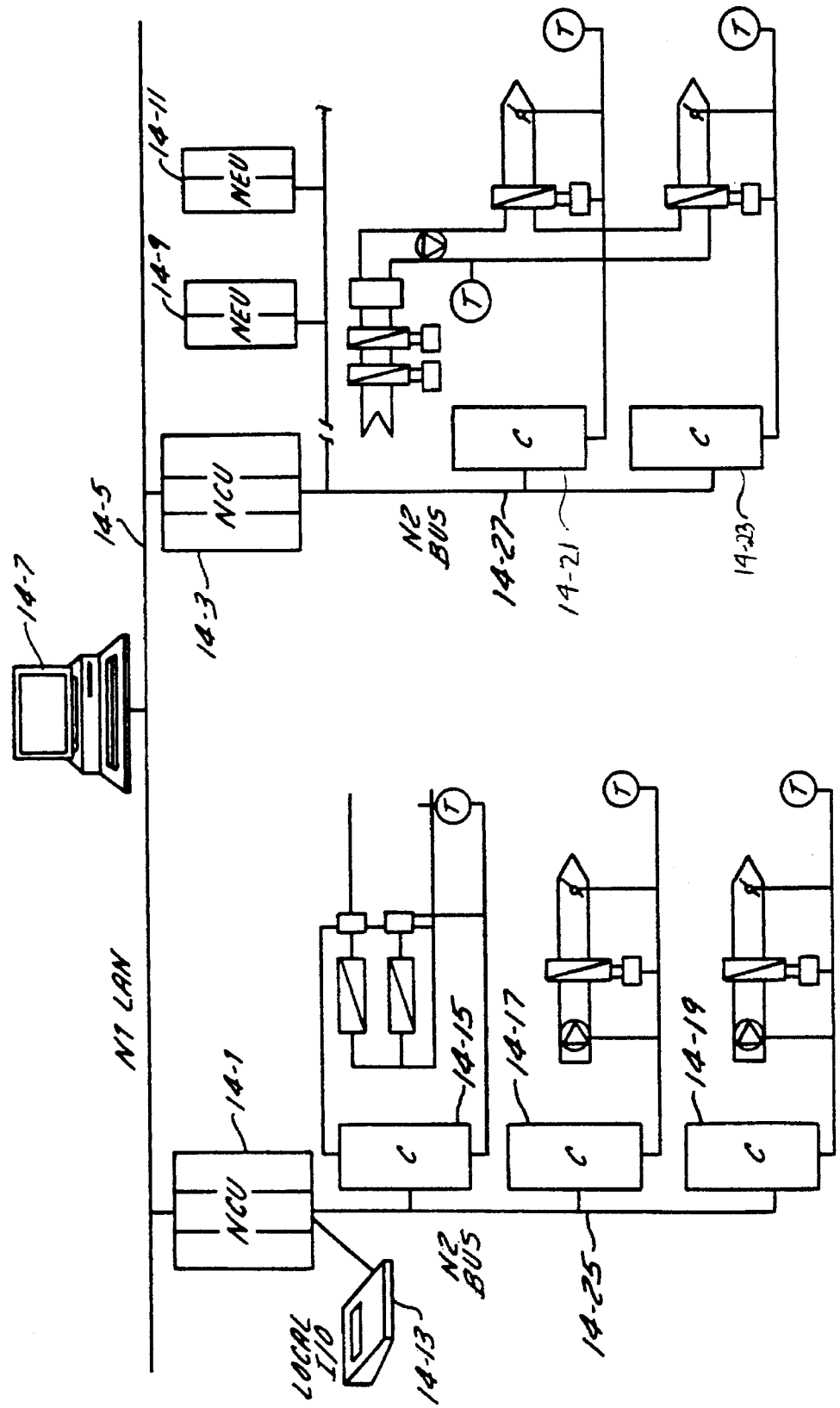
FIG. 14 illustrates a facilities management configuration for mid-size buildings.

FIG. 14 shows a typical configuration for a mid-sized building in which several network control units, for example, 14-1, 14-3 simultaneously manage heating ventilating and air conditioning, and various other electro/mechanical systems. NCUs 14-1 and 14-3 can communicate with each other through high speed N1 bus 14-5 and with operator work station 14-7. NCU 14-3 has expanded capacity and range by implementing remote network expansion units 14-9 and 14-11. This eliminates the necessity of wiring line voltages for the separate devices back to the network control unit 14-3. Local input/output to network control unit 14-1 is provided by local I/O device 14-13. Both network control units 14-1 and 14-3 communicate with their respective control devices and network expansion units over an N2 bus 14-25, 14-27.

Figure 15:
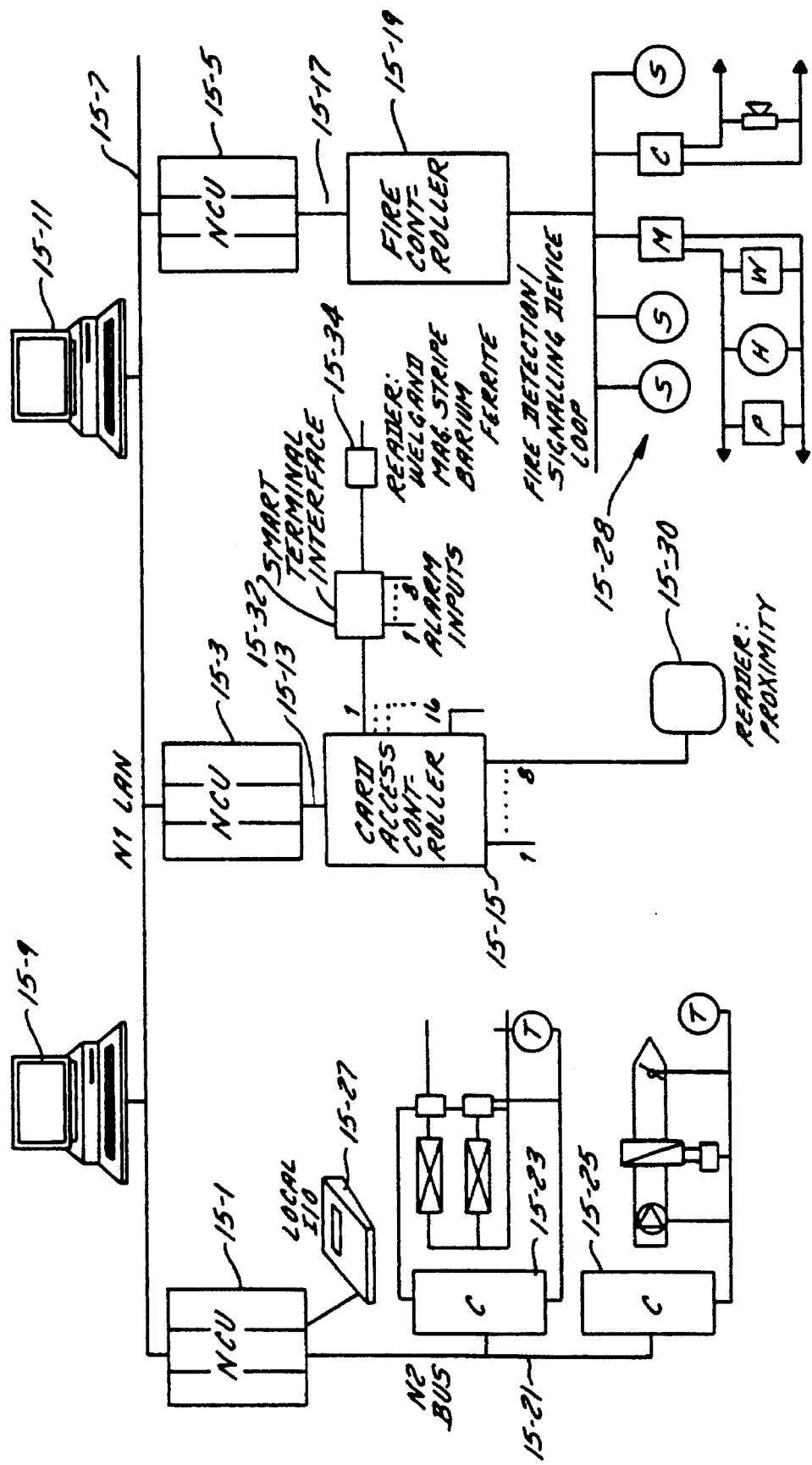
FIG. 15 illustrates a facilities management configuration for large buildings.

FIG. 15 shows a facilities management system configured for a large building. In FIG. 15, multiple network control units 15-1, 15-3, 15-5 are interconnected over the N1 bus 15-7. In addition, a plurality of operator workstations such as 15-9 and 15-11 are also connected to the N1 bus. For example purposes, FIG. 15 shows network control unit 15-3 connected via its N2 bus 15-13 to card access controller 15-15. Card access controllers were discussed relative to FIG. 11. FIG. 15 further shows network control unit 15-5 connected over its N2 bus 15-17 to fire controller 15-19. Fire controllers were discussed relative to FIG. 12. Network control unit 15-1 is connected over its N2 bus 15-21 to various control systems, for example, 15-23 and 15-25. In addition, local input/output to network control unit 15-1 is provided via local I/O terminal 15-27.

Figure 16:
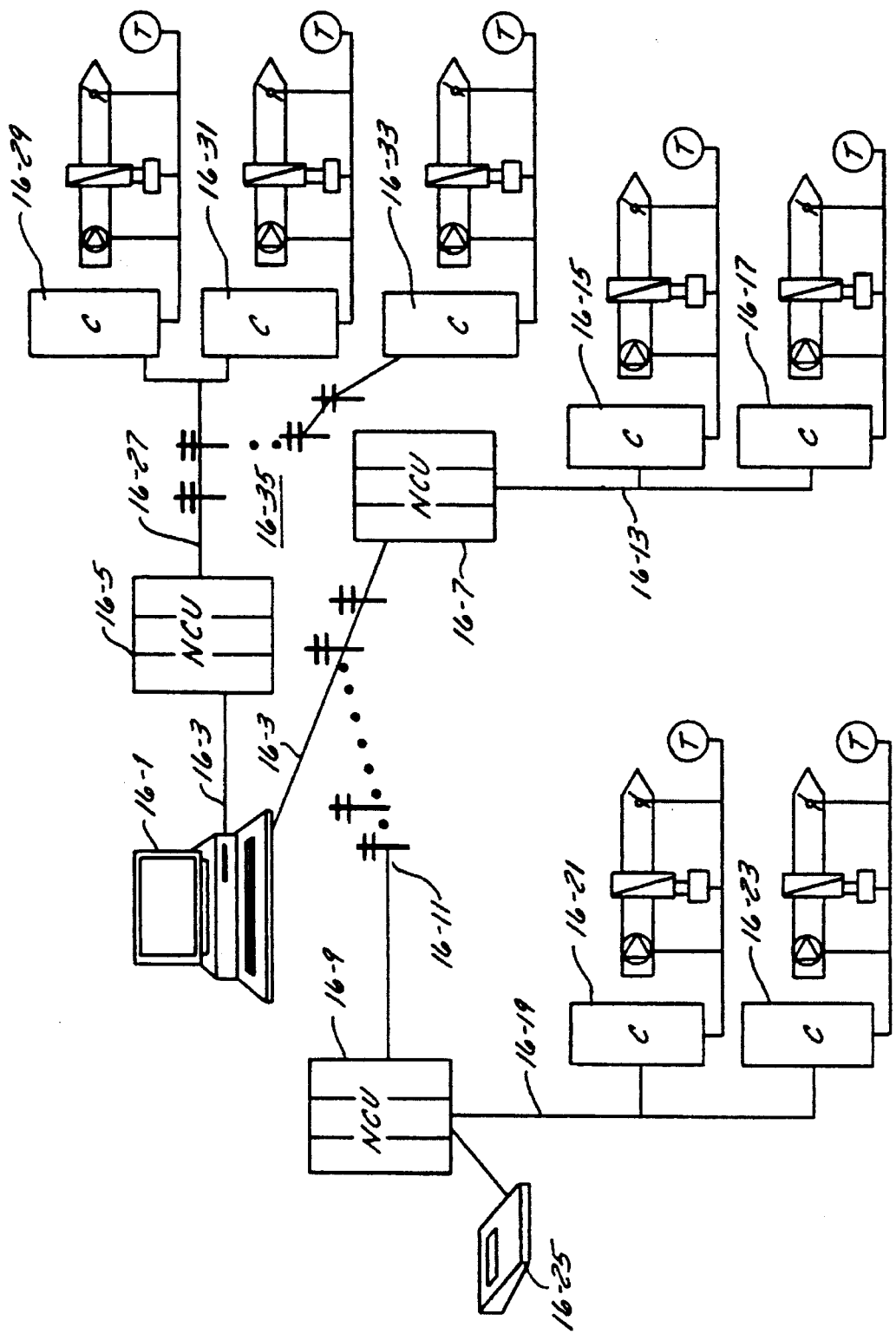
FIG. 16 illustrates a facilities management configuration for remote buildings.

According to the invention, a facilities management system can also be configured for remote buildings. FIG. 16 shows such a system. As shown in FIG. 16, remote links can exist either on the N1 or the N2 bus. Operator work station 16-1 is directly connected on a N1 bus 16-3 to network control unit 16-5 and network control unit 16-7. Network control unit 16-9, however, is connected to the N1 bus 16-3 via remote links 16-11. Network control unit 16-7, directly connected to operator work station 16-1, is further connected over its N2 bus 16-13 to controller 16-15 and 16-17. Similarly, NCU 16-9 is directly connected over its N2 bus 16-19 to controllers 16-21 and 16-23. Local I/O to network controller 16-9 is provided by local I/O terminal 16-25. In contrast, network control unit 16-5 is directly connected over an N2 bus 16-27 to controller 16-29 and 16-31 but is connected to controller 16-33 over remote link 16-35. Thus, according to the invention, peer-to-peer communication over the N1 bus can be accomplished by a remote link and master/slave communications over the N2 bus can also be accomplished by a remote link.

Figure 17:
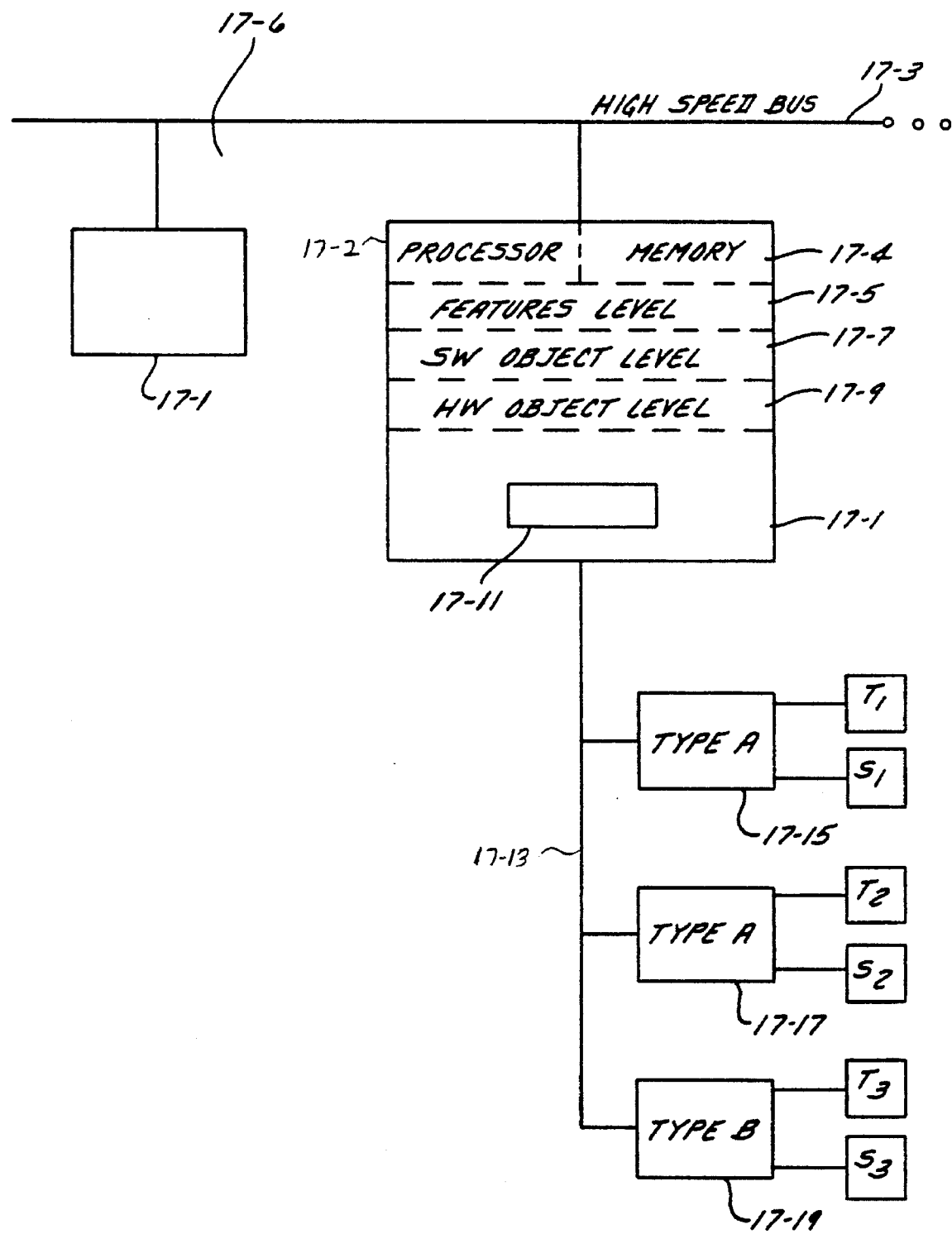
FIG. 17 shows one system configuration according to the present invention.

According to FIG. 17, a plurality of network controllers 17-1 each having a processor 17-2 and a memory 17-4 are connected by high speed bus 17-3 to form, for example, a networked Facilities Management System (FMS) 17-6. It should be noted that processor 17-2 may be centralized or distributed to accommodate software layers in the node as discussed herein. Each network controller functions as a master control node for operational units attached to it and incorporates several layers of software. The software levels are structured to provide increasing isolation between the software levels and the operational units. The highest software level is the features level 17-5. Features level 17-5 implements specific functions to be performed by the network controller in operating the facilities management system. One example of a specific function would be a user display tabulating or graphically showing certain values. Features contain a control program and a list of data objects on which the control program operates.

Any number of high level software features can be implemented depending upon the requirements of the system and the capabilities of the master control node. Some other examples of features performed in a facilities management system would include trend analysis, totalization, and other statistical features providing measures of facilities management systems performance. An important factor is that the increasing level of isolation from the hardware allows the software features to be unaffected by changes in the facilities management system hardware.

Software features at the highest level communicate with the software object level 17-7. The software object level is an intermediate level which determines how to carry out the action requested by one of features 18-21, 18-23, 18-25 at the features level 18-5. Information is passed between the software object level 17-7 and 18-7 and the features level 17-5 and 18-5 independent of differences at the lower levels of hardware. Similarly, the software object level forms an interface with another level of software called the hardware object level 17-9 and 18-9. The hardware object level allows for a common interface to be established between the software object and hardware object levels regardless of the peculiarities of operational units, such as sensors and other data acquisition and control instruments, connected to the network controller. This is accomplished by configuring the hardware object level to mask the differences between the operational units to the various entities in the software object level 17-7 and 18-7. In accordance with requirements of local bus communications interface 17-11 and 18-11, network controller 17-1 communicates over local bus 17-13 with slave controllers 17-15, 17-17, and 17-19. As shown in FIG. 1, any number of types of slave controllers is possible. The slave controllers are connected to operational units, for example, to sensors. Such sensors are binary or analog field sensors which read values of real world data (e.g., outdoor air temperature).

Figure 18:
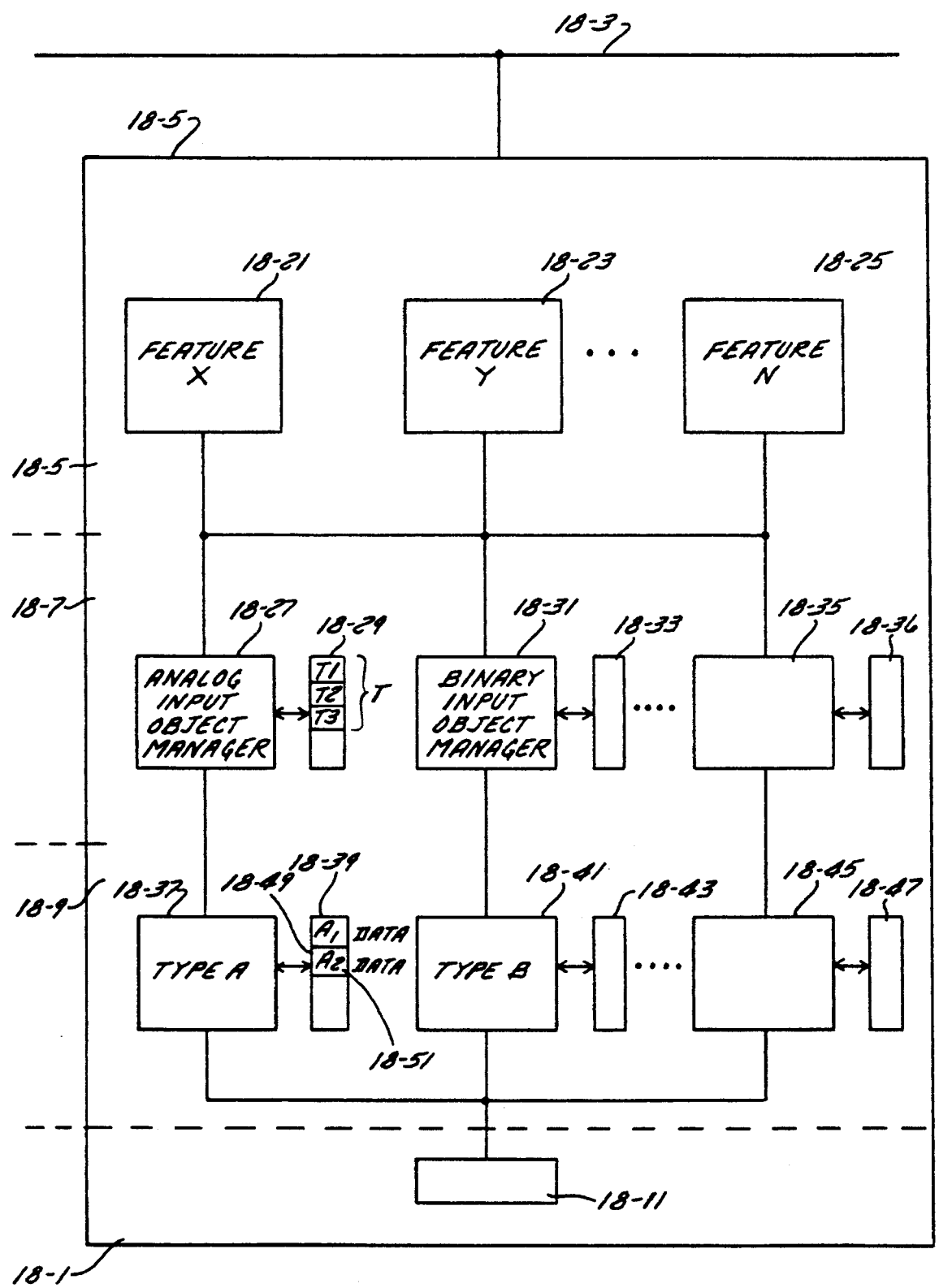
FIG. 18 shows a more detailed view of various software levels.

FIG. 18 provides a more detailed illustration of the configuration described in FIG. 17. The software object level contains a plurality of software object managers 18-27, 18-31, 18-35. A software object manager is a database manager which handles all requests for a particular type of software object. An object is a named data element stored in the network controller. Objects are categorized in types and each instance of an object has its own set of data, such as object name, current value, alarm limit, etc. Therefore, each software object manager is associated with a corresponding database, 18-29, 18-33, 18-36. One example of a software object manager is an analog input object manager 18-27. This would be the database manager for all instances of analog input objects, such as instances T1, T2, T3 of temperature objects T in the following example. Another is a Binary Input Object Manager 18-31. All of the elements of the database for a given manager are objects of the same type. In the following example, the software objects include analog input points, and binary input points. Each object type may have several instances, each of which has its own set of data values called attributes. For example, the analog input objects stored in database 18-29 are each an instance of a type of object. Each of these three instances has its own set of attributes. These attributes are data which includes the object name, the current value, the alarm limits, etc.

The hardware object level contains a similar plurality of hardware object managers 18-37, 18-41, 18-45. Each hardware object manager is a database manager which handles all requests for a particular type of hardware device on the local low speed bus 17-13 connecting the network controller to the slave hardware devices 17-15, 17-17, 17-19. For example, a slave controller type A hardware manager 18-37 is the database manager for all slave controller objects of type A (A1, A2, in the example given below). As with the software object managers, each hardware object manager has a database 18-39, 18-43, 18-47 associated with it containing all objects of that type. For example, database 39 for Type A hardware objects includes A1 data 18-49 and A2 data 18-51. Each object has a set of attributes unique to that particular object.

Transparency is achieved at two levels. First, software objects are transparent to features; and second, hardware devices or operational units are transparent to software objects. These transparencies are best illustrated by examples. In the first case, the transparency of software objects to features, assume Feature x needs to read a current value field or attribute of sensor T2. This is accomplished by directing the request from Feature x to the software object manager controlling T2. As shown in FIG. 17, in this case T2 is controlled by the Type A slave controller 17-17. The analog input object manager 18-27 is responsible to identify the data structure of T2 and return the attribute required by the feature, e.g. the value attribute, to Feature x. As a result, Feature x need only understand the various possible types of data that can be returned as single values and it does not need to know the entire database structure for an analog input object.

Feature x also need not be concerned with the particular object type when it requests the current value of an object. Because all information is transferred between the Features level 17-5 and 18-5 and the software object level 17-7 and 18-7 in the same way, the feature need only ask for the current value of an object. Thus, the method for requesting the current value of an analog input object and the value of a different type object, such as a binary input object, does not vary. Feature x only sends a request for the current value attribute to the appropriate object manager. The feature uses the object type only to determine which software object manager controls the data. The actual request issued by the feature for the value is the same regardless of which type of object is being queried. This avoids requiring high level software features to request current value differently for each different object type.

An added advantage of this approach is that the feature can always obtain the information the same way regardless of where the hardware is located in the system. Because the feature only requests the object by name, the feature is insensitive to the physical location in the system of the hardware which produces the named object. Thus, hardware differences and physical location of hardware are masked out by the hardware and software object managers.

The software object database managers and the hardware object database managers transfer information as previously described and shown in FIGS. 17 and 18. It should be noted that this is for illustration purposes only and that any configuration of information transferred is possible depending upon the functions performed by the software object database manager and the data provided by the hardware object database manager.

Therefore, features are not concerned with the type of slave controller hardware device to which actual sensors or data acquisition or control instruments are attached. When a feature requests the values of the attributes of an object, it is insensitive to the type of slave controller used to manage the sensor which generates the raw data. The software and hardware object levels isolate the features and present the same set of data values the same way to all features for a given object type regardless of the physical slave controller to which the operational unit is attached. Thus, the features need not be changed for each type of slave controller.

This leads to the second level of transparency, the transparency of hardware devices to software objects. By interposing a hardware object manager between the software object managers and the slave controllers, it is possible to mask the hardware differences from the software managers. This frees the software object managers' processing capabilities in the node to perform higher level control and reporting of predefined conditions. For example, software object managers report alarms, and notify high level features of changes to act as a trigger mechanism independent of the hardware used to generate the data.

One example based on FIG. 18 occurs when Feature x 18-21 reads the values of analog type temperature points T1, T2, and T3. As previously discussed, the feature is not concerned with the hardware and therefore makes the same request for each temperature point to the analog input object manager 18-27. This is because the object requested is of the analog type. The analog input object manager 18-27 itself is also not concerned with the slaves on which T1, T2, and T3 are located. As far as the Feature x, and analog input object manager 18-27 are concerned, all communications to the various hardware managers are the same for T1, T2, and T3.

The analog input object manager 18-27 requires a plain floating point (real) number, such as 72.3° F. from the hardware object level 17-9. The hardware object managers 18-37 and 18-41 for slave types A and B condition the data to supply the analog input object manager 18-27 with values of the required type. In order to determine the value, any number of individual calculations in the hardware object manager may be required. For example, assume the value of the temperature sensor arrives at the slave controller as a count, such as a digital count produced by an analog to digital converter, which must be spread over a predefined range to compute the floating point value. Further modifications may be required by a span equation, a square root equation, and a filter before the final temperature value of the sensor is obtained.

As shown in FIG. 17, Type A slave controllers 17-15 and 17-17 deliver T1 and T2 raw data. Type B slave controller delivers T3 raw data. Assuming that controllers A and B have completely different levels of capability, the differences in the controllers would create significant problems in existing computerized facilities management systems. For example, one controller may implement a square root equation while the other may not, or the controllers may have different range equations. In conventional facilities management systems, the high level software would be required to compensate for these differences. However, in the present invention, the hardware object managers for the slave controllers access the node processor (or a separate processor) to condition the data and mask these differences from the analog input object manager 18-27.

Assume that Type A slave controllers 17-15 and 17-17 are highly simplistic devices which provide only the analog digital count to the network controller. In this case, the hardware object 18-37 manager for type A slave controllers must perform the other calculations necessary to obtain the final temperature values T1 and T2 to be provided to the analog input object manager 18-27. In contrast, assume slave controller type B is a highly sophisticated device which performs most of the ranging and filtering prior to sending the information on to the network controller. In this case, the hardware object manager 18-41 for type B controllers performs relatively little processing. In either case, the processing performed by the hardware object manager is transparent to the software object manager 18-27 which manipulates data and sends it to the high level feature. This is because there is a common information interface between the hardware object managers 18-37 and 18-41 and the analog input object manager 18-27. Thus, all hardware object managers communicate with the software object level 17-7 according to the same rules. Thus, the analog input object manager 18-27 can be written to deal with a generic object type, in this case, the analog input object. It need not contain alternative code for each single possible slave controller implementation of an analog input.

It should be further noted that as shown in FIG. 18, communication is possible between all the features and all the object managers in software object level 18-7 and all the object managers in software object level 18-7 and hardware object level 18-9. The actual communications paths used are a function only of the function performed by the feature and the data required. Thus, Feature y may also request software object T1, thus accessing analog input object manager 18-27. Similarly, Feature n may request data from one or more object managers in software object level 18-7 which may further request data from one or more object managers in hardware object level 18-9. The commonality of interface between the hardware object and software object level simplifies the addition of new slave controllers and object instances. An object instance would be added in the above example if a fourth temperature sensor T4 were to be added to the system. A new slave controller of the same type would be added if a third type A slave controller, A3, were added. In both cases, all the necessary software exists on the network controller because there are no changes to the informational interfaces between the software object level 18-7 and the hardware object level 18-9. The user need only modify the database to create a new instance of the 18-29 analog input object T4 or the database 18-39 to create another instance of type A controller object, e.g. A3, in the network controller.

It is also possible to add a new slave controller type with minimal impact on the existing facilities management system software. Assume a new controller type, type C, is to be attached to the local bus 17-13. This would require adding (by download or other means) a new hardware object manager to the existing software in the network controller acting as the master control node for operational units on that local bus. This hardware object manager would map the capabilities of the new controller into the software objects already defined in the system. For example, the new hardware controller may monitor analog temperature data in an unconventional manner, requiring a new hardware object manager. If the new controller produces analog temperature data, the new hardware object manager can map the data into a new instance T5 of the analog input objects. The existing software object managers and high level features in the software object level 17-7 and features level 17-5 of the network control software would be unaffected, since they would operate the same way as before. The only exception would be when the new hardware supports a new data type which is so different in operation from the existing types of objects that it could not be mapped into one of the existing software object managers at the software object level 17-7. In that case, a new software object might also have to be created.

Thus, the hardware object managers have again been used to mask out the differences in the hardware to the software objects. Thus, the software object managers need not have different hardware dependent versions. A software object manager handles a data element the same way, whether the data element comes from a sensor operated under type A control or another sensor operated under type B control. The hardware object managers format or map the data into the form required by the software object managers needs. This allows the software object managers to provide a hardware independent interface to the higher level software features.

Figure 19:
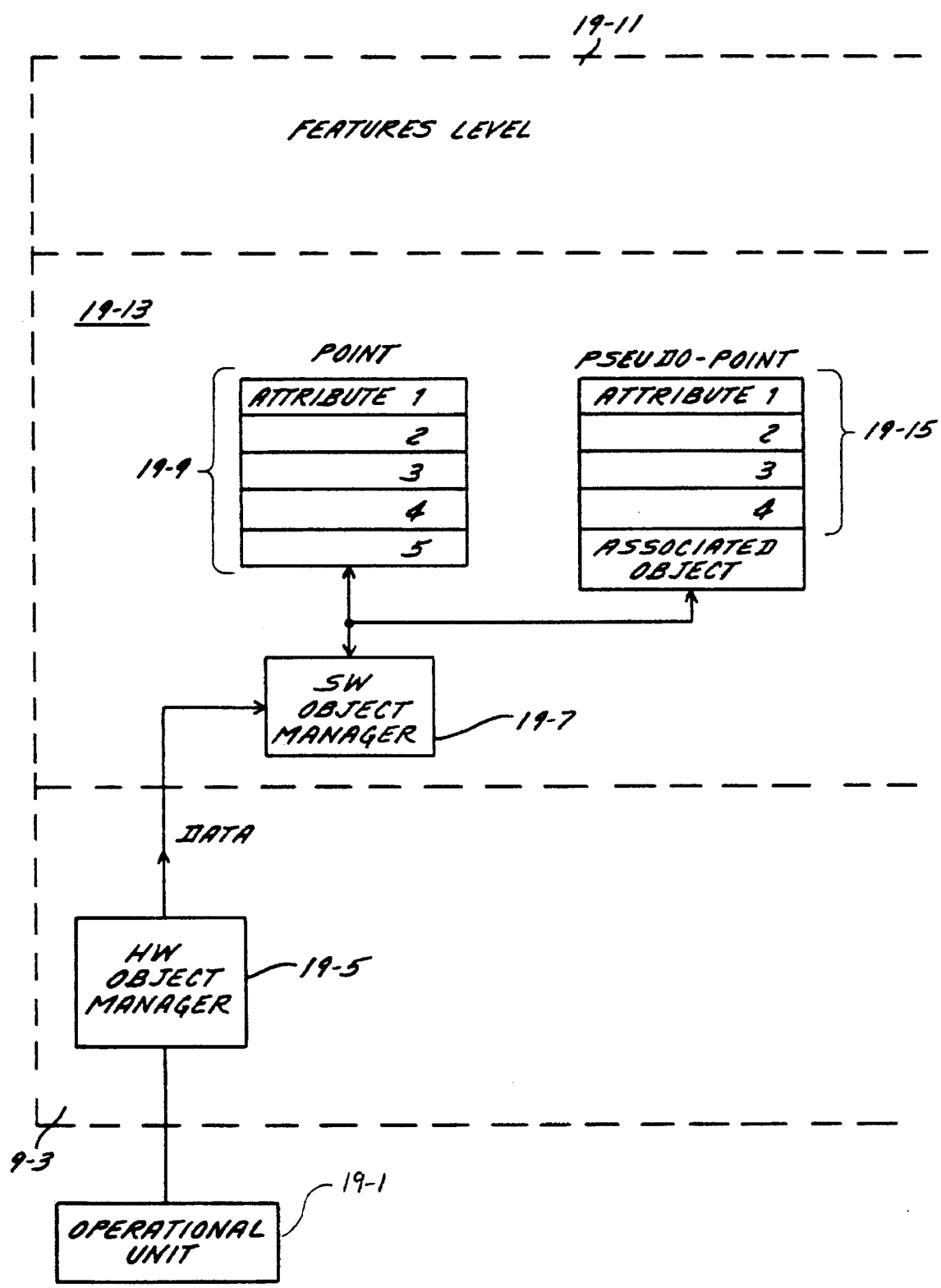
FIG. 19 illustrates the use of points and pseudo points according to the invention.

According to another aspect of the invention, FIG. 19 illustrates that a software or hardware object manager provides a construct to handle data generated during a calculation in much the same way that data obtained directly from an operational unit such as a sensor is handled. According to the invention, a point is defined as a type of object. For example, an analog input point is a type of object. Therefore, the point has attributes such as its current value, high limit, low limit, alarm state, its hardware address, etc. These multiple dimensions to the point define the point as a vector quantity. A point is always associated with an operational unit such as a sensor in the field. Thus, operational unit 19-1 provides data to the network controller 19-3 which processes the data in a hardware object manager 19-5 into a form required by software object manager 19-7. The data corresponding to the point is stored as attributes 19-9 in a storage means, such as processor memory 17-4.

Intermediate calculations at features level 19-11 sometimes require that the software object level 19-13 supply data which is not gathered directly from an operational unit. In order to facilitate a common method of handling such data, pseudo points 19-15 are created at the software object level 19-13. A pseudo point is handled by software object manager 19-7 in exactly the same way as a point 19-9. The difference between a point and a pseudo point is that a point gets its values from operational units while a pseudo point obtains one or more of its attributes from an associated object. The pseudo point stores the identity of the associated object as one of its attributes. Thus, pseudo point 19-15 could recognize its associated object as point 19-9. In this case, pseudo point 19-15 could obtain one or more of its attributes from the attributes of point 19-9. This allows the software object manager 19-7 to treat all data requests from the features level 19-11 in the same way. Thus no distinction need be made between data obtained as points from operational units and other data used in intermediate calculations which is not directly obtained from such operational units.

Figure 20:
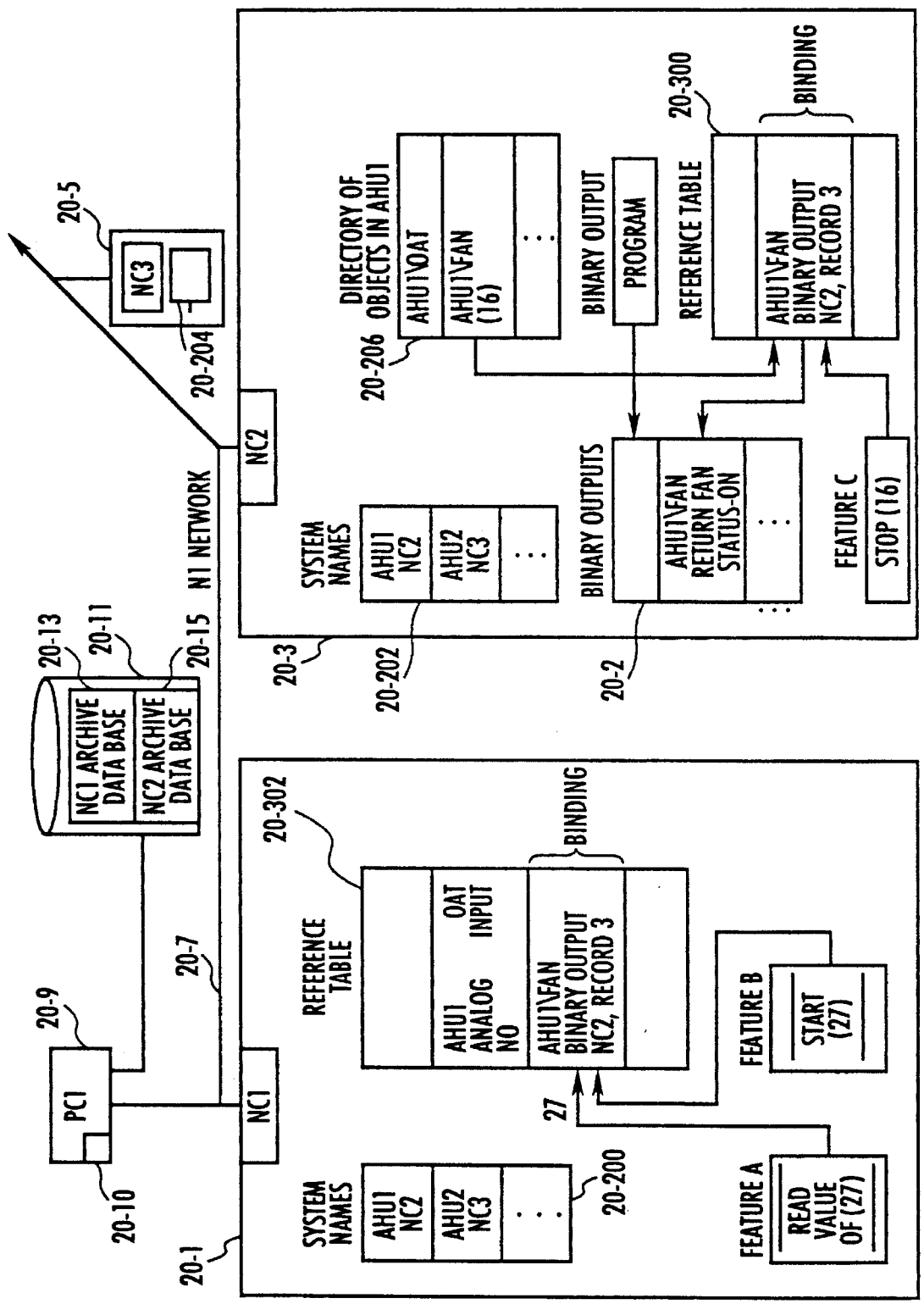
FIG. 20 is another overview of a system according to the present invention.

FIG. 20 shows network controllers 20-1, 20-3, 20-5 interconnected on high speed network bus 20-7. High speed network bus 20-7 is used to transmit data among the nodes into computer 20-9. Computer 20-9 further transfers information to storage device 20-11 which contains archived data bases, such as archive data base 20-13 for network controller 20-1 and archive data base 20-15 for network controller 20-3.

Computer 20-9 contains generation software 20-10 which allows the user to create data elements at whatever level of data is appropriate to a specific application and to assign names to the data elements. Since no two elements may have the same name, the generation software checks the archived data bases 20-13, 20-15 or online databases and verifies that each data element is assigned its own unique name. When the name has been assigned, the name and the data element are both downloaded to the host node using high speed bus 20-7. This is shown generally in FIG. 21 at generation time as reference numbers 21-20 and 21-22. As a result, the host nodes contain named data elements.

Figure 21:
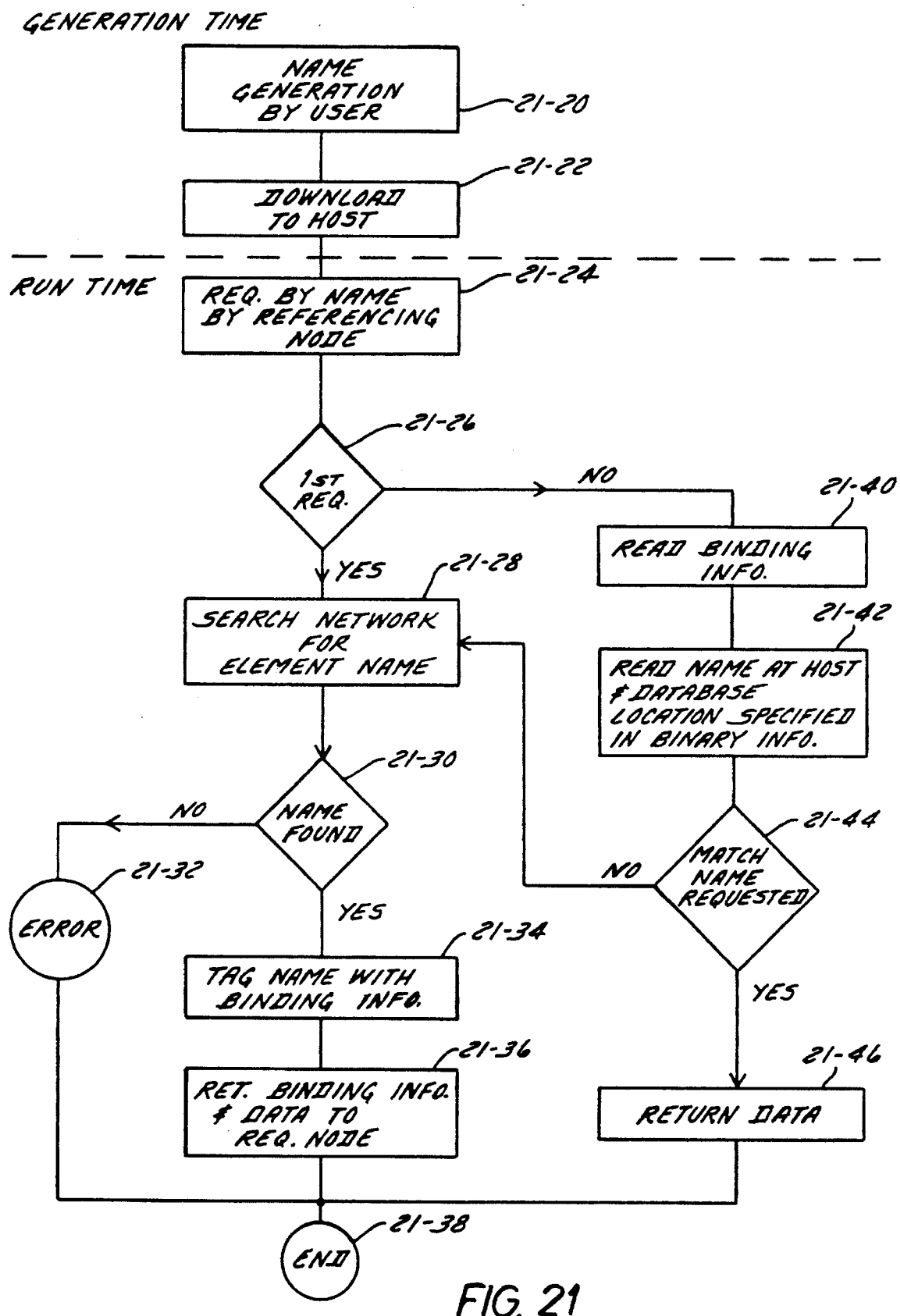
FIG. 21 is a flow diagram illustrating a first embodiment of the method of the invention.

As further shown in Function Block 21-24 in FIG. 21, during run time a referencing node transmits a request for a data element by name. As shown in Function Block 21-26, if this is a first request for the named data element, the entire network is searched until the data element is found. This is shown generally in Function Block 21-28. As shown in Function Block 21-30, if the name cannot be found anywhere on the network, an error message 21-32 is transmitted and the search for the name is terminated in Block 21-38. On the other hand, if the name is found, as shown in Function Block 21-34, the name is tagged with binding information. This binding information is a node address on the network and an internal address of the data element within the node's data base. The node address and internal address of the data element can have any convenient format. In accordance with Function Block 21-36, the binding information and the data element itself are returned to the referencing node which stores the binding information.

As shown in Block 21-26, if the referencing node is not making a first request for the data element, control passes to Function Block 21-40 where the binding information is read. Using the binding information, at Block 21-42 the name at the location specified (host node and data element location) is read and compared in Block 21-44 with the name requested. If the name found at the location specified matches the name requested, the data is returned to the requesting node in accordance with step 21-46 and the data acquisition routine is terminated.

However, it is possible that the name found at the specified location does not match the name requested. This indicates that the binding information has become out of date. Typically the verification is done in the host node. The host verifies that the data requested is still at the same address by comparing the name passed with the name of the element stored at the bound address. As previously noted, if they are the same the binding is still valid and the data is returned as requested. However, if the data element has moved, either within the host node's data base or to another node, the host node detects the mismatch between the name now stored in that location in its data base and the name passed in the request. The referencing node is informed that the binding information is out of date. The binding information can become out of date when a download, deletion, or other data base generation is performed on the host node, either deleting the data element or moving the data within the node to another location on the data base or moving the data to a different node. Any of these events can happen without the referencing node being informed. When the binding information is out of date, the referencing node executes a search of the network for the element name in accordance with step 21-28, again following the steps previously described for the first request of a data element name. If the data element name has been deleted, an error message 21-32 will be returned. However, if the data element name has been moved either within the node or to a different node, in accordance with steps 21-34 and 21-36, the name will be tagged with the new binding information. The new binding information and the data element will be returned to the referencing node.

As a result of the above, the network is self healing. References which become out of date are corrected the first time a reference is made after the change of address has occurred. Further, if a referencing node is downloaded before a data element it references is downloaded, an error message is returned until the name is downloaded and then can be found. Thus, in accordance with the above invention, a search of the network need only be made either the first time the data element is requested or the first time a data element is requested after it has been moved.

Figure 22:
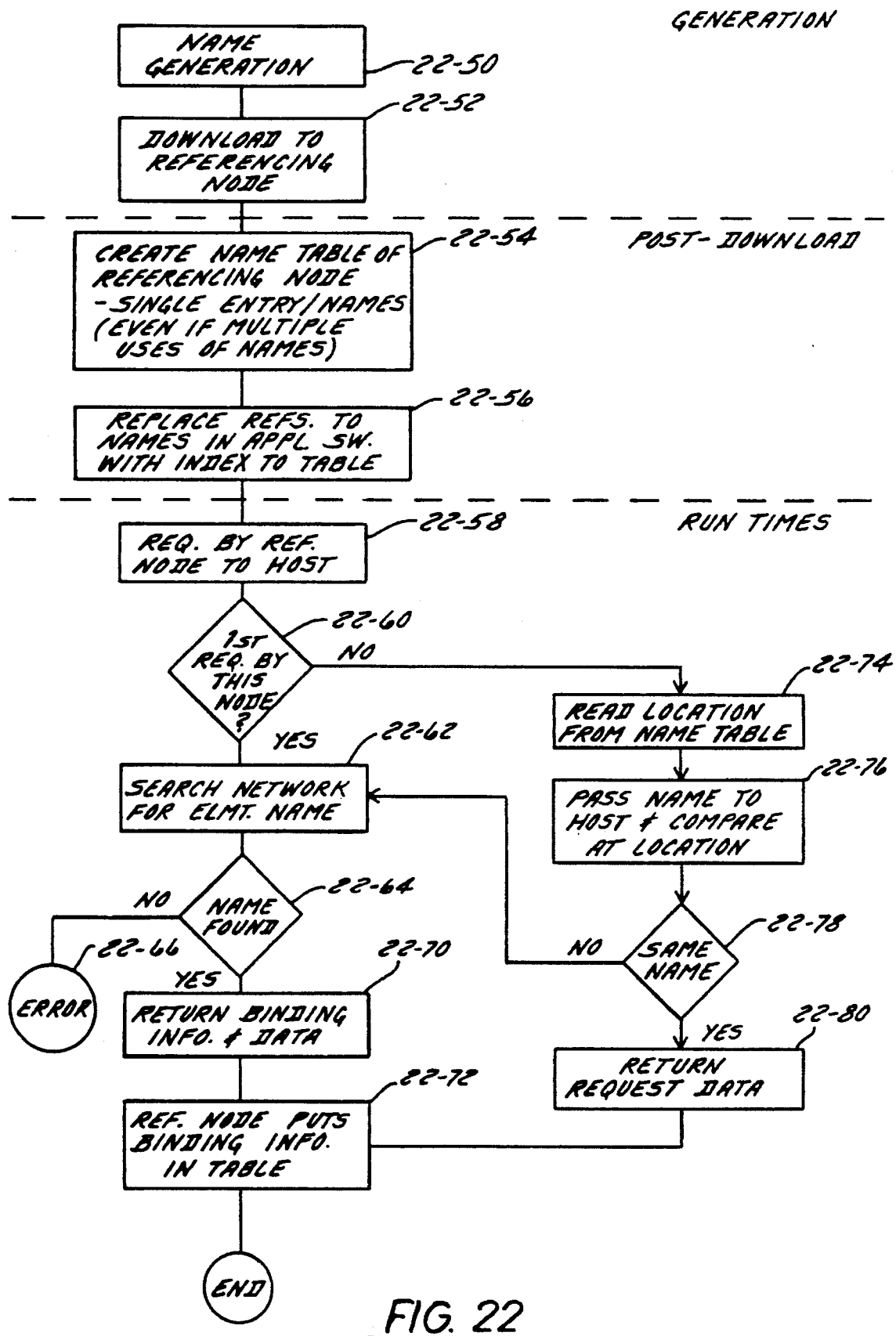
FIG. 22 is a flow diagram illustrating a second embodiment of the method of the invention.

FIG. 22 illustrates a variation of the above described method. FIG. 22-3 illustrates that after name generation 22-50 the names are downloaded at step 22-52 to the referencing nodes. At step 22-54, the referencing nodes create a name table. The reference table can be constructed to optimize memory usage in the node by keeping only one copy of the data element. All references and applications in a referencing node which require the data element are then replaced by a reference table index which typically requires fewer data bytes than an ASCII name. Thus, the name is kept in only one place, the reference table entry, as shown in steps 22-54 and 22-56 of FIG. 22.

It should be noted that in this method each referencing node keeps its own name table. Thus, after step 22-58 when the referencing node requests the data element, step 22-60 is executed to determine if this is the first request by the referencing node. If it is the first request by the referencing node, steps 22-62 through 22-72 in FIG. 22 would be executed. This would involve searching the network for the element name, if the name is found returning the binding information and the data, and placing it in the table created in the referencing node as shown in step 22-72. Errors would be treated as previously discussed.

If this is not the first request by the referencing node, then at step 22-74 the location of the data element is read from the name table and the request sent to the host. The name is then compared by the host node with the name at the location specified in the name table. Based on the result of the comparison at step 22-78, the data will be returned to the requesting node or the network will be searched for the element name. It is important to note that within the referencing node, it does not matter in what application or feature the request for the data element originates. Once the binding occurs for one reference to that element, it occurs for all references in that node to that element. This means that the binding needs to occur only once for all references in the node instead of once for each place the reference occurs in the node. This reduces the time spent making initial bindings for all of the references by the node. It should be further noted that a separate reference table is built for each node. Thus, if the location of the data element is changed within the host node or to another host node, the process of updating the reference table will be repeated by each referencing node the first time that node requests the data element.

Figure 23:
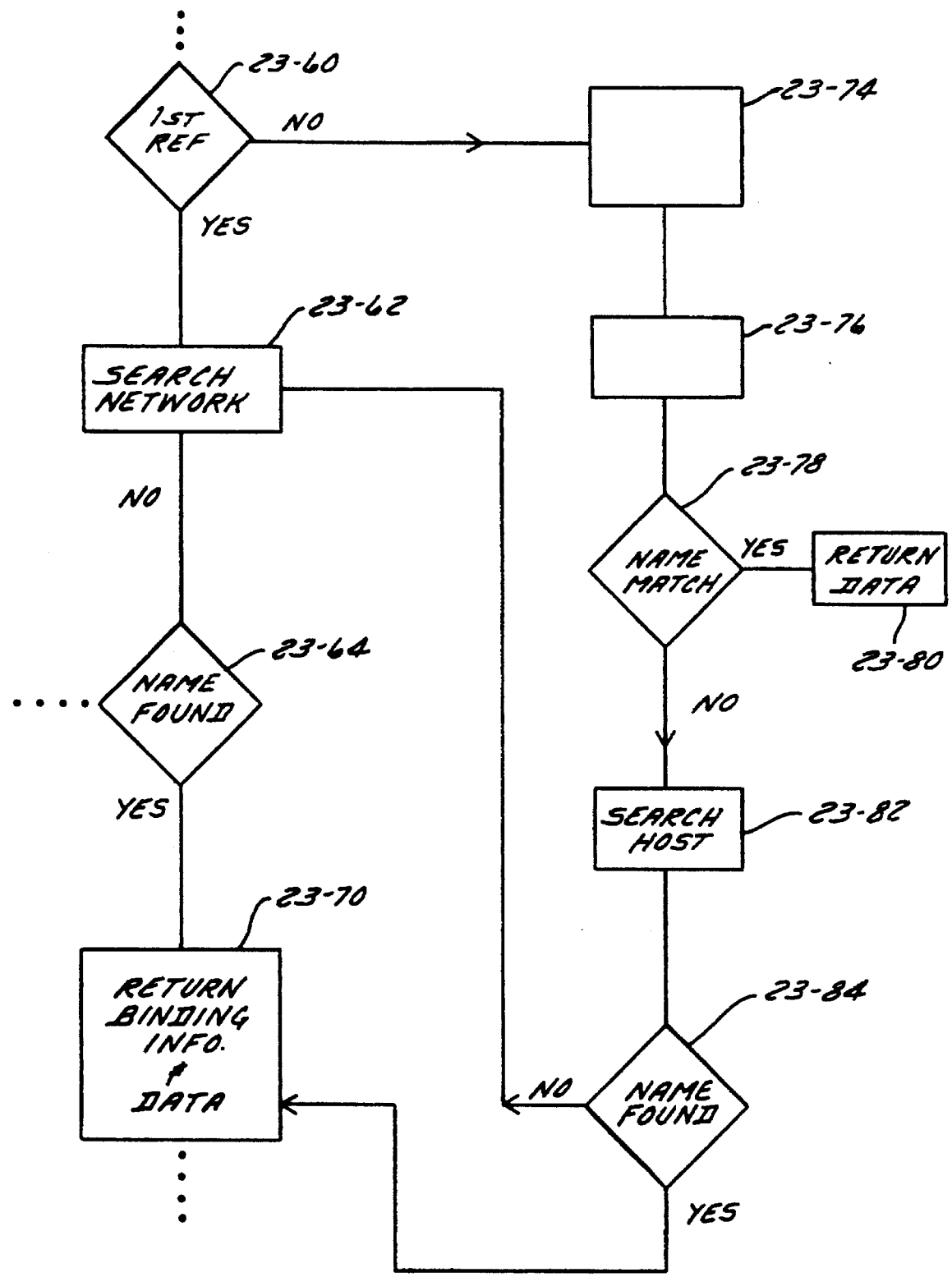
FIG. 23 illustrates a further optimization of the method in FIG. 22.

FIG. 23 shows a further optimization of the arrangement shown in FIG. 22. Assuming a node has made a first request for a data element, the name of the location identified by the binding information is compared with the name of the data element currently being requested. In this case, if no match occurs, a local search is first performed at step 23-82 by searching the host identified by the binding information. This is because it is likely that the data element will be found within the same host. If this is the case, control passes to step 23-70 where the binding information and data are returned to the referencing node. However, if this is not the case, the remainder of the network is searched beginning at step 23-62.

A further embodiment avoids searching the network for references to data elements where the data element is stored in the same node as the requesting node (i.e., the host node and the referencing node are the same node). As previously described, the reference name table must contain an entry for each name in the referencing node. This is necessary even if the referencing and host nodes are the same because the data may at some time move from this node to another node. Thus, it is not possible to eliminate an entry from the name table in the reference node even though the referencing node is also the host node for the named element. However, in these situations only, it is possible to eliminate searching the network the first time the referencing node requests a data item for which the referencing node is also the host node. This is achieved by having the data base software and the host node add the reference table entry when the element is downloaded. The table entry contains the correct binding information since the host node owns the data element and, hence, knows the binding. When the first reference from somewhere else on the same node occurs, the binding information is already in the reference table and no additional searching is required. Thus, it is advantageous for a data element which is used frequently by a reference node to be hosted on that reference node.

Figure 24:
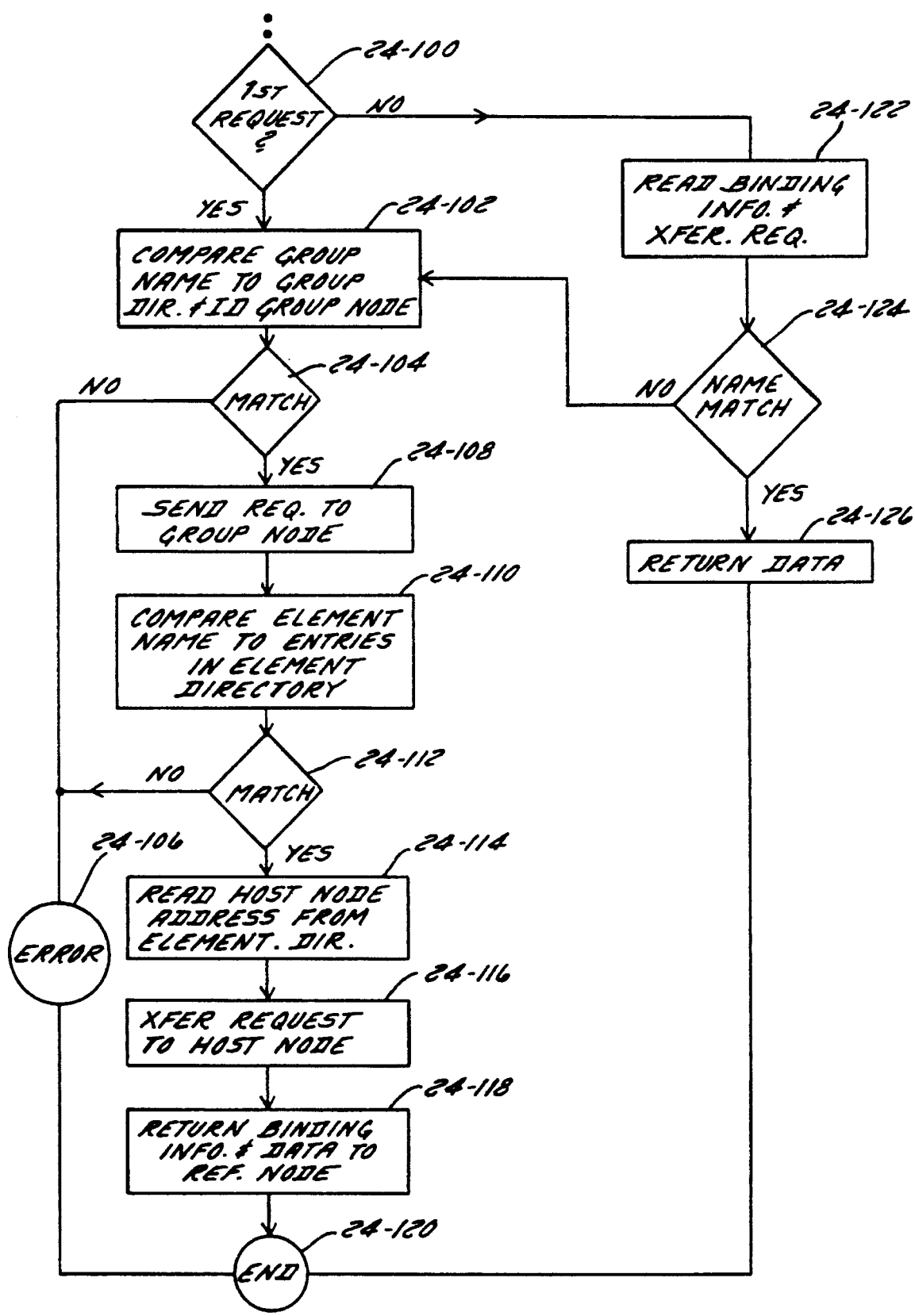
FIG. 24 illustrates an embodiment of the method of the invention using multiple levels of names.

FIG. 24 shows a further optimization technique using multiple levels of names. As illustrated, two levels of names are shown. However, the technique can be extended to an arbitrary depth of the naming hierarchy. Thus, small and hyphenated levels of names can be used.

At each level a directory is formed permitting access to the next higher level. In a two level naming scheme, each name consists of two parts—a group name and an element name within the group. Each group is assigned to one node in the network and may have many elements within the group. A first directory or group directory, is a directory of all the groups in the network. The directory lists the name of each group and defines the node on which the group resides. Since the group directory must be kept on each node of the network, it is broadcast to all nodes in the network. The addition or deletion of groups must also be broadcasted to all nodes in the network so that they maintain an updated copy of the group directory. For each group on a node, the node contains a second level of directory called the element directory. The element directory lists all the elements in that group and identifies the node address of each element in the group. It is important to note that the elements in the group need not reside on the node containing the group or element directory, nor need all the elements and the group reside on the same node of the network. Of course, the element directory is updated whenever an element is added or deleted from the group or moved from one node to another. FIG. 24 illustrates how the directories are used. As shown in step 24-100, it is first determined if a reference node is making its first request for a data element. If this is a first request, in step 24-102 the reference node compares the group name to the group directory and identifies the group node. In step 24-104 if a match has not occurred error 24-106 is indicated and the sequence of events is terminated.

Assuming proper operation at step 24-104, a match occurs and at step 24-108 the request is sent to the group node as identified in the group directory. In step 24-110 at the group node, the element directory is searched to determine if the element appears in that group. Since the element directory contains the location of the data element, if a match occurred at step 24-112 then at step 24-114 the group node reads the host node address from the element directory and at step 24-116 transfers the request to the host node. At step 24-118 the host node obtains the data and returns the binding information and the data to the reference node. Thus, the initial search for the name of the element is shortened to a search of the group directory followed by a search of the element directory for the correct group. The entire network need not be searched. However, it should be noted that the directories must be kept up to date and that a copy of the group directory must be maintained on each node of the network. The group's element directory need be maintained only on the node where the group directory resides. The added bookkeeping is only required when a group or element is added or deleted or an element is moved. This is considerably less work than downloading all referencing nodes when such changes occur. The actual references of the software of the referencing nodes need not be affected.

As previously discussed, if this is not a first request for data, binding information is read and the name is compared with the name found at the location identified by the binding information. If a match does not occur, then the binding information is no longer up to date and the sequence must again be executed to locate the proper information.

In one application, the above described methods can be carried out in a facilities management system. This application to a facilities management system is by way of example and is not intended to be a limitation of the invention. In FIG. 20 several real time network controllers and a personal computer used to generate data bases to download to the network controllers are interconnected on network 20-7. Storage means 20-11, such as a disk attached to personal computer 20-9 contains the data bases to be downloaded to network controllers 20-1, 20-3 and 20-5. Each network controller and the personal computer can be considered a node. Assume NC2 is the name of a host node 20-3 and the host node owns a data object or element called AHU1/FAN.

The system/object name is a two level naming scheme where the system name is the same as the group name in the above description and the object name is the name of the particular data object or element. This object is the return fan for air handler #1. It is a binary output object because it can be controlled to one of two positions and its name is unique on the network. The "group" or system name is AHU1 and the "element" or object is FAN. Assume also that NC1 is the name of node 20-1 and is a referencing node. This means it has several software features which need to reference the FAN object. As shown in FIG. 20 Feature A needs to read the current value of the FAN object and Feature B sends a command to the FAN object to physically start the fan. As shown in the figures, a list of all the system names, group directories 20-200, 20-202, and 20-204 is duplicated in each node. The group directories identify which node contains the directory of objects for a particular system. For the case of the AHU1 system, the directory of objects is maintained by NC2 node 20-3. Thus, NC2, node 20-3 also contains a directory of objects in the AHU1 system 20-206 and where they are located in the data base. Similarly, the objects for the AHU2 system are located on NC3 or node 20-5.

As previously discussed, using personal computer 20-9 the user creates a database which can be placed on archived files 20-13, 20-15 on storage disk 20-11 and can be downloaded to network controllers 20-1, 20-3 and 20-5. References, such as those from Features A and B to object E1/FAN, are kept in an ASCII name form when downloaded. This is because they are not yet bound at the time the data base for the network controller is downloaded. The referencing software features are oblivious to the actual physical location of the data object AHU1/FAN.

Upon downloading, an object is given to a data base manager which manages all objects of the same type. In the case of AHU1/FAN, the binary output manager in NC2 is used. The object data base manager software initially enters the names into the reference name table. For example, when the binary output object manager is given the FAN object at download time, it places the FAN object into its own binary output data base 20-2 and adds an entry in the reference table 20-300. This entry contains the name of the AHU1/FAN object and its binding information; object type (binary output), host node address (NC2), and data base location in the binary output data base (record 3). In this example, the table entry is located at offset 16 as shown in FIG. 20. Note that no other nodes besides NC2 know the binding information at this time. These nodes still only have a name reference to AHU1/FAN. The directory of objects and AHU1 will later also point to the reference table for the FAN object so that later lookups of the name will find it in the proper place. Data base for the referencing node 20-1, NC1, is also downloaded. This causes entries to be made in the reference table for NC1. When the data base for Feature A is downloaded, an entry is made into the reference table for AHU1/FAN but without the binding information. This "unbound" reference simply shows that some feature in NC1 will be referencing FAN. When the data base for high level software Feature B is downloaded, it will also try to add the unbound reference to the table and find that it is already there (at offset 27 in the reference table 20-302). Both features will then replace the named reference to AHU1/FAN with the offset of 27 into the table. Note that at this point in time the binding information is still not in the table in NC1.

Execution of high level software Feature A in NC1 requires reading the value of FAN object. Since the binding is not yet in the reference table in NC1 for AHU1/FAN, the software must locate AHU1/FAN on the network. This requires searching the system name list or group directory in NC1 for the system name AHU1. As shown in FIG. 20, the list shows that AHU1 is located on NC2. Thus, the software directs the request to NC2. NC2 locates the object in its data base using the element directory. This is accomplished by looking up FAN in the directory of objects in AHU1. In the example shown in FIG. 20, this is a binary output point located at offset 16 in the reference table in NC2. The reference table of NC2 already has the binding information added for FAN, since this information was put there at download time, as described above. Hence, the software can send the request to the correct data base manager (binary output) object manager on this node and request the correct record, which is record 3.

Once the data is obtained, the information is passed back to Feature A and NC1 along with the binding information. At that time, the reference table entry for FAN is completed in node NC1 with the correct binding information.

FIG. 20 also illustrates that for references in the host node, such as from Feature C in NC2, the binding information is already in the reference table after the data base is downloaded. Thus, the binding procedure is not required for those references, even the first time the reference is accessed.

Since the binding information has been provided to network controller NC1, subsequent references from network controller NC1 need not repeat the above procedure. Assuming Feature B needs to reference FAN, it uses the stored offset of 27 to find FAN in the reference table. This time the binding information is already in the table. Thus, the software could send a request directly to the binary output data base manager on node NC2 and request record 3. The look-up procedure described above is no longer required. Any other features on NC1 that subsequently reference FAN will use the same bound reference in the table, so the binding is only required once for all references from NC1. As previously discussed, the reference table reduces memory requirements since the longer ASCII name is replaced by a short table offset in each software feature and since only one table entry is required for all references from that same node.

FIG. 25 illustrates the sequence of events when a data element moves within a node. Assume that FAN moves within the data base of NC2 from record 3 to record 5. This could occur, for example, as a result of a data base regeneration on the personal computer so that record 3 is now an object called AHU1/PUMP while AHU1/FAN has been moved to record 5. The binding information used by network controller 25-1 to go directly to the binary output data base manager on network controller 25-2 would cause a request for record 3. However, the request also sends the name of AHU1/FAN so that it can be compared with the name found at record 3. In this case, the records no longer match.

Using one of the optimizations described earlier, the binary output data base manager searches its own data base to see if it still has the object AHU1/FAN. In this case it is found at record 5, so the information requested is returned along with the new correct binding information. NC1 sees that the binding it was using has been corrected by NC2 and updates its reference table by replacing the reference to record 3 with record 5.

Thus, the object has moved within network controller NC2, but network controller NC1 was still able to find the data without any changes to the network controller NC1. Furthermore, all references in network controller 25-1 are corrected, since the common reference table entry is updated.

Figure 26:
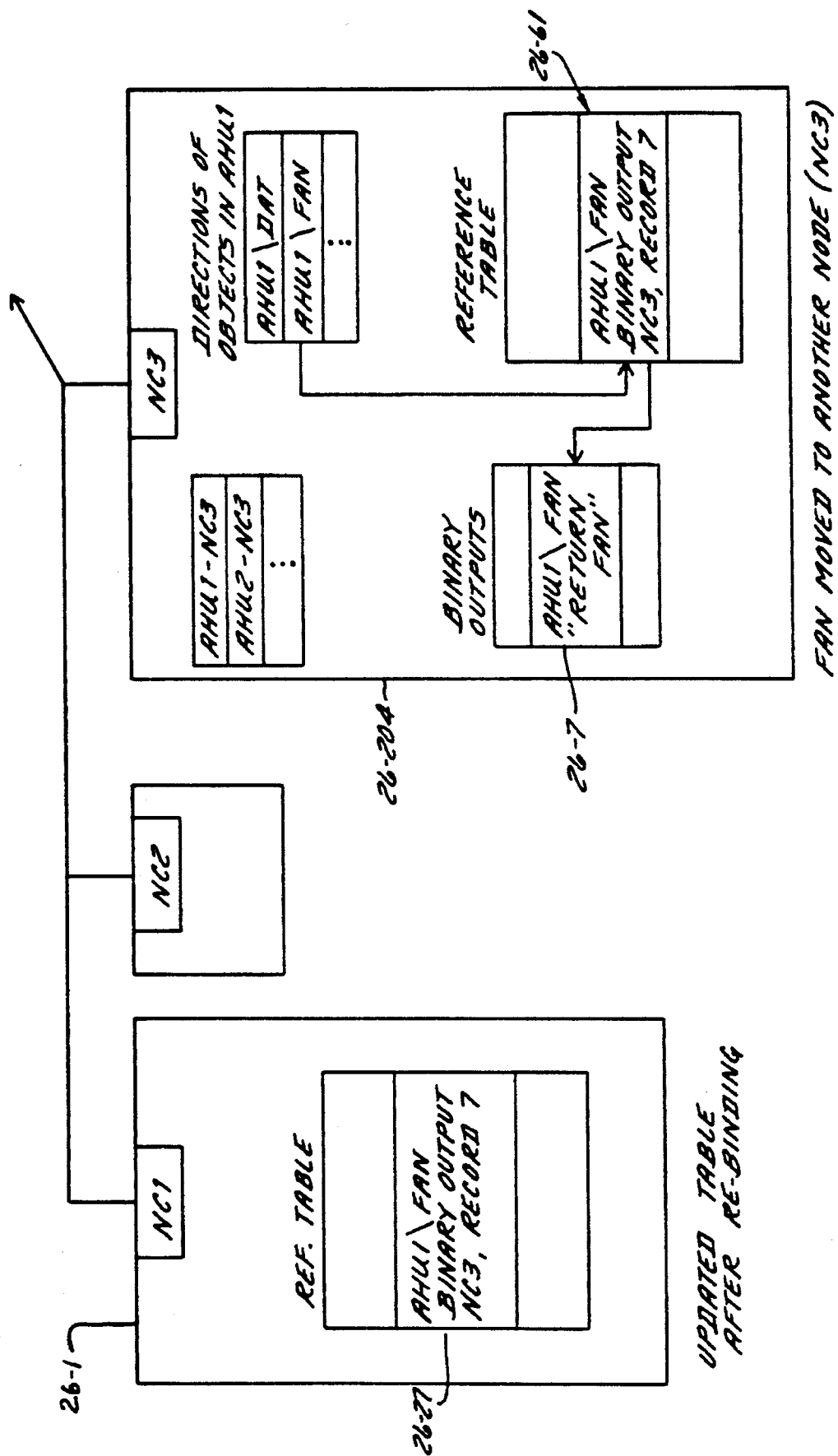
FIG. 26 illustrates an example of the invention when a name moves between nodes.

FIG. 26 illustrates the situation when, as a result of a download, a data object has been moved to a different network controller. In this case, the user has generated a data base for NC2 and NC3 moving the system or "group" name AHU1 and its objects to NC3. Now, FAN is record 7 in the binary output data base on network controller NC3 (node 5). Here, a network controller NC1 which attempts to reference FAN using the binding information it already has fails. This is because the name comparison at network controller NC2, record 3 shows that the AHU1/FAN data object is no longer at that address. Moreover, a check of the remaining elements in the NC2 data base shows that FAN cannot be found. Thus, Feature A in the network controller 1 receives an error message.

Network controller 26-1 responds by erasing the binding information from its table and following the method discussed above to find the new location of AHU1/FAN.

In this case it would be found on network controller 3 at record 7. Doing this once corrects all references in network controller NC1, since the common reference table is updated.

It should be noted that had the data element been completely deleted from the network, network controller NC1 would have reported its inability to find FAN via an advisory message to an operator. This is also true for all references to FAN from NC1 until FAN is downloaded again. Thus, an error occurs until AHU1/Fan is redefined, or the reference is removed. However, after the download the references will bind and begin to work properly. Hence, the order of node download is not critical.

Figure 27:
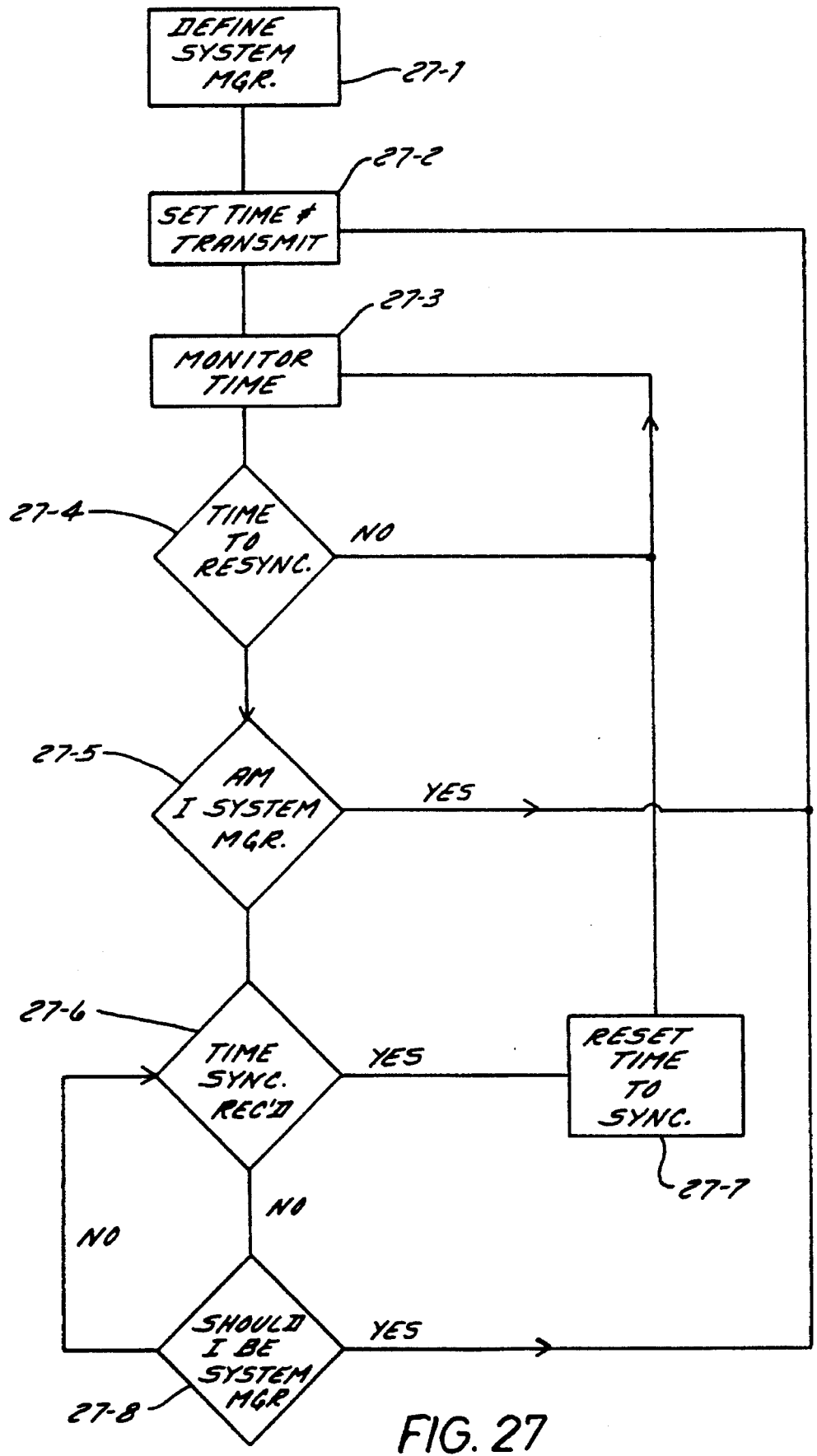
FIG. 27 illustrates a method of time synchronizing nodes according to the invention.

In order to provide proper time synchronization among nodes interconnected on an N1 bus, it is necessary for one of the nodes to play a limited system manager role. As shown in FIG. 27, a node 27-1 is selected as a time synchronizer (a limited system manager) and at 27-2 the node defines the time and transmits this information to the other nodes interconnected on the N1 bus. Shown in 27-3, the nodes monitor the time during the non-update interval. Decision block 27-4 tests a clock to determine if it is currently the time for which resynchronization has been set. If not, control is transferred back to 27-3 and time monitoring continues. If it is determined in decision block 27-4 that it is now time to reestablish synchronization of time among the nodes, in block 27-5 the node tests to determine if it is the system time manager. If so, control is transferred to block 27-2 and the system time manager transmits the current time. If in decision block 27-5 the node recognizes it is not the system manager, in block 27-6 the node determines if it has received the time synchronization data. If so, the node resets its time in block 27-7 and time monitoring continues as in block 27-3. If the time synchronization data is not received at block 27-6, the node in block 27-8 determines if it can be the system time manager and, if so, transmits the time as in block 27-2. This allows a new node to assume the time synchronization responsibility if the original system time manager fails or goes off line.

Figure 28:
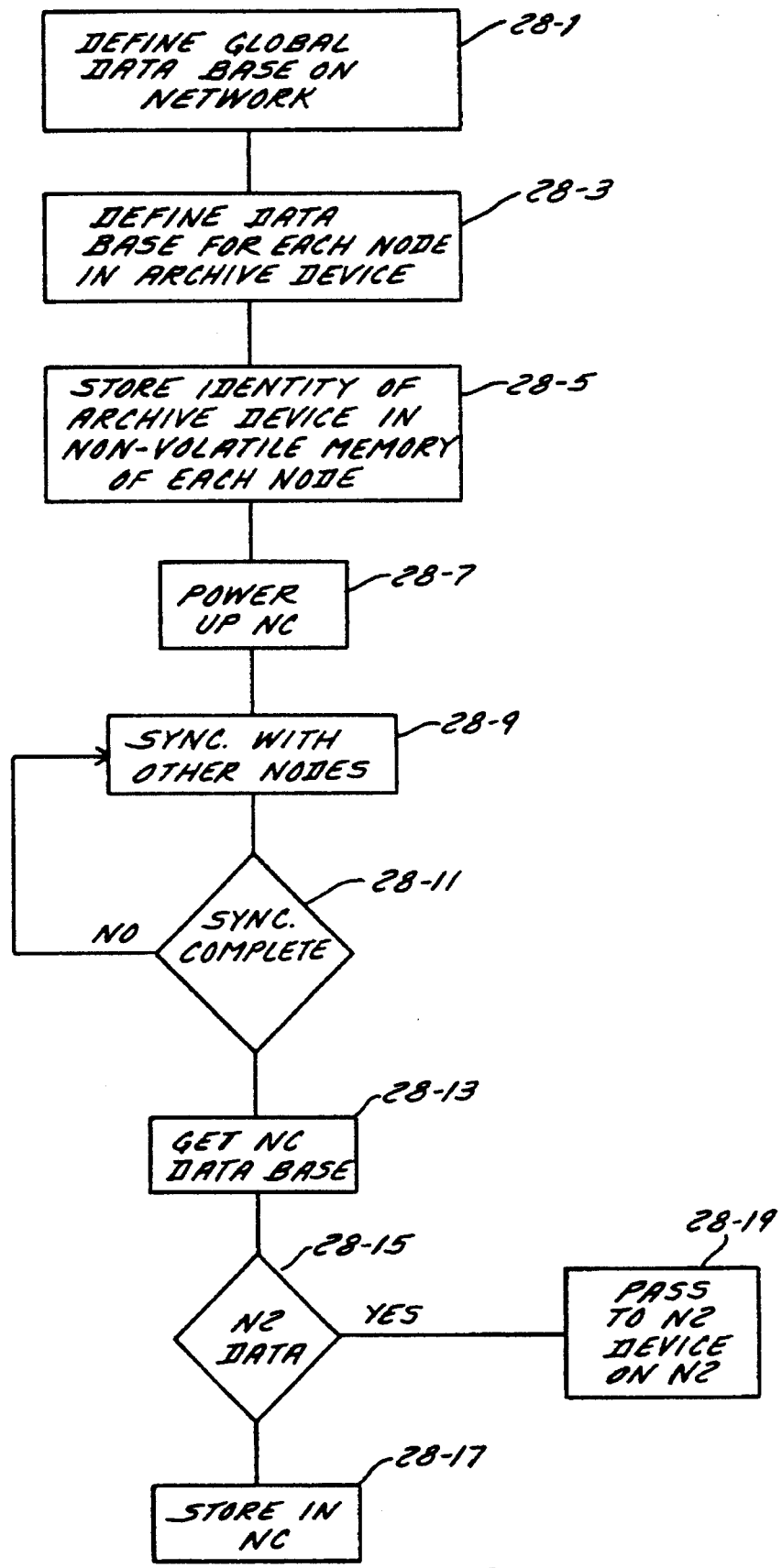
FIG. 28 illustrates downloading global variables to nodes on the network according to the invention.

In addition to synchronizing time among the nodes, it is also necessary to synchronize global data. FIG. 28 shows the fundamental steps in the download. In function block 28-1 a global data base is defined and loaded onto the network. A global data base can include such items as passwords, a list of system names (although not object names), a list of nodes and printers on the system, report groups which indicate where user advisory messages of certain classifications are to be directed, and other information which would be useful to all the nodes. Function block 28-3 shows that each node also has a data base defined for it in an archive device. The node data base includes data to be stored in the node and additional data to be transmitted along the N2 bus to other devices controlled by the node. In function block 28-5, a node is configured on a network by giving it an N1 address and storing the identity of its archive device in non-volatile memory. Following power-up at step 28-7, the node must be synchronized with the other nodes at step 28-9. Step 28-11 tests if the synchronization is complete. If not, control is transferred back to function block 28-9 to complete the synchronization process. Upon completion of node synchronization, control transfers to function block 28-13 in which the node accesses the archive device to download its own particular data base. As each data element is received, decision block 28-15 tests if the information is to be transmitted to a device on the N2 bus. If not, the information is stored in the node as shown in function block 28-17. If the information is destined for a device on the N2 network, as shown in function block 28-19 the information is passed onto the device through the N2 network.

Figure 29:
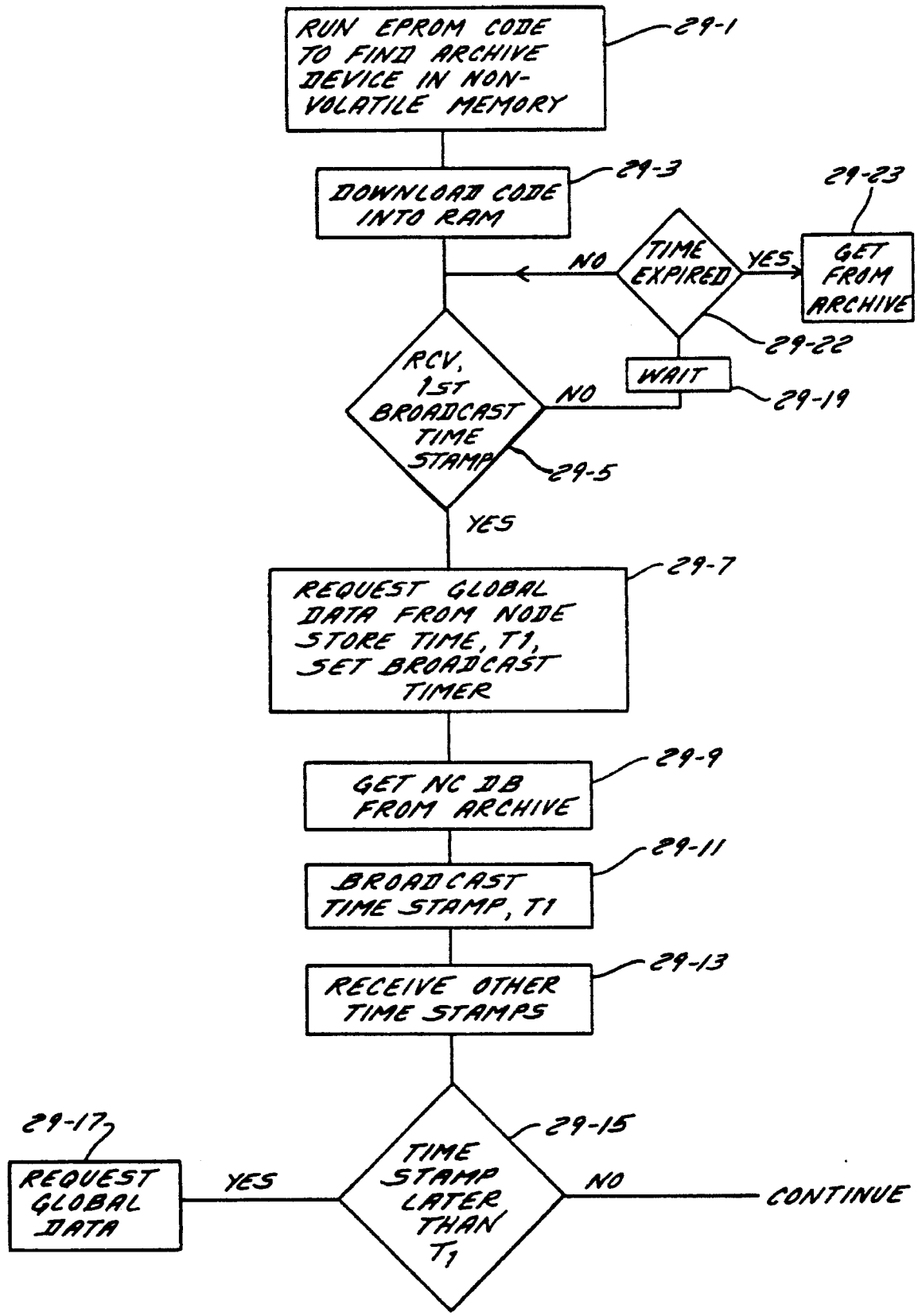
FIG. 29 is a more detailed illustration of downloading variables according to the invention.

FIG. 29 further illustrates how synchronization takes place. Upon power up, a node executes code in electronically programmable read only memory to identify the node's archive device defined in the non-volatile memory section of the node. This is shown in function block 29-1. As shown in function block 29-3, the node then requests the archive device to download the code into its random access memory. At decision block 29-5, the node joining the network tests to see if it has received a broadcast from another node on the network. According to the invention, the nodes on the network all periodically broadcast a time stamp indicating the latest version of the global data base in that node. Thus, if a node joining a network has not yet received a broadcast time stamp as shown in decision block 29-5, the node waits until it does receive one. Upon receipt of the first broadcast time stamp, the node entering the network requests the global data from the node associated with the time stamp, as shown in function block 29-7. In addition, the new node stores the time it received with the global data base information as its time stamp. Subsequently, in function block 29-9, the node accesses the archive device to obtain its own particular data base, as previously discussed. After receiving its data base, the new node joins the others in the network in broadcasting its time stamp, as shown in function block 29-11. Synchronization of the data bases is maintained by receiving time stamps from other nodes as shown in function block 29-13. In the event that the time stamp received is later than the time stamp currently in the node, the node requests the global data from the node with a later time stamp, as shown in function blocks 29-15 and 29-17. It should also be noted, that it is possible for a node to become hung up waiting for global data which is not available. Thus waiting step 29-19 is tested against time expiration decision point 29-21. If a time has expired, then to avoid suspending operation of the node, the node accesses the archive device for the global data as shown in step 29-23.

An alternative approach allows a node joining a network to avoid waiting for receipt of its first time stamp, as described above. According to this alternative, the node joining the network first accesses the archive device for the global data and records the time stamp of the global data on the archive device as its time stamp. The node then joins the network, periodically transmitting its time stamp and examining time stamps of other nodes as described above.

A similar approach is used with slave devices controlled by nodes on the N2 network. Every time an N2 device comes on line, it reports its data base revision level as a time stamp to its network controller. If the network controller has a new data base as indicated by its own time stamp, it downloads that information, which is some portion of the data base, to the device coming on line on the N2 network. If the network controller does not have a more recent data base than that indicated by the time stamp of the device operating on the N2 network, the network controller assumes that the N2 device has the correct data base.

Figure 30:
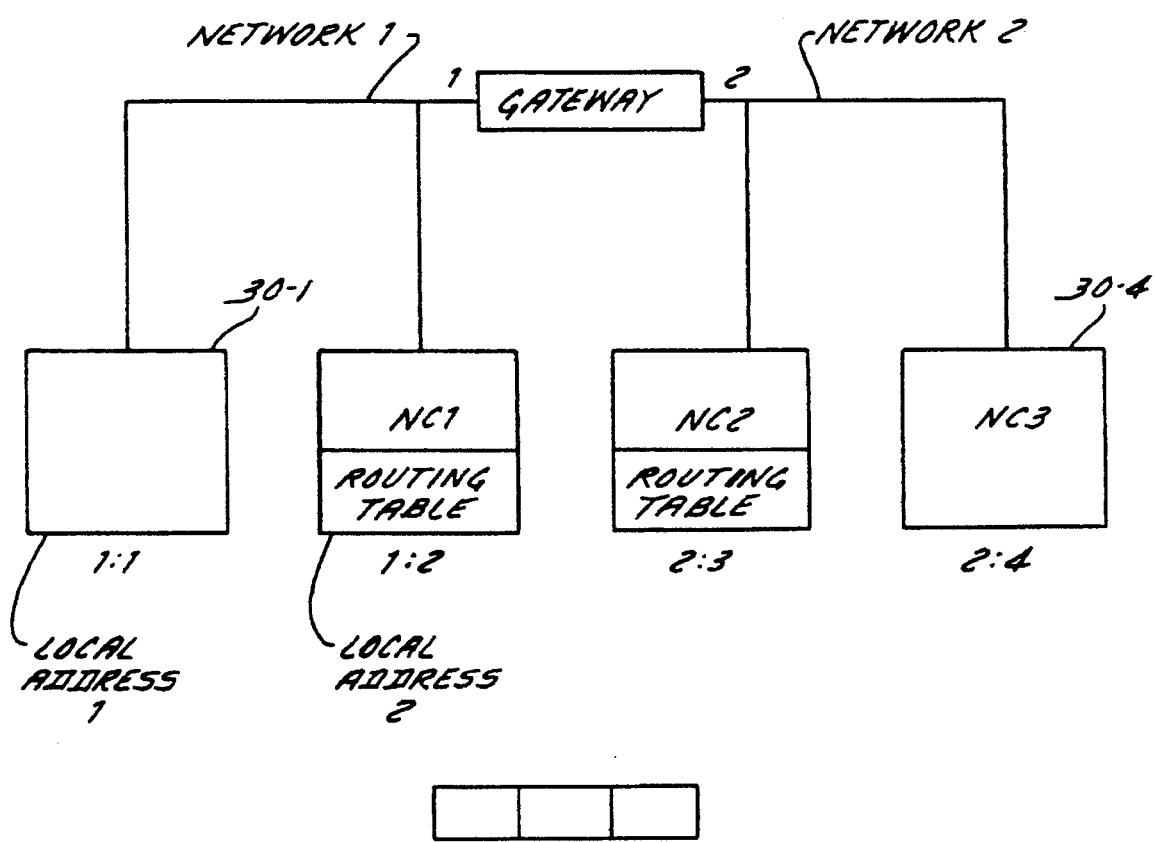
FIG. 30 illustrates cascading of download devices according to the invention.

FIG. 30 shows an approach to downloading information into a device without a routing table. The approach consists of cascading devices so that a path to a device without a routing table can be established through other devices which have routing tables. This is particularly useful in cases where it is not desirable to require personnel to go to an actual site of a device to physically download or upload a device's data base. According to the invention, each requesting network controller maintains at a minimum in non-volatile memory the address of its archiving device. In addition, each network controller maintains in non-volatile memory the address of a network controller that will initiate a download on its behalf. This is called the NC initiator. The NC initiator must be initialized in a consistent state before it can facilitate a download/upload request from another node. Thus, a cascading mechanism is employed whereby nodes above in the hierarchy are initialized before nodes lower in the hierarchy are initialized.

Two cases are possible. In FIG. 30, download device 30-1 could initiate the download with network controller 3, shown as node 30-4 which does not have a routing table. Table i of FIG. 31 shows the sequence of steps which are implemented by the network control layer of the archiving device or PC. It should be noted that each node is given an address defining its network, a local address on the network, and a port of the node. The node itself is assigned port 0. Thus, download device 30-1 has address 1:1:0. This is because the device is on network 1, local address 1, and because a device itself is defined as port 0. As Table 1 at FIG. 31 shows, the source of the message is 1:1:0, its destination is 2:4:0. An interim source of the message as it navigates the network is also shown. For the originator, the source and interim source are defined to be the same. Thus, the first interim source is 1:1:0. The remaining interim source entries in the table in FIG. 31 have the same network and local address as the preceding entry. A routing defined in a network layer such as that of the Open Systems Interconnection model of International Standards Organization of the node routes the message to NC1 which is network 1, local address 2, port 0. Tracing the steps through the table shows that by routing the message first through NC1 and then NC2 the download information eventually arrives at NC3. NC3 replies to the source acknowledging the receipt of the message. Since the receiving device does not have a routing table, it replies to the node from which it received the message. From there, the acknowledgement could be routed over the same path as the message transmission in reverse direction or over any other convenient path defined by the nodes having routing tables.

In the second case, network controller 3 initiates the download request to the archive PC 30-1. In this case, node NC3 located at address 2:4:0 does not have a routing table to use for sending its download request. However, as previously mentioned NC3 maintains in non-volatile memory an address of a network controller that will initiate a download on its behalf. Thus, NC3 routes its request to this NC initiator. NC3 requests the download from the data download device at address 1:1:0, which is identified in NC3 as its archiving device. The route taken by the request, as shown in Table 2 in FIG. 32, assumes that NC2 at address 2:3:0 is the NC initiator for NC3. NC2 must already contain a routing table to send the message to the archive device. This illustrates that by cascading the devices the message can be received by the archiving PC. It should be noted that this creates a hierarchy of nodes such that a higher level node, such as NC2, must be fully functional before a lower order node, such as NC3 can be downloaded. Similarly if another node named NC3 as its NC initiator downloads to that other node could not take place until NC3 completed its download through its initiator, NC2.

When downloads occur problems can result from objects whose system definition lies on a different NC than the object resides on. This is because two NCs cannot always be guaranteed to have mutually consistent data bases. These inconsistencies can not be automatically corrected, since they will naturally arise when several NCs have been affected whose definitions interlace. While these NCs are being updated (downloaded) there will necessarily be a time period during which inconsistencies cannot be avoided. However, all problem cases can be detected and reported to the user.

When one NC is downloaded the others may be temporarily inconsistent with it. If this condition persists, or if the system attempts to access objects on either NC during this period of time, errors or ambiguities can occur.

The following example demonstrates problems which can arise when an object is moved from one NC to another. Other scenarios could be constructed but the data base inconsistencies resulting would be the same. The following assumptions are made:

a. NC1 contains the directory for system S.

b. NC2 contains the original version of an object O.

c. NC3 contains the new version of the same object O.

The normal case is to add object O to the data base for NC3 and delete it from NC2. This can be done either through template generation (single object changes) or via DDL (data definition language). In either case inconsistencies can occur.

Assume DDL is used for this change. Then three NC DDL files need to be updated (NCs 1, 2, and 3) in order to complete the transaction. Each of the NCs must then be downloaded. However, one or more of the downloads could be skipped or an old data base incorrectly downloaded, resulting in inconsistent NCs in the field. Similar problems can occur if a template generation change fails or is cut off in the middle for some reason. The following cases demonstrate the inconsistencies which can arise.

Assume that, after the above changes have been made, NC1 is downloaded first. Then the system directory for S will indicate that object O should reside on NC3. Until NC3 is downloaded (if it ever is!) object O can not be found, since the directory says it should be on NC3. This is the first problem case—a directory pointing to an object which is not there. Note that bound references will continue to use the old object O in NC2 for now. New bindings can not be accomplished since the directory is needed for new bindings and it points to a nonexistent object. Further assume that NC2 is downloaded next. This creates the same problem as above with the additional problem that even old bindings will fail, since the old version of object O is now deleted. Until NC3 is downloaded the object does not exist.

Now suppose NC2 is downloaded first. This is again the same problem, since the old directory for S still points to NC2 which no longer contains the object. Current bindings become invalid and new bindings can not be made. After NC2 is downloaded, further assume NC1 is downloaded second. Same problem again occurs, since the directory points to NC3 which has not been downloaded with the new object yet and the old object is gone.

Now assume NC3 is downloaded first. As a result of this download, there are two copies of object O in the field. This demonstrates a second problem which can arise—duplicate objects with the same name in multiple NCs. Old name bindings previously discussed will continue to use the old version of O in NC2. New bindings will also go to NC2 since the directory is still not updated. Until NC1 is downloaded, the new version of O is inaccessible. This is referred to as an "orphan object"—it cannot be accessed, since its name is in no directory. There is no way for the user to examine, change, or even delete this version of the object. This demonstrates that a third problem can arise. After NC3 is downloaded, further assume NC1 is downloaded. Now there are still duplicate objects O but features can be bound to BOTH copies of O. Old bindings to O are still valid, since the object can still be found on NC2 but new bindings will go to NC3 since the new object is in the directory. Thus, for example, event triggers which cause high level features to refocus certain tasks, as discussed below, could be signed-up and received from both copies at the same time. If the object type of O has not changed, then both triggers will be considered valid by the receiving task. This is a variation of problem two (duplicate objects)—now binding can be made to both versions. Other scenarios result in the same problems. That is, downloading NC2 then NC3 or vice versa results in a directory in NC1 pointing to a non-existent object in NC2 and an orphan object in NC3.

In summary, then, the following problems can occur after downloading:

a. A directory in a node can point to a non-existent object.

b. Orphan objects cannot be accessed or removed—no directory points to the object; and c. Duplicate objects can occur and binding can be to either copy of the object.

These downloading problems can not be automatically corrected, since the software can not know where in the order of download the user is i.e., it can not determine what the NC data bases should look like now or when the downloads are completed. However, the problem can be detected and the operator alerted as follows.

Assume the following definitions:

Directory NC—the NC or node containing the directory for system S.

Object NC—the NC or node containing an object in system S.

"Here I am" message—a message which is sent by an object to its directory NC signifying that the object exists, where it is found and its type. "Are you there" message—a message which is sent by a directory to one of its objects requesting the object respond (to determine if the object is on the correct NC and is the correct type).

Since inconsistencies normally arise out of download, the following scenarios would catch the above errors as they are introduced. The object NC sees its directory NC come online—in this case the NCs could be out of synch, since one could have had changes made while the other was off-line. Thus, it is necessary to resynchronize the directories. This is done by each object whose directory is in the NC which came online (as defined by the global system directory data base) sending a "Here I am" message to its directory NC. This catches two of the problems. First, it catches orphan objects, since the directory NC will not find the object in its directory. It can then report an error to the user. Second, it catches duplicate objects since both try to report to the same directory. However, one must be an orphan since the directory can only point to one of them at a time. Again an error can be sent by the directory manager of the directory NC to the user. A check could also be made on the object type to guarantee that the object reporting in is the proper object type as determined by the directory.

In a second case, the directory NC sees the object NC come online. In this case sending an "Are you there" message from the directory to its objects checks for the existence of the objects. This catches the errors in which a directory points to a non-existent object, since the object does not respond if it is not there. Again, object types could also be cross-checked.

In a third case, the directory NC sees the object NC (or vice versa) go off-line. Little can be done here until communications between the two can be established.

In a fourth case, the object NC sees the directory NC downloaded. This is treated the same as the online case. The objects send the "here I am" message to determine if the download changed anything.

In a fifth case, the directory NC sees the object NC downloaded. This is the same as the second case. The "Are you there" message is sent to determine if the object is still there.

In summary, the "Here I am" message is used to catch duplicate and orphan objects at those times when the relationship between the directory and object NC may or may not be used. The "Are you there" message catches non-existent objects, since these will be caught by the references when they occur.

A directory manager task in the node is responsible for performing both halves of the solution. The directory manager task maintains a Reference Identification (RID) table. Thus, it knows all objects that are defined on the NC and can run through this list when a directory NC comes online, etc. It sends the "Here I am" messages for all objects whose system is on that other NC. If necessary, it can run through the directories it owns and send the "Are you there" messages to all objects defined to reside on that other NC.

In addition, the directory manager receives both of these messages on the other end. The "here I am" is sent to the directory manager which checks its directory to ensure that the object is supposed to be where it is. The "Are you there" message also goes to the directory manager of the object NC who looks in the RID table for that object.

This linkage checking need only be done when the system and object lie on different NCs. The inconsistencies are not possible within a single NC. If they exist, it is due to a template generation transaction which was interrupted. In that case, the user can be made aware that a problem exists, since an error can be issued at the time the transaction was interrupted.

The way in which one NC sees that another is online, downloaded, etc. is done the same as for trigger handling. The node status message is sent to the node manager which distributes it to the directory manager after which the above processing can occur.

Error messages are inevitable when a point and its system are on different NCs, since one NC must be downloaded before the other. This will happen even if the user conscientiously downloads all the affected NCs. However, the number of such cases (split object and directory) typically is few and this will most likely occur only when an object is moved from one NC to another.

In a facilities management system, it is preferable to replace polling type applications where a needed data value is repeatedly read at some interval with an event based scheme which only executes an algorithm when a value changes. This requires recognizing when data has changed and associating the change of data with a triggerable object or feature. In a distributed environment, it must be recognized that the owner and user of the data may be in separate nodes or processors, as data bases may be changed independently of each other. Introducing a sign-up mechanism allows a feature needing specific data to request the node containing the specific data or data element to inform the feature whenever the specific data or data element changes. As a result, polling is no longer required. However, in a distributed environment, a node containing the specified data may experience a download of a new data base resulting in a loss of the sign-up request. The same problem occurs if the data moves from one network node to another. Thus, if a node is updated by data base generation or download, the signing up feature must be informed. As previously discussed, each node periodically transmits a time stamp indicating its most recent data. Thus, if a node has been detected to go off line or to have been downloaded with new data, the sign-up feature will invalidate its sign-up and attempt a new sign-up with the new data base. If this is not possible, the binding scheme previously discussed allows the signing up feature to determine where the data has now been located. If the data is no longer available, of course, sign-ups are not possible.

It should be noted that trigger sign-ups can be used to drive several features including event totalization or a customized feature programmed by the user. Similarly, sign-ups could also be used to drive the refreshing of person machine interface screens rather than interval refreshing of such screens. This would allow immediate notification to a user of changes in the state of the variable or data.

Figure 33:
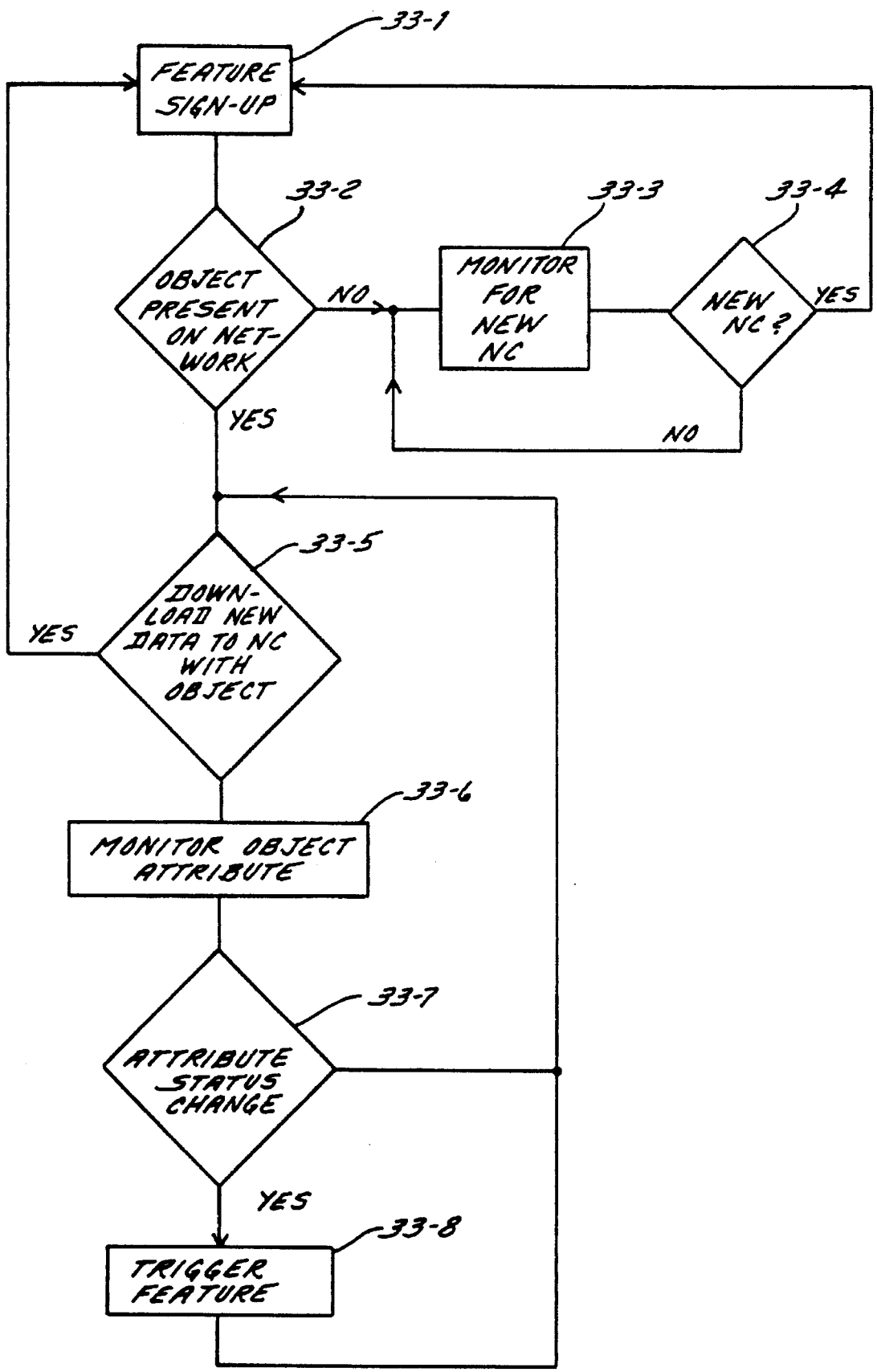
FIG. 33 illustrates triggering of features from attributes of objects.

FIG. 33 illustrates the process. As shown in block 33-1 features sign up for triggering by objects which are named data elements in the system. In block 33-2, a processor in the node checks if the object is present on the network. As shown in block 33-3 if not, the feature begins monitoring the network to determine if a new network controller (NC) becomes added. When a new NC is detected as shown in block 33-4, the feature checks the new NC for the triggerable object and repeats the processing in block 33-2.

When a feature determines the object is present, then the feature tests to determine if new data was downloaded with the object in an NC, as shown in block 33-5. If this is the case, the feature repeats its sign up in block 33-1. Otherwise, as shown in block 33-6 the feature monitors the triggerable attribute of the object. Block 33-7 shows that changes to the attribute's status sends a trigger to the feature (block 33-8). Whether or not the feature receives the trigger, the feature repeats processing beginning at block 33-5. This allows the feature to recognize downloads of new data to the node having the object so that it can again sign up to be triggered. By repeating step 33-2, the feature can pick up triggerable objects which have been relocated in the network.

Figure 34:
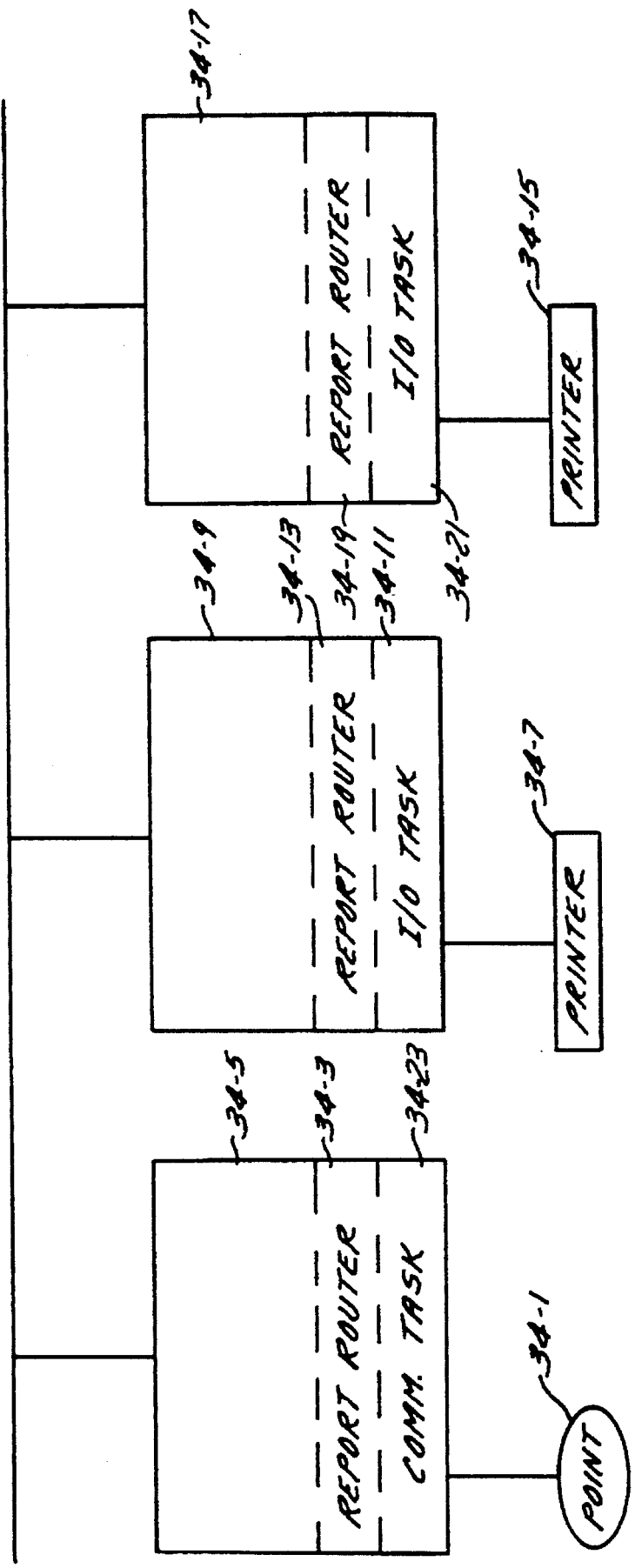
FIG. 34 illustrates distributive report routing according to the invention.

According to the invention, global data in the network controllers identify the destinations of various reports created during system processing. A system produces several types of reports with unique lists of targets. For example, reports can be of the critical type (1-4) maintenance (follow-up), and status. In addition, point history reports, totalization reports, trend reports, and transaction log or trace reports are created. Another requirement is that all critical type reports in a facilities management system be preserved until delivered to at least one of the targets defined for the report type. In order to facilitate report routing, all reports emanating from a given node are routed to a specially designed report router task for ultimate distribution to various hard copy devices, computer files, and other storage devices. As shown in FIG. 34, if point 34-1 changes, a message is sent to report router 34-3 in network controller 34-5. Report router 34-3 determines that the message should be sent to its preferred destination, printer 34-7, which is under the control of network controller 34-9. This is accomplished by report router 34-3 sending the change of state information to I/O task 34-11. Report router 34-3 also keeps a copy of the message. If printer 34-7 prints the message, notification is sent back to report router 34-3 and the copy is deleted.

On the other hand, if printer 34-7 is offline or for some other reason cannot print the message, I/O task 34-11 notifies report router 34-13, which is the report router available in the same network controller as the destination printer. If report router 34-13 is unable to locate a default device, the message is discarded. Report router 34-3 receives no message from report routers 34-9 or 34-13 and therefore report router 34-3 indicates that the information has not been stored or printed by not indicating a change of state. The report router 34-3 then maintains its copy of the message.

On the other hand, if report router 34-13 locates a default device, such as printer 34-15 connected to network controller 34-17 to report router 34-19, report router 34-13 routes the message to I/O task 34-21 for transmission to printer 34-15.

If the default device also does not operate, the message is discarded and no message is returned to report router 34-3 indicating that the report has been neither printed nor stored. Report router 34-3 then keeps a copy of the message in its save file.

If a printer comes on-line, all report routers are notified. If the save file contains a message, the message is routed to the specified device again. Should the save file be filled, the lowest priority and oldest message is removed from the save file and an error is logged on the system.

Figure 35:
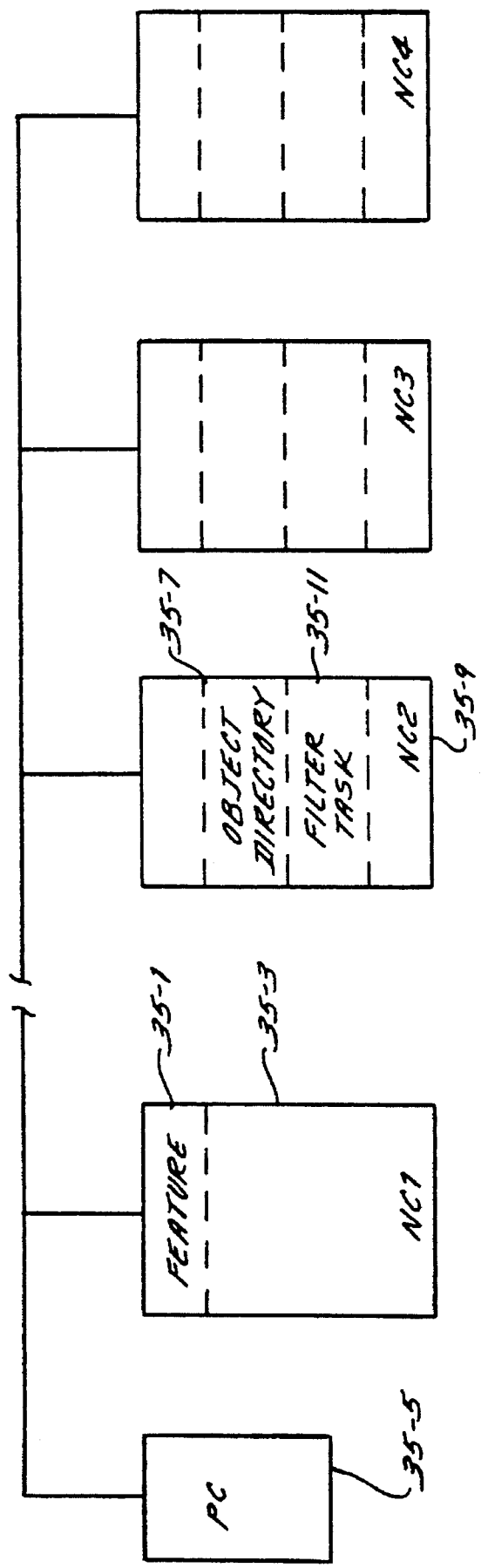
FIG. 35 illustrates filtering of summary report data at local nodes.
Figure 36:
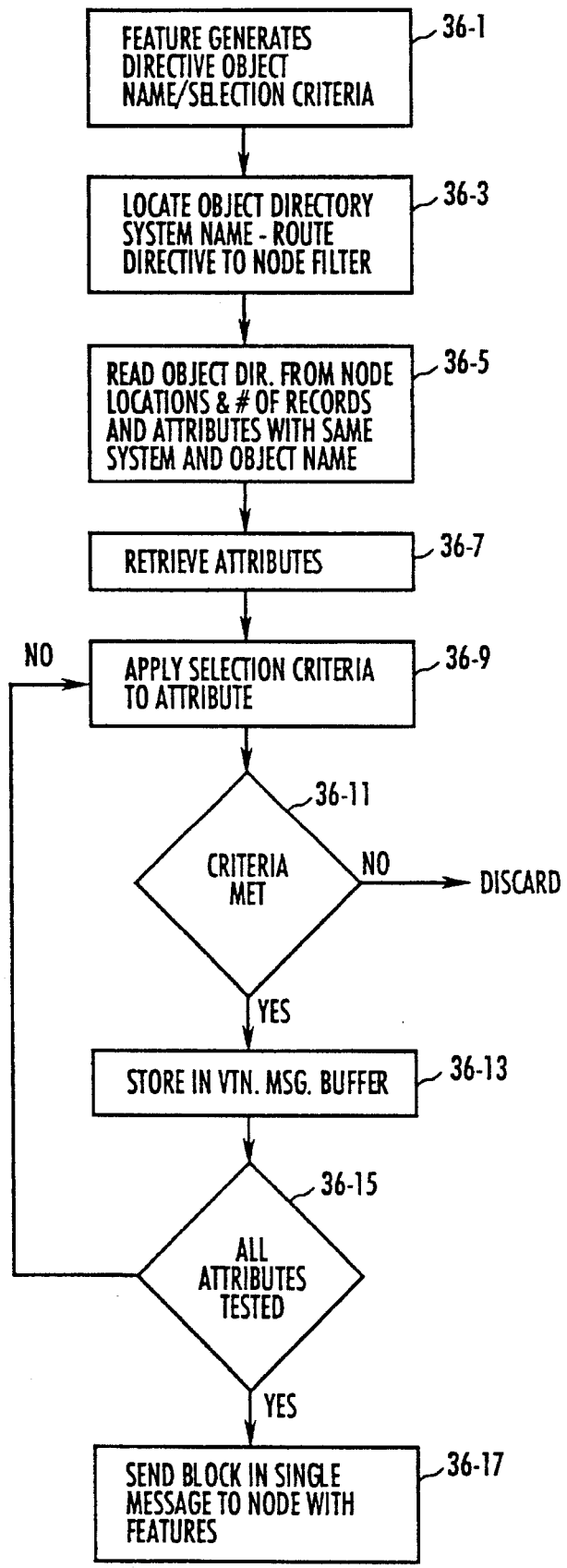
FIG. 36 shows a more detailed description of the events which occur in applying selection criteria to filtered attributes.

FIGS. 35 and 36 illustrate distributed filter processing for generating report summaries. Report summaries are generated based on an object name and certain selection criteria. One approach is to have the remote device which is to receive the summary retrieve each object directory and then retrieve a record for each object identified in the directory. The remote device then keeps only those records which meet the criteria for the summary. However, this would require a significant amount of processing and communication among nodes. Thus, localized filtering of the data at the node at which the particular object directory of interest is located is desirable.

As shown in FIG. 35, feature 35-1 and node 35-3 may require transmitting a data summary to PC 35-5. However, the objects required to construct the summary may be scattered throughout the system. The object directory is directory 35-7 located in NC2, shown at 35-9. As shown in FIG. 36, feature 35-1 generates a directive specifying an object name and selection criteria in function block 36-1. In function block 36-3, the object directory 35-7 is located in network controller 2 shown at 35-9. At step 36-5, the object directory is read from the node location and the number of records and attributes with the same system and object name are recorded. Using the object directory 35-7 the objects are retrieved from network control nodes in NC1, NC2, NC3, and NC4. When the objects are retrieved in step 36-7 the selection criteria included in the directive generated instep 36-1 are applied. As indicated in step 36-11, if the criteria is not met, the element is discarded, while if the criteria is met in the function block 36-13 the attribute is stored in the message buffer. Decision block 36-15 tests whether all the attributes have been evaluated. If not, the selection criteria is applied to the next attribute. If all the attributes have been evaluated, a message is generated to send a single message to the requesting node 35-1 in the form of a message block with the attributes requested.

Figure 37:
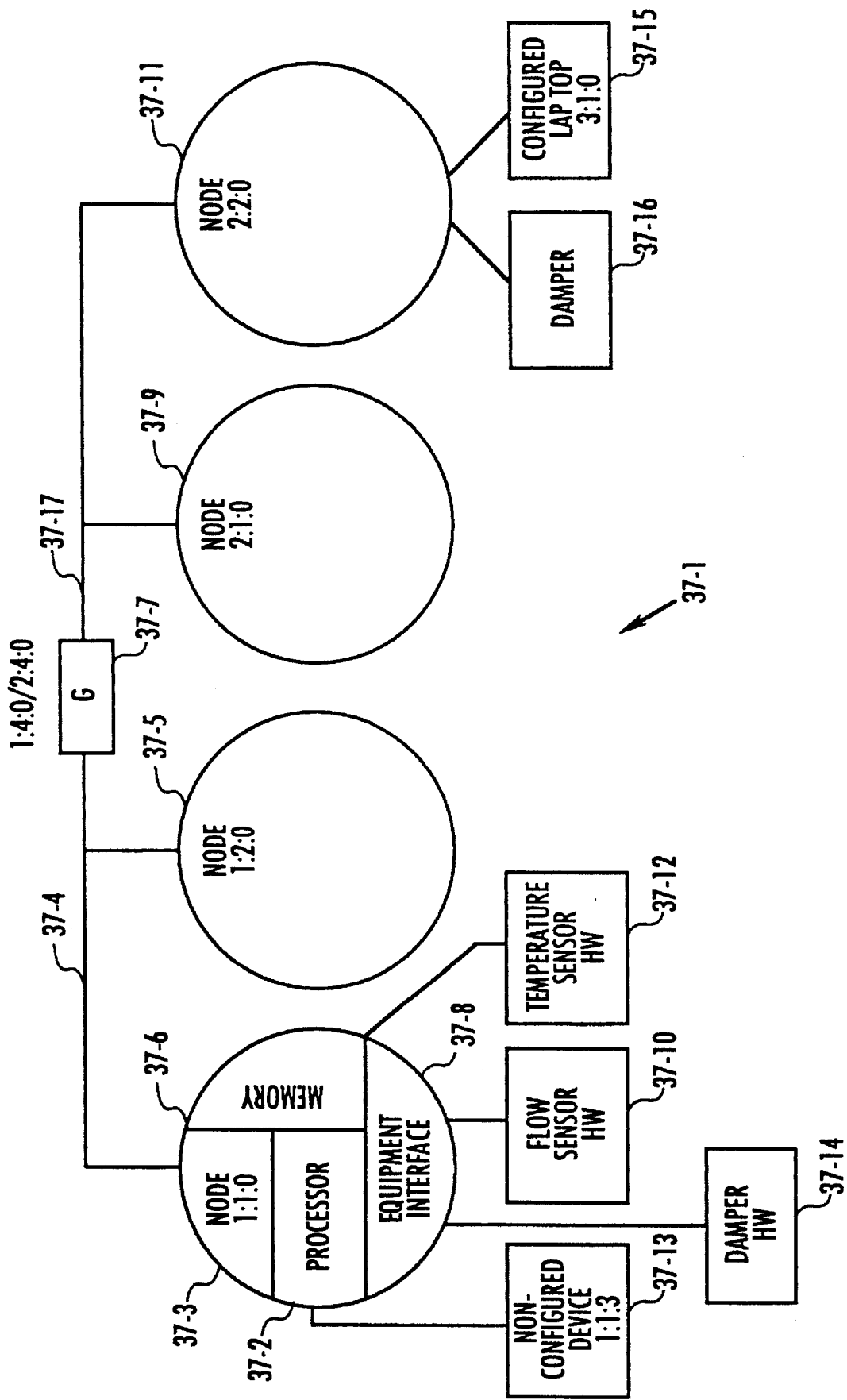
FIG. 37 shows an example of a non-configured device attached to a configured node for communicating over communications links with one or more configured nodes.

For purposes of illustration, system 1 in FIG. 37 can be a facilities management system (FMS) having nodes 37-3, 37-5, 37-9 and 37-11 which function as network controllers to process data related to building and industrial, environmental, security and other automated system controls. As illustrative node 37-3 shows, each such node or network controller has at least one processor 37-2, a memory 37-6, and equipment interface circuits 37-8. Such equipment interface circuits may accommodate numerous equipment interconnection arrangements, including, but not limited to, interfaces which use direct and secondary communications links to the node. In operation, network controller 37-3 could be monitoring measurements from air flow sensor 37-10 and temperature sensor 37-12 and in response opening and closing dampers 37-14. It is understood, however, that nothing limits the application of this invention to such FMS systems and that numerous types of networked systems can benefit from this invention.

In the system 37-1, network controllers 37-3 and 37-5 are connected by a first communications link 37-4. The first communication link 37-4 is connected via gateway 37-7 to a second communication link 37-17 having network controllers 37-9 and 37-11 attached. The nodes attached to communications links 37-4 and 37-17 can be considered to form individual networks. The number of nodes or network controllers on a network and the number of networks interconnected by gateways on a system is a function of systems requirements and capabilities. It is understood that the principles of the present invention apply to any number of nodes or network controllers on any number of communication links and are not limited in this respect.

According to a routing convention in FIG. 37, each node is identified by a network address. The elements of a network address include at least three fields: first, an identifier of the communication link called a subnet, and second, a local address of the node on the communications link or subnet. For example, node 37-9 is at subnet 2 local address 1. The third field of the network address is the port number of the node from which a device is dropped, called the Drop ID. As illustrated in FIG. 37, each individual configured node itself is Drop ID 0. Non-configured devices, such as lap-top computers or other data processing devices, can be connected or dropped to numbered ports of the node. Here it is again understood that the present invention accommodates any number of node ports and introduces no limit on such node port capabilities. A port of non-configured lap-top computer 37-13 can be connected to a port from a node, such as node 37-3 and assigned a network address. For example, if port 2 of non-configured lap-top computer 37-13 is connected to port 3 (Drop ID 3) of node 3 which is at subnet 1, local address 1, the network address of lap-top 37-13 is 1:1:3 as shown in FIG. 37. It should be noted that the port of lap-top computer 37-13 is not part of the network address. FIG. 37 further illustrates that another lap-top computer 37-15 can be part of the network as originally configured. According to the naming convention, such devices are identified as additional nodes on additional subnets, in this case, subnet 3, local address 1, Drop ID 0.

Figure 38:
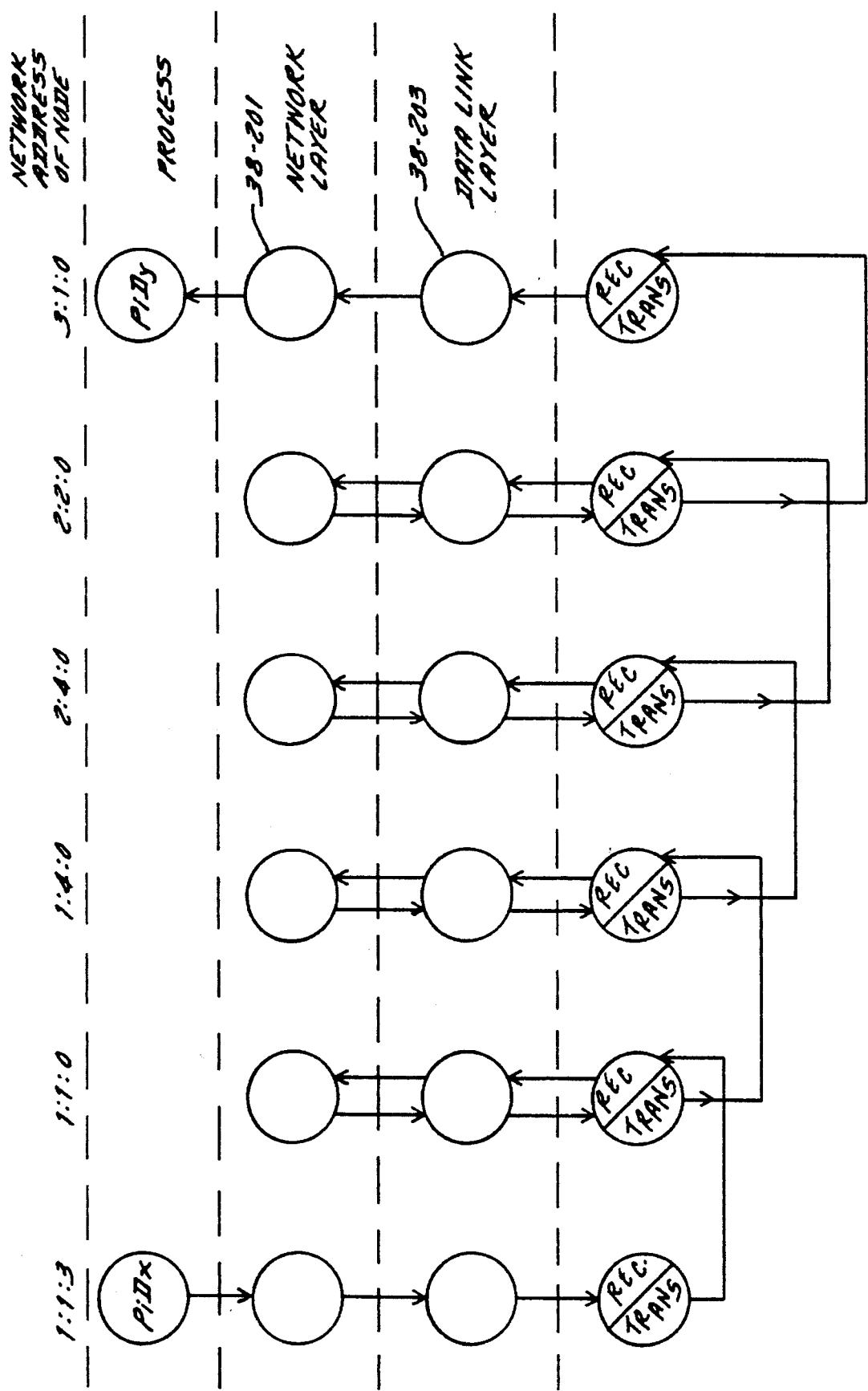
FIG. 38 illustrates the message path between the non-configured and configured nodes in FIG. 1 along with various data communication layers.

Finally, for convenience the naming convention allows further appending an identifier of a process in the device, although this is not required. The only requirement is that the subnet, local address and the Drop ID be included in the fields of the network address. Such process identifiers identify the process in the device which is the source of the message and which will usually receive the response, and the process in the device which is the destination of the message and which will usually generate the response. It should be further understood that nodes or network controllers can be organized into any combination of processing layers such as network and data link layers from the open system interconnection architecture of the International Standards Organization or any other convenient architecture, as illustrated in FIG. 38.

According to the invention, when a non-configured device is attached to a port of a configured node, the non-configured device establishes its presence on the port. When receiving messages from other configured nodes the configured node first determines from the subnet and local address destination portions of the message if it is the destination node. If not, the message is passed on to the next proper configured node defined by the route. At the destination, the configured node evaluates the Drop ID of the received messages to determine if the message is for itself (Drop ID 0) or for the attached non-configured device (non-zero Drop ID).

Figure 39:
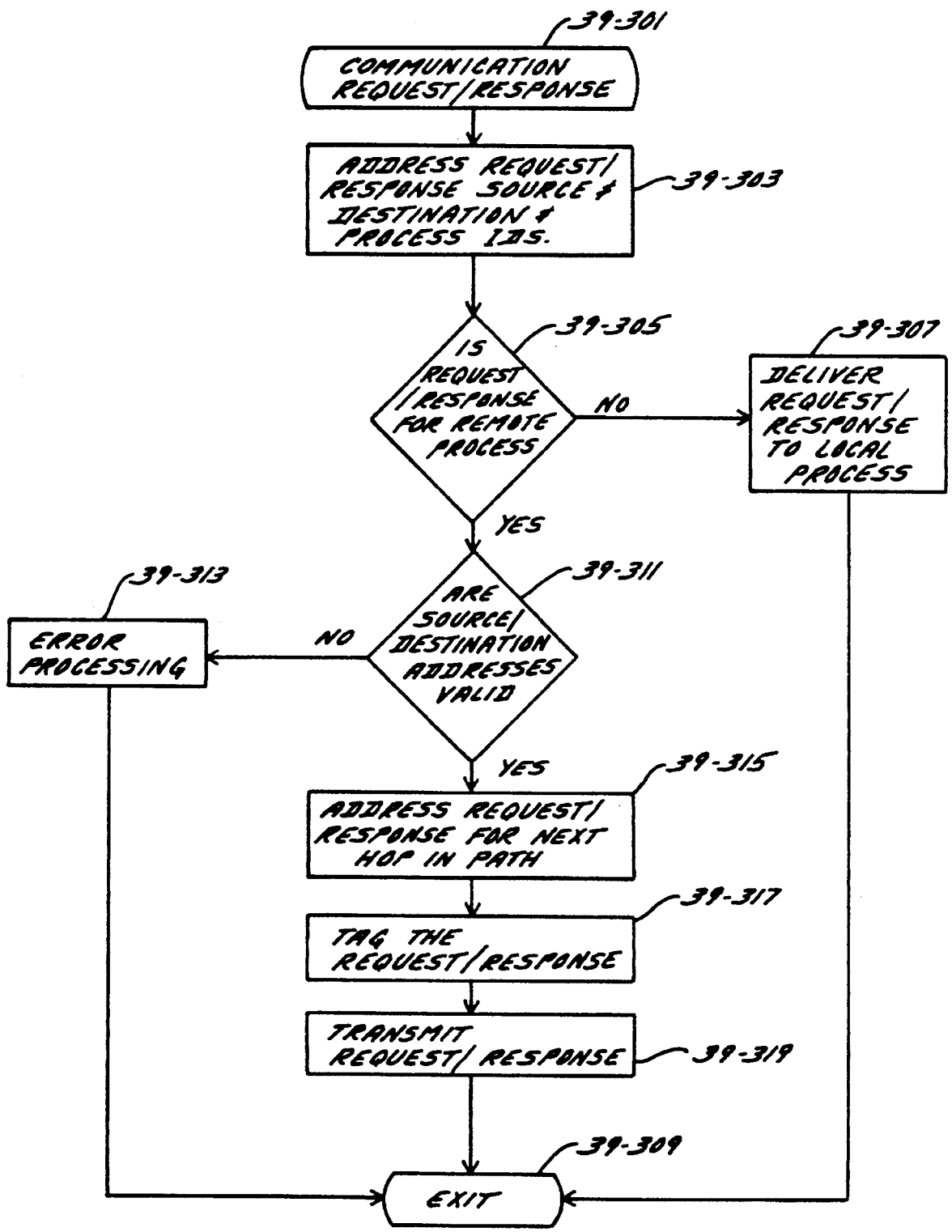
FIG. 39 illustrates the transmission of a request from a non-configured device or a response from a configured device.

FIG. 39 illustrates the generation and transmission of a message by a process on non-configured lap-top 37-13 which seeks to communicate over the network with another device. To initiate the communication request shown in block 39-301 an initialization phase first takes place in which the non-configured device establishes its location on the network. Non-configured device 37-13 sends a message requesting the address of the node or FMS network controller to which it is attached, in this case node 3. The node or FMS network controller responds by activating an initialization task which sends the network address including the subnet, local address and Drop ID back to the non-configured device. The non-configured device then stores this information as its network address.

In function block 39-303 the non-configured device accesses this address and uses it as the source address portion of messages it generates. These messages include both the source address and destination address and data or data requests to be transmitted. For illustration, assume that non-configured lap-top 37-13 has requested data concerning the status of a damper 37-16 recorded in configured lap-top 37-15. In function block 39-305 the processor in the node transmitting the message determines if the request is for a process remotely located in another node or for a local process in this node. If not, as shown in function block 39-307, the request is delivered to the local process and exit 39-309 is taken. If the request is for a process in another node, function block 39-311 determines if the source and destination network addresses are valid. This requires that network processing layer 38-201 in the node verify that the subnet, the local address of the node or network controller on the subnet, the Drop ID and the process identifier are valid. If not, error processing 39-313 begins and exit 39-309 is taken. If the network addresses are valid, the network layer 38-201 in the first node references a routing table stored in a memory 37-6 to determine the next hop in the path. As previously discussed, such routing tables may be static or dynamic, centralized or decentralized. For illustrative purposes only and not as a limitation of the invention, a static routing table is assumed. The request is then tagged with the network address of the transmitting node for acknowledgement by the next intermediate destination in the data link layer 38-203 of the node, as shown in function block 39-317. Transmission of the request then takes place in function block 39-319.

As discussed above, FIG. 39 illustrates the activities involved following a request from a non-configured device to communicate over the network. The same processing takes place when a node or network controller transmits a response from a configured device. Thus, by using the same processing that takes place when a network controller or node transmits a response from a configured device, a request by a non-configured device to communicate over the network can be accommodated.

FIGS. 37 and 38 and the table in FIG. 41 show further detail in routing the request from the non-configured lap-top source 37-13 to the configured lap-top destination 37-15. Non-configured lap-top source 1:1:3:PIDX identifies a process on subnet 1, local address 1, Drop ID 3 identified as PIDX. The message from non-configured lap-top 37-13 also identifies the destination as subnet 3, local address 1, Drop ID 0, process PIDY. Thus, the first routing, which would not be defined in a routing table at configuration time, is from 1:1:3:PIDX to 1:1:0. This represents the path between the non-configured lap-top 37-13 and the node or network controller 37-3. The static routing tables which were defined at configuration provide the routing from node or network controller 37-3, network address 1:1:0, to configured lap-top 37-15, network address 3:1:0. As shown in FIGS. 37, 39, and 41 the next stop from node 37-3 identified in the static routing table is to the network 1 side of gateway 37-7 which is defined as subnet 1, local address location 4, Drop ID 0. The routing table in gateway 37-7 directs this request to the output of the gateway at subnet 2, local address 4 Drop ID 0. The routing table at the gateway determines that the efficient route for this request is directly to node 37-11 defined as subnet 2, local address 2, Drop ID 0. Node 37-11 has its own routing table which routes the message off port 3 to an address defined as subnet 3, local address 1, Drop ID 0. The message is then routed to the process identified as PIDY.

FIG. 38 illustrates the activities that take place in the network and data link layers at each intermediate stage of the process. As previously discussed, the intermediate receivers and senders of messages are determined by the entries in the static or dynamic routing tables in memory at each node. In the intermediate stages, a message is received and an acknowledge signal is transmitted by the data link layer 38-203 of the receiving configured node to the intermediate node which forwarded the message. The network layer 38-201 determines if the destination for the message is this configured node or some other configured node and finds the appropriate next intermediate destination from the routing table. The data link layer 38-203 retags the message for acknowledgement by the next intermediate stage and then transmits the message to the next intermediate destination identified by the network layer 38-201.

Figure 40:
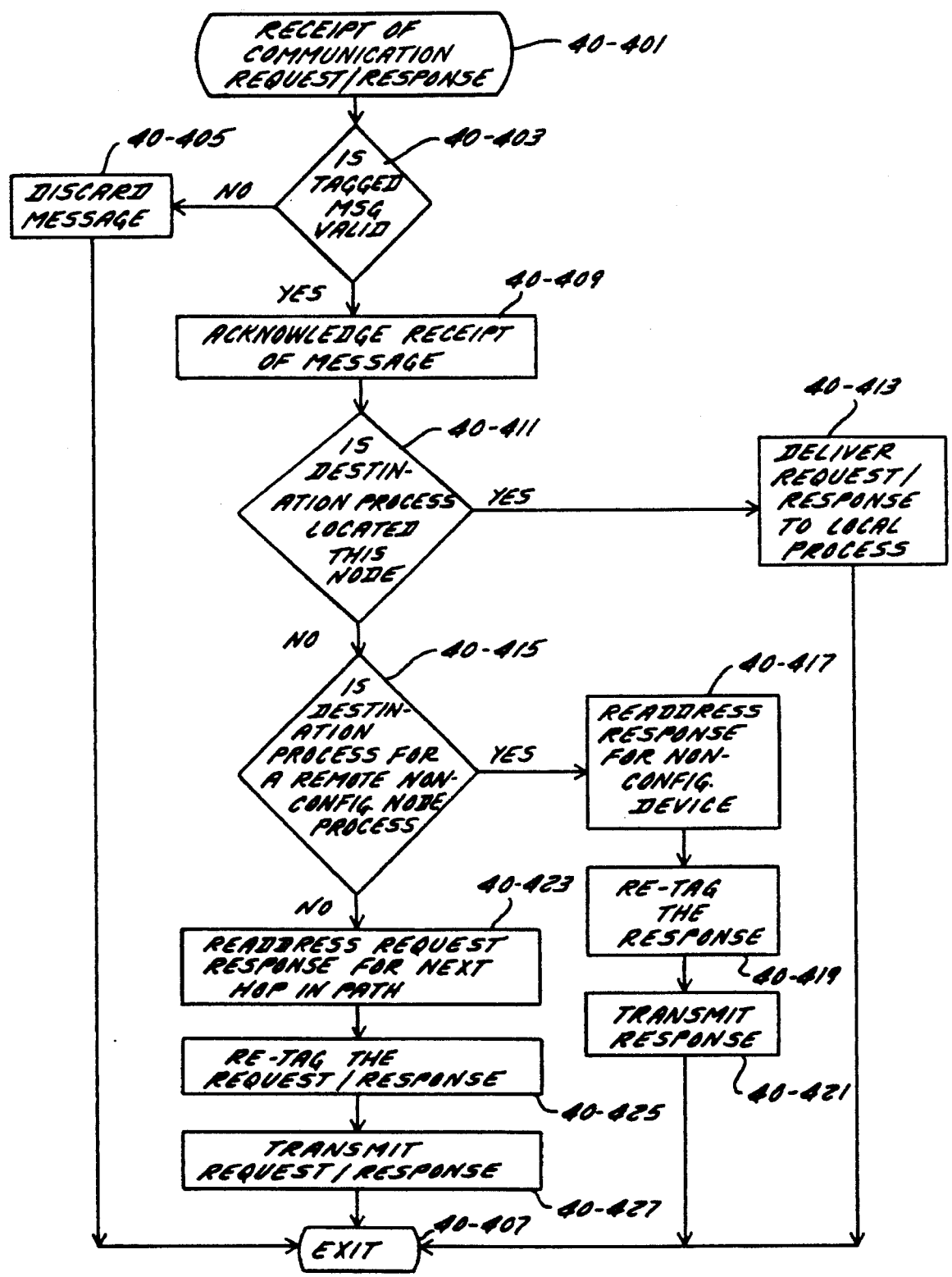
FIG. 40 illustrates the receipt of a request from a non-configured device or the receipt of a response from a configured device.

FIG. 40 illustrates the activities of any given node which take place upon receipt of a request from a non-configured device. These activities are the same as those that take place upon the receipt of a response from a configured device. Thus, the same approach for handling receipt of responses from configured devices can be used to respond to a request from a non-configured device. As previously discussed, messages from configured nodes are tagged by the forwarding node so that receipt can be acknowledged. As shown in FIG. 40, in function block 40-403 the message is first evaluated to determine if the tagged message is from a valid source to a valid destination and whether the message is appropriately tagged, as previously discussed relative to FIG. 39. If not, as shown in function block 40-405, the message is discarded and an exit 40-407 is taken. In addition, other known tag functions for reliability such as sliding windows, can be performed. If the processing in the data link layer 38-203 in function block 40-403 identifies the message as valid, function block 40-409, also a part of the data link layer 38-203, transmits an acknowledgement of receipt of the message to the forwarding node. At the network layer 38-201, the message is tested in function block 40-411 to determine if the destination process is located at the receiving configured node. If so, function block 40-413 delivers the request to a process local to the receiving node and takes exit 40-407. If the destination process is not located at this node, network layer 38-201 processing continues as shown in block 40-415. The destination process is then tested to determine if it is for a non-configured node. If this is the case, the network layer readdresses the response for a non-configured device, the data link layer retags the response and it is then transmitted, as shown in function blocks 40-417, 40-419 and 40-421 respectively. If the processing in block 40-415 is such that the destination process is not at a non-configuring node, the request is readdressed for the next hop in the path, retagged, and transmitted as shown in blocks 40-423, 40-425, and 40-427 respectively. It should be noted that processing in function blocks 40-409-40-427 is the same for receipt by any node in the system.

FIG. 41 shows that the response from configured lap-top 37-15 can be routed to non-configured lap-top 37-13 at network address 1:1:3 by retracing the exact message path previously traversed in going from non-configured lap-top 37-13 to 'configured lap-top 37-15. Using this approach, it is not necessary to actively evaluate an additional data communication path to return the information required by the non-configured device. The response from lap-top 37-15 containing the status of damper 37-16 is routed back through the nodes to node 37-3 which, as previously discussed, tests the messages it receives to determine if the message is destined for the node itself or for the non-configured device on the node. In this case lap-top 37-15 addresses the response to the source of the request, identified as network address 1:1:3. Since node 37-3 at subnet 1, local address 1 recognizes the Drop ID 3 as the node port attached to non-configured device 37-13, the response is sent to lap-top 37-13.

Finally, it should be noted that a response from configured node 37-15 to the request from non-configured device 37-13 need not traverse the same path. For example, in adaptive routing systems variations in message traffic conditions may result in the response traversing a different path through the network than the request. Indeed, it is possible for the network on communications link 37-4 to employ a static routing scheme, while the network on communications link 37-17 employs an adaptive routing, or vice versa. All adaptive, all non-adaptive, or any combination of networks can be used with the invention. However, regardless of how the response reaches the configured node, the configured node routes the message to the non-configured device based on the Drop ID in the network address given as the destination of the message. As a result, functions which are not normally incorporated into the network can be performed by attaching a non-configured device to a convenient port from one of the nodes on one of the networks in the system. This is because the Drop ID of the network address allows responses from configured nodes to be routed to non-configured devices dropped from ports on configured nodes.

Figure 42:
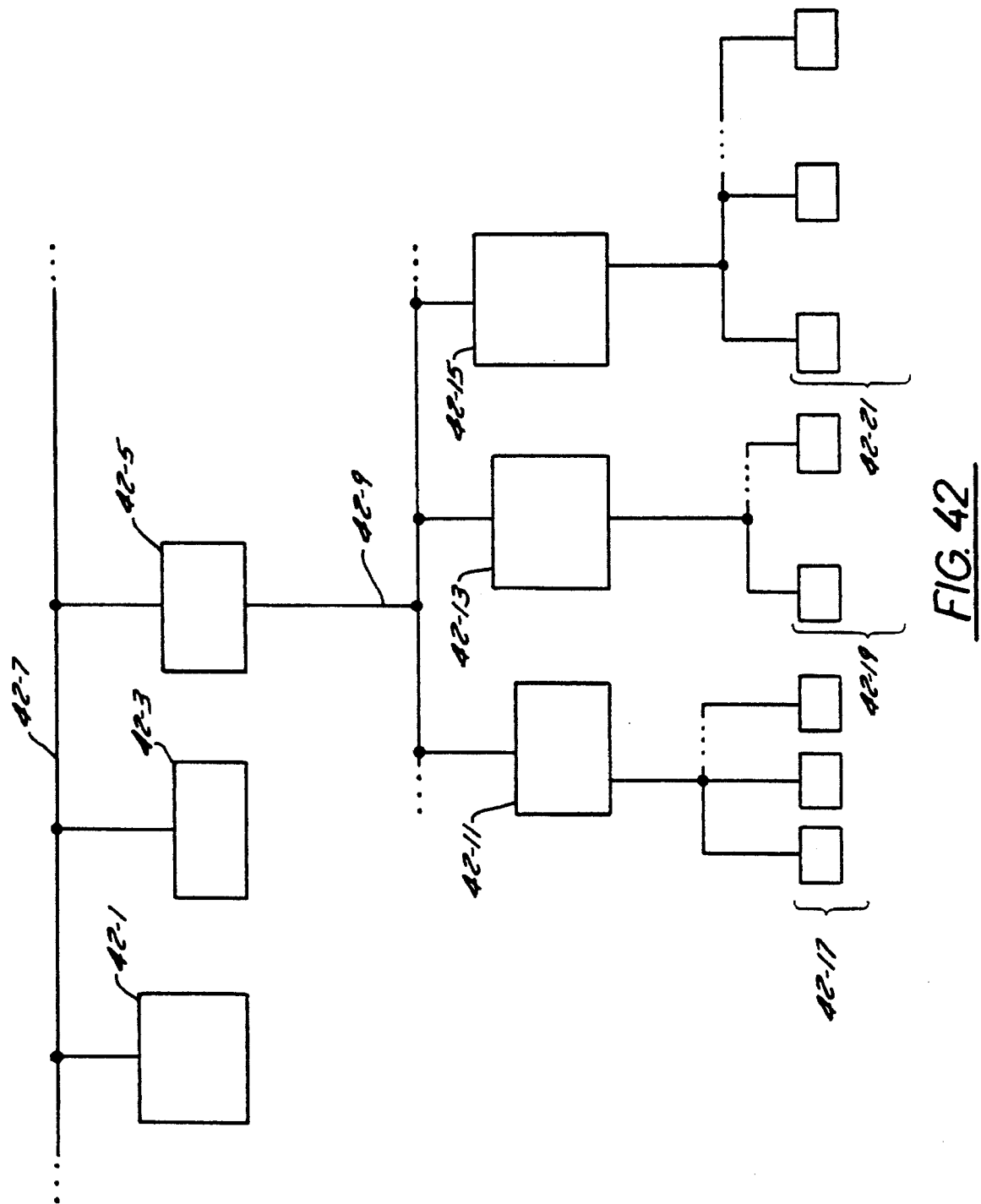
FIG. 42 shows the general configuration of a facilities management system.

FIG. 42 shows one possible configuration of a facilities management system using a network approach with multiple levels of control. Network controllers 42-1, 42-3 and 42-5 operate at a first level and communicate with each other over a high speed network bus 42-7. The number of network controllers which can be interconnected is limited only by the capabilities of the network controllers themselves and the high speed bus 42-7. Each of the controllers 41-1, 42-3 and 42-5 at this first level are peers because they have access to the same high speed network bus and operate to control other lower level functions.

FIG. 42 illustrates this principle at network controller 42-5. Network controller 42-5 operates as a master node relative to slave controllers 42-11, 42-13 and 42-15. The network controller 42-5 communicates with slave controllers 42-11, 42-13 and 42-15 over a local bus 42-9 and with other network controllers over high speed bus 42-7. As the master controller, network controller 42-5 allocates resources on the local bus among the slave controllers 42-11, 42-13 and 42-15. Each slave controller performs its individual functions and communicates with data acquisition units 42-17, 42-19 and 42-21, respectively. Data acquisition units connected to sensors provide information needed for the slave node to perform its data processing functions.

Certain functions in the slave nodes 42-11, 42-13 and 42-15 may require access to information obtained by data acquisition units not controlled by the particular slave node. For example, in performing its individualized function, slave node 42-11 may require access to information provided by sensors connected to data acquisition unit 42-19 which is controlled by slave controller 42-13. In order to obtain this data, the slave controller 42-11 signals network controller 42-5 over the low speed bus 42-9. In traditional systems, network controller 42-5 then transmits a message over low speed bus 42-9 to slave controller 42-13 requesting the data. Slave controller 42-13 would then respond by transmitting the data to network controller 42-5 over the low speed bus 42-9. Network controller 42-5 would then pass the required data to slave controller 42-11.

As the above example illustrates, the request from slave controller 42-11 for data available from data acquisition units 42-19 results in a series of messages transmitted over the low speed bus. As the number of data access requests across slave controllers increases, the message traffic across the slow speed bus grows at a high rate resulting in data bus congestion and a reduction in processing efficiency.

The situation is compounded by additional requests made from peer network control nodes over the high speed bus. For example, for network controller 42-3 to access data available from data acquisition unit 42-19, a request must first be made to network controller 42-5 over high speed bus 42-7. Network controller 42-5 then communicates over local bus 42-9 in the manner described above. Thus, additional message traffic occurs both on the local low speed bus 42-9 and on high speed bus 42-7. In addition, if network controller 42-3 is making its request for data based on a request for data based on a lower level slave controller of its own, additional delays are incurred on the local bus connecting network controller 42-3 and its slave controllers. Thus, it is inefficient for each data request to generate a series of messages resulting in the actual data being obtained from the data acquisition unit controlling the particular sensor.

An additional problem occurs when the network controller 42-5 itself requires access to multiple data items acquired by the data acquisition units 42-17, 42-19 and 42-21. A "feature" of a system, defined as a function performed by the system, often requires data from one or more sensors which may be at different locations in the system. When one feature implemented by a portion of the program in network controller 42-5 requires access to data available from a data acquisition unit, the network controller must seize control of the local bus and transmit a message to the appropriate slave controller to acquire the information and transmit the information back to the master controller. The slave controller responds by transmitting the requested information. This also results in communication bottlenecks and reduced data processing efficiency. As a result, higher priority functions, such as fire alarm messages, become stacked in a waiting list delaying corrective action.

Figure 43:
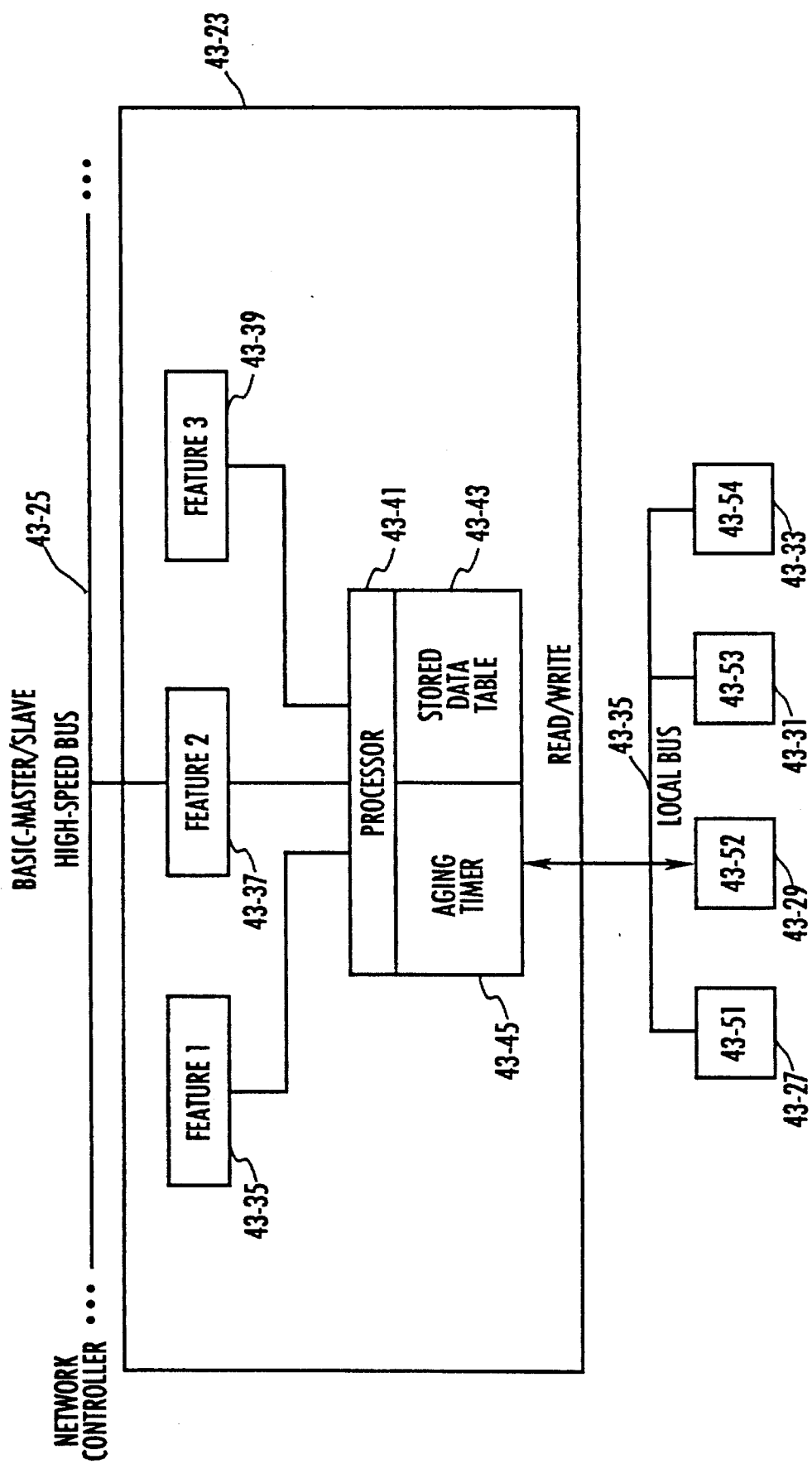
FIG. 43 shows a basic configuration in which a master node communicates with slave nodes over a local bus.

FIG. 43 shows one embodiment of the present invention. Network controller 43-23 is connected to high speed bus 43-25 and slave controllers 43-27, 43-29, 43-31 and 43-33 over local bus 43-35. As previously mentioned, any number of slave controllers can be connected to network controller 43-23 depending on the processing capabilities and requirements of the network controller and on the communication capabilities of the local bus. In FIG. 43, network controller 43-23 is shown having three representative features, 43-35, 43-37 and 43-39. It is assumed that each of these features is carried out under the control of processor 43-41. The number of features shown is by way of illustration and is not intended as a limitation. It is further assumed that each of the features represents a desirable function requiring access to data available through the slave controllers and is carried out in network controller 43-23. Finally, FIG. 43 shows a stored data table 43-43. The stored data table is a cache memory used to hold values of data items as they are received from the slave controller by the master controller. Aging timers 43-45 are associated with each data item received and represent a predetermined time during which an individual data item in stored data table 43-43 is valid. Thus, each data item in stored data table 43-43 is associated with its own aging timer 43-45.

In operation, when a feature within the network controller or another processor or network controller requests data to perform a function, the network controller determines if the data is available in stored data table 43-43. If the data is present in the stored data table, the network controller then determines if the aging timer associated with the data has expired since the data was last acquired. If the aging timer has expired, the network controller then issues messages required to obtain new data from the appropriate processor and data acquisition unit. If the aging timer has not expired, network controller 43-23 provides the feature, or other processor with the most recent information available in the stored data table. As a result, it is assumed that no significant change in the value of the sensor has occurred.

Assume that at $t_0$ Feature 1 represented by reference number 43-35 in FIG. 43 requests data from a sensor controlled by slave controller 43-27. Network controller 43-23, under the control of processor 43-41, determines that there is no entry in stored data table 43-43. Thus, network controller 43-23 issues messages over the local bus to slave controller 43-27 directing slave controller 43-27 to obtain the information from a data acquisition unit and provide the information to network controller 43-23. When network controller 43-23 receives the data from slave controller 43-27, it stores the information in the stored data table and associates a predetermined aging timer with the data item stored. It should be noted that the aging timer can be implemented in any number of ways known in the art. For example, a count down clock could be set and counted down from the time the information is stored. This could be achieved by preloading a register to a known state and clocking the register up or down until a second logical state, e.g. all logical ones or logical zeros, is attained. Alternatively, the time of storage could be recorded and compared with the time at the next data access. In this case, we assume, for example, that the aging timer is set for 100 milliseconds. The selection of 100 milliseconds is based on predetermined system characteristics in which it is known that data acquired by this particular sensor will be valid for 100 milliseconds.

At $t_0$ plus 50 milliseconds Feature 2 requests access to the same data. Under the control of processor 43-41, master controller 43-23 determines that the data item requested exists in stored data table 43-43. The master controller then tests the corresponding aging timer. Since data acquired at $t_0$ was valid for 100 milliseconds and since the data access in this case occurred only 50 milliseconds after the data was acquired, the data aging timer has not expired. Therefore network controller 43-23 will provide the data to be processed by Feature 2 from the stored data table. This is true even if the sensor controlled by slave 43-27 has changed in value. The advantage is that no further data communication is required over the local bus for Feature 2 to have access to a valid value of the required parameter.

At $t_0$ plus 100 milliseconds Feature 3 requests data available from a sensor controlled by slave controller 43-29. Since this data has not been recorded in the stored data table 43-43, network controller 43-23 issues the appropriate data communication messages to acquire the data. When network controller 43-23 receives the data from slave controller 43-29, the data is stored in the stored data table 43-43. At $t_0$ plus 150 milliseconds Feature 1 again requests access to the same data element obtained by slave controller 43-27 at $t_0$. However, the processor in the network controller determines that the data aging timer has expired. Thus, network controller 43-23 issues messages to acquire fresh data through slave controller 43-27. Assuming network delays of 1 millisecond, the data is stored in the stored data table at $t_0$ plus 151 milliseconds. Since the data aging timer for this data is 100 milliseconds, the data will remain valid until $t_0$ plus 251 milliseconds.

It should be noted that the stored data table was not updated at 100 milliseconds when the data aging timer for the data acquired at $t_0$ expired. Even though the value of the sensor data controlled by slave 27 may have changed by this time, no feature or other processor required access to this data. Thus, it was not necessary to update the stored data table until access to the expired data was required. This further reduces unproductive communication on the local and high speed data buses.

Figure 44:
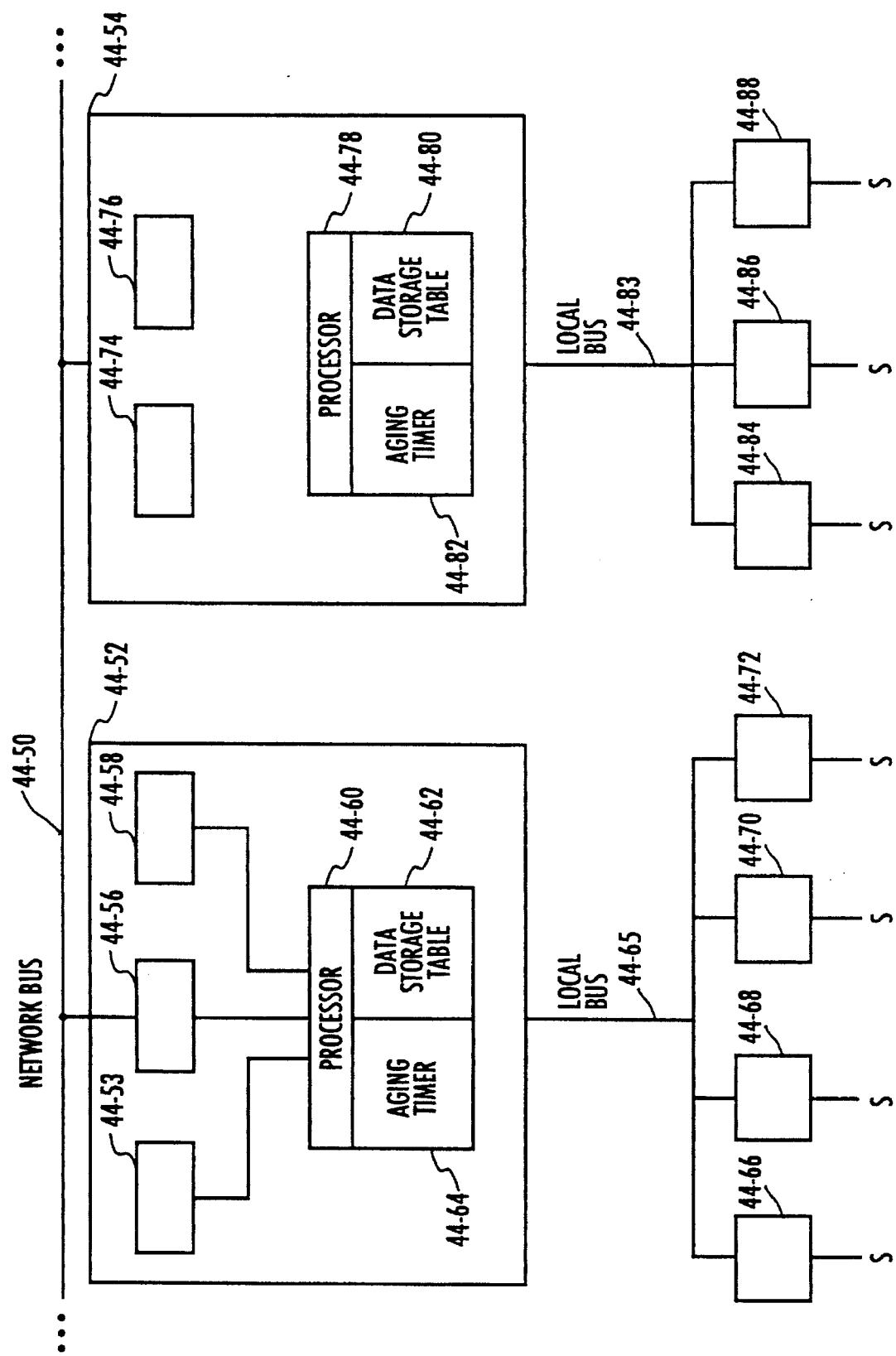
FIG. 44 shows another embodiment in which multiple master nodes communicate over a network bus.

Another embodiment of the invention is shown in FIG. 44. FIG. 44 illustrates a further reduction in communication bottlenecks on a high speed network bus 44-50. Network controller 44-52 performs representative Features 44-53, 44-56 and 44-58 under the control of processor 44-60. Network controller 44-52 also contains data storage table 44-62 and aging timer 44-64 and is connected over local bus 44-65 to slave controllers 44-66, 44-68, 44-70 and 44-72. Such slave controllers generally may be connected to one or more sensors, S, or other devices. Similarly, network controller 44-54 performs Features 44-74 and 44-76 under the control of processor 44-78. Network controller 44-54 further includes data storage table 44-80 and aging timer 44-82 and communicates over local bus 44-83 with slave controllers 44-84, 44-86 and 44-88.

By way of example, at time $t_0$ Feature 44-74 requests data available from a sensor controlled by slave controller 44-84. As previously discussed, network controller 44-54 generates appropriate messages over local bus 44-83 which causes slave controller 44-84 to acquire the data and transmit it to network controller 44-54. Network controller 44-54 then stores the information in the stored data table 44-80 and assigns a predetermined aging time value 44-82. At $t_0$ plus 30 milliseconds, the requesting Feature in network controller 44-52 requests the same data over the high speed network bus 44-50. In response, network controller 44-54 determines from the data storage table 44-80 and the data aging timer 44-82 that the current value in the data storage table is valid and need not be updated. Thus, network controller 44-54 transmits over network bus 44-50 the requested data as found in the data storage table. In addition, network controller 44-54 transmits the time the data was read (the actual value of $t_0$) and the value of the aging timer. In response, network controller 44-52 stores the data received in its data storage table 44-62 and provides it to the requesting Feature for processing. In addition, network controller 44-52 determines the time the data is stored in its data storage table 44-62 and how much longer the data will be valid based on the aging time transmitted by network controller 44-54. Assuming delays of approximately 2 milliseconds in transmitting data, the data is stored in data table 44-62 at $t_0$ plus 32 milliseconds. Since the data would be valid from $t_0$ to $t_0$ plus 100 milliseconds, network controller 44-52 determines that the data will be valid for an additional 68 milliseconds. Thus, network controller 44-52 stores an aging time value of 68 milliseconds as aging timer 44-64 corresponding to the data element obtained from network controller 44-54. Thus, for the next 68 milliseconds, the time during which network controller 44-54 will not again access slave controller 44-84 to obtain this data, features in network controller 44-52 or slave controllers connected to network controller 44-52 over local bus 44-65 will obtain this particular data element from data storage table 44-62. As a result, unproductive data requests over network bus 44-50 are also eliminated. Thus, in this embodiment the transfer of the data aging timer value among peer nodes connected on a network can produce significant reductions in data communications requirements. It should also be noted that another alternative to transferring the data aging timer from the network controller containing the requested data in its data storage table is to transfer the remaining time available on the data aging timer. This would allow the receiving network controller to avoid the requirement to calculate the remaining time during which the received data would be valid.

It should also be noted that the use of the aging timer in a distributed facilities management system (FMS) further allows the user to define variable valid time periods for individual pieces of data. For example, a slave controller accessing data from a sensor sensing outside air temperature need not access the data as frequently as a sensor monitoring the temperature of a furnace. This is because the rate of change of outside air temperature is slower than the rate of change expected in a furnace. Thus, the data aging timer would be different depending on the variability characteristic of the data. In lieu of userdefined data aging timers, the default values which are automatically implemented in the absence of further userdefined information can also be programmed.

Figure 45:
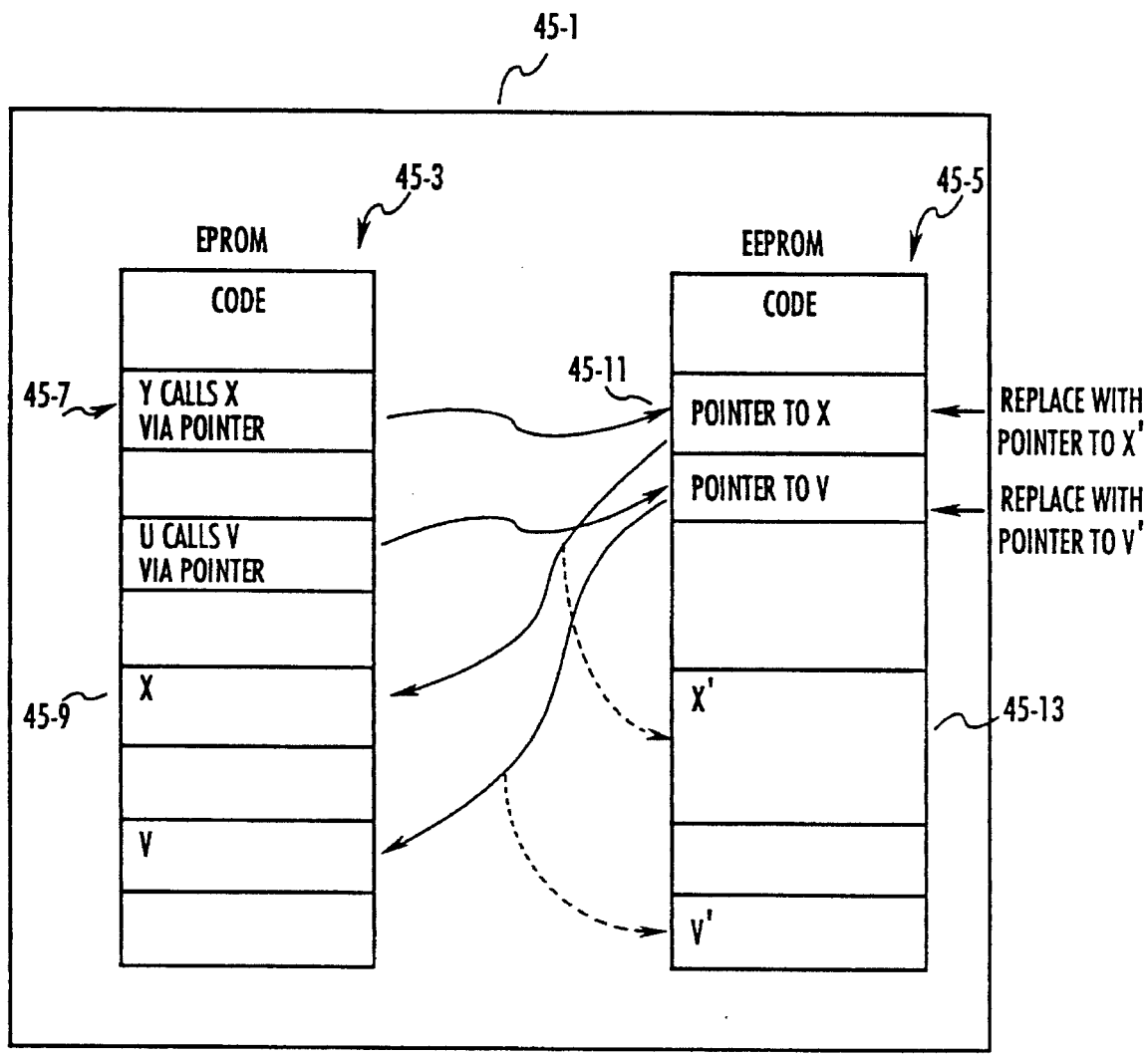
FIG. 45 shows a memory configuration with pointers to segments of memory according to the invention.

According to another aspect of the invention, as illustrated in FIG. 45, it is useful from time- to-time to alter portions of the executable code. For example, in order to evaluate a new technique or to implement a software patch, it may be desirable to provide new code and skip existing code. The present invention facilitates such flexibility by using a technique to transfer program control on every sub-program call. For example, digital control module 45-1 has sections of electronically programmable read only memory (EPROM) 45-3 and erasable memory (e.g. EEPROM) 45-5. As code in EPROM 45-3 is executed routine Y comes to a call to routine X at 45-7. Rather than jumping to X which is located at 45-9, all calls to subroutines from EPROM 45-3 are routed to a pointer table in erasable memory 45-5. Thus, the call from routine Y at 45-7 to routine X is routed to a pointer 45-11 residing in erasable memory 45-5. Pointer 45-11 contains a value which indicates the location of the code for routine X 45-9. Thus, the call from Y to subroutine X results in accessing erasable memory to identify another location in EPROM from which the next execution step will take place.

In the event that a user wishes to by-pass routine X located in EPROM at 45-9, it is possible to reprogram erasable memory 45-5 at location 45-11 with a new pointer now pointing to a routine X' located at location 45-13 in erasable memory. In this way, it is not necessary to disturb the EPROM or otherwise change the device since it is possible to implement a software patch in erasable memory and eliminate execution of the undesired code and EPROM by changing the pointer in erasable memory to point to the desired new code.

Figure 46:
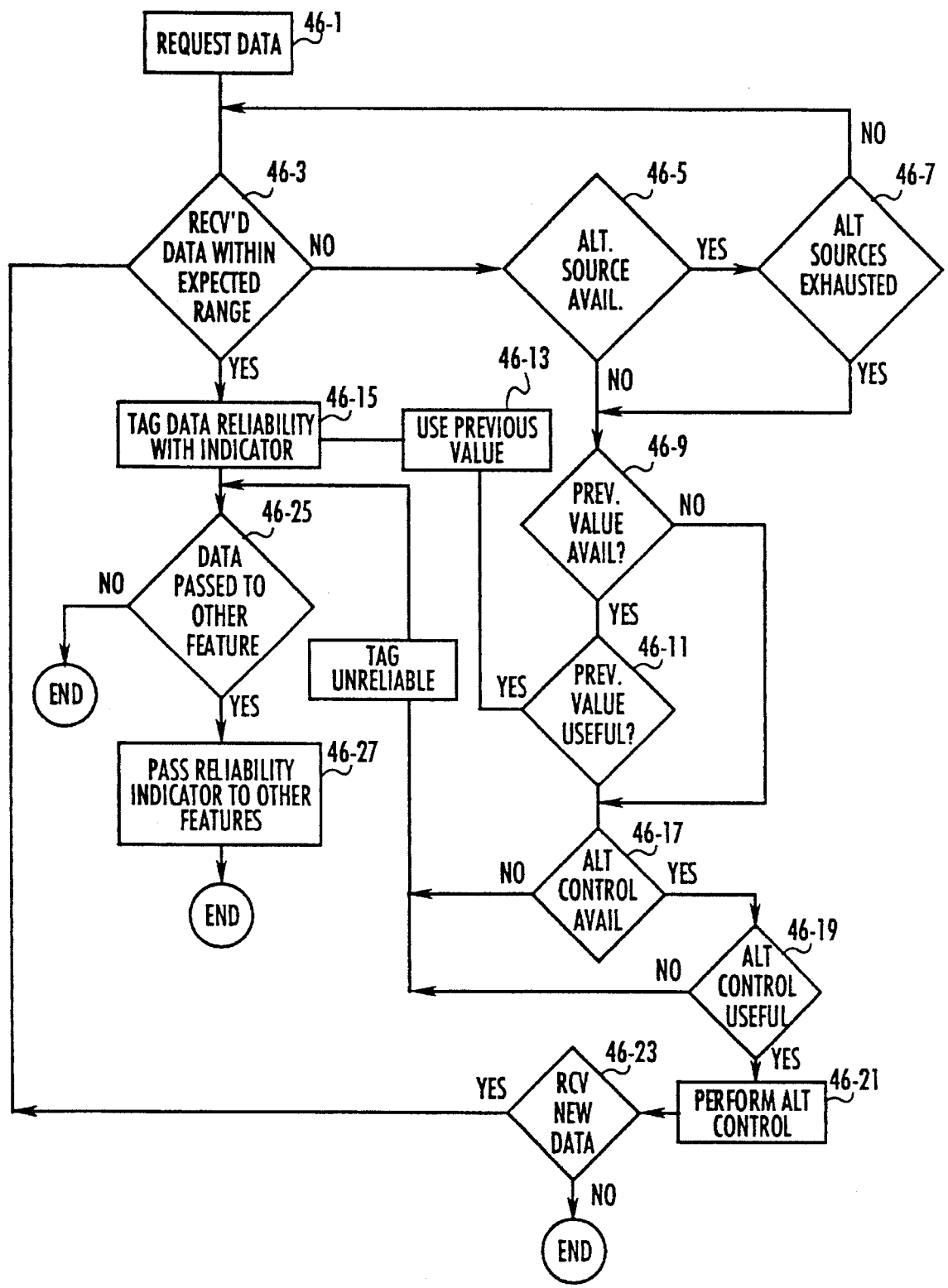
FIG. 46 illustrates a method of tagging data with reliability indicators.

In distributed facilities management systems, reliability of the data received (or not received) is often an issue. According to the present invention, as an aid to consistency and completeness, each data value passed between features of the facilities management system is tagged with a reliable/unreliable indicator. As shown in FIG. 46, when data is requested in function block 46-1, the received data is tested at decision block 46-3 to determine if the received data was within the expected range. If not, one possible alternative in decision block 46-5 is to execute processing that determines if an alternate source of the data is available. Such processing may include sorting through directories to identify other physical locations in the network where the data is located. For example, the source data may be stored at another memory location in the same or another node, or the same data may be available from another sensor. Such processing could also include determining if a substitute for the unreliable data could be derived from other data available on the network.

Function block 46-7 tests to determine if the alternate sources have been exhausted. If not the data could be obtained from an alternate source and retested in decision block 46-3. If no alternate source is available or if the alternate sources are exhausted, another option is to use the previous value of the data. Thus, function block 46-9 tests if the previous value is available. If a previous value is available, it would then be determined if the previous value is useful in this process at 46-11. If so, the previous value is used as shown in function block 46-13 and the data is tagged with a reliability indicator appropriate to such old data in function block 46-15. If a previous value is not available or not useful, in function block 46-17 a decision is made as whether alternate control is available. If not, or if alternate control is determined not to be useful, as shown in function block 46-19, the data can be used and tagged with an indication of its unreliability. Of course, if alternate control is available, such alternate control techniques can be executed as shown in function block 46-21. New data received in the alternate control process would also undergo reliability testing as shown in function block 46-23. In any case, once data is tagged with a reliability indicator in function block 46-15, the data can then be passed on to other features as shown in function blocks 46-25 and 46-27. This provides an indication of the reliability of the data which can be included in intermediate calculations as an indication of the reliability of an ultimate calculation. The use of the reliability indicator is discussed further below relative to control of proportion and integral and derivative (PID) control loops.

Figure 47:
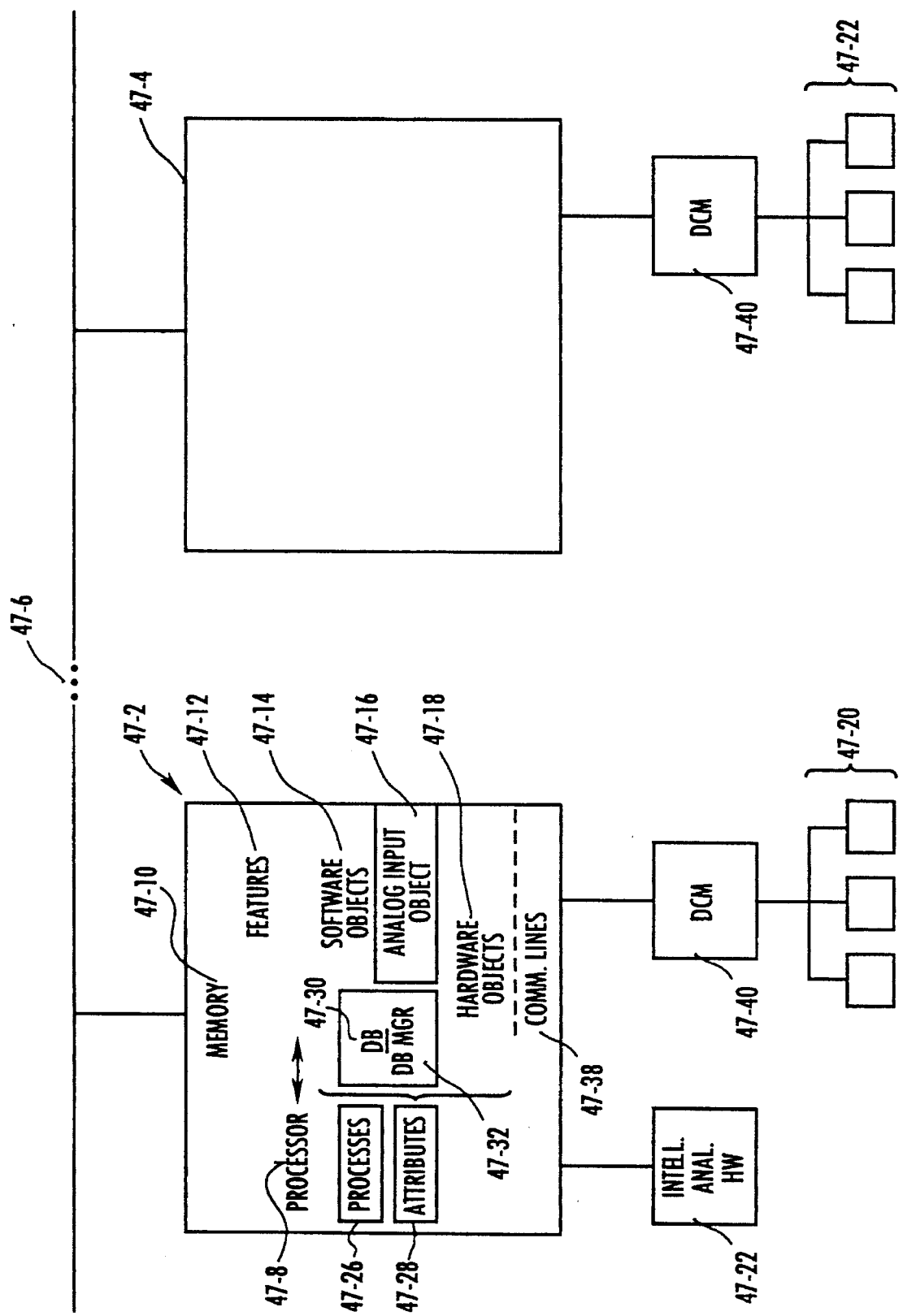
FIG. 47 shows an overview of a facilities management system with an analog input object according to the invention.
Figure 48:
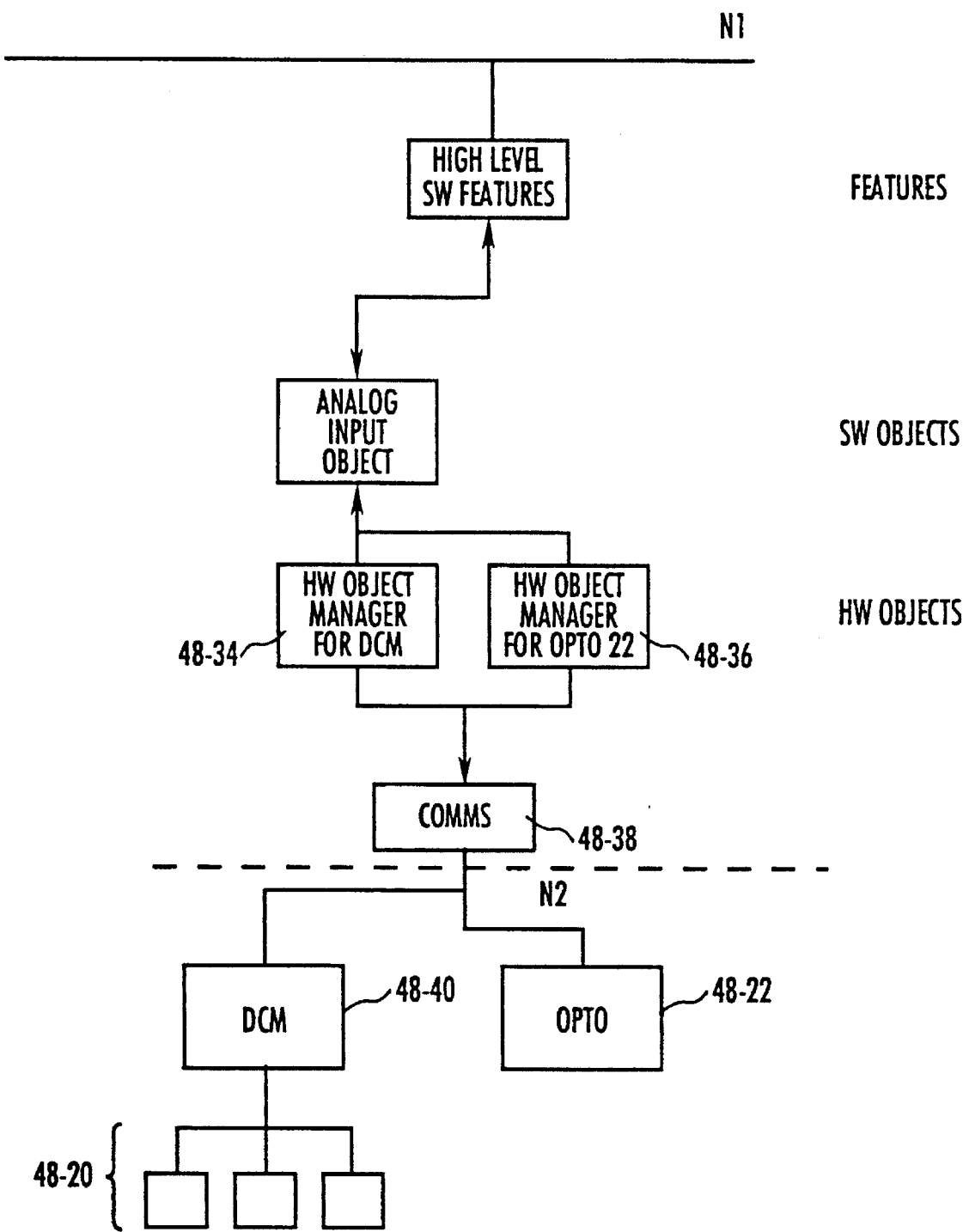
FIG. 48 shows a more detailed overview of a network controller with an analog input object.

FIG. 47 shows a facilities management system with network controllers 47-2 and 47-4 connected by a high-speed bus 47-6. Each network controller has a processor 47-8 and a memory 47-10. The network controllers use the processing capability and the memory to perform a variety of functions required for facilities management and using data provided by a variety of analog input devices. The highest level of processing in network controllers 47-2 and 47-4 is the features level 47-12. Features are high-level functions performed by the network controller to carry out predefined tasks.

In order to avoid significantly changing the software involved with the high-level features level 47-12, it is necessary to provide a common format for information provided the features by the analog input hardware devices 47-20 and 47-22. This is accomplished in the software objects level 47-14 which processes the data provided to the features level 47-12. As previously discussed, each software object contains methods or processes 47-26 and attributes 47-28 which represent the data used by the processes. It should be noted that the processes 47-26 and attributes 47-28 are maintained in a database 47-30 which is controlled by database manager 47-32. One of the software objects is the analog input software object 47-16.

The analog input software object communicates with hardware objects 47-18 as shown in FIG. 47. Using a common interface, the analog input software object 47-16 requests data from the individual hardware objects 48-34, 48-36 and receives information back from each hardware object using a common format. Hardware object managers 48-34 and 48-36 communicate over communications link 48-38 with intelligent analog hardware 48-22 or with a digital control module 48-40 which performs proportional and integral and derivative (PID) control functions. Digital control module 48-40 communicates with function modules 48-20 which interface directly to analog input hardware.

Figure 49:
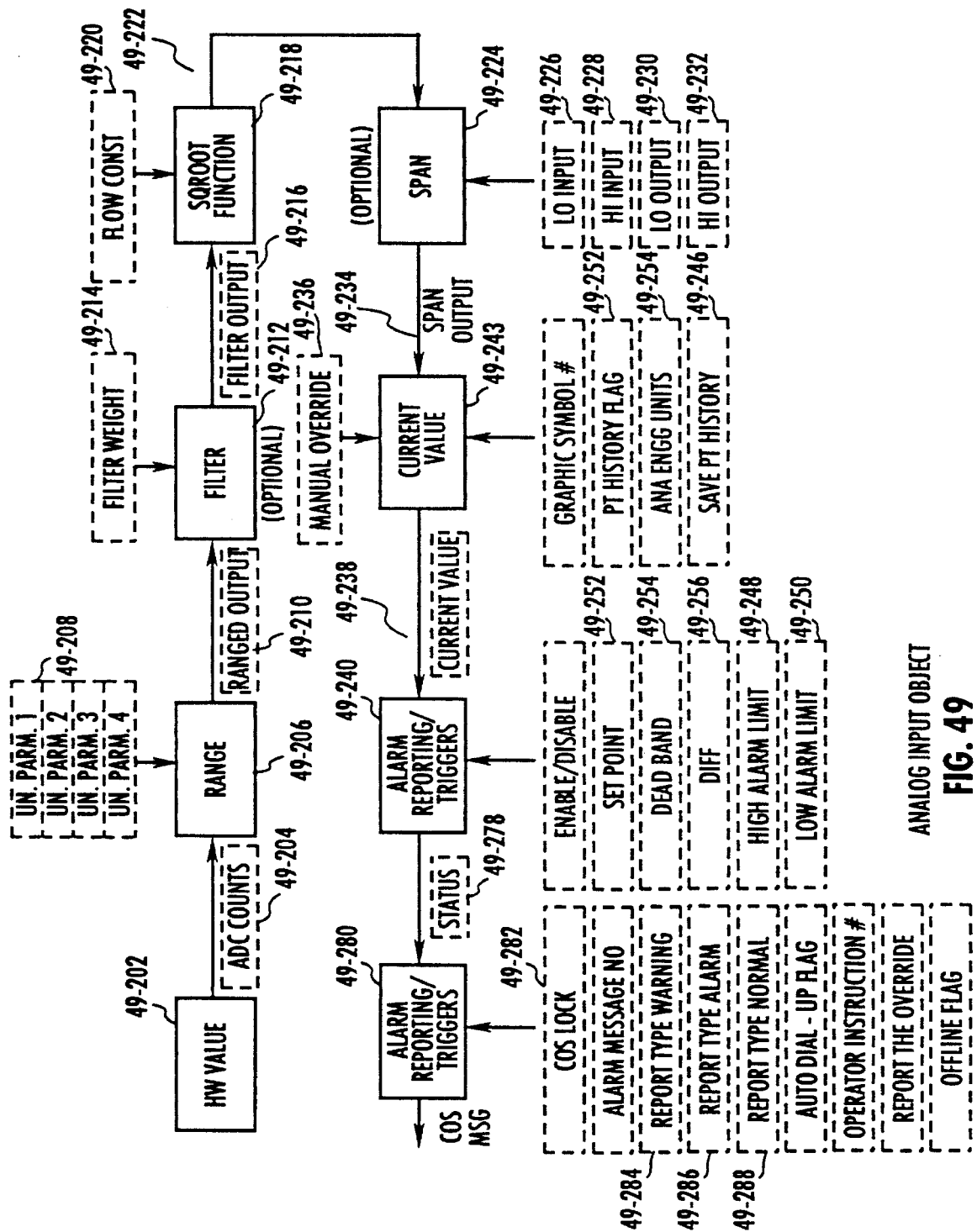
FIG. 49 is a general model of an analog input software object.
Figure 50:
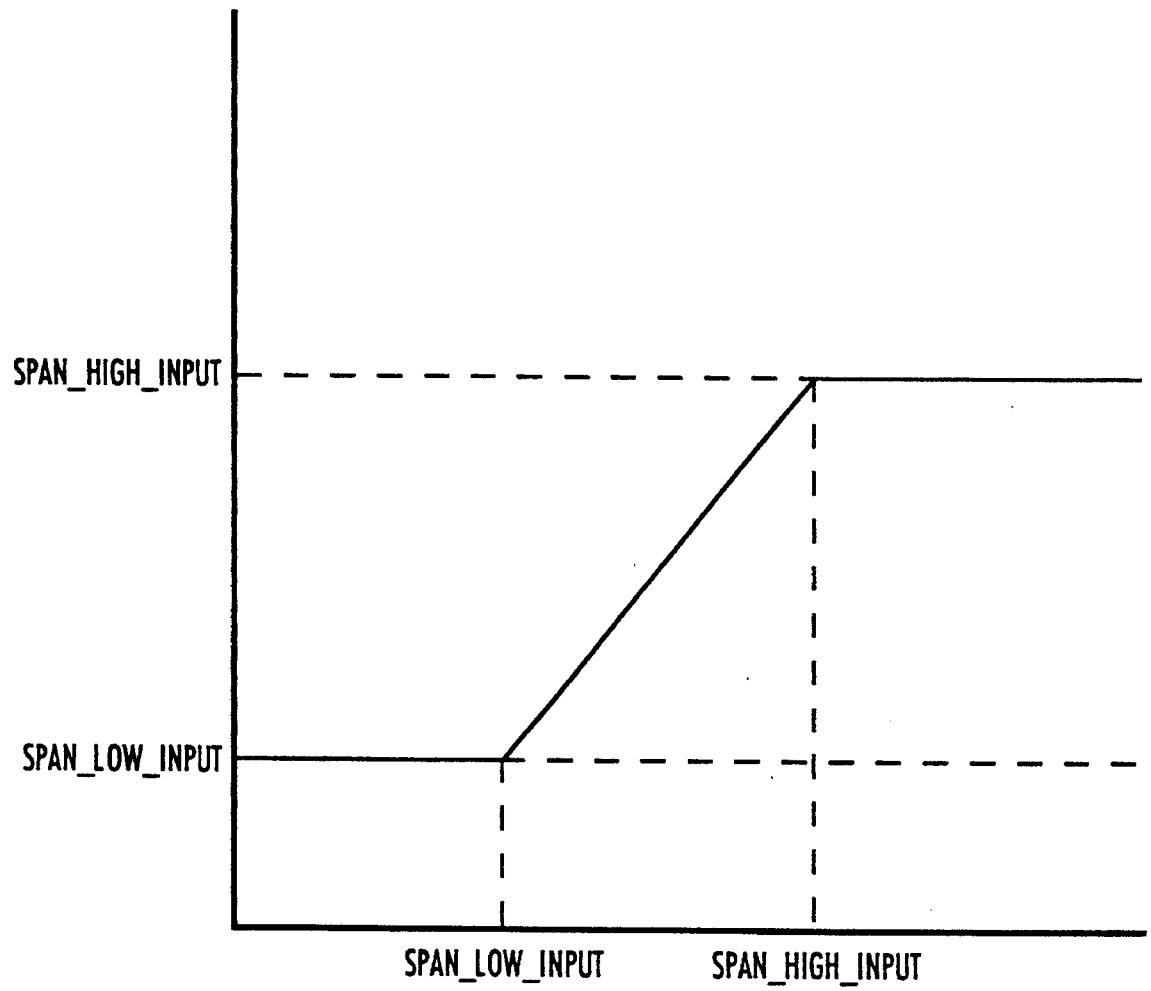
FIG. 50 shows the input and output values for a span function.

FIG. 49 shows a general model of an analog input software object. Typically, a hardware value 49-202 is produced as a result of an input from a function module 48-20. An A/D converter produces ADC counts such as 0–4095 for a twelve bit A/D. As previously mentioned, the exact method for linearly ranging the raw A/D counts varies as a function of the hardware. For a PID controller, the ranged value is computed using the following third order equation:

$$\text{Ranged value} = (A_1 \times X^3) + (A_2 33\ X^2) + (A_3 \times X) + A_4 \quad (1)$$

Equation 1 is implemented in range block 49-206. Linearization coefficients $A_1 \ldots A_4$ are defined during object generation. In most cases, these are predefined based on the hardware device used. However, the linearization coefficients may be entered by the operator where the hardware used is not one of a predefined type or for any other reason. These are stored as linear parameters 1-4, shown at 49-208 in FIG. 49. The ranged output 49-210 becomes the current value of the object if the optional features shown in FIG. 49 are not selected. Thus, converting the hardware input to a digital representation and applying linear coefficients to obtain a ranged output 49-210, a current value which can be processed by the analog input software object is derived regardless of the analog input hardware involved.

Ranged output 49-210 can be routed to filter 49-212 which has a filter weight attribute 49-214. The optional filter allows the operator to define the degree of filtering on analog input points. Such filtering can be used to eliminate false alarms resulting from analog noise on the calculated value. The following equation is used to compute the filtered value:

$$\text{Filtered value} = F + 1/W^*(U-F) \quad (2)$$

where:

F=the previous filtered value

U=present unfiltered value

W=filter weight ($1.0 \leq W$), where a value of 1.0 disables the function.

Another optional function that my be used on the value of the analog input object is the square root function 49-218 which uses flow constant 49-220. The output of the square root function 49-222 is calculated as follows:

$$\text{Square root output} = K^* \sqrt{\text{filtered value}} \quad (3)$$

where: K is the flow constant and is a configuration parameter.

Another optional feature is the span feature 49-224 which allows the operator to span the analog value, to provide upper and lower bounds on the analog value, and to provide an offset and gain adjustment to correct calibration errors. Using the span function, the operator enters a low input value 49-226 and a high input value 49-228 defining the input range and a low output value 49-230 and a high output value 49-232 defining the output range. A linear equation represented by FIG. 50 defines span output 49-234 as follows:

If input analog value is>span high input then output analog value=span high output If the input analog value is<span low input then output analog value=span low output If span low output$\leq$input analog value span high input then:

m=(span high output–span low output) (span high input–span low input)

b=span low output–m* span low input output analog value=m* input analog value+b where:

Input analog value is the analog value to be spanned;

Output analog value is the output of the function.

Output 49-234 of the span function is the current analog value of the analog input object. Manual override attribute 49-236 provides the operator the opportunity to override the current analog value to a specified value. This may be done in the case of a faulty sensor or to simulate a particular field condition. When manual override 49-236 is used, current value 49-238 is replaced and used for further processing in the alarm detection block 49-240. It should also be noted that manual override 49-236 may be accomplished by network controllers 47-2, 47-4 rather than by an individual operator. Such override conditions can be displayed in any manner appropriate to the system.

The analog input object continues to track any reliable changes in status due to hardware changes and reports the last computed status when the override is released. This is done in current value block 49-243. The history of a data point can be saved using save point history block 49-246. For this purpose, a network controller 47-2, 47-4, would contain a point history buffer which would be read and displayed in a separate point history window. In a facilities management system, the buffer would normally consist of the last 48 samples of the analog input value, each sample taken every 30 minutes. Only the value of the analog input object would be graphed and displayed.

Figure 51:
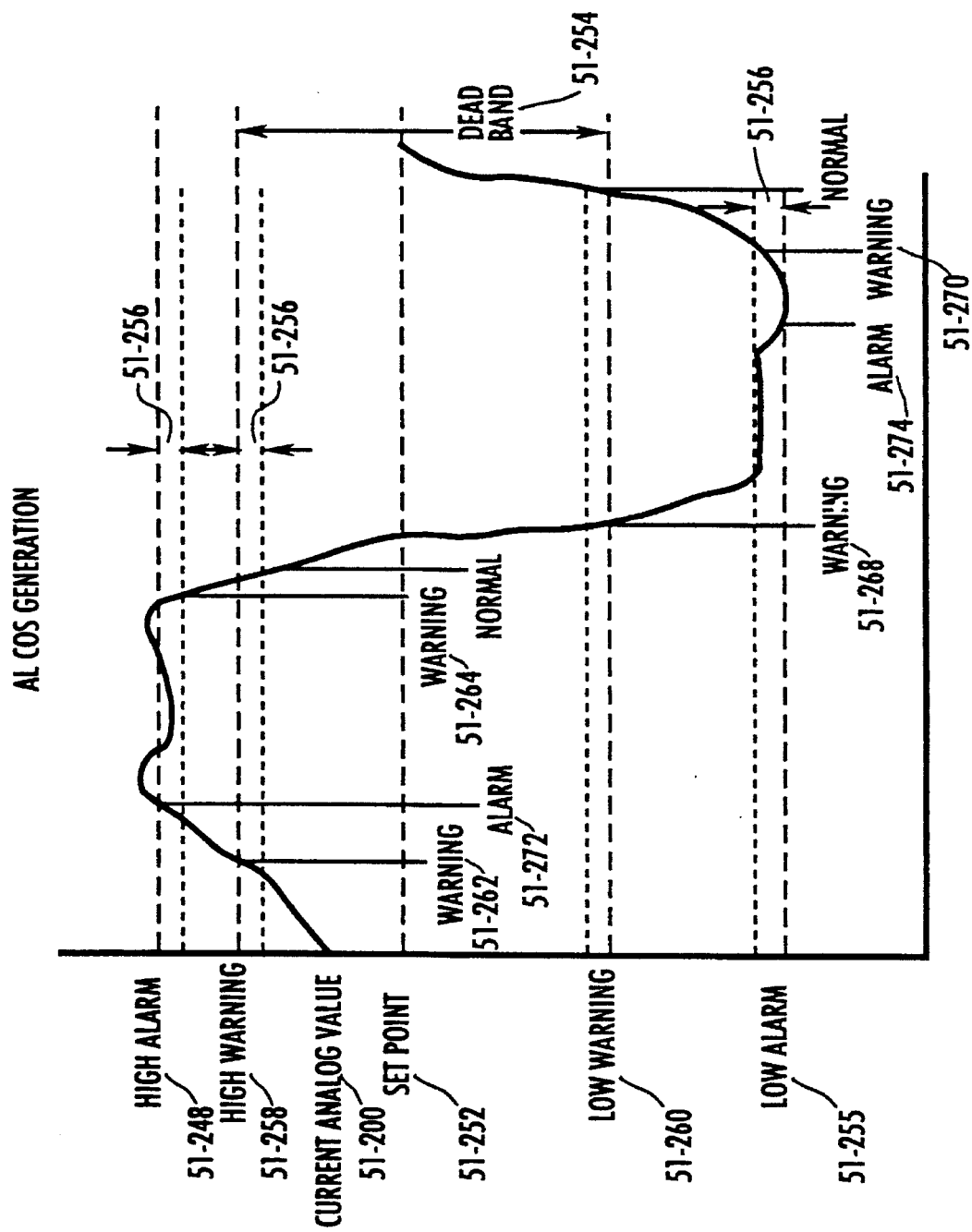
FIG. 51 shows limits for change of state generation.

Alarm detection block 49-240 performs alarm analysis whenever the current value changes, either due to a change in field conditions reported or when a new value is received from an override command, and when high alarm limit 49-248 or low alarm limit 49-250 is changed. If an object value falls outside the high and low alarm limits, an alarm is generated. According to the invention, an operator may also define a setpoint 49-252, a dead band value 49-254, and a differential value 49-256. As shown in FIG. 51, dead band 51-254 sets a high warning 51-258 and a low warning 51-260. When current analog value 51-200 exceeds the high warning 51-258, warning 51-262 is generated. Similarly, when current analog value 51-200 goes below low warning 51-260, warning 51-268 is generated. When the current analog value 51-200 exceeds the high alarm limit 51-248, alarm 51-272 is generated. Differential value 51-256 eliminates excess alarm reports resulting from fluctuation of the current analog value 51-200 above or below high alarm limit 51-248. Based on the differential value, when the analog value crosses one of the limits and causes the next alarm condition to be reported, it will not change the alarm condition back to the previous condition until it has crossed not only the limit but the limit and its differential 51-256. Thus, after alarm 51-272 is generated, excursions of the current analog value 51-200 below high alarm 51-248 do not turn off the alarm condition until current analog value 51-200 passes below the high alarm 51-248 minus the differential 51-256. At this time, warning 51-264 is generated. Warning 51-264 is not removed until current analog value 51-200 passes below high warning 51-258 minus differential 51-256 to create a normal condition. A corresponding process takes place when the current analog value 51-200 makes excursions around the low warning 51-260 and low alarm 51-255.

Alarm delay timers are also possible. For example, if an analog object receives a warning command, an alarm delay timer will be started until it times out. Both change of state and trigger reports due to any reported changes in status will be locked out and not reported. This can be used to prevent nuisance alarms when the analog input object is used as a feedback to an analog output object as discussed. When an analog output object issues a command, it also issues the warning command to the associated analog input object. The delay time can then be used to prevent alarms while the field is responding to the command. When the timer expires, the new status of the object is reported. If no delay timer is specified the status is reported immediately. If alarm timing is not in process, any reliable change in status is reported for the analog input object, assuming the object is not currently overwritten.

Status messages 49-278 are reported to alarm reporting/ triggers function 49-280. Status 49-278 can be either high alarm, low alarm, high warning, low warning, or normal depending on the current value and limits defined. Changes in status are reported if the object is not disabled, and the change of state (COS) reports are not locked out based on COS lock 49-282. The operator can define three groupings of report types; warning 49-284, alarm 49-286, and normal 49-288. High and low alarm conditions use the alarm report type, high and low warning conditions use the warning report type, and normal conditions will use the normal report type. A report type can be defined by the user during generation as critical 1-4, maintenance, status, or none. Reports are not sent if a report type is not specified. In addition, the user can optionally specify the alarm message number 49-290 through reports using the alarm report type and a warning message number for reports using the warning report type.

Figure 52:
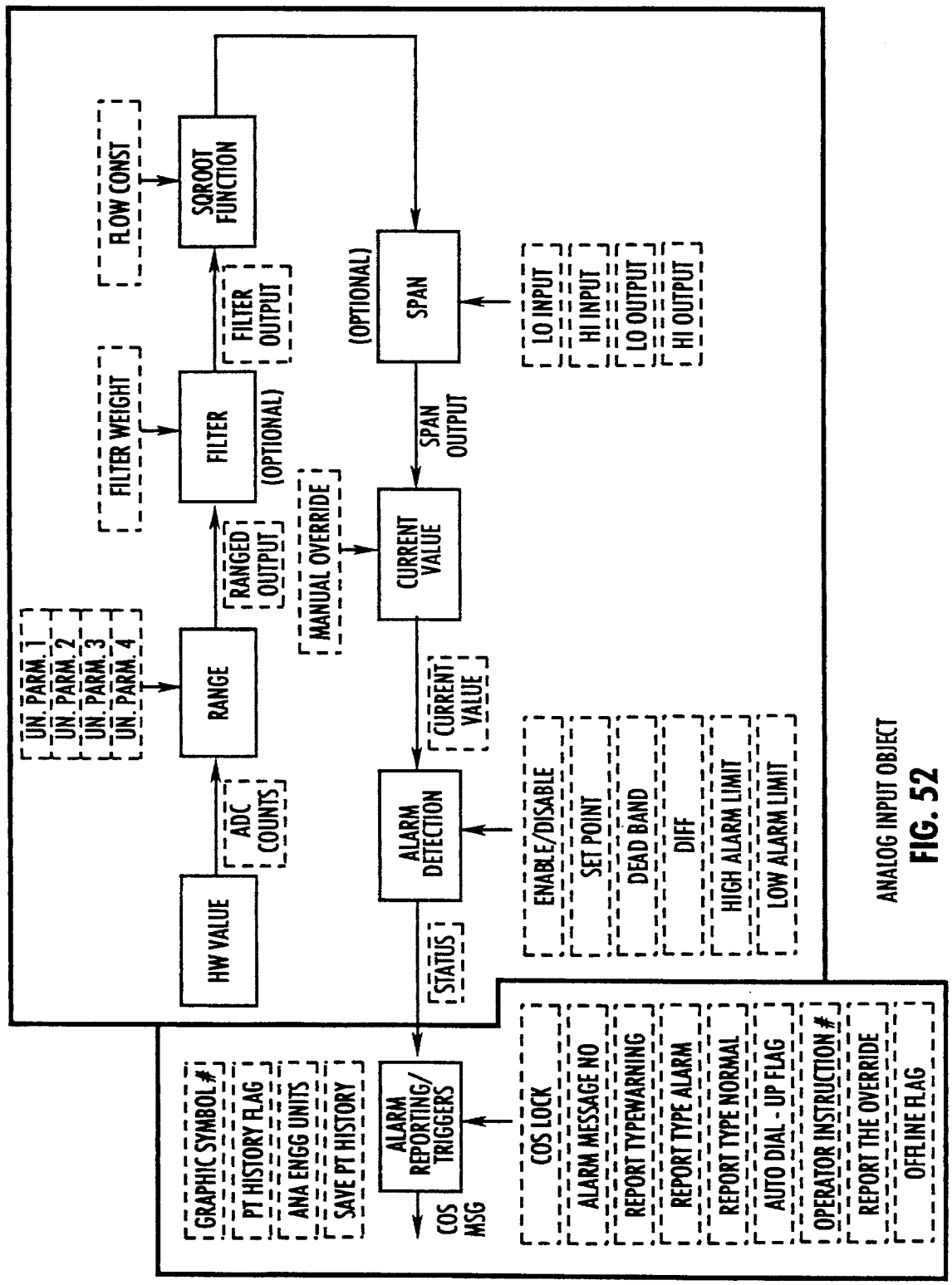
FIG. 52 shows an analog input software object with functions distributed between a network controller and a proportional integral differential controller.

As previously discussed, the analog input object general model shown in FIG. 49 maps into various types of hardware. One example is shown in FIG. 52 in which a PID controller hardware performs all functions except the alarm reporting/triggers and the save point history 49-246. These remain in the network controller 47-2, 47-4.

In operation, an operator defines an analog input object by entering a system name, the object name, the system name of the hardware object the analog input object will map to, the object name of the hardware object, the analog input object will map to, and other parameters. These include analog units, high and low limits, set point, normal band, differential, filter weight, the reports types that the various reports will be sent to, flow coefficients, span high and low inputs and high and low outputs, and linearization parameters 1–4. These were discussed above. Using this information, the analog input object operates on any hardware output to convert the output to a floating point representation which can be used by higher level software elements. In addition, the analog input object performs background processing in the form of alarm detection and reporting as previously described. Thus, it is possible to utilize a wide variety of different data format hardware operational units to acquire data which will be used by the higher level software features.

While specific embodiments of the invention have been described and illustrated, it will be clear that variations in the details of the embodiments specifically illustrated and described may be made without departing from the true spirit and scope of the invention as defined in the appended claims.

Figure 53:
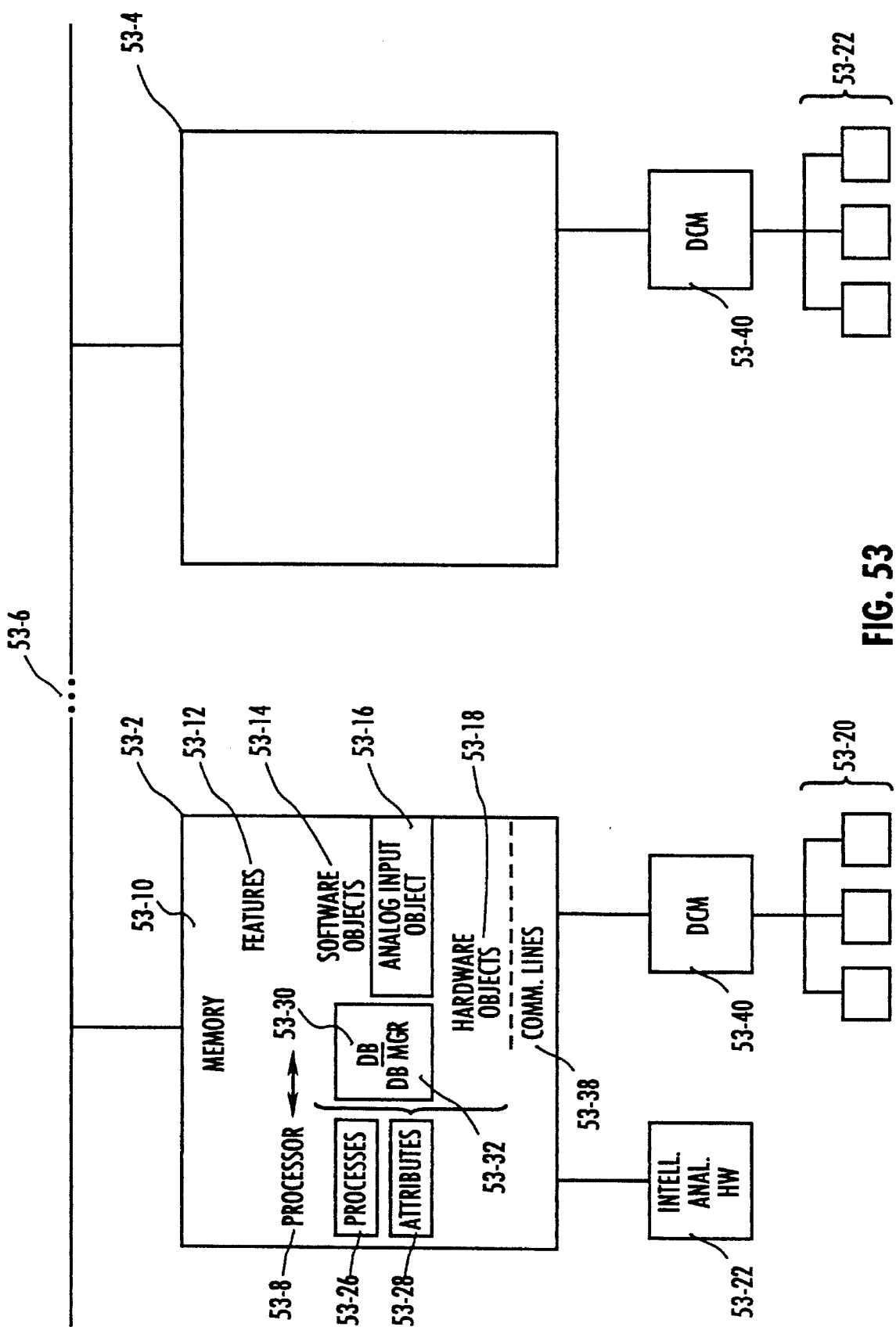
FIG. 53 is an overview of a facilities management system with a binary input object.
Figure 54:
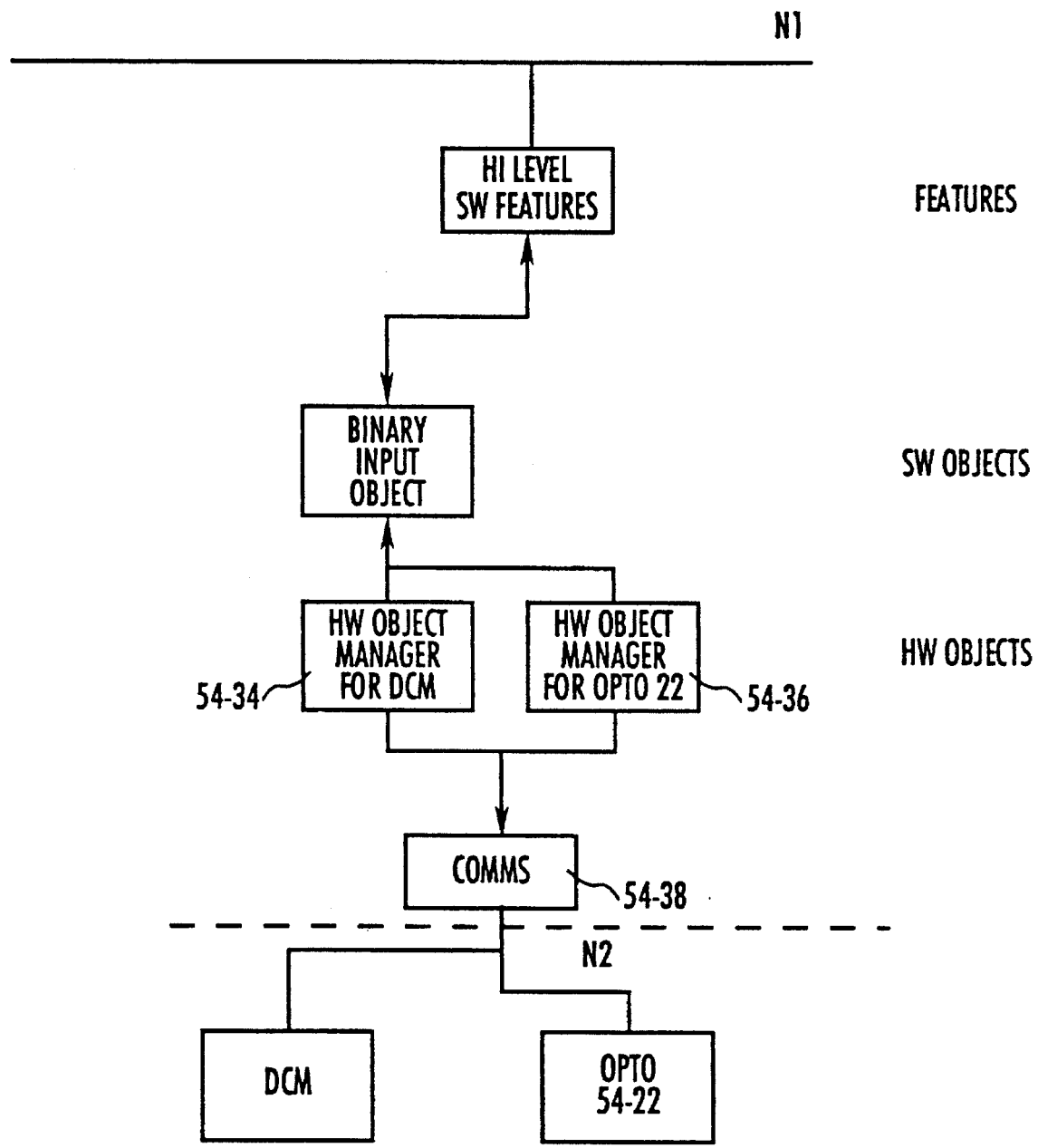
FIG. 54 shows a binary input object in a network controller.

FIG. 53 shows a facilities management system with network controllers 53-2 and 53-4 connected by high-speed bus 53-6. Each network controller has a processor 53-8 and a memory 53-10. The network controllers use the processing capability and the memory to perform a variety of functions required for facilities management based on data provided by a variety of binary input devices. The highest level of processing in network controllers 53-2 and 53-4 is the features level 53-12. Features are high-level functions performed by the network controller to carry out predefined tasks. In order to avoid significantly changing the software at high-level features level 53-12 for different input devices, it is necessary to provide a common format for information provided to the features by the binary input devices 53-20 and 53-22. This is accomplished in a software objects level 53-14 which filters the data provided to the features level 53-12. Each software object contains methods or processes 53-26 and attributes 53-28 which represent the data used by the processes. It should be noted that the processes 53-26 and attributes 53-28 are maintained in database 53-30 which is controlled by data base manager 53-32. One of the software objects is the binary input object 53-16. The binary input object 53-16 communicates with hardware objects 53-18. Using a common interface, the binary input object 53-16 requests data from the individual hardware objects 54-34, 54-36 and receives information back from each hardware object using a common format. Hardware object managers 54-34 and 54-36 communicate over communications link 54-38.

Figure 55:
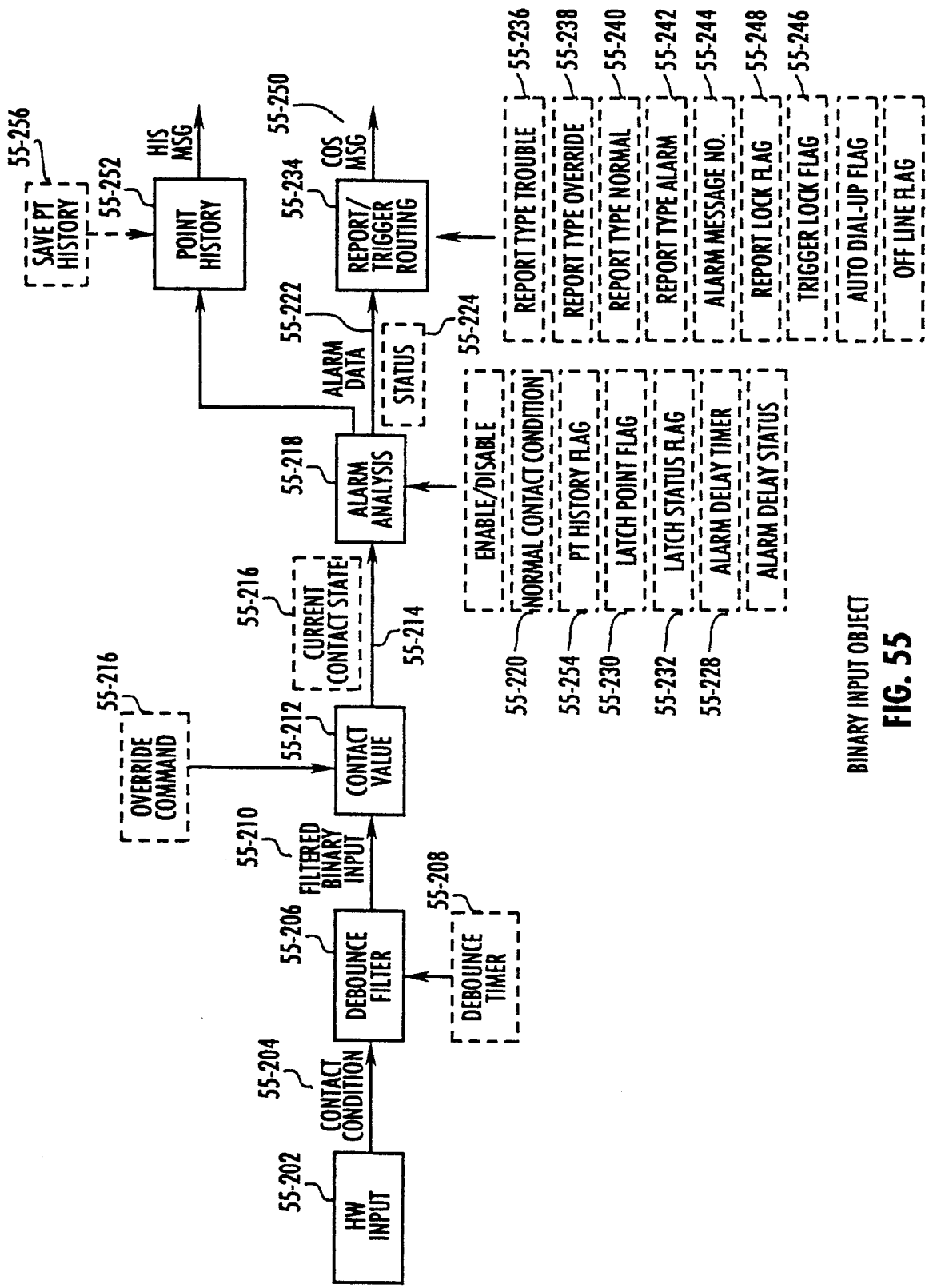
FIG. 55 is a general model of a binary input object.

FIG. 55 shows the general model of a binary input object. Hardware input 55-202 produces a contact condition on signal line 55-204. Due to faulty hardware or other noisy conditions, contact condition 55-204 from binary input hardware 55-202 may flutter and cause excessive reporting. If hardware input 55-202 supports it, such nuisance changes can be avoided by debounce filter 55-206. Debounce filter 55-206 is hardware dependent and relies on a software object attribute, debounce timer 55-208. The value of the debounce timer 55-208 is also dependent on the hardware type. The debounce filter 55-206 verifies that the samples contact status remains unchanged during a debounce time period defined by debounce timer 55-208. If no change in the contact condition on signal line 55-204 occurs during the debounce period, the contact condition becomes the filtered binary input 55-210. Filtered binary input signal 55-210 will appear on signal line 55-214 unless overridden by override command 55-216.

Debounce timer attribute 55-208 can, for example, define the time in milliseconds and may be subject to other system peculiar constraints. For example, in one FMS the debounce timer must be a value devisable by 12 and may range from 1 to 255.

Filtered binary input 55-210 is passed to contact value function block 55-212 which determines the current contact state on signal line 55-214. Contact value function 55-212 places filtered binary input 55-210 on current contact state signal line 55-214 unless overridden by override command 55-216.

Override command 55-216 allows an operator to set the contact value of the binary input software object to a user specified value. This could be used in the case of faulty or off-line hardware or to simulate a specific condition. When override command 55-216 is executed by contact value process 55-212, the new contact value will be used to determine the current status of the object based on the normal contact condition stored as attribute 55-220. However, even while overridden, the binary input object still tracks and stores any reliable contact changes and uses the last reported state when the override is cancelled by the operator.

Alarm analysis is performed in function block 55-218 when the current contact state on signal 55-214 changes, either due to a change in a field condition or when a new value is received from an override command. Alarm analysis is also performed when the normal contact condition is changed. The normal contact condition is defined when the binary input software object is generated. However, the normal condition can be changed for feedback analysis by a related binary output object manager herein, or by other high level features. The normal contact condition is stored in memory as attribute 55-220. Alarm analysis function 55-218 produces data on signal line 55-222 for status information attribute 55-224. A new status 55-224 of a binary input object is determined by comparing the current state on signal line 55-214 against the normal contact condition 55-220. If they do not match, the binary input object status 55-224 is set to alarm. If they do match or no normal contact condition was specified, all changes of contact value are considered normal changes.

Figure 56:
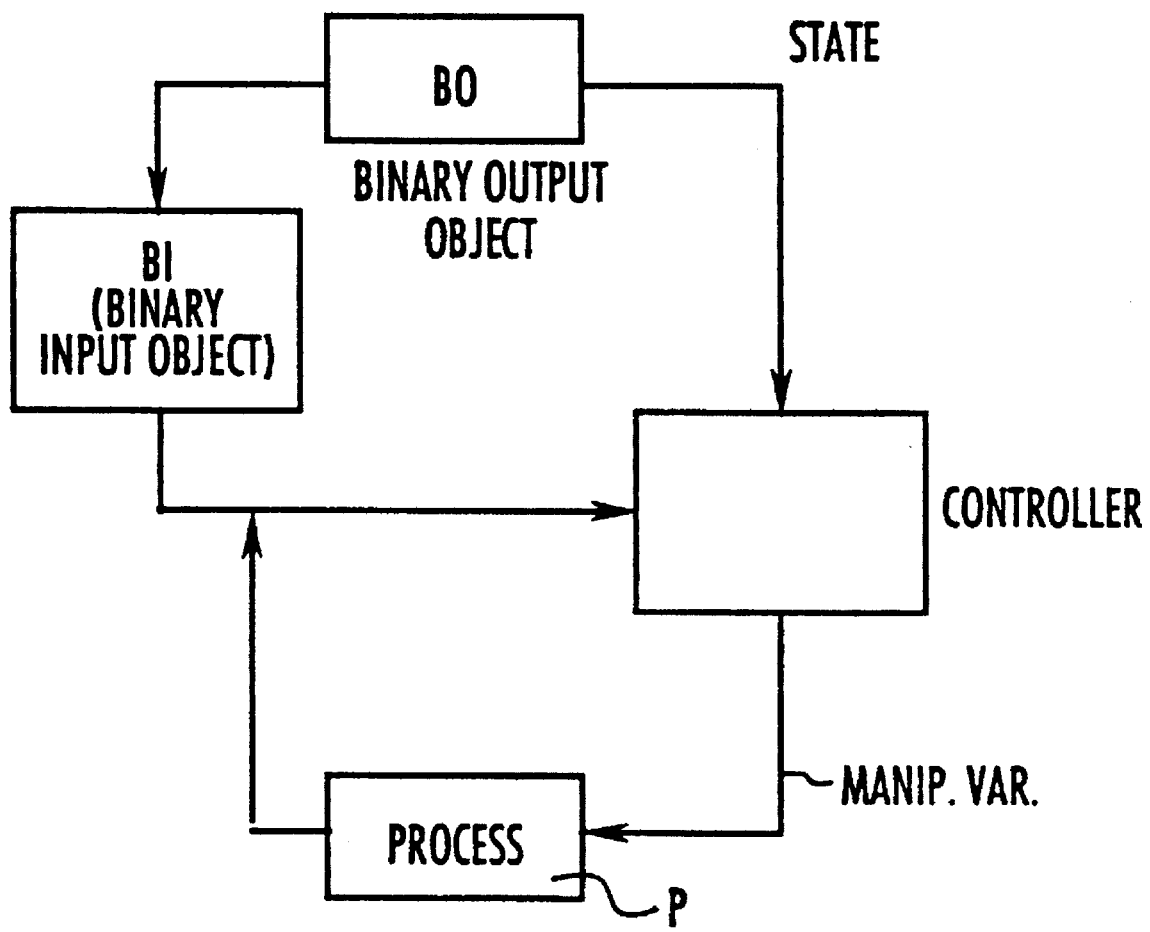
FIG. 56 shows a Binary Input Object used in a feedback loop.

A change due to an override command is always processed immediately. An override command cancels any alarm delay timing described below that may be in effect. When a change to the normal contact condition is received, alarm delay timer 55-228 is started. While this timer is timing out, the alarm delay status is set active. Until it times out, both change of state and trigger reports resulting from contact changes are locked out for the duration of the alarm delay timer 55-228. This has the advantage that it prevents nuisance alarms when the binary input object is used as a feedback to a binary output object, as shown in FIG. 56. When the binary output object issues a command to a field device or hardware operational unit, it also modifies the normal contact condition of the associated binary input object. The delay time can then be used to prevent alarms while the field is responding to the command. When the time specified in alarm delay timer 55-228 expires, the current contact value 55-216 is compared against the normal contact condition 55-220 and a new status 55-224 is determined.

Using latch point flag 55-230 the operator may enable a latching function in the binary input object. When the latch point flag 55-230 is in a state to select the latching function, any changes to an alarm condition will be latched until a reset latch command is received. No further change of state processing in alarm analysis function block 55-218 will be performed when the alarm condition is latched. This is indicated by latch status flag 55-232.

The new status 55-224 is routed to a report/trigger routing function 55-234. As previously noted, any changes in status are reported if the binary input object is not disabled and change of status reports are currently not locked out. Several reporting conditions exist: report override 55-238, report normal 55-240 and report alarm 55-242. A report type (critical 1-4 maintenance, status or none) can be defined by the user when generating the binary input object for each of the reporting conditions. If no report type is specified for a condition, the object will not report that condition. In addition, the user can optionally specify an alarm message number 55-244. The alarm message associated with the alarm message number is reported together with the alarm condition report. Report lock flag 55-248 and trigger lock flag 55-246 indicate conditions in which the binary input object will lock out reports to other tasks performed in the network controller. The change of state message on signal line 55-250 indicates to the high level feature that the contact condition 55-204 from the hardware input 55-202 has changed.

Point history function 55-252 also receives signals from alarm analysis function 55-218. Point history function 55-252 samples and archives certain attributes associated with the binary input object. The samples are stored in a point history file. An operator can manually disable or enable the data gathering process. This is reflected in point history flag 55-254. The save point history attribute 55-256 reflects an option to save the samples in a file in a computer or write the samples to a printer. Typically, a point is sampled when a status change occurs and 10 samples are stored. The data sample includes the current contact condition, the current status, the software override flag, the off line flag and the time and date of each current. If save point history attribute 55-256 indicates that this option is not selected, the historical information is stored only at a network controller. It should be further noted that point history information consisting of the last 10 binary input events recorded in the network controller can be displayed or a dynamic trend in the form of a text table can be displayed.

Figure 57:
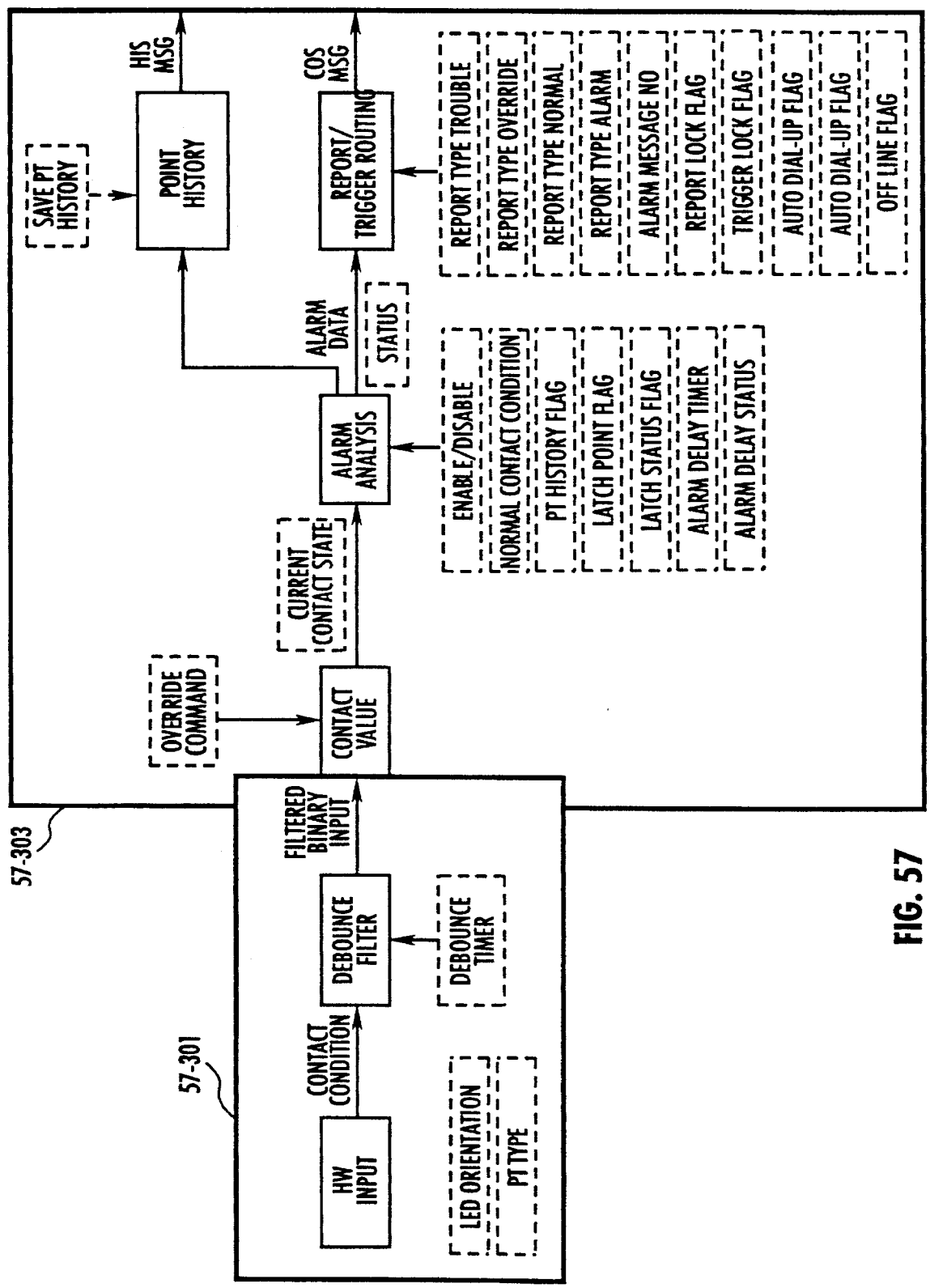
FIG. 57 shows a binary input object and the interface to a proportional, integral, differential hardware controller, which may be implemented in a Digital Control Module (DCM) hardware controller.

An important feature of the invention is that a binary input software object can map to a variety of hardware types. FIG. 57 shows PID or DCM hardware 57-301 having the hardware input and debounce filter built in. The filtered binary input is then transmitted to the contact value function which is located in a network controller and operated by the binary input object manager 57-303. It should be noted that the binary input object may map to two different types of hardware on the PID or DCM controller 57-301. The first is a single binary input and the second involves mapping two separate inputs to one slot on the PID or DCM controller. This is called a multi-binary input and needs a subslot number to select which of the two inputs the binary object maps too. Thus, the binary input object will support two instances of the binary input.

Figure 58:
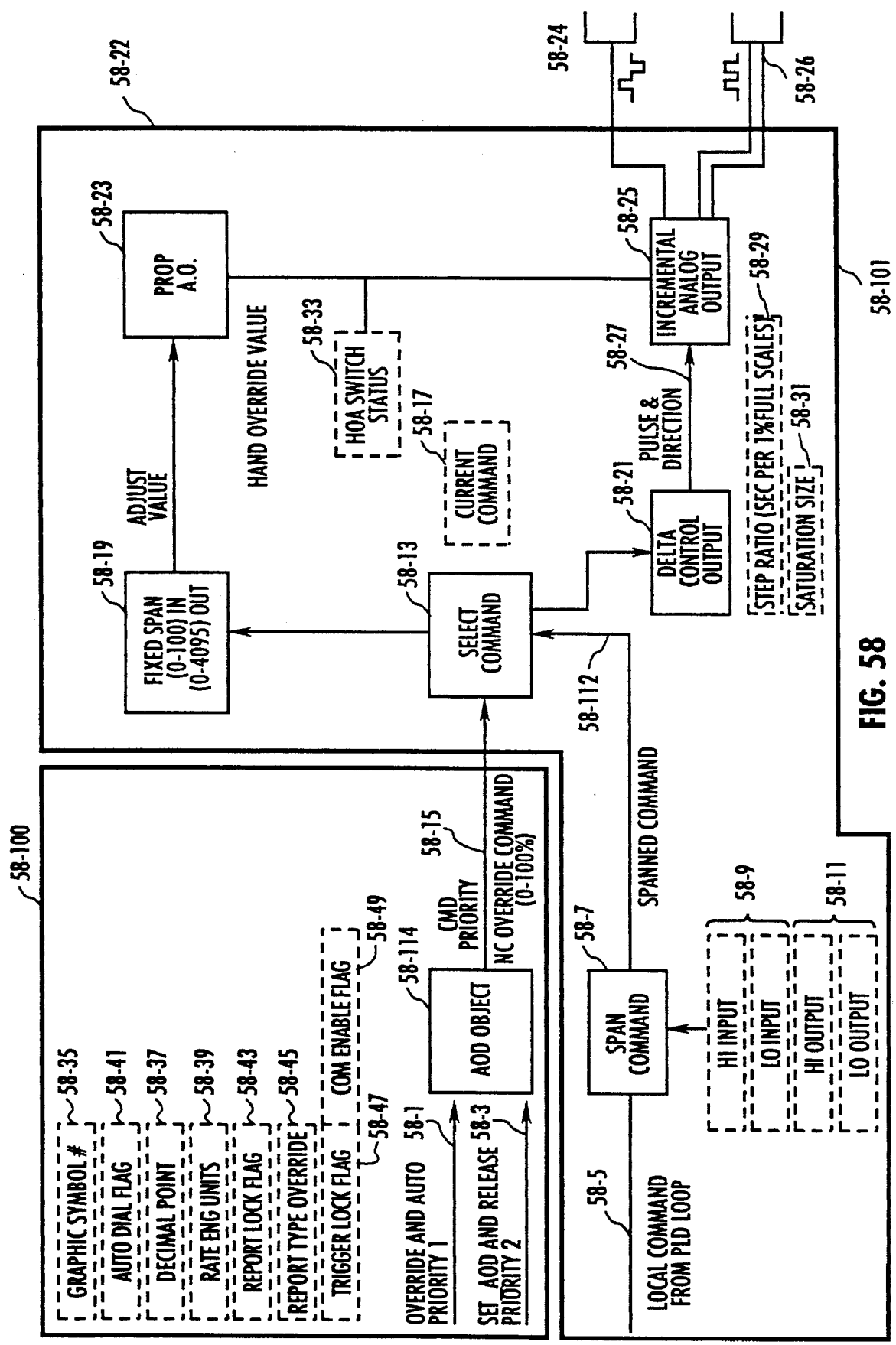
FIG. 58 is an overview of a first type of analog output object.
Figure 59:
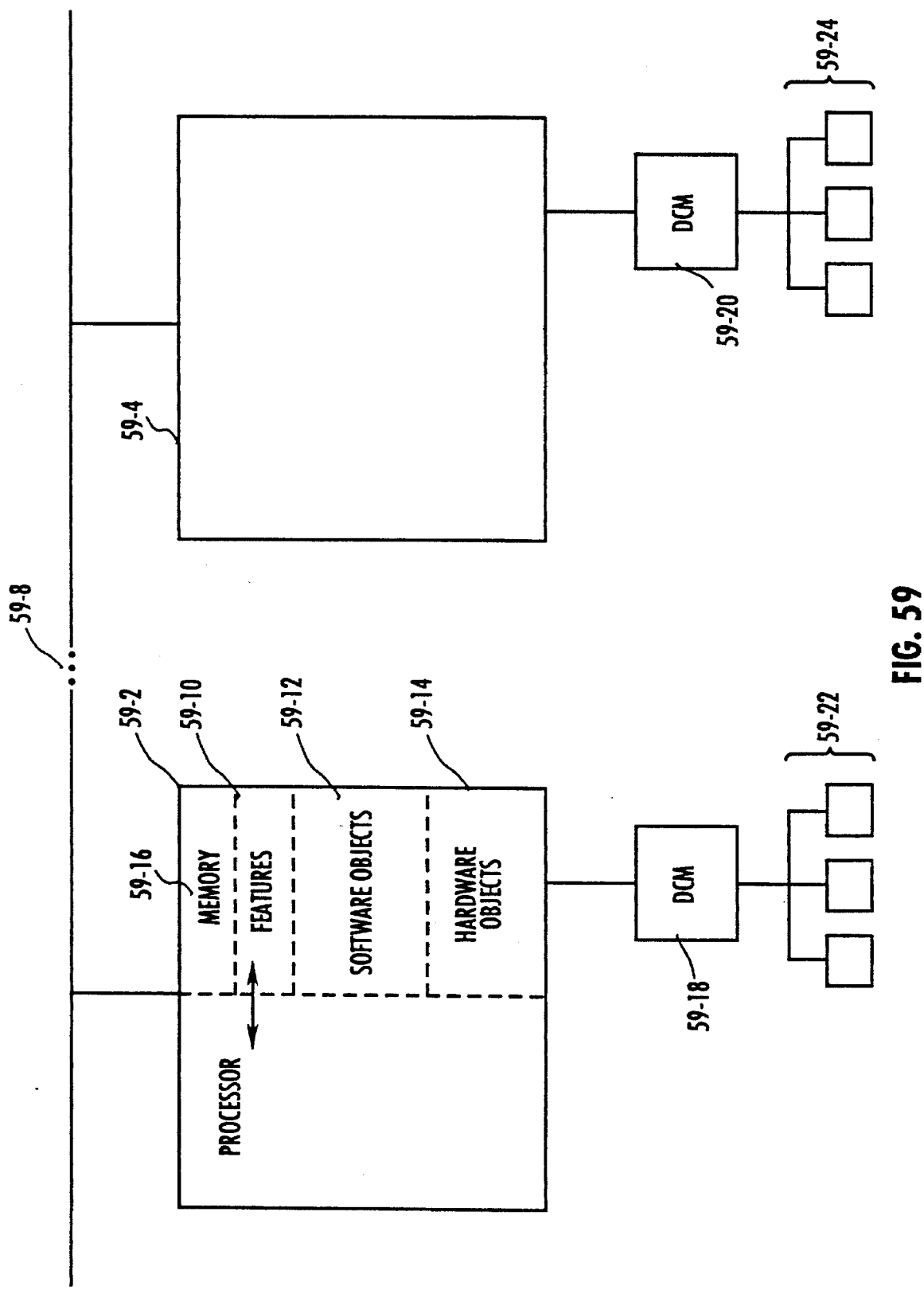
FIG. 59 is an overview of a facilities management system with analog output devices.
Figure 60:
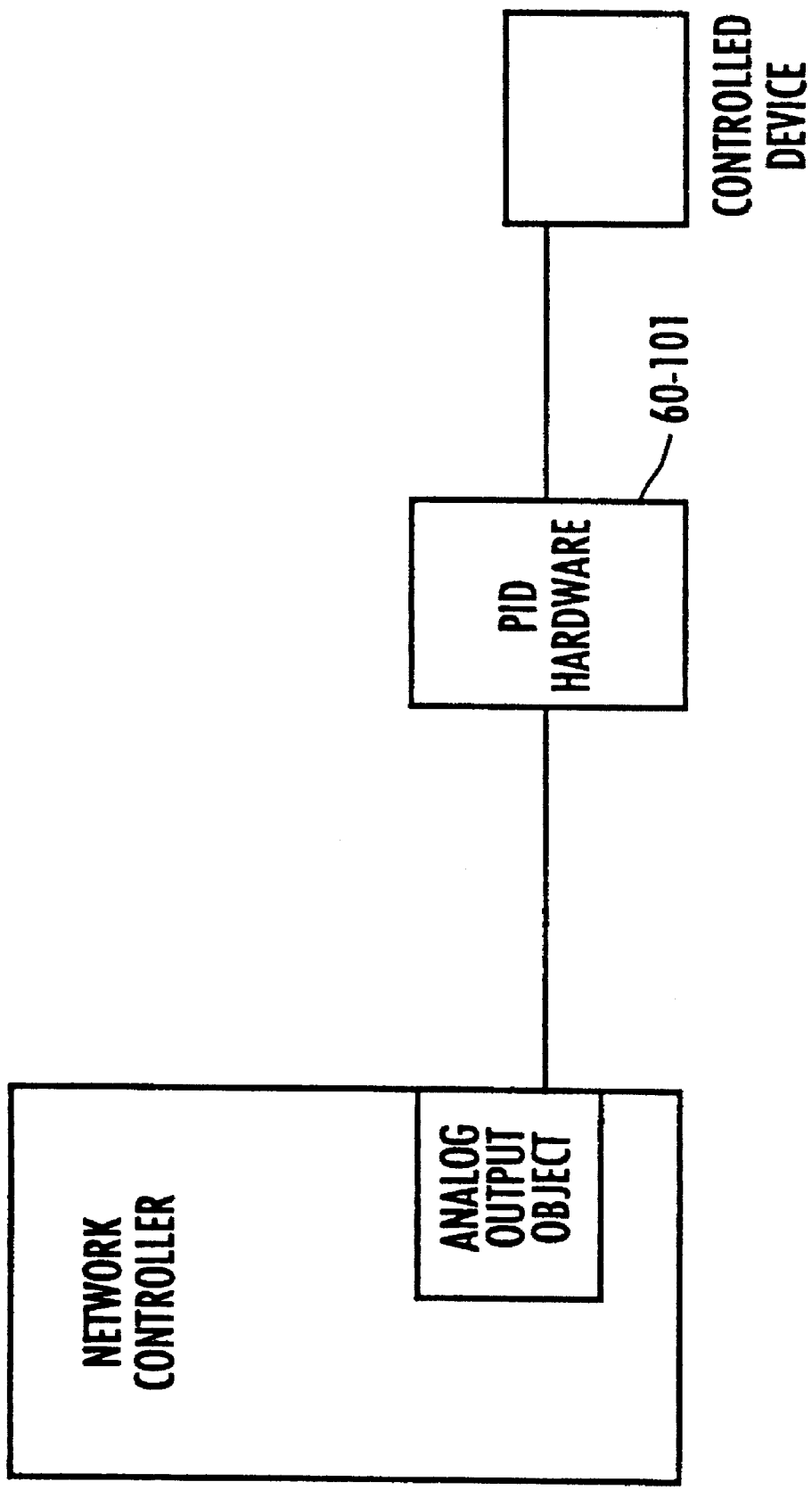
FIG. 60 is an overview of an alternative facilities management system with PID hardware.

In FIG. 58 the analog output object manager 58-100 for analog output digital object 58-114 resides in a network controller and receives three types of input commands. Highest priority commands are override and auto priority 1 commands on signal line 58-1 which can originate in a network controller (NC). Set AOD and release commands 58-3 are the second priority and also can originate in the same network controller. Signal line 58-15 routes output deflection information from the analog output digital object in a network controller to PID hardware 58-101. In contrast, local commands from a PID loop 58-5 often originate in a digital control module, e.g. 58-18. These are lowest priority commands and it is assumed that only one local PID loop command 58-5 is applied to the PID Hardware 60-101 at a time.

The local command from the PID loop on signal line 58-5 is a floating point number which represents a percentage between 0% and 100% of full scale deflection of the process being controlled. For a PID controller, this must be converted to a percentage of full scale deflective of a particular output device. Such conversions are not necessary for outputs from the network controller.

By way of example, in facilities management system 59-8, a high level software feature programmed to perform control system functions requests data transfers between itself and an analog output object which is one of the software objects 59-12 programmed into a memory 59-16 of a network controller 59-2. Network controllers 59-2, 59-4 each may function to control activities of digital control modules 59-18 and 59-20. The analog output object can map to hardware objects 59-14 and the network controllers 59-2 and 59-4 interface with digital control modules 59-18 and 59-20. Software objects 59-12 are stored in a database and are controlled by a database manager for objects of that type. As discussed below, analog output objects can be analog output digital objects or analog output setpoint objects. Thus, an analog output digital (AOD) object 58-114 is manipulated by analog output object manager 58-100. Objects, including the analog output digital object 58-114, are structured into methods and attributes as described previously.

The analog output object can also be programmed directly into a PID controller (not connected to a network controller) which exercises control functions on hardware devices connected to it. Indeed, the analog output objects described below can be programmed into any system which exercise control over output devices. The PID function of a facilities management system described below is by way of example and is not a limitation of the invention.

The local PID command on signal line 58-5 is thus routed to span command operator 58-7 in the PID hardware 58-101, which maps the command in the configured range specified by the high and low limits 58-9 to a command in the range specified by high and low output limits 58-11, according to the linear equation described below. This provides the flexibility to perform a variety of manipulations of the final analog adjust value commanded at devices 59-22 and 59-24.

At database generation, an operator enters two values defining an input range 58-9 and two values 58-11 defining an output range. It should be noted that if the span command operator is not desired, all four parameters are set to a value which will cause the signal to skip this operator. Logically the span function is a linearization based on an input analog value the local PID command signal line 58-5 performed as follows:

If input analog value is>span high input then analog output value=span high output If input analog value<span low input then analog output value=span low output If span low input≦input analog value≦span high input then m=(span high output–span low output) (span high input–span low input)

b=span low output–m*span low input analog output value=m*(input analog value)+b.

The above assumes that the analog input value is the analog value to be spanned and the analog output value is the output of the span command operator 58-7.

The output of span command operator 58-7 or, in the case of an analog digital output object, percentage deflection on signal line 58-15 is interpreted based on driven hardware type. Depending upon the requirements of the output device 58-22, the output can be issued either as a proportional value or as an incremental or delta control output. This selection is made by a user who configures the system at database generation timer via select command operator 58-13. The select command operator 58-13 also determines who has control of the active device depending on the priority of its inputs. Thus, span command operator output 58-112 or the network controller override commands 58-15 from the analog output digital object 58-114 are selected by select command operator 58-13. Based on priority, select command operator 58-13 completes an attribute 58-17 called current command. Current command 58-17 is, for example a percentage of the full scale deflection of the output device 59-22, 59-24. As previously indicated, it is important to distinguish that the local command from the PID loop 58-5 is a percentage of full scale deflection of the entire process while the output 58-112 of the span command operator 58-7 is always a percentage of full scale deflection of the physical device rather than the process. This provides a means to convert local PID commands to commands compatible with multiple physical objects. Thus, the local PID commands can be configured for compatibility with the PID loop while the span command operator output 58-112 provides compatibility with physical devices e.g. 59-22, 59-24.

It should be noted that the select command operator 58-13 is configured at generation time to route signals either to fixed span operator 58-19 or delta control output operator 58-21. This is necessary when there is no means for determining the type of output required. If the output required from the analog output digital object is a proportional analog output 58-23, fixed span operator 58-19 is activated. A proportional analog output is a percent of full scale. Fixed span operator 58-19 takes the output 58-112 from the span command function 58-7 and runs it through a fixed span operator 58-19 which has 0–100 as the input range and a selected number of output states, 0–4,095, as the output range. Fixed span operator 58-19 then converts this to the appropriate signal based on the output device 58-22. The adjustment value is then transmitted to the proportional analog output 58-23. For example, if the output device generates a signal between 10 and 15 volts and the span command operator 58-7 requires 50% of full scale and D/A converter with 4096 states (0-4095) would require a digital input of 2047 to generate a 12.5 volt output (50% of the difference between the 10 and 15 volt lower and upper limits).

Control is transferred to the delta control output block 58-21 when an incremental analog output 58-25 is required. The output of delta control block 58-21 is a pulse 58-27 whose polarity and duration drives the output device to adjust to some percentage of full scale, e.g., the percentage of full scale indicated by the current command. The last value of the current command attribute 58-17 is stored and compared with a new current command attribute valve. The difference is then computed. The sign of this difference determines the direction of the pulse (positive or negative). The magnitude of the change is converted in delta control output block 58-21 to seconds of pulse duration using the "step ratio" attribute 58-29. "Step ratio" attribute 58-29 is entered at generation time for the particular output type and represents a number of seconds of duration per 1% of full scale. For example, if the step ratio attribute 58-29 is 0.02 seconds per 1%, and the computed delta is −20%, then the pulse will be a negative signal with a duration of 400 milliseconds. Thus, multiplying the change in percentage by the step ratio determines the length of the pulse duration.

On some function modules, e.g., two channels 58-26 are available. In these cases if the sign is positive, a first channel is pulsed and if the sign is negative, the second channel is pulsed.

Another attribute, saturation size 58-31, defines the saturation pulse size in seconds. A pulse of this duration ensures that the output is driven to the intended extreme. This can be used to resynchronize the output any time the output of the span function calls for 0 or 100%. This is advantageous since it allows the error buildups which occur during operation to be eliminated each time an extreme position is requested.

Hand/off/auto switch 58-33 operates in two positions. In a first or auto position, the current command attribute is used to control the physical devices. In a second or manual position, function module does not react to the current command attribute 58-17 which is still updated by the analog output digital object. Every change of state of the hand/off/auto switch 58-33 is reported through the system so that polling is not required. Thus, all software applications react accordingly.

As previously discussed, the analog output object is made up of software which has both methods and attributes. Some of the individual attributes have been discussed. The methods include the span command operation, the select command operation, and the hardware dependent conversions which include the fixed span output or delta control output. Other attributes also exist for the person machine interface (PMI) and for the hand/off/auto switch. The person machine interface is affected by a graphic symbol number attribute 58-35, a decimal point attribute 58-37, and an engineering units attribute 39. Each of these attributes affect the display. The auto dial flag 58-41, report lock flag 58-43, report type override 58-45, trigger lock flag 58-47, and com enable flag 58-49 are attributes which effect where and when the hand/off/auto switch 58-33 information is routed.

Figure 61:
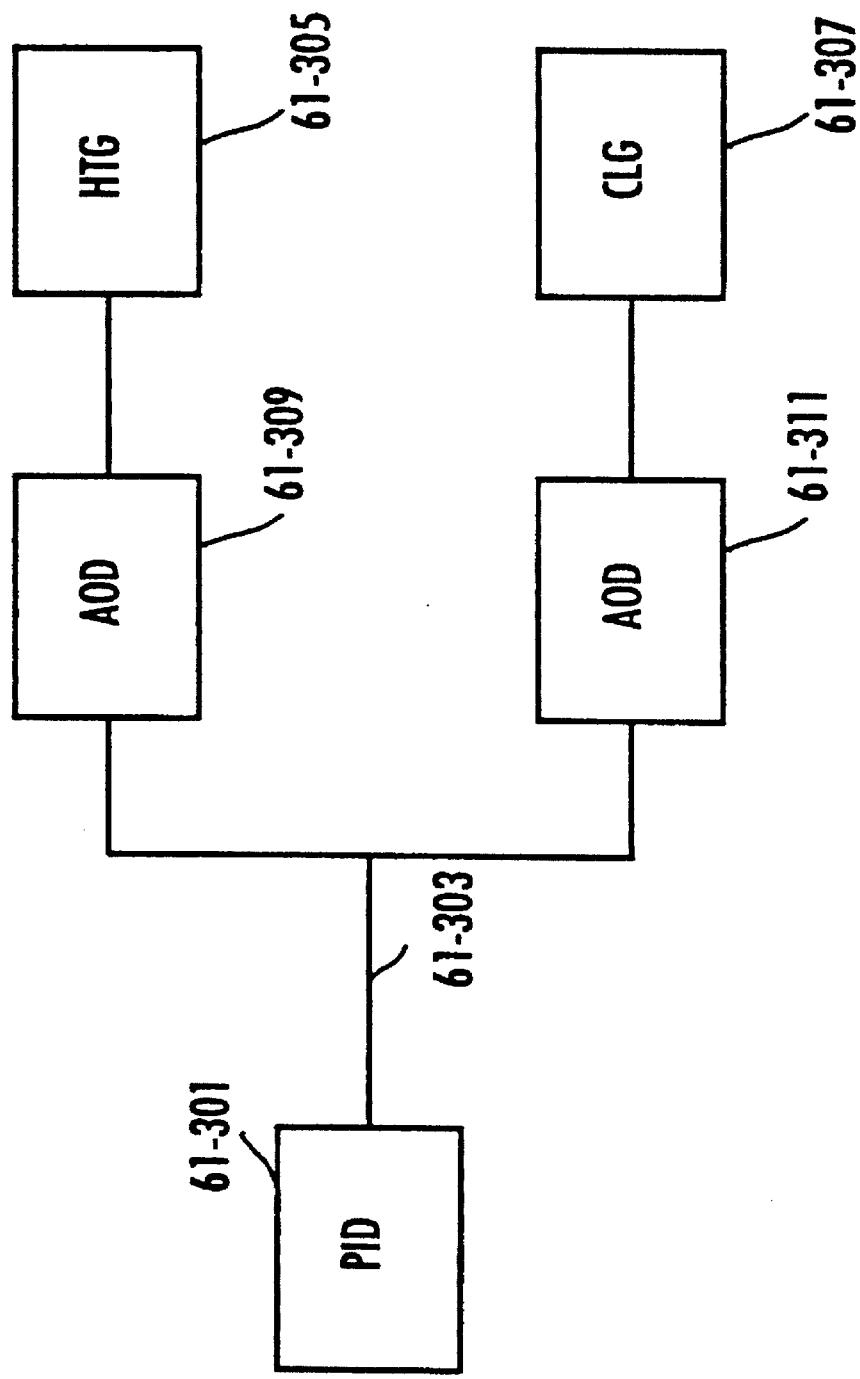
FIG. 61 illustrates the use of analog output objects to allow set point maintenance using multiple devices connected to a single PID controller.

FIG. 61 illustrates an embodiment in which the analog output object allows PID controller 61-301 to operate on multiple physical devices with only one PID output signal 61-303. In this case, assume that a temperature regulation circuit employs both a heating device 61-305 and a cooling device 61-307. A first analog output digital object 61-309 controls the heating device 61-305 by translating PID signals between 50% and 100% of full scale deflection into a 0 to 100% range of the heating device 61-305. A second analog output digital object 61-311 translates 0 to 49% full scale deflection outputs from the PID controller into 0 to 100% full scale operation of the cooling device 61-307. Thus, a single PID control output signal 61-303 from 0 to 100% of its full scale can be used with two or more analog output digital objects to allow the single PID controller output to control the operation of two or more separate individual physical devices, such as a separate heating and cooling 61-307 unit. It should be noted that it may be desirable for ranges to overlap. Thus, heating device 61-305 may be allowed to operate when PID signals are between 0 and 60% and cooling device 61-307 may operated between 40–100% of PID full scale deflection. This results in a 20% range when both units operate.

Figure 62:
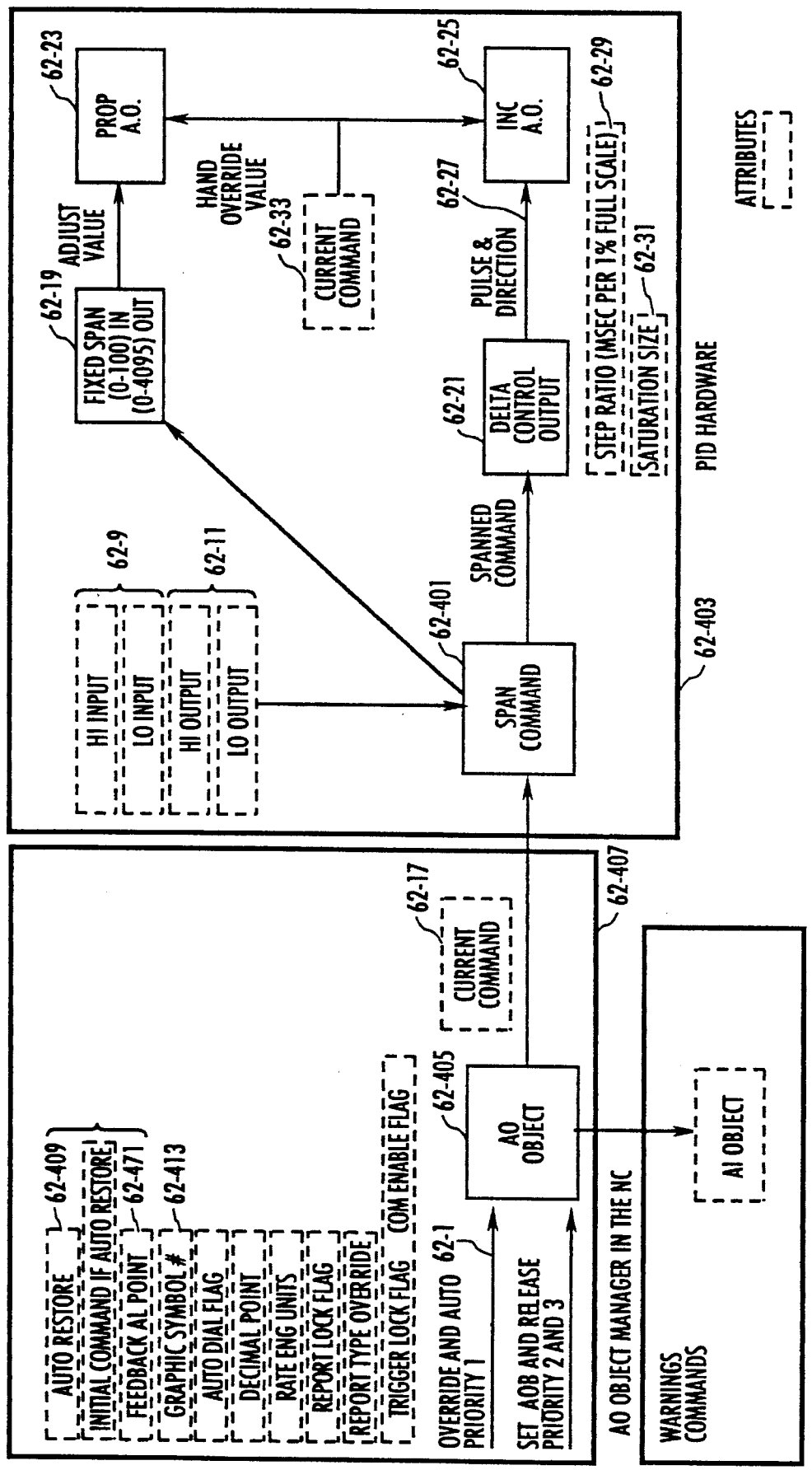
FIG. 62 is an overview of a second type of analog output object.

FIG. 62 illustrates a further embodiment of an analog output object. The embodiment in FIG. 62 shows an analog output setpoint object 63-405 which can be used to operate with devices other than PID controllers. One of the functions of the analog output setpoint object 63-405 is to send commands to a device outside of the FMS system and to verify that the command was acted upon. An example of this object's use would be to send a desired setpoint command as a voltage level to an external controller such as a chiller controller and using the associated analog input object to verify that the external controller has acted upon the command. The primary difference between the analog output setpoint object and the analog output digital object is in the order of the span processing. In the case of an analog output digital object, in PID hardware 62-403 the span command operation 58-7 is done before select command operator 58-13 selects whether the override command 58-15 from the network controller or the spanned command 58-112 should be passed on to a fixed span operator 58-19 or delta control output operator 58-21. In the case of the analog output setpoint object 62-405, PID hardware 62-403 is the same as PID hardware 58-101, except for the absence of select command operator 58-13. In the case of an analog output setpoint object 62-405, the span command processing 62-401 in PID hardware 62-403 is done after select command processing rather than before. In this case select command processing is performed by the analog output object manager 62-405 in network controller 62-407. This is because in analog output digital object processing of PID controller outputs, the span processing receives a percentage of the full scale of the output of the process being controlled. With the analog output digital object, an operator is allowed to input parameters concerning the desired operation of the physical device driven by the analog output object. For example, an operator can identify the desired position of a valve, (e.g., half open or half closed) rather than a parameter of the process. This is allowed because access to the modify current command 62-17 is allowed after the span operation. In the case of the analog output setpoint object, since the PID controller may not be used to issue the commands, all commands may be in terms of the desired position of the physical device, and thus the span command processing 62-401 is moved. It serves the function of allowing some modification of the commands set from the network controller. As a result select command processing is not required in the PID hardware 62-403.

Figure 63:
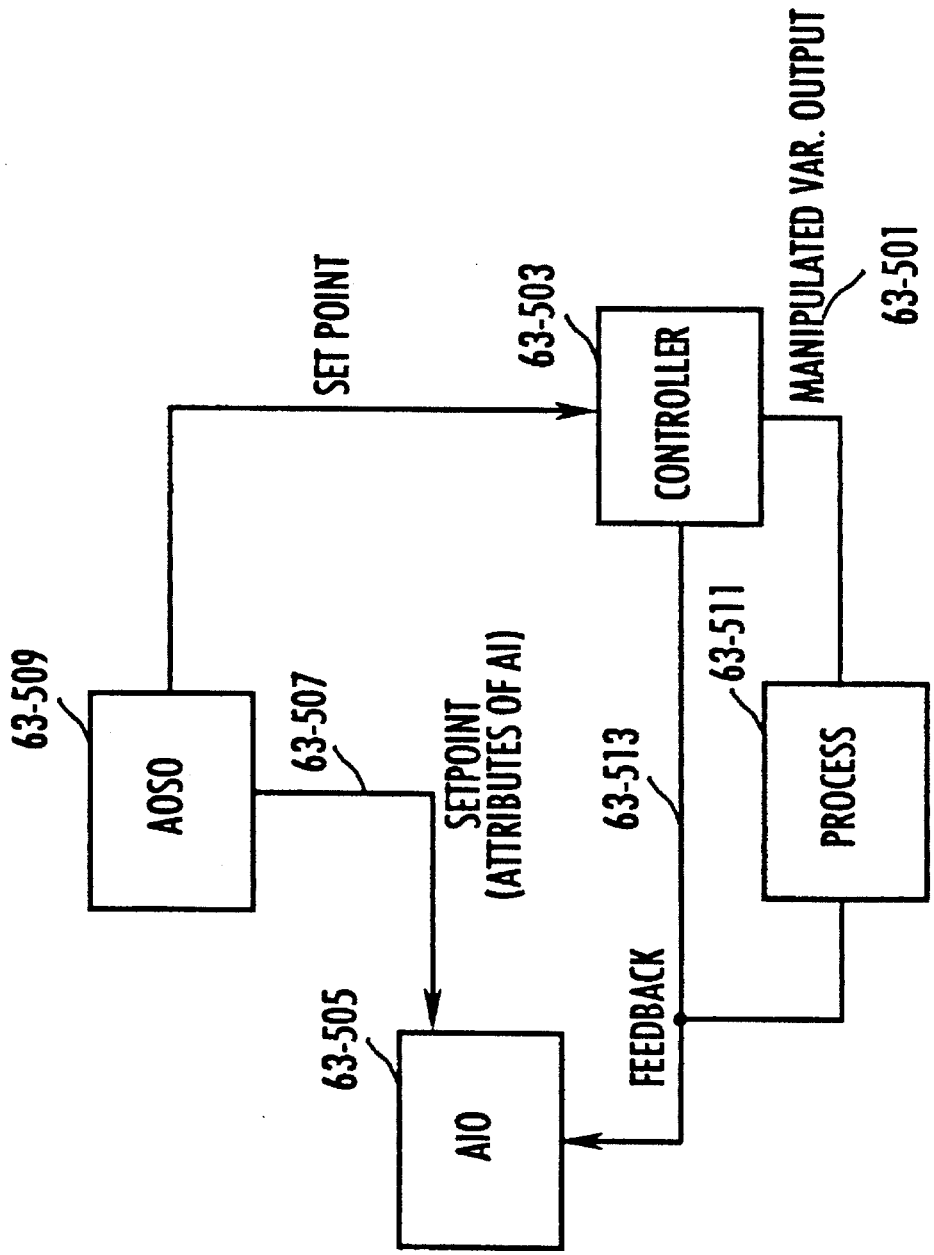
FIG. 63 shows an analog output object used in operation with feedback for alarm analysis.

In FIG. 63, operational feedback for alarm analysis can also be implemented. The manipulated variable output 63-501 of a controller 63-503 is returned as feedback signal 63-513 from process 63-511 not only to the controller 63-503, but also to an analog input object 63-505. The analog input object 63-505 is a software object in a network controller memory whose attributes are used to define input alarm limits and setpoints of the process 63-511 being controlled. The analog input object controller 63-503 also receives the set point information 63-507 from the analog output setpoint object 63-509. This is made possible by basing the analog input object 63-505 on the analog output object current command 58-17 before the span operation. As a result, the set point information 63-507 and the process feedback signal 63-513 are in the same units, facilitating use of the process feedback by the analog input object. Therefore, without further translation, the analog input object can run alarm checks and other methods which are part of its definition as disclosed herein. By sending the setpoint command 63-507 from the analog output setpoint object 63-509 to the setpoint attribute of the analog input object 63-505 and providing the process feedback 63-513 also to the analog input object, the analog input object 63-505 can be used to verify that the external control performed its required function.

Figure 64:
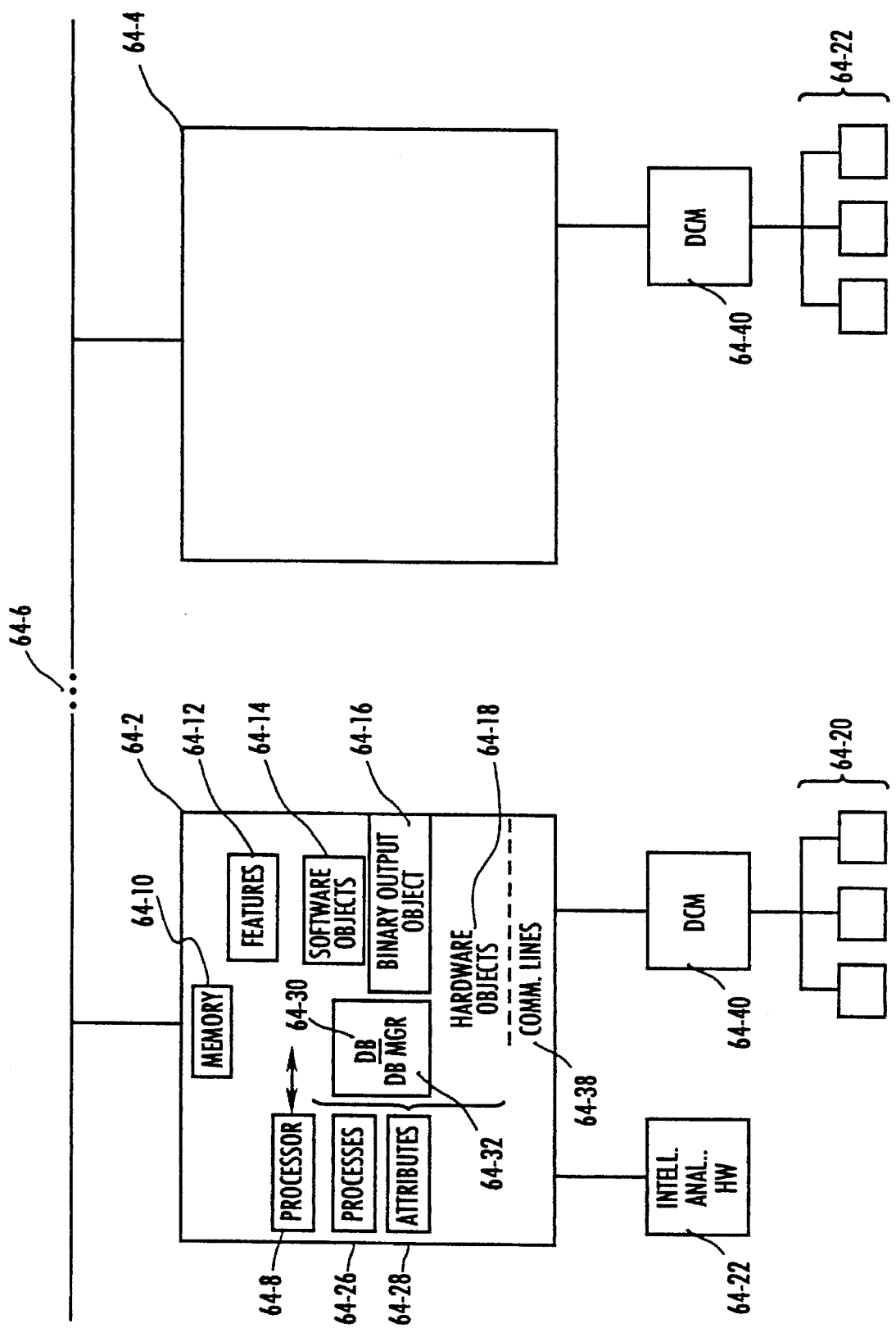
FIG. 64 is an overview of a facilities management system with a binary output object.
Figure 65:
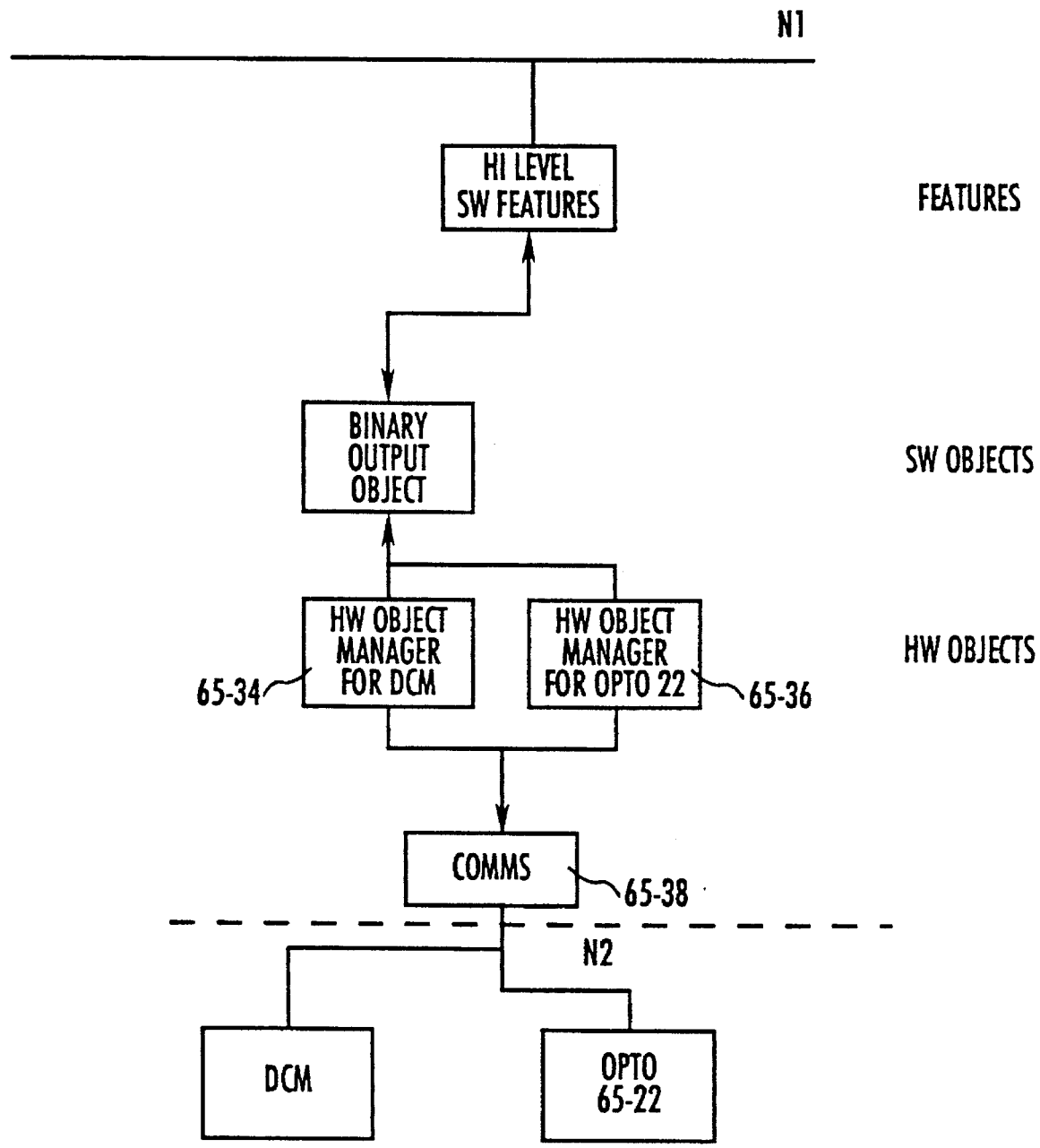
FIG. 65 is an overview of a binary output object in a network controller in a facilities management system.

FIG. 64 shows a facilities management system with network controllers 64-2 and 64-4 connected by high speed bus 64-6. Each network controller has a processor 64-8 and a memory 64-10. The network controllers 64-2, 64-4 use the processing capability and the memory to perform a variety of high level functions required for facilities management using data provided by a variety of input devices.

In addition, the network controllers 64-2, 64-4 command lower level software to cause output devices to perform specified tasks or switch to specified states. The highest level of processing in network controllers 64-2 and 64-4 is the features level 64-12. Features are high-level functions performed by the network controller to carry out predefined tasks. In order to avoid significantly changing the software involved with high-level features level 64-12, it is necessary to provide a common format for information and commands provided by the features to binary output devices 64-20 and 64-22. This is accomplished in a software objects level 64-14 which processes the data provided by the features level 64-12. Each software object contains methods or processes 64-26 and attributes 64-28 which represent the data used by the processes. It should be noted that the processes 64-26 and attributes 64-28 are maintained in a database 64-30 which is controlled by database manager 64-32. One of the software objects is the binary output object 64-16. The binary output object 64-16 communicates with hardware objects 64-18 as shown in FIG. 64. Using a common interface, the binary output 64-16 object transmits and receives data from individual hardware object managers 65-34, 65-36 using a common format. Hardware object managers 65-34 and 65-36 communicate over communication link 65-38 to hardware output devices which have two stable states. One example is a relay which may be energized or not.

Figure 66:
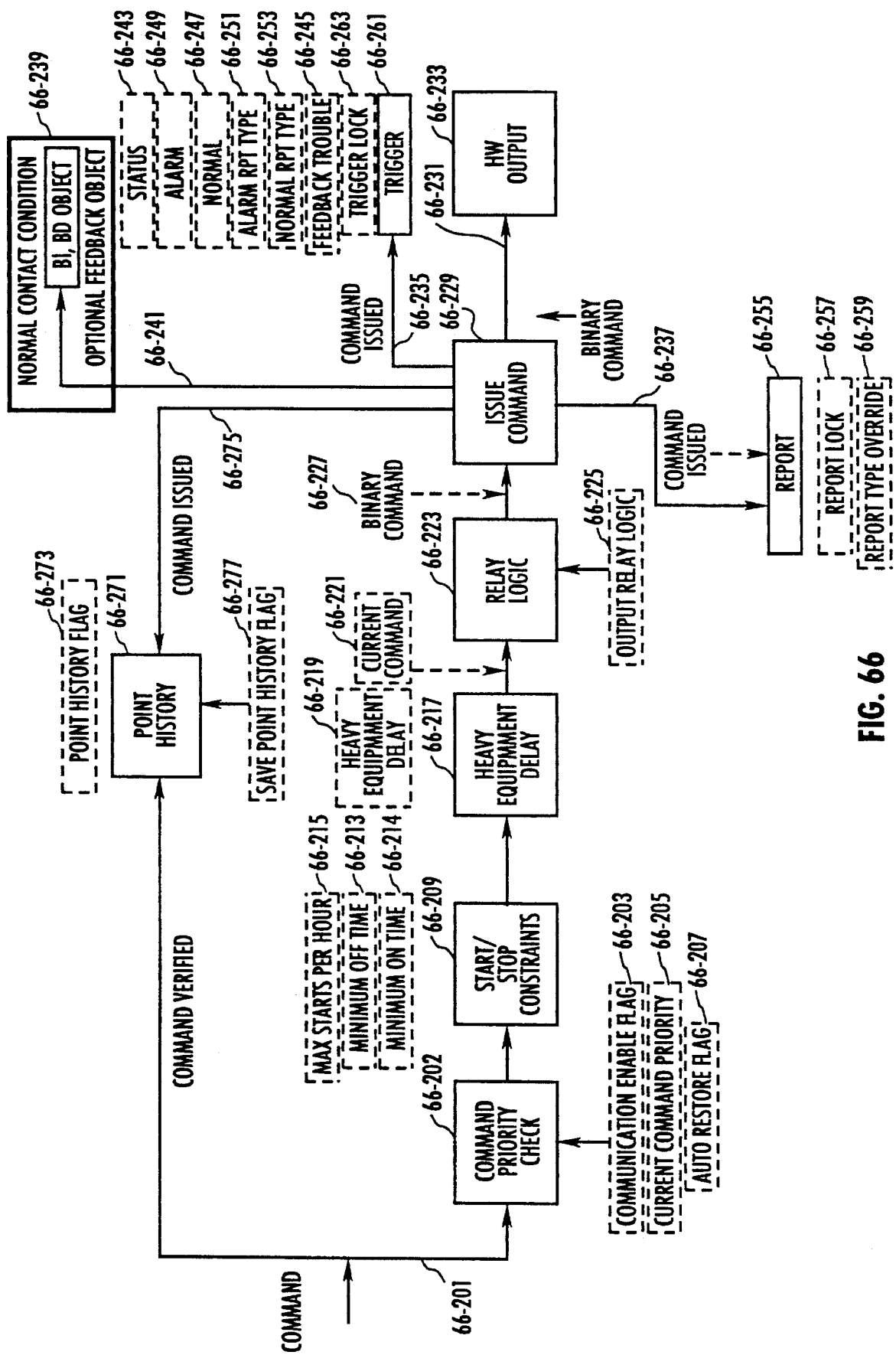
FIG. 66 is an overview of a binary output object.
Figure 67:
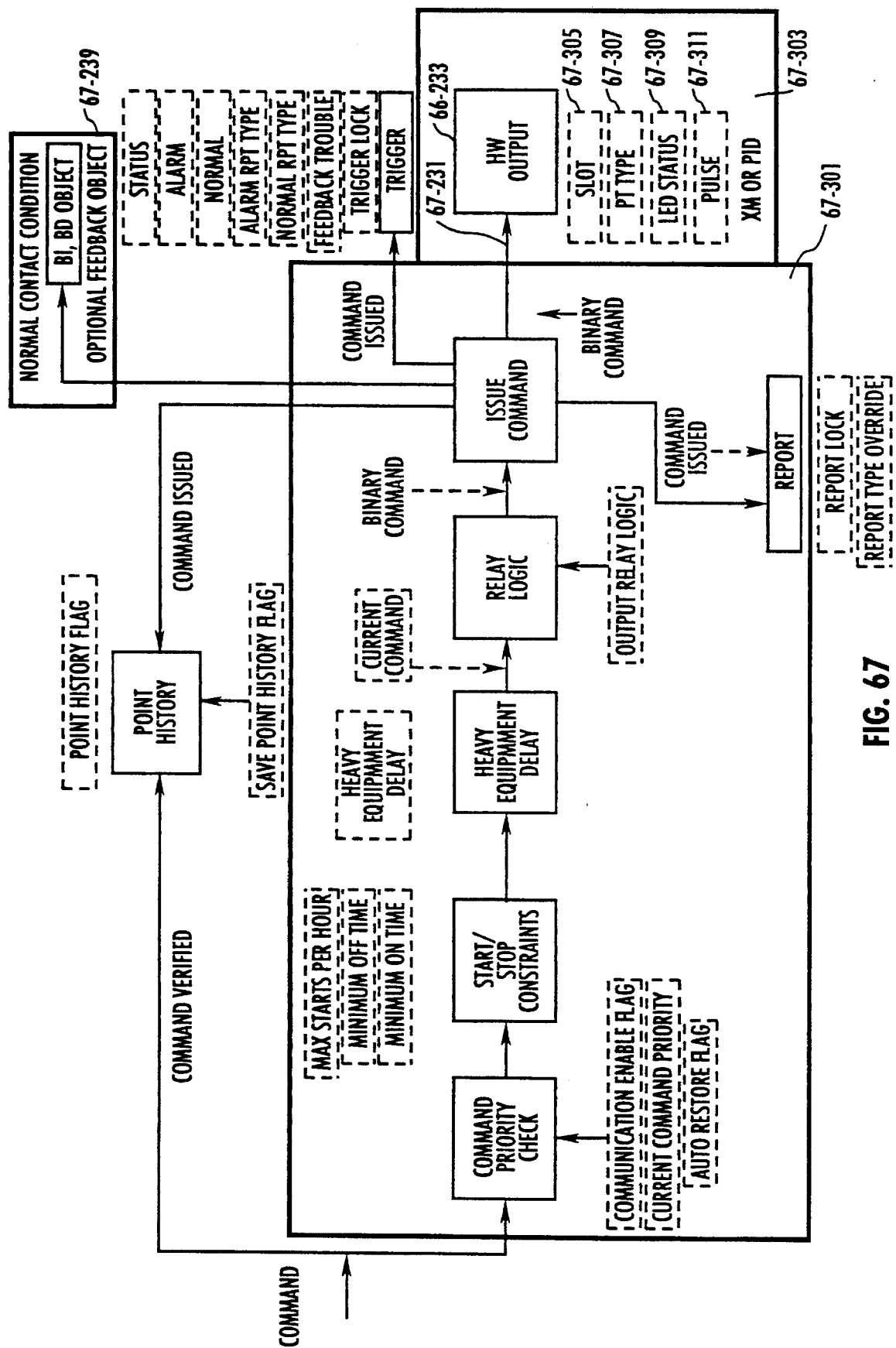
FIG. 67 shows one distribution of functions between a binary output object manager in a network controller and control hardware.

FIG. 66 shows the general model of a binary output object. As previously indicated, the binary output object provides an interface to binary output hardware residing on a variety of hardware devices. As with other software objects according to the invention, the interface to the hardware devices may be through another software level, the hardware objects level which receives information from the software objects in a uniform format. The hardware object level may also provide signals to slave controllers located between the nodes and hardware devices. Commands to the output hardware devices can optionally be run through different constraints to ensure that the command will not damage the equipment. In addition, multiple levels of priority for commands received from a higher level software feature can be implemented. This is done in the command priority check 66-202 which receives commands on signal line 66-201 from the higher level software features. When communication enable flag 66-203 is in an enabled state, commands received on signal line 66-201 in the command priority check module 66-202 are checked for priority against the current command priority stored as shown in block 66-205.

Commands on signal line 66-201 can originate either with a facilities management system operator, as in the case of certain overrides, or with a higher level software feature. For example, in a facilities management system certain demand limiting, time scheduling, and load rolling activities managed by higher level features can issue commands on signal line 66-201 through the binary output object to hardware devices. One possible schedule of priorities in a facilities management system would be to place a manual override in response to a fire at the highest priority and an automatic override in response to a fire at a next level of priority. The next lowest level of priority could involve ordinary override commands followed by lower priority commands to perform such functions as demand limiting, time scheduling and load rolling.

When conflicting requests are present at different priority levels, the highest priority action is determined by the command priority check 66-202 and only the highest priority action is performed. When the highest priority command is released, the next highest priority command takes control. It should be noted that a system may contain multiple binary output objects each maintaining its own priority table for determining which high level software feature has control of the object. Thus, a first binary output object may have a different set of priorities from a second binary output object in the same system.

A binary output object can be used in a feedback arrangement with a binary input object. This allows reducing processing by monitoring the state of the feedback input. All commands issued at priorities 1, 2, or 3 (fire or override) are issued, since the consequences of an incorrect feedback indication could be destruction of the controlled system. However, at other priorities the command need not be issued if the state of the feedback binary input object currently matches the commanded output state. Feedback analysis can be prevented by a previous disable command. In this case, the previous command is checked, rather than the feedback, to determine if a new command should be issued. When no feedback input is defined to a binary output object, the command is issued. Similarly, if the feedback input is defined but is known to be presently unreliable, then the command is also issued. Finally, if restore flag 66-207 has been set by the operator when the binary output object database is generated, the binary output object will be restored to the last commanded condition whenever a network controller 64-2, 64-4 is started or when the binary output object comes on line after a communications failure or a reboot of the local database. Thus, the last command to the object is automatically reissued if:

1. The last commanded condition does not match the current feedback status, assuming feedback is assigned.
2. No feedback was assigned.
3. Feedback assigned is presently unreliable.

When restoring a facilities management system, the auto-restore operation could also prevent commands from being issued until after all regularly time scheduled commands have been updated. Start/Stop constraints block 66-209 operates to prevent commands from being issued under certain circumstances. High priority commands, commands at priorities 1, 2, or 3, would not be checked against start/stop constraints in block 66-209, for the reasons discussed above. However, all other commands must comply with the minimum on and off times stored in blocks 66-214 and 66-213 and the maximum number of starts per hour stored in block 66-215. Processing in start/stop constraints block 66-209 checks the command against these parameters to avoid short cycle on/off commands. The minimum on time is a value in seconds which may be defined by the operator to identify how long the object must remain in force before a stop command is allowed. Similarly, the minimum off time defines how long the object must remain off before a start command is allowed. The maximum number of starts per hour 66-215 is defined by the operator to specify how many starts are allowed for a particular binary output object in a given hour. The number of starts is reset each hour on the hour using a time of day indication provided by the network controller 64-2. Any time a start command is requested, the number of starts in the past hour is checked against the number allowed. If the limit has already been reached, the request is queued and the command is not issued until the constraint is removed. Commands are kept in a command priority table for possible issuance after the constraints have expired. When the constraint is removed, the command priority table is checked to determine the highest priority command to be issued.

After start/stop constraint processing 66-209, heavy equipment delay processing 66-217 takes place if the binary object has been defined as a heavy equipment object. Following the start of a heavy equipment object in a given network controller, no other start command to a heavy equipment object in the same network controller would be allowed until the specified delay period has expired. The operator can specify a heavy equipment delay 66-219 anywhere from 0 to 255 seconds. Heavy equipment delays only apply to the network controller that the output object is defined on. Thus, there is no attempt to coordinate the start of heavy equipment objects on a first network controller 64-2 to those on another network controller 64-4. The heavy equipment delay helps prevent damaging surge currents caused by the simultaneous starting of multiple inductive loads.

Before a binary command can be issued, it must be converted to the representation understood by the particular hardware device the object controls. Thus current command 66-221, which is in the form of a start/stop command, is related to relay processing block 66-223. Relay processing blocks 66-223 relies on data stored as output relay logic 66-225 to determine if a start command opens or closes relay contacts. For example, for certain hardware devices the start command may close relay contacts, while for other hardware devices the start command may open relay contacts. This information is stored in output relay logic 66-225 and the translation is made in relay logic processing 66-223 to generate binary command 66-227.

In addition, two types of output configurations can be supported. These are defined during database generation. The first is a momentary output, also called a motor start/stop. This output consists of two separately controlled relays with the (A) side configured as a form C type and the (B) side configured as a form C type. The (A) and (B) sides refer to which of two possible outputs are activated. One of the parameters defined for an output of this type is a pulse duration in milliseconds. During database generation this can be fixed in multiples of 20 or 12 milliseconds based on the hardware type. Relay processing block 66-223 defaults to energize (A) side for a defined pulse duration and then de-energize the (A) side in the start condition. In the stop condition relay logic 66-223 energizes the (B) side for a defined pulse duration and de-energizes the (B) side. By changing the hardware output orientation, this can be reversed. A stop command received during the defined pulse generation energizing the other side of the output device, will be stored and not acted upon until completion of the previous command.

A second output type works strictly on the (A) relay side which is a form C relay. This is the maintained output in which the default hardware orientation is such that a start command energizes the (A) side and a stop command de-energizes the (A) side. This of course can also be reversed. Based on the above, the issue command processing block 66-229 generates start and stop binary commands on signal line 66-231 to hardware output 66-233. Issue command processing 66-229 also generates command issued information on signal lines 66-235 and 66-237. The command issued information includes the binary command and time information which is used in alarm analysis and reporting in a binary input object receiving feedback signals from the binary output object.

As previously discussed, a binary output object and a binary input object can operate together in a feedback configuration. During database generation of the binary output object, an optional binary input object 66-239 can be assigned as feedback. Alarm processing is not done in the binary output object but instead is done at the corresponding feedback binary input object 66-239. However, alarm status signals are routed to the binary output. Issue command processing 66-229 sends commands on signal line 66-241 to set the normal contact condition of the associated feedback object to a value. This results in alarm analysis processing as described herein.

The processing results are reported to the binary output object and become the status 66-243 of the binary output object. Status is defined as reliable and unreliable. In the case of a feedback object 66-239, if the normal contact condition cannot be modified, the status of the binary output object is unreliable. Feedback trouble attribute 66-245 then signals that the feedback object 66-239 is not operational from the binary output object point of view. Once the binary output object shows the feedback object 66-239 is unreliable, it remains that way until the binary input object 66-239 becomes reliable and issues a corresponding report.

The binary output object status 66-243 when feedback is not assigned is always normal and no reports are generated. However, when feedback is assigned, the binary output object status 66-243 can be either normal 66-247 or alarm 66-249. During database generation, the user may define report types as critical 1-4, maintenance, status or none for alarm and normal report condition types 66-251 and 66-253. If no report type is specified for a condition, the object does not report that condition. It should be noted that a binary input object also generates similar reports and that, unless its report types are set to "no report", duplicate reports of the same condition can occur in a feedback system. The command issued information on signal line 66-237 reports any change of state in the binary output to report router block 66-255, which performs processing to report the information to appropriate display and other devices in the system. If report lock 66-257 is set, the binary output object processing in report router 66-255 prevents any further information reporting. However, the binary output object itself remains able to accept commands.

Command issued information on signal line 66-235 is routed to trigger processing 66-261. Trigger processing reports triggers to certain higher level software features which request it. For example, a higher level software feature may request a trigger when the binary output object issues a start command, so that the higher level software feature may begin executing certain other steps particular to its function. If trigger lock 66-263 indicates a lock condition, trigger processing 66-261 will prevent trigger reporting. Point history processing 66-271 samples, displays and archives certain attributes associated with the binary output object. The samples are stored in a point history file for each object. Point history flag 66-273 enables point history processing based on command issued data provided on signal line 66-275. When selected, save point flag 66-277 stores the historical information on an archive file on a peripheral device. When not selected, the information is only stored at the network controller 64-2.

A hand/off/auto (HOA) switch can also be implemented. Such a switch allows a user to manually turn the output on or off. Hardware output 66-233 detects if the switch is in the auto condition and reports this back to the binary output object. Any change from the auto position will be reported to the operator indicating that the object has been overridden. In the auto position, the binary output object manager, which controls the operation of the binary output object, executes commands as described above. In the hand/off position the most recent command is remembered and executed when the switch is placed back in the auto position. Intermediate commands are not executed.

In operation, an operator configures a binary output object based on the hardware output to be controlled. The binary output object resides in a network controller 64-2, 64-4 and is operated by a binary output object manager 67-301. Binary output object manager 67-301 directs the processing to cause binary commands 67-231 to be routed to a hardware output device 67-233 which is part of a proportional plus integral plus derivative (PID) controller or other such extension module 67-303. An operator using a network terminal or some other device for communicating with the binary output software object enters the software object name and the name of the hardware object which the binary output software object will map to. The user then selects such parameters as report types, point history, auto-restore flags heavy equipment delays, start/stop constraints, the name of an optional feedback object 67-239 and hardware dependent fields.

Hardware dependent fields selected by the operator include slot: 67-305, which is an integer number defining which of several possible output modules this particular binary output object maps to; point type 67-307, which identifies if a hardware output is a maintained relay or a latched; LED status 67-309, which identifies whether the LED will be on when the relay is open or closed; and a pulse duration 67-311, which is used when point type 67-307 indicates a latched relay. The value in pulse duration 67-311 represents the length of time in milliseconds the output will be pulsed for commands. The entered value must be divisible by 20. These parameters define a PID or digital control module (DCM) controller. Other types of hardware dependent fields are also possible. For example, point type 67-307 could have a value between 1 and 3 depending on whether the hardware output is one stage, two stages, or three stages. This places certain constraints on the slot number 67-305. If the hardware is a two or three stage type, both the selected slot +1 or the selected slot +1 and +2 must be available, respectively. While the LED status remains the same, the pulse duration in this case must be between 1 and 255 milliseconds and divisible by twelve.

Figure 68:
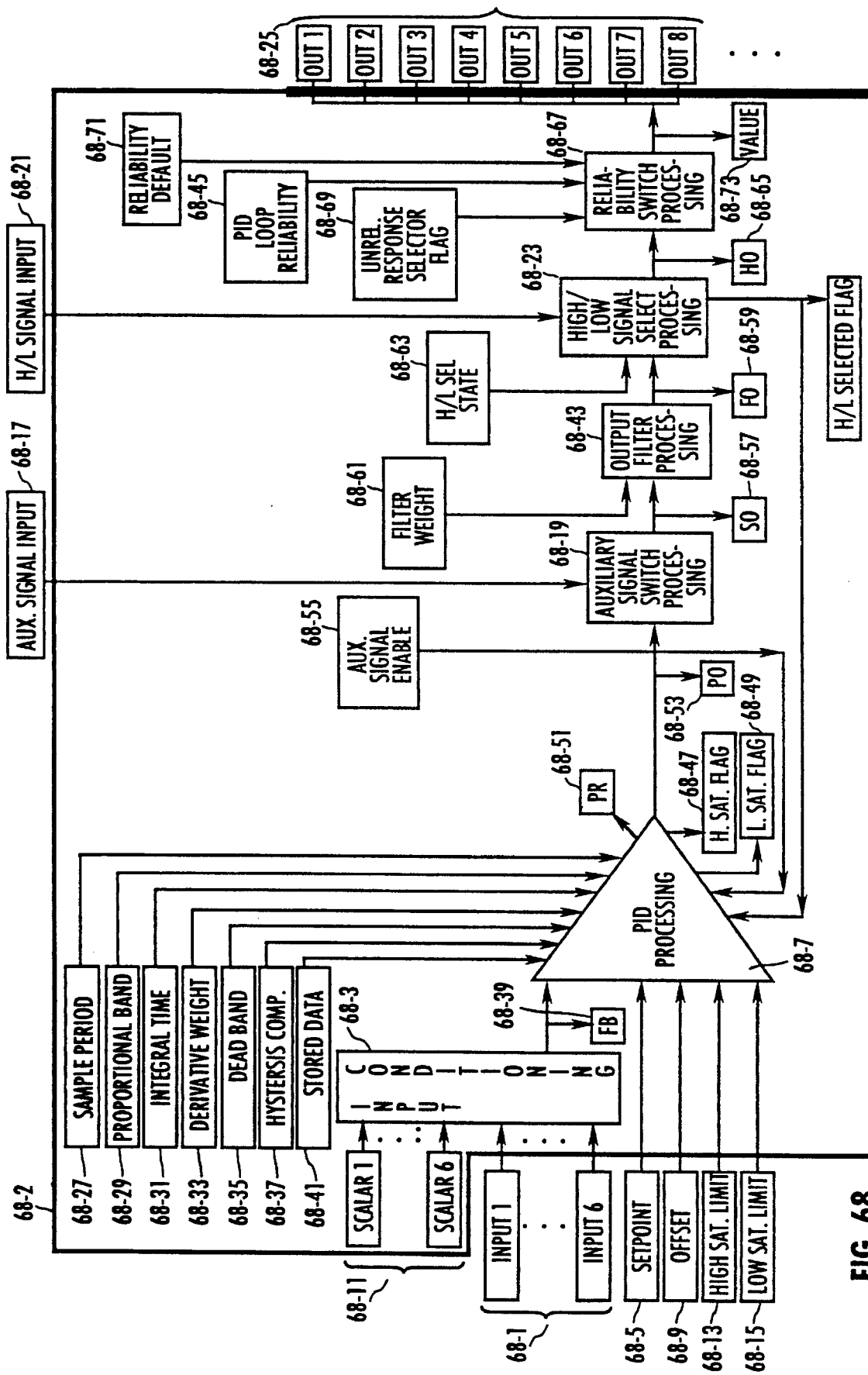
FIG. 68 illustrates processing of a PID Loop Object.

According to another aspect of the invention, FIG. 68 shows a proportional plus integral plus derivative (PID) loop object. The PID loop object is implemented in software at the software object level, as discussed previously. Thus, the PID loop object has a database manager which manages processes and attributes stored in a storage means of a node or network controller, as do other software objects. Within the facilities management system, according to the invention, tasks for processing PID loops are divided among a PID data base manager task and 16 PID loop execution tasks. Thus, a PID controller may control up to 16 instances of the PID loop.

Figure 69:
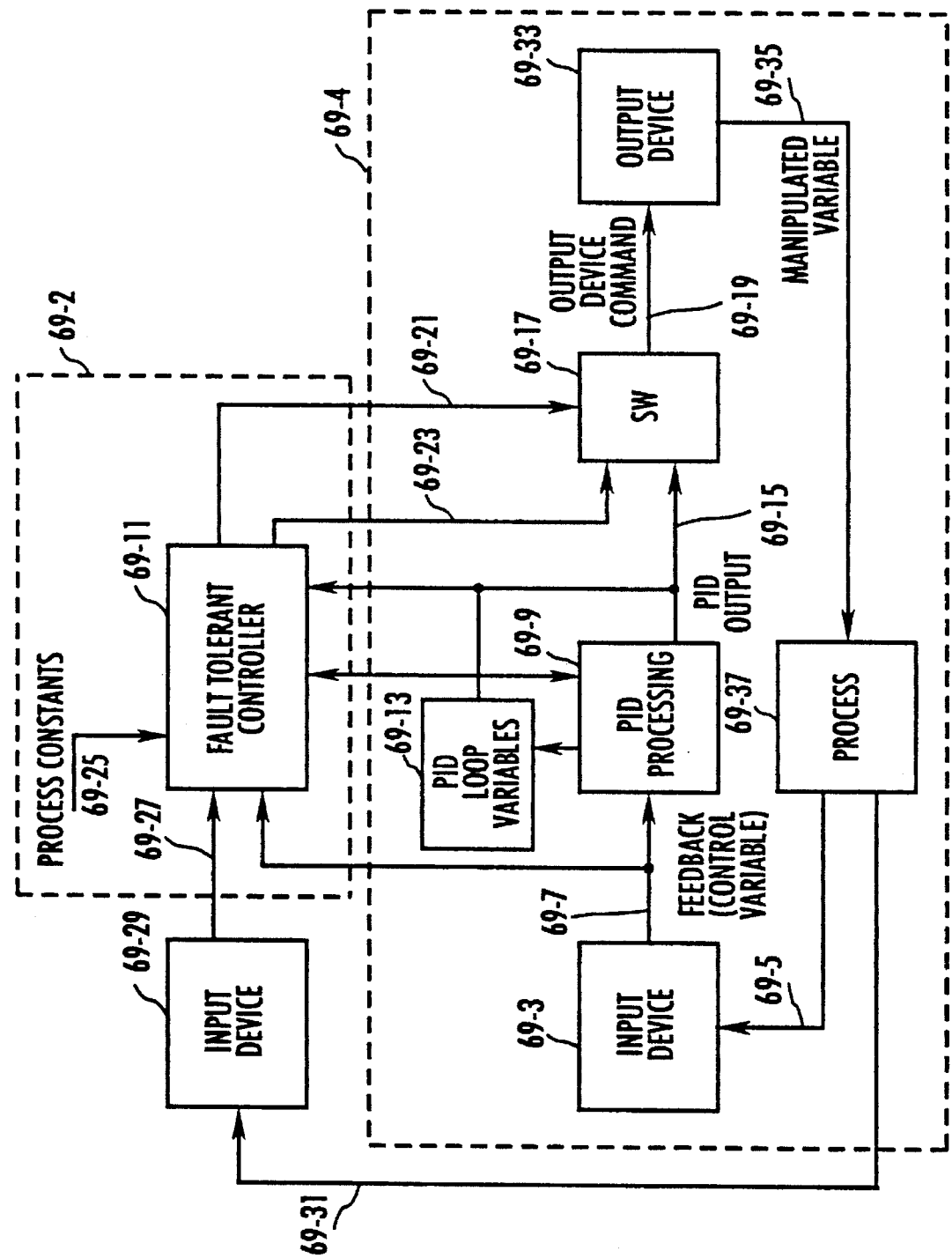
FIG. 69 shows a typical HVAC control system with a fault tolerant control strategy implementation.

FIG. 69 shows a control loop with PID processing. The PID data base manager first provides an interface to other tasks in the network which may read data, e.g. 69-5, from a PID loop, write to a PID loop, or command a PID loop. The second PID data base manager task is to schedule processing of each of the 16 instances of PID loops. The third responsibility of the PID data base manager is to execute an auxiliary signal switch processing, output filter processing, high/low signal select processing and reliability switch processing in accordance with the inputs to these processing functions.

AS shown in FIG. 68, a PID loop object has six inputs 68-1 which are used by an input conditioning process 68-3 to calculate a feedback value for the PID loop. Each of six inputs 68-1 may be floating point values such as analog parameters or references to attributes of other objects, as previously discussed relative to pseudo points. The references to attributes of other objects must be objects in the same physical digital control module (DCM) functioning as a PID controller. As an analog value, the input value or the value on other parts that accommodate analog values may change as a result of a command from a network controller.

As previously discussed, if a port refers to an attribute of another object, the value of the attribute is obtained each time the corresponding processing is executed. This is achieved by sending a read attribute message to the specified object transmitting the message between tasks within the digital control module functioning as the network controller rather than over the N2 bus. It is also possible for ports to be individually overridden in which case, the override value is used as the value of the port until a command to release the override is received. If a port is an analog value, the last value commanded by the network controller is remembered and acted upon when the command to release is received. Only the network controller initiates and releases overrides.

The setpoint input 68-5 may also be a floating point value or a reference to an attribute of another object, as previously discussed. The setpoint value 68-5 is the desired value of the feedback value and it is used in PID processing 68-7.

Offset value 68-9 may be a floating point value or a reference to an attribute of another object. The offset value 68-9 performs two functions. If input conditioning processing 68-3 determines that all 6 scalers 68-11 are 0, then PID processing 68-7 is disabled and offset value 68-9 is used as the output of PID processing 68-7. If any of the 6 scalers 68-11 is not 0, offset value 68-9 is added to the output value calculated by PID processing 68-7. The offset 68-9 may be used to introduce other control actions to the PID processing where it may be used to indicate the first output command the PID processing issues on start-up.

High saturation limit 68-13 may be a floating point value or a reference to an attribute of another object. High saturation limit 68-13 is an input directly to PID processing 68-7. PID processing is prevented from issuing a command to the PID output above this high saturation limit 68-13. Low saturation limit 68-15 may also be a floating point value or a reference to an attribute of another object. A saturation limit 68-15 is provided directly to PID processing 68-7 and establishes a lower limit below which PID processing 68-7 will not issue a command to the PID output.

Auxiliary signal input 68-17 may be a floating point value or a reference to an attribute of another object. The auxiliary signal input 68-17 is an alternate input that may be passed on to the output of auxiliary signal input processing 68-19 discussed below. High/low signal input 68-21 may be a floating point value or a reference to an output of an another object in the digital control module functioning as a PID controller and is an alternate input that may be selected for passing on by high/low select signal processing 68-23.

The 8 outputs 68-25 are used to adjust manipulated variables, e.g., of a controlled process to desired states so that the setpoint and feedback variables are equal. The outputs refer to any attribute of any object in the same physical PID controller. The command from the PID loop is routed to each of the objects defined in these references. The PID processing also uses this information to determine if the object specified by this reference has been overridden by some other task.

Certain parameters are analog values and cannot be overridden. The six scalers 68-11 are each floating point values to represent coefficients for each of the corresponding six inputs 68-11 to input conditioning processing 68-3. Sample period 68-27 has a range of 1–32767 seconds and determines how often the PID processing 68-7 is executed for a PID loop. Proportional band 68-29 is a floating point value which sets the sensitivity of the PID processing 68-7 to the difference between the feedback value and the setpoint value (the error). The magnitude of the error causes a swing in output value. A positive value indicates a reverse acting control while a negative value indicates direct acting control. Of course, these controls could be reversed without violating the spirit of the invention.

Integral time 68-31 is a floating point value which provides the PID processing sensitivity to the integral of the error. This is the time it takes the integral term to equal the proportional term given a constant error. Setting this value to 0.0 removes the integral action from the PID control processing. Derivative weight 68-33 also is a floating point value and gives the PID processing sensitivity to the rate of change of the feedback value. This term in conjunction with the integral time and the proportional band determine the amount of the derivative control provided. Setting this value to 0.0 removes derivative action from the PID control processing. Dead band parameter 68-35 is a floating point value which is compared to the absolute value of the difference between the set point and the input conditioned feedback. If this dead band value 68-35 is not exceeded, no error change is considered by the PID processing 68-7. Hysteresis compensation bias 68-37 ranges from 0.0 to 100.0 and represents the amount of hysteresis encountered between the output point and the feedback point. This proportional value is used to compensate for process hysteresis.

Feedback value 68-39 is calculated by input conditioning processing 68-3 and is a floating point value. PID processing 68-7 attempts to make feedback value 68-39 equal the setpoint value 68-5. The stored data 68-41 includes information from previously iterations of the PID processing 68-7. In the first pass to PID processing 68-7, these values are set to 0.0, except for the previous direction value which is initialized to 1.0. The historical data includes the previous feedback value applied for derivative control, the previous integral term supplied for integral action and bumpless transfer, the previous hysteresis compensation bias for hysteresis removal, the previous output value for hysteresis removal, and the previous direction of output values for hysteresis removal. The previous direction of output values is set equal to one for increasing values and equal to minus one for decreasing values.

The processing of PID loops is divided among a data base manager task and 16 PID loop execution tasks. As such, the PID controller digital control module may control up to 16 instances of PID loops. The PID database manager task has 3 primary responsibilities. First, to provide an interface to other tasks or objects in the PID controller or node which may want to read data from PID loop, write data to a PID loop, or command a PID loop. The second task of the PID database manager is to schedule processing upon each of the 16 instances of the PID loop. The third responsibility is execution of subsidiary processing which may include auxiliary signal switch processing 68-19, output filter processing 68-43, high/low signal select processing 68-23, and reliability switch processing 68-67.

In order to perform these tasks, the PID database manager can react to two types of write record messages. The first is the ADD LOOP message which adds a PID loop to the database. It also causes the configuration information for that loop to be written to an EEPROM so that the loop will be automatically added once power is returned after a power failure. The second type of write record message is the DELETE LOOP message. This causes execution of the PID loop to cease and the definition of the loop to be disabled. It also causes the object connected to the output of the loop to be notified that the loop is no longer defined.

The PID database manager also accommodates two types of read record messages. The READ CONFIGURATION reads record message and causes the current working definition for the given PID loop to be formatted and sent back through the N2 bus to the network controller. The other read record message is READ CURRENT STATE. This causes information on the current state of the PID loop along with values used during the last iteration of the processing to be sent via the N2 communication bus to the network controller.

START UP causes a PID processing 68-7 to react as if it had just been added. All historical data for the processing is reinitialized. The first output from the PID processing will then be based on the current offset 68-9 and the correction due to the current proportional control.

A write attribute causes the specified attribute of the given PID loop to be set to the value in the message. This causes the output of the PID loop to change as a result. A read attribute causes the current value of the attribute to be returned to the requestor. If the attribute is override, the override value is returned. If the attribute is a reference to an attribute of another object, the read attribute message is redirected to the destination object.

Where valid, an override attribute causes the value in the message to take precedence over the normal value the input would receive until a release attribute message is received for that attribute. A release override attribute causes the effect of the override attribute message to be removed.

The PID database manager also causes reporting of change of states. Such change of state reported include changing of a PID loop reliability flag 68-45, changing of a high saturation flag 68-47, changing of a low saturation flag 68-49, and changing of a PID processing reliability flag 68-51. These flags are discussed below.

The primary function of the PID loop database manager is to provide scheduling. The PID loop data base manager continuously monitors the amount of time that has elapsed since the last time the PID loop was processed. When the sample period amount of time 68-27 has elapsed, the PID database manager task collects the current state of the ports used by the PID processing 68-7. To collect the current state of the ports used by PID processing 68-7, the PID data basemanager determines if the port is in an override condition or is defined as an analog value or a reference. As previously discussed, if an override, the override value is used as the value of the port. If the port is an analog value, its value is used, and if the port is a reference, a read attribute message is sent to the object specified and the value returned is used as the value of the port. The PID database manager checks the reliability of the data and the response and flags the port as reliable if the data received is determined to set that category.

It should be noted that the PID database manager executes a priority scheme to allow each PID loop to be processed every sample period within 15% of its sample period. This is done through a series of PID executive tasks which are each given a different priority. When the definition for a PID loop is added to a PID controller, the PID database manager determines which PID executive task will provide the execution for that PID loop based on the sample period of the PID loop. PID loops with shorter sample periods are assigned higher priority PID executive tasks. PID loops with longer sample periods are assigned to tasks with lower priorities. When a PID loop is deleted from the PID controller, the PID database manager task rearranges the association between PID loops and PID executive tasks according to the sample periods. When the sample period of a loop is changed, the priority of the loops is rearranged.

After collecting the current state the PID executive task also provides any historical data needed. The PID database manager then begins executing input conditioning processing 68-3. Input conditioning processing 68-3 provides for input summation, difference, averaging and various other accumulative functions or for the instantaneous maximum or minimum of the given inputs. The accumulative function, chosen by setting the input function attribute 68-1 to 1, is as follows:

$$\text{Feedback value} = \left( \sum_{n=1}^{6} \text{scalar}(n) * \text{input value}(n) \right)$$

It should be noted that if the input is a reference to an object of another attribute and is null, then no point has been specified and a scaler of zero is used. If the scalar is zero then the input is ignored.

The minimum function, chosen by setting the input function attribute 68-1 to 2, is as follows:

minimum of
    scalar (1)*input value (1)
or,
    scalar (2)*input value (2)
or,
    scalar (3)*input value (3)
or,
    scalar (4)*input value (4)
or,
    scalar (5)*input value (5)
or,
    scalar (6)*input value (6)

The maximum function, chosen by setting the input function attribute 68-1 to 3 is as follows:

maximum of
    scalar (1)*input value (1)
or,
    scalar (2)*input value (2)
or,
    scalar (3)*input value (3)
or,
    scalar (4)*input value (4)
or,
    scalar (5)*input value (5)
or,
    scalar (6)*input value (6)

The 16 PID execution tasks are identical and differ only in their priorities as discussed above. Upon each iteration of the PID processing 68-7, the PID database manager sends one of the PID executive tasks all the needed data to perform the processing for one of the instances of the PID loop. Upon completion of the PID processing, the PID executive task sends the calculated output 68-53 along with all the updated intermediate results to the PID database manager task. It should be noted that no data about a PID loop is stored between iterations.

PID processing in general is as follows:

$E(t) = (\text{setpoint }(t) - \text{feedback }(t))$ $P\text{term}(t) = 100 * E(t)/P\text{band}$ $I\text{term}(t) = ((T/I\text{time}) * P\text{term}(t)) + (1 - T/I\text{time}) + I\text{term}(t-1)$ $D\text{term}(t) = D\text{weight} * (I\text{time}/T) * (100/P\text{band}) * \text{feedback}(t-1) - (\text{feedback}(t))$ $\text{OUT}(t) = P\text{term}(t) + I\text{term}(t-1) + D\text{term}(t) + \text{Offset}(t) + \text{Hysteresis compensation}(t)$ Where:

| | |
|---|---|
| F (t) = | The value at time t |
| F (t−1) = | The value at the previous iteration |
| E (t) = | The error at time t |
| Pterm (t) = | The proportional control contribution at time t |
| Iterm (t) = | The integral control contribution at time t |
| T = | The sample period |
| Dterm (t) = | The derivative control contribution at time t |
| Setpoint (t) = | The set point at time t |
| Feedback (t) = | The feedback value at time t |
| Pband = | the proportional term coefficient |
| Itime = | The integral time coefficient |
| Dweight = | The derivative term coefficients |
| Offset (t) = | An externally controlled compensation term |
| Hysteresis compensation (t) = | The action needed to compensate for hysteresis in the system |

Whenever the output command from PID processing 68-7 changes direction of travel (that is when the derivative of PID processing output 68-53 changes sign) PID processing 68-7 may be configured to compensate for any hysteresis that occurs in the process between the output of the PID controller and the associated input. This is done by adding (or subtracting) the hysteresis compensation value 68-35 to the output 68-53 of PID processing as the direction of travel is increasing (or decreasing).

Bumpless transfer describes the reaction of PID processing 68-7 as control is transferred from one control method such as human control or another PID loop, to PID processing 68-7 of this loop. The control reaction is predictable, and is based on a difference between the feedback and set point as well as the previous command sent to the output just before control was transferred to PID processing 68-7.

Whenever the auxiliary signal switch enable attribute is set, or all the outputs that might receive the command from PID processing are overridden, PID processing 68-7 goes into a tracking mode. In the tracking mode, PID processing 68-7 prepares for bumpless transfer by continuing to calculate Pterm(t). When one of the outputs is released from the override condition, or the auxiliary signal switch enable attribute is reset, the PID executive task obtains the value the output was commanded to and uses it along with Pterm(t) from the previous iteration to perform the bumpless transfer. In the case of an override due to Hand/Off/Auto switch being in the Hand or Off position, this last commanded value is available. Therefore, bumpless transfer is not provided once the switch is returned to the Auto position.

The High and Low Saturation Limit inputs 68-13 and 68-15, typically specified in percent full scale deflection of the output, specify the boundaries which the command to the output of PID processing must stay within.

PID processing 68-7 provides the facility of determining and annunciating when PID processing has become saturated, that is PID processing can not command the output to reach setpoint. PID processing is determined to be saturated when the command for the output for 40 consecutive iterations has been within 1% of the High Saturation Limit value 68-13, or the output for 40 consecutive iterations has been within 1% of the Low Saturation Limit value 68-15.

Once PID processing has been determined to be saturated, either the High Saturation Flag 68-47 or the Low Saturation Flag 68-49 is set accordingly to annunciate the fact. This in turn causes the PID database task to issue a change of state message so that functions in the network controller (NC) may act accordingly. These flags are reset once the Auxiliary Signal Enable flag 68-55 is set, or all the outputs are placed in an override condition. Saturation recovery is also provided by PID processing 68-7. The processing is designed so that the integral action does not "windup" once the processing attempts to command the output beyond the values specified for the High and Low Saturation Limits 68-13, 68-15.

After executing PID processing 68-7, the PID executive task sends a message back to the PID database manager task containing the new value for the PID Output Value attribute 68-53, along with all the updated intermediate results needed for the next iteration of PID processing for this PID.

The PIDEXEC task may then call other specialized processing. This call may suspend the other ongoing processing or it may provide data on the current iterations of the PID processing.

A call to suspend specialized processing is sent when a process loop is determined to be unstable, or when it has been determined PID processing 68-7 does not have control of the outputs of the PID loop as discussed below relative to fault tolerant processing. This condition is indicated when the PID loop is determined to be unreliable, the PID processing is in the tracking mode, or the auxiliary signal switch processing 68-19 is commanded by the auxiliary signal switch enable attribute 68-55 to pass the Auxiliary signal input 68-17 to output 68-57, or High/Low Signal Select processing 68-23 has selected the High/Low Signal input 68-21.

If none of the aforementioned conditions exist, then the appropriate data on the current iteration of the PID algorithm is sent in calls for further processing.

It is also possible to by-pass PID processing to insert a signal in place of the signal 68-53 which normally comes from the output of PID processing 68-7. If all 6 scalers 68-11 are 0, PID processing 68-7 is by-passed and the value of offset 68-9 is used as the PID output value attribute 68-53.

PID loop object 68-2 further provides that the output of PID loops can be effected according to the status of auxiliary signal switch processing 68-19, output filter processing 68-43 and high/low signal select processing 68-23. This occurs when the PID database manager task receives a write attribute message that changes the input of one of these algorithms or the PID executive task for the PID loop has finished execution and has sent a message to the PID database manager checking in the changes it has made to the configuration of the PID loop. The auxiliary signal switch processing 68-19 examines the state of auxiliary signal enable flag 68-55. If the flag is set, the value of the auxiliary signal input 68-17 is passed to auxiliary switch value attribute 68-57. If auxiliary signal input 68-17 is unreliable, the last reliable auxiliary switch value 68-17 is passed on. If the auxiliary switch enable flag 68-55 is reset, the value of the PID output value attribute 68-53 is passed to the auxiliary switch value attribute 68-57.

Output filter processing 68-43 receives its value from auxiliary switch value attribute 68-57 and performs a first order filtering upon the value. The output is placed in the output filter value attribute 68-59. Filter weight attribute 68-61 is used to define the effectiveness of the filter and has a range of 1.0 to $+10^{23}$, wherein a filter weight of 1.0 effectively disables the filtering. Filtering is performed according to the following equation:

Output filter value=previous filter value+((1/filter weight)*(PID output value−previous filter value)).

The previous filter value is the value calculated in the last iteration. The above equation is calculated every sample period or every time the auxiliary signal input 68-17 is changed or every time the offset 68-9 is changed when all the scalers are 0. If a previous filter value does not exist because the previous iteration's data was unreliable, or because it is the first pass through the processing for this instance, the auxiliary switch value 68-57 is passed directly to the output filter value attribute 68-59. The last reliable output filter value attribute 68-59 is issued to the output filter value if there is a math error while calculating the filter output.

High/low select processing 68-23 compares the output filter value attribute 68-59 with the value of the high/low signal input 68-21. If the high/low select state attribute 68-63 is set, the greater of the two inputs is passed to the high/low select value attribute 68-65. If the high/low select state attribute 68-63 is reset, the lesser of the two inputs 68-21 and 68-59 is passed on. In the event that the high/low signal input 68-21 is unreliable, the PID loop unreliable flag will be set and the high/low select value attribute 68-65 will remain at its last reliable value. The high/low select flag attribute 68-63 is set when the high/low signal input 68-21 is selected. A change in the state of this flag causes a report to be sent over the N2 bus.

Reliability switch processing 68-67 reflects the reliability of the commands issued to the outputs 68-25 of the PID loop. During processing for the PID loop, should the input data for any of the PID loops become unreliable, the output of the processing remains at the last reliable output value for the loop. In addition, the PID loop reliability flag 68-45 is set to be unreliable whenever the data supplied by the high/low signal attributes 68-65 is unreliable. This flag is also set to an unreliable state when any of the following conditions occur:

1. If the condition of the auxiliary signal enable flag 68-55 is set to route the auxiliary signal input 68-17 to the outputs of the PID loop, and the auxiliary signal input 68-17 is unreliable.

2. If the PID output attribute 68-53 is routed through the auxiliary signal switch processing 68-19 and the calculations used to generate the PID output attribute 68-53 are determined unreliable. These calculations are deemed unreliable when any of the ports used by the PID processing 68-7 receives unreliable data or when a math error, such as a division by 0, has occurred during the calculation.

Following the execution of the high/low signal select processing 68-23, the PID database checks the PID loop reliability flag 68-45. If this flag is reliable, the PID database issues the output command to the output specified for the given PID loop definition. If the PID loop is unreliable, and the unreliable response selector flag 68-69 is reset, the PID database manager issues the last reliable output command from the high/low signal select processing 68-23 to the output. Otherwise, it issues the command specified by reliability default attribute 68-71 to the output.

The PID database manager task sends the write attribute command to the appropriate object database manager specified by the output value attribute 68-73. The following values are supplied by the PID processing 68-7 on completion of execution. The PID database manager task ensures that the current PID loop database reflects these changes.

The PID output value is the command to be issued to the output point which drives the controlled variable toward the setpoint value. It may be thought of as percent of full scale between 0.0 and 100% deflection. The PID processing reliability flag 68-51 is either a 0 or 1 and indicates whether an error in the calculation has occurred or one of the ports used by the PID processing 68-7 is unreliable. The PID loop reliability flag 68-45 is either a 0 or 1 wherein 0 indicates that the command being sent to the outputs of the PID loop is based on reliable data.

Additional loop parameters are returned for the next execution of the PID processing 68-7. These parameters include the feedback value for derivative control, the integral term for integral action and bumpless transfer, the hysteresis compensation bias for hysteresis removal, the output value for hysteresis removal and the direction of the output values (increasing=1, decreasing=–1 for hysteresis removal, the previous feedback value and the error calculated between the setpoint and the feedback value).

A Facilities Management System (FMS) can provide a pre-defined set of features which provide facilities such as energy management, interlocking, calculated points, and other building control algorithms. Often either subtle or sometimes major changes to these algorithms are required for a particular site. New applications or unusual applications not covered by the standard features may also need to be accommodated. In these cases it is necessary to provide the means for a user or branch engineer to implement customized control algorithms not covered by the standard features.

A programming language to specify building control algorithms provides the user flexibility in coding customized control algorithms. The choice of a commonly known language, BASIC, as a base to build on is important since it allows users to write in a familiar language. Since typical BASIC cannot efficiently accommodate a Facilities Management System, a new language has been developed using BASIC as a starting point. Adding FMS extensions to the language makes it a building control language. Language extensions include, but are not limited to, the following:

- ability to read attributes of objects in the FMS (for example, to read the value of a sensor)
- ability to write to an actuator from the language (LET and TELL statements)
- ability to trigger processing execution from a change in a sensor
- ability to execute processing periodically (PERIOD)
- ability to have processing wait a specified amount of time (WAIT)
- ability to output a user advisory from within a processing segment (ADVISORY)
- ability to output a summary from within a processing segment
- ability to abort processing
- ability to access current time/day/date
- pre-defined FMS-related constants such as ON, OFF, ALARM, etc.
- FMS-related functions—SPAN, RAMP, FILTER, Enthalpy, Wet Bulb, Relative Humidity, PI_Reset Additional concepts have been introduced in several language statements. In conventional programming languages, the capability to maintain or remember data values is done through variables. A new dimension according to the invention is remembering values in the statements themselves. That is, a plurality of executable statements in the language remember a value(s) from one execution of the statement to the next. Three examples would be:

a. FIRST PASS in the complex IF statement—this allows the programmer to perform initialization code once whenever a condition in the system changes.

b. A differential compare operator—allows the user to make a comparison which is not only based on current values but on the history of the previous comparison.

c. A PI_RESET function also remembers values from one execution to the next.

Another facilities management aspect according to the invention is the ability to trigger execution of a user algorithm based on a change to an element in the system such as a sensor or alarm value. In particular, when any triggerable attribute of any object changes it can trigger an individual algorithm(s). The language is unique in that it will automatically sign-up for these changes when such an attribute is referenced. The user need not specifically request this sign-up.

In a further extension of the transparency concepts discussed above, the language is transparent to the objects in the FMS because it is independent of the type of controllers or points on the system. This is achieved by defining a "generic" interface to objects in the system. Reading of data values is accomplished through the name of the object and the name of the data field to be read. For example, the outdoor air temp would be AHU1\OUTDOOR\VALUE. This mechanism is the same for all objects so new objects may be added to the system without changing the language.

Similarly, writing of values is accomplished through another transparent mechanism, the LET statement. For example, to assign a new differential to an analog point the following statement is used, LET 'AHU1\TEMP\DIFF'=5.0 Commanding of objects is also transparent. There is one statement type for sending commands to all objects. For example:

TELL 'AHU1\FAN' TO "START"

The handling of unreliable information as previously discussed is also accomplished by the language. The language attaches a reliability flag to every piece of data it handles. It carries this flag through calculations so that the results of a calculation are only reliable if all inputs are reliable. Furthermore, if the language receives an unreliable value from the system it can automatically replace that value with the last reliable value for that piece of data. The language also provides a function for the user to query whether any given piece of data is reliable or not.

The concept of shared variables is another aspect of the invention. The language provides the means for two or more programs or processes in the same controller to share a value. They may all read and update this value. It is treated like any other named variable in the language. In addition, a change to a Boolean shared variable can be used to trigger a program or process.

The ability to multi-process user-defined processes generated in the language exists because each controller my contain many processes which can each be executing independent of the other processes. Thus, the language implements a prioritized multi-tasking scheme which resembles parallel processing.

In addition, the language treats time data the same as any other data type such as integer or Boolean. That is, time is considered a data type of its own. It has its own variables, its own constants (i.e., 10:21:33), and its own operators (to add, subtract, compare etc. time values). Current time-of-day can be read by an algorithm.

The language also has a PI_RESET function which is designed to reset a setpoint by means of a programmed proportional-integral calculation. It is designed for use in closed loop systems.

The control system shown generally in FIG. 69 has an input device 69-3 which receives inputs along line 69-5 and generates control variables along line 69-7, often known as a feedback variable. A control variable on line 69-7 provides an input to a proportional plus integral plus derivative (PID)

device for object 69-9 and to an object 69-11 which provides a fault tolerant control strategy. In the present context, typical objects include hardware and software combinations which perform functions desirable for a control loop. Such objects are typically implemented in software and stored in a memory portion of one or more automated processing control nodes 69-2 operating as a network. The organization of a system having hardware and software objects according to the present invention has previously been discussed.

The PID loop 69-4 is typically structured to operate under normal circumstances without assistance from the fault tolerant control strategy object 69-11 in control node 69-2. PID object 69-9 generates and receives PID loop variables 69-13 and also provides inputs and receives outputs from fault tolerant control strategy object 69-11. The PID output on line 69-15 is routed both to the fault tolerant control strategy object 69-11 and to switch 69-17. The output on line 69-19 of switch 69-17 can thus be switched between the PID output and the output of the fault tolerant control strategy object 69-21 based on command on line 69-23 also generated by the fault tolerant output control strategy. The fault tolerant strategy of object 69-11 also receives process constants on line 69-25 and another output on line 69-27 generated by input device 69-29 which receives input signal 69-31.

The output device driving command on line 69-19 from switch 69-17 constitutes a manipulated variable driving output device 69-33 which generates a related manipulated variable on line 69-35. The related manipulated variable on line 69-35 is input to process 69-37 which completes the control loop by generating signals on lines 69-5 and 69-31 to input devices 69-3 and 69-29.

The purpose of the control loop is to generate manipulated variables on lines 69-19 and 69-35 to control the output device and to accomplish the desired process 69-37. In normal operation, PID control is accomplished and switch 69-17 is set via signal 69-23 to PID output line 69-15. Thus, the fault tolerant control strategy object 69-11 merely monitors the status of control variable on line 69-9 and does not participate in the actual control of the loop.

Fault tolerant control strategy object 69-11 monitors control variable on line 69-7 to verify that the control variable is within a reliable range of values. When fault tolerant strategy object 69-11 determines that control variable on line 69-7, the feedback variable, is no longer within the reliable range, the fault tolerant control strategy object 69-11 directs switch 69-17 to route to the output device command signal on line 69-19, the fault tolerant control strategy object output 69-21. This is done via switch command line 69-23. At this point, based on process constants on lines 69-25 and signals 69-27, the fault tolerant control strategy object 69-11 implements a strategy which allows the related manipulated variable on line 69-35 to continue to be adjusted even though the feedback, the control variable on line 69-7, is no longer reliable. Thus, the loss of feedback in the PID control loop does not result in the loss of control over output device 69-33 or related manipulated variable on line 69-35.

Through input device 69-29 which monitors signals on line 69-31 from process 69-37, the fault tolerant strategy object 69-11 responds to dynamic changes in process 69-37 along with process constant 69-25 to generate signals to control the manipulated variables on lines 69-19 and 69-35. Thus, even under a failed condition, it is possible to retain a level of control over process 69-37 which minimizes the effect of the failure.

In one example, the fault tolerant control strategy addresses the typical HVAC processes including heating, cooling, and mixed air discharge temperature control.

Figure 70:
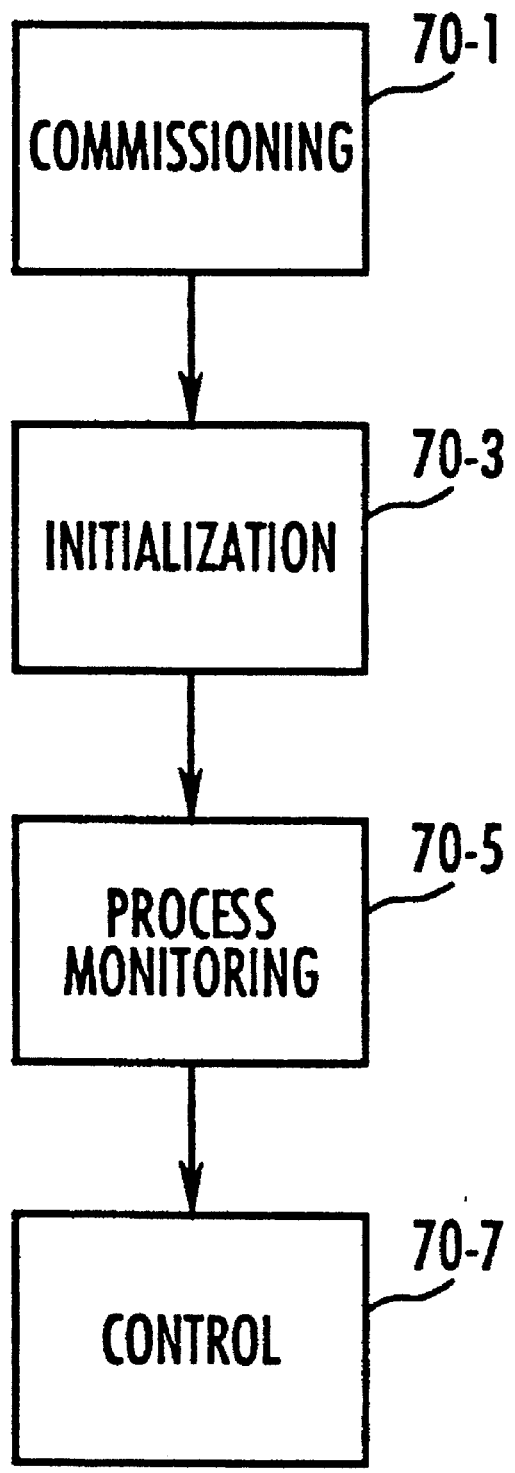
FIG. 70 shows the phases of implementing a fault tolerant control strategy.

FIG. 70 shows phases of implementing a fault tolerant control strategy. These include commissioning 70-1, initialization 70-3, process monitoring 70-5 and control 70-7.

Figure 71:
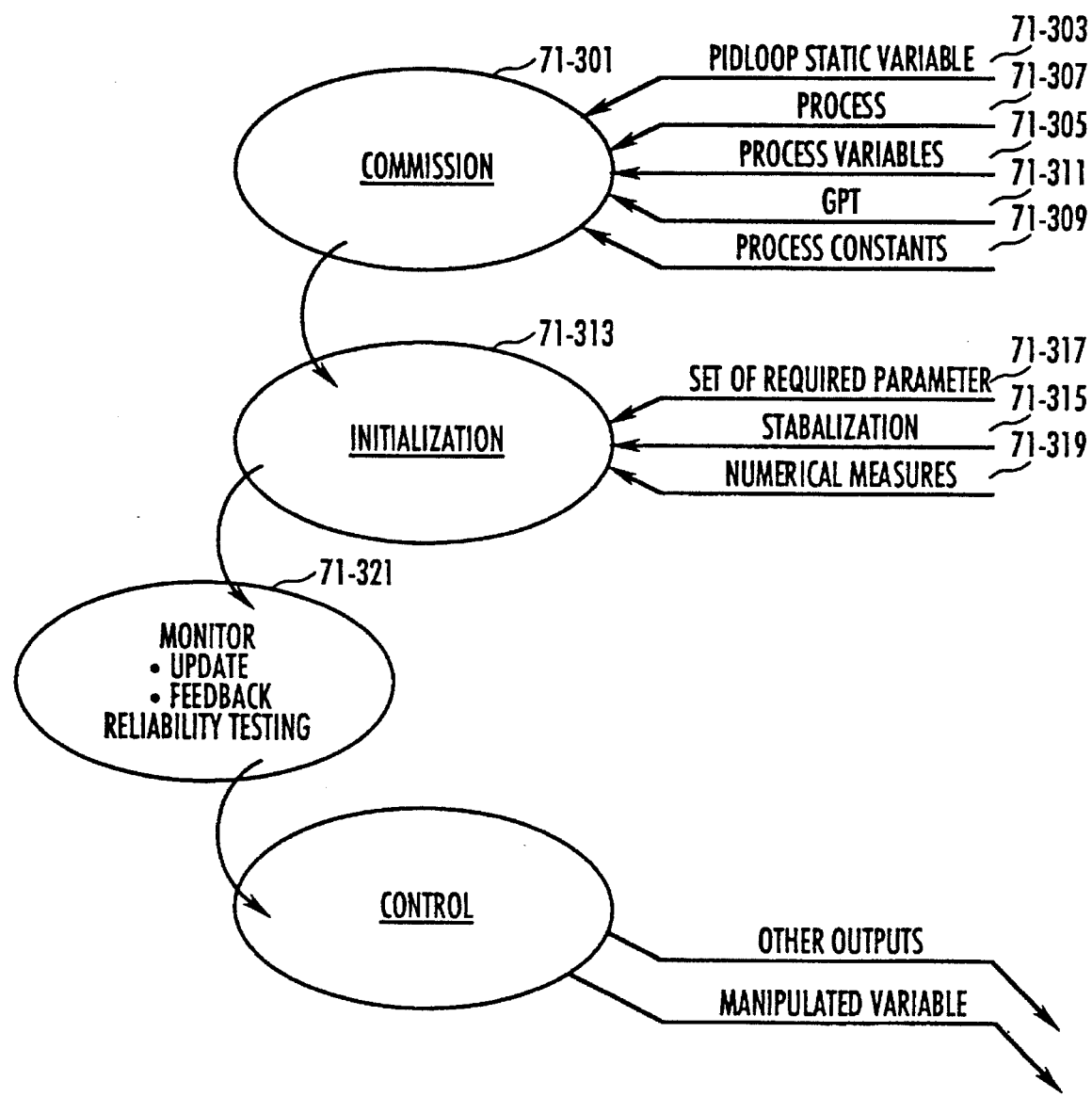
FIG. 71 illustrates the inputs and outputs of the phases of the strategy.

FIG. 71 outlines inputs and outputs of the process which takes place in implementing a fault tolerant control strategy. During initial commissioning 71-301 the fault tolerant control strategy object is informed where parameters are stored in a memory accessible to the fault tolerant control strategy object 69-11, and what parameters are important to the process being controlled. For example, air temperature and flow rate parameters may be used to determine if, for example, a chilled water valve should be open or closed. Thus, initial commissioning identifies the variables which are used in the fault tolerant control strategy.

In a fault tolerant controller used in an HVAC system, there are three classes of information or parameters. The first is a static set of variables 71-303 which is the same for each PID loop. These include the setpoint, a proportional band, and the control variable. A second set of parameters are process variables 71-305 which are the actual analog inputs obtained. These differ depending on the HVAC process 71-307. For example, some HVAC processes require outdoor air temperature while others require water temperature or pressure. Finally, there are process constants 71-309 which are PID loop dependent as a result of their dependency on physical devices used to monitor system performance. In implementing a fault tolerant control strategy object, it is also necessary to provide information concerning the configuration of the PID loop. This can be done either by programming the fault tolerant control strategy in a programming language or as a user block of a graphical programming tool 71-311. In either case, the routine is added to a control system database which can be accessed by the fault tolerant control strategy object and executed in a control node.

During initialization phase 71-313, a routine in the fault tolerant control strategy object 69-11 collects data concerning the process constants and the static PID loop and performs a stabilization check 71-315. As previously indicated, the constants can be hard coded and need only be read into the fault tolerant control strategy object once. The three classes of PID loop parameters represent the most recent state of the controlled process. The commissioning phase previously discussed provides the information on where these parameters are located in memory. During initialization, the parameters are read by the fault tolerant control strategy software object. Initialization then verifies that a set of reliable static parameters 71-317 required for process control can be obtained. This is because a full set of reliable PID static data is necessary to allow execution of a fault tolerant control strategy.

Initialization phase 71-313 verifies stabilization of the PID loop control, rather than the variables or parameters. A PID loop is stable if the controlled variable remains close to the setpoint and fluctuations in the manipulated variable are small. As part of the initialization phase 71-313, predetermined numerical measures of oscillation and sluggishness 71-319 are evaluated against the performance of the control loop.

During the monitor phase 71-321, the fault tolerant control strategy object 69-11 presumes stable process control and updates the static PID variables and the process variables. The primary function performed during the monitor phase is evaluation of the reliability of the control variable 69-7 or feedback of the PID loop. This may be based on several physical analog inputs in the PID loop itself if, for example, the feedback is multidimensional. If this feedback, the control variable on line 69-7, goes unreliable, then the control mode of operation is entered. It should be also noted that it is not absolutely necessary to monitor the actual feedback or control variable. Control variable 69-7 may be the output of a software object generating the control variable. In this case, the control variable is defined to be unreliable when any of the inputs to the software object generating the control variable become unreliable. Thus, if an analog input to the software object generating the control variable is detected to have become open or shorted, or if a non-legitimate value is generated during data manipulation in the software object (e.g., dividing by zero), then the fault tolerant control strategy assumes that the control variable 69-7 or the feedback has become unreliable.

When the control function is entered, the fault tolerant control strategy object 69-11 calculates the value to be used in place of the value generated by the PID algorithm. As indicated previously, this is basically an open loop control based on a model of the system and the current state of the variables. There need be no requirement of linearity between the process variables and the calculated output command. Since the system responds to the current state of the process 69-37, it is also possible to respond to changes in the setpoint, as shown in the equation given below.

It should be noted that the fault tolerant control strategy object 69-11 may attempt to execute control at the same rate as the PID controller. However, in most cases, control will be slower due to limitations of network performance. As previously indicated, fault tolerant control strategy object 69-11 is ordinarily implemented in a control node and not in the PID device which is part of the loop. Thus, multiple communications over a local bus between the PID loop and the control node, and perhaps over a network bus interconnecting multiple control nodes increase loop response time under fault tolerant control strategies.

Figure 72:
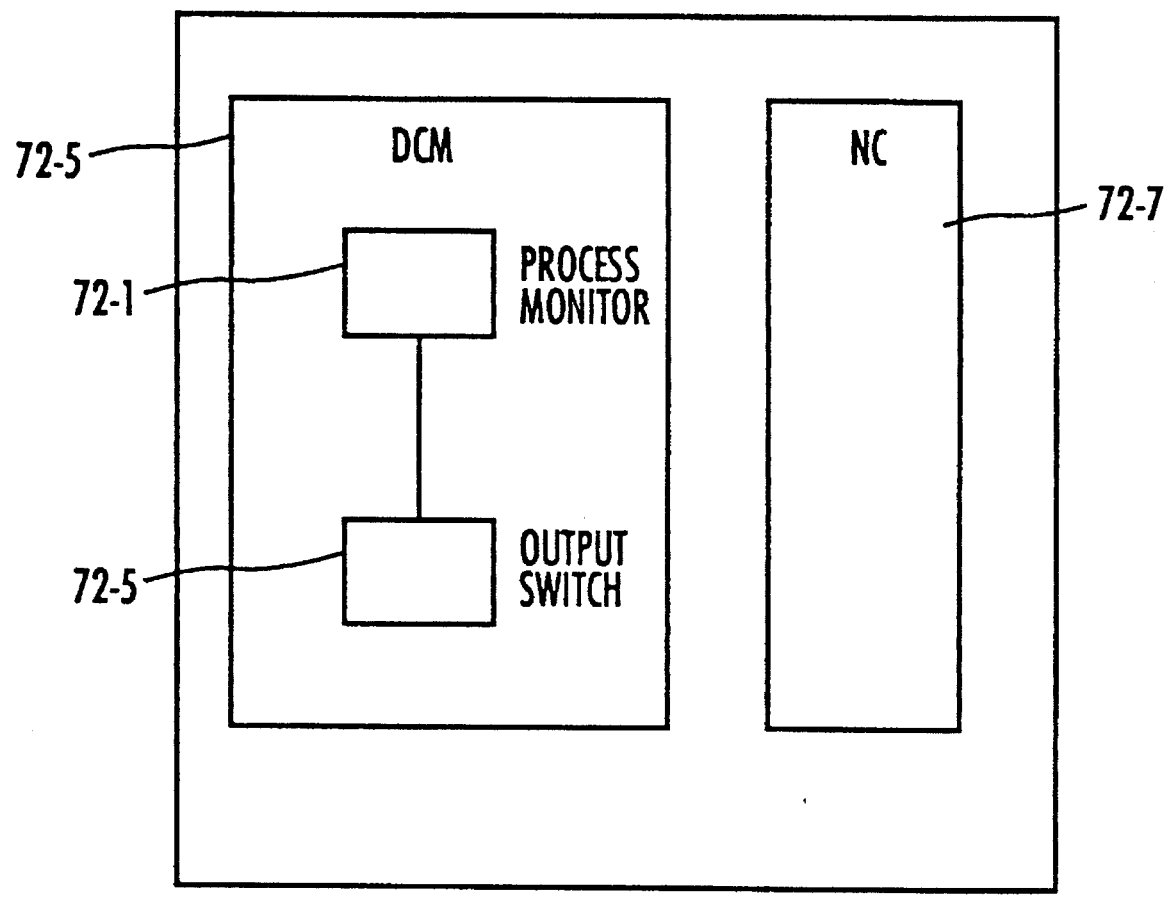
FIG. 72 illustrates one configuration of a system with a digital control module and a network controller.

As previously discussed, a fault tolerant control strategy can be based in part on a model of the control process. The fault tolerant controller block executes once every twenty sampling periods of the PID controller. The process monitor and output switch functions execute once each sampling interval of the PID controller. In one system configuration shown in FIG. 72, the functions of the process monitor 72-1 and output switch 72-5 can be implemented directly in a Digital Control Module 72-5 while the fault tolerant controller functions are implemented in the Network Controller 72-7.

Various variables required to implement a fault tolerant control strategy are listed in Table 1.

TABLE 1

Inputs

| | |
|---|---|
| 1. SP: | Setpoint Variable (reference variable) |
| 2. CV: | Controlled Variable (feedback variable) |
| 3. MV1: | Primary Manipulated Variable (control output variable) |
| 4. MV2: | Secondary Manipulated Variable (Interacting control output variable) |
| 5. PV1: | Primary Process Variable (feedforward variable #1) |
| 6. PV2: | Secondary Process Variable (feedforward variable #2) |
| 7. PB: | Controller Proportional Band |
| 8. AT: | Controller Sampling Period |
| 9. OUTHI: | Controller High Saturation Limit |
| 10. OUTLO: | Controller Low Saturation Limit |
| 11. BAND: | Controller Error Tolerance |

Outputs

TABLE 1-continued

| | |
|---|---|
| 1. FLAG: | Fault-Tolerant Enable Flag |
| 2. BACKUP: | Fault-Tolerant Output |

Local Variables

| | |
|---|---|
| 1. CVo: | Reference Controlled Variable |
| 2. MV1o: | Reference Primary Manipulated Variable |
| 3. MV2o: | Reference Secondary Manipulated Variable |
| 4. PV1o: | Reference Primary Process Variable |
| 5. PV2o: | Reference Secondary Process Variable |
| 6. PBo: | Reference Controller Proportional Band |

Figure 78:
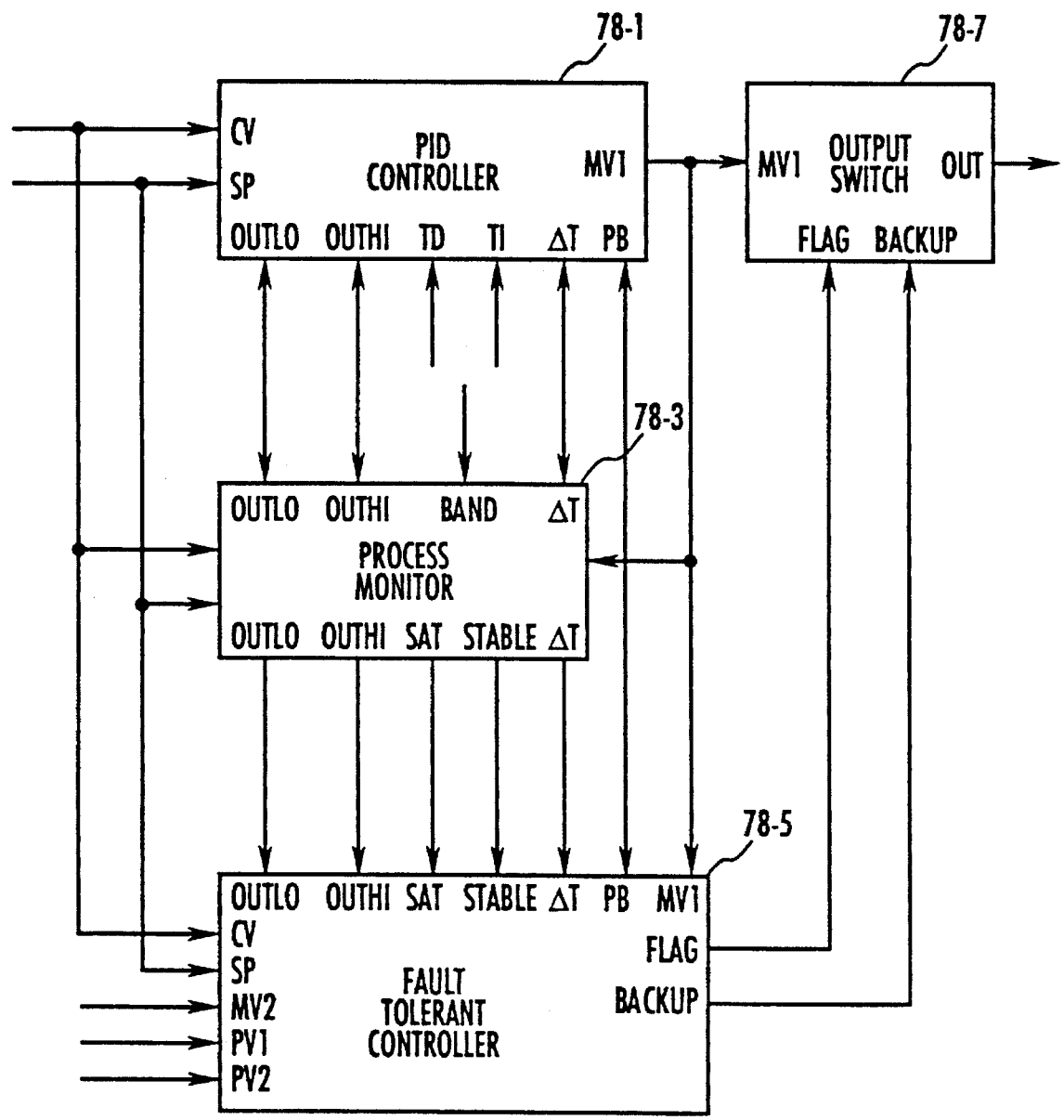
FIG. 78 shows a fault tolerant control configuration.

FIG. 78 is a more detailed illustration of the fault tolerant control of the invention. PID controller 78-1, process monitor 78-3 and fault tolerant controller 78-5 all receive the setpoint SP and control variable CV. PID controller 78-1, process monitor 78-3 and fault tolerant controller 78-5 all perform individual processing which is discussed in more detail below. Based on conditions in the system, fault tolerant controller 78-5 generates a flag output which is routed to an output switch 78-7. In addition, fault controller 78-5 generates a backup output which is also routed to the output switch 78-7. The backup output is determined by the following equation:

$$MV1=MV1_o+EFF*(MV2-MV2_o)+(100\%/PB_o)*(SP-CV_o+(EFF-1)*(PV1-PV1_o)-EFF*(PV2-PV2_o)); \text{ with EFF being limited to a range of } 20\%-80\%$$

The other input to the output switch is manipulated variable MV1 produced in PID controller 78-1. Under normal circumstances, i.e. when the system is not experiencing a fault, fault tolerant controller 78-5 sets a flag to output switch 78-7, such that the output of switch 78-7 is a primary manipulated variable from the PID controller 78-1. Generally, the manipulated variable corresponds to one output of a PID process as shown in FIG. 69. When a fault condition exists in the system, the flag causes the output switch 78-7 to route the backup signal from fault tolerant controller 78-5 to its output. As shown in FIG. 69, the output of the switch can be used to drive an output device. Thus, a failure in the process control loop is accommodated by the fault tolerant controller, so that the output device remains operational, even if in a degraded state.

Figure 79A:
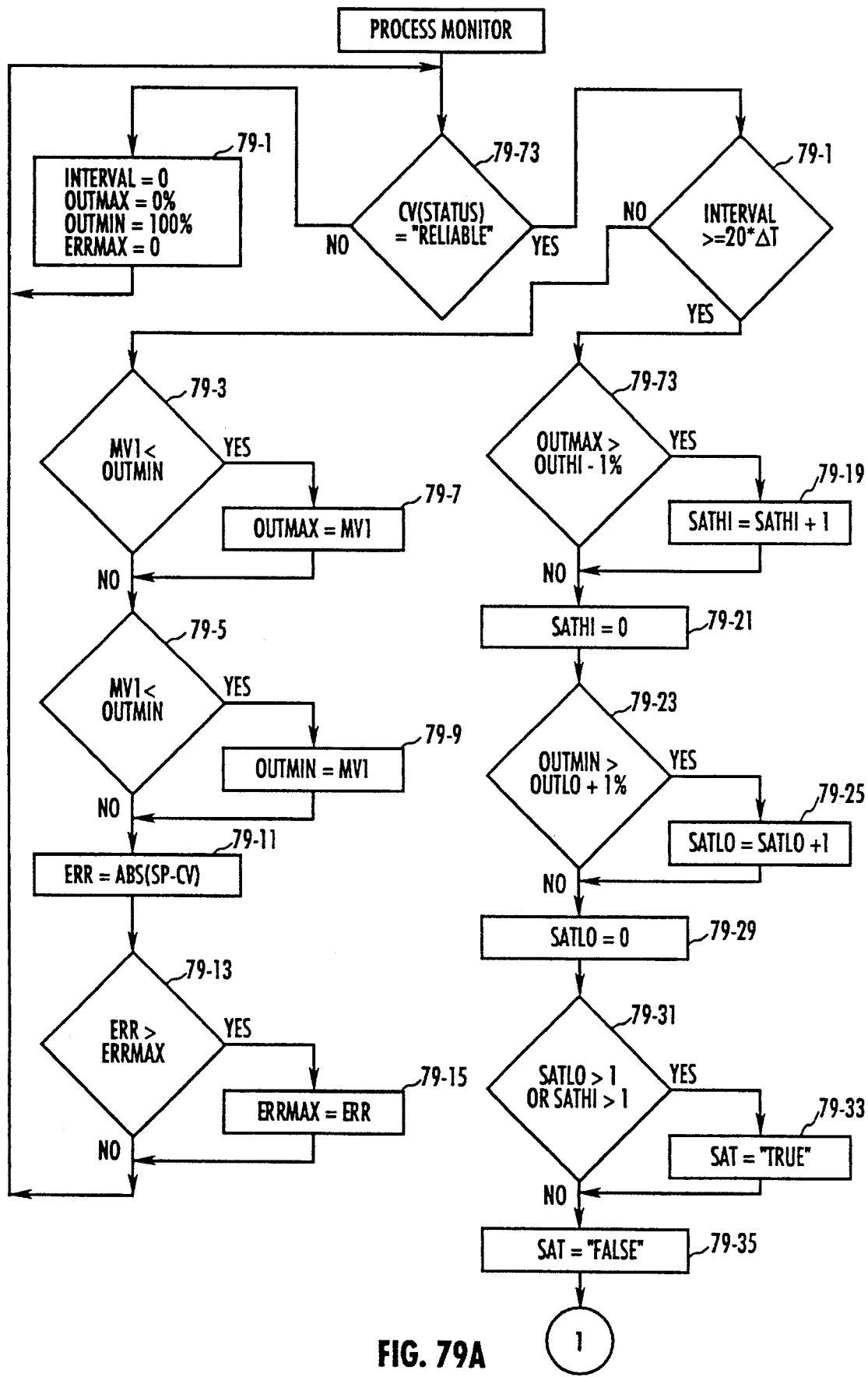
FIGS. 79A and 79B show process monitoring steps.
Figure 79B:
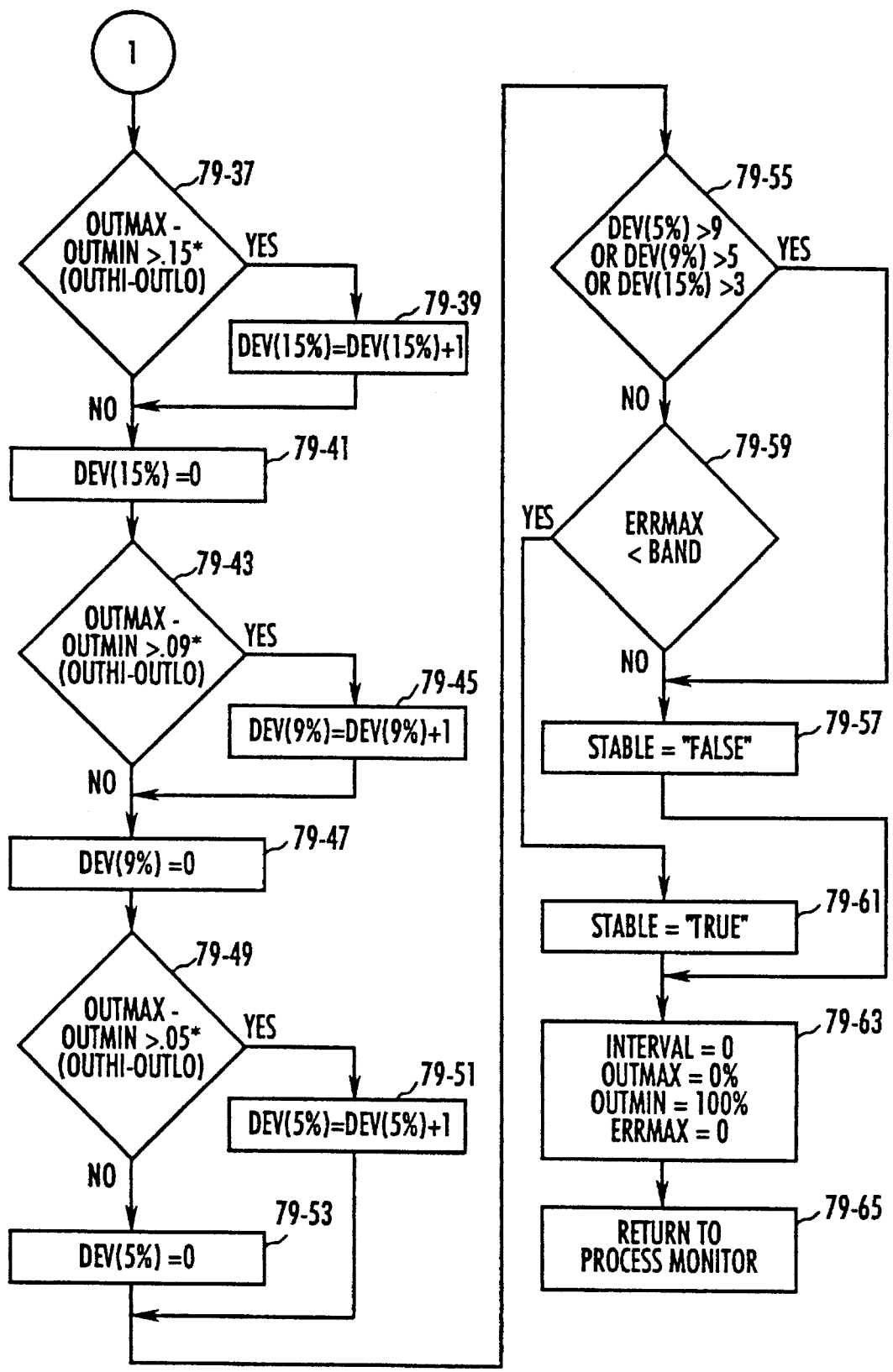

FIGS. 79A and 79B illustrate processing that takes place in process monitor 78-3. Typically, the process monitor operates in a digital control module. A network controller typically executes the process 20 times slower than the monitor rate possible at the digital control module. Thus, processing is different in the process monitor depending on whether or not a complete execution has taken place in the network controller. Prior to initiating processing, it is first determined in test block 79-73 if the control variable is reliable, as discussed herein. If not, the variables shown in block 79-71 are set and control is returned to test block 79-73. In test block 79-1 the process monitor first determines if the interval is greater than or equal to 20 times the process rate in the digital control module. If this is not the case, the manipulated variable is tested as shown in blocks 79-3 and 79-5 to determine if it exceeds maximum and minimum outputs which have already been detected and stored by the monitor process. If the manipulated variable is beyond these stored values, then the appropriate maximum and minimum output is set equal to the manipulated variable in function blocks 79-7 and 79-9. In either case, in function block 79-11, an error value is determined to be the absolute value of the setpoint minus the control variable. As shown in function blocks 79-13 and 79-15, if the present error exceeds a maximum error previously monitored by the process, the maximum error is set equal to the present error.

The above process continues to repeat until the interval is determined to exceed 20 times the processing time of the digital control module in function block 79-1. At this point, control transfers to other function blocks which determine whether or not the system is saturated and whether or not the output is stable. If the maximum output as previously determined during processing previously discussed exceeds one percent less than the output high defined for the process as shown in block 79-73, a high saturation variable is incremented. If not, the variable is set equal to zero as shown in function blocks 79-19 and 79-21. Similarly, if the minimum output as previously described is beyond the pre-defined limit of an output low variable, as shown in block 79-23, a low saturation flag is either incremented or set equal to zero, as shown in function blocks 79-25 and 79-29. At function block 79-31, it is determined if either of the saturation variables exceeds one. If so, a saturation flag is set "true" as shown in block 79-33 and if not, a saturation flag is set "false," as shown in function block 79-35.

Processing in the process monitor then proceeds to identify the number of deviations beyond specific percentages of the range of high and low outputs. For example, function block 79-37 determines if the differences between the maximum output and minimum output of the process exceeds 15% of the high and low outputs allowed. If not, a deviation variable is set equal to zero in function block 79-41. However, if the difference does exceed 15% of the allowed difference between the high and low outputs, the deviation variable is incremented as shown in function block 79-39. Similarly, function blocks 79-43, 79-45, and 79-47 show a counting of the deviations from 9% while function blocks 79-49, 79-51, and 79-53 show how deviations beyond 5% are counted. It should be noted that since the deviation variables are reset to zero each time the difference between the maximum and minimum outputs is within the specified range, the deviation counts are incremented only in the case of consecutive variations beyond the specified range.

Function block 79-55 is used to determine whether or not the process is stable. If there have been more than nine counts of deviations greater than 5% or five counts of deviations from 9% or three counts of deviations greater than 15%, function block 79-57 sets a STABLE variable to a "false" state. This indicates that the system is not stable. If these deviations are within the acceptable ranges, then function block 79-59 compares the maximum error with a band variable which defines an acceptable range of error. Again, if the maximum error is out of the range specified by the band variable, the process is considered to be unstable otherwise, the process is considered stable as shown in function block 79-61. Function block 79-63 resets the variables before returning control in function block 79-65 to the process monitor executive. It should be noted that the output minimum and maximum are typically set to 100% and 0% respectively. This assumes that the manipulated variable is provided in the form of a percent of full scale deflection. However, any other arrangement for adjusting a manipulated variable would be within the spirit of the invention.

Figure 80:
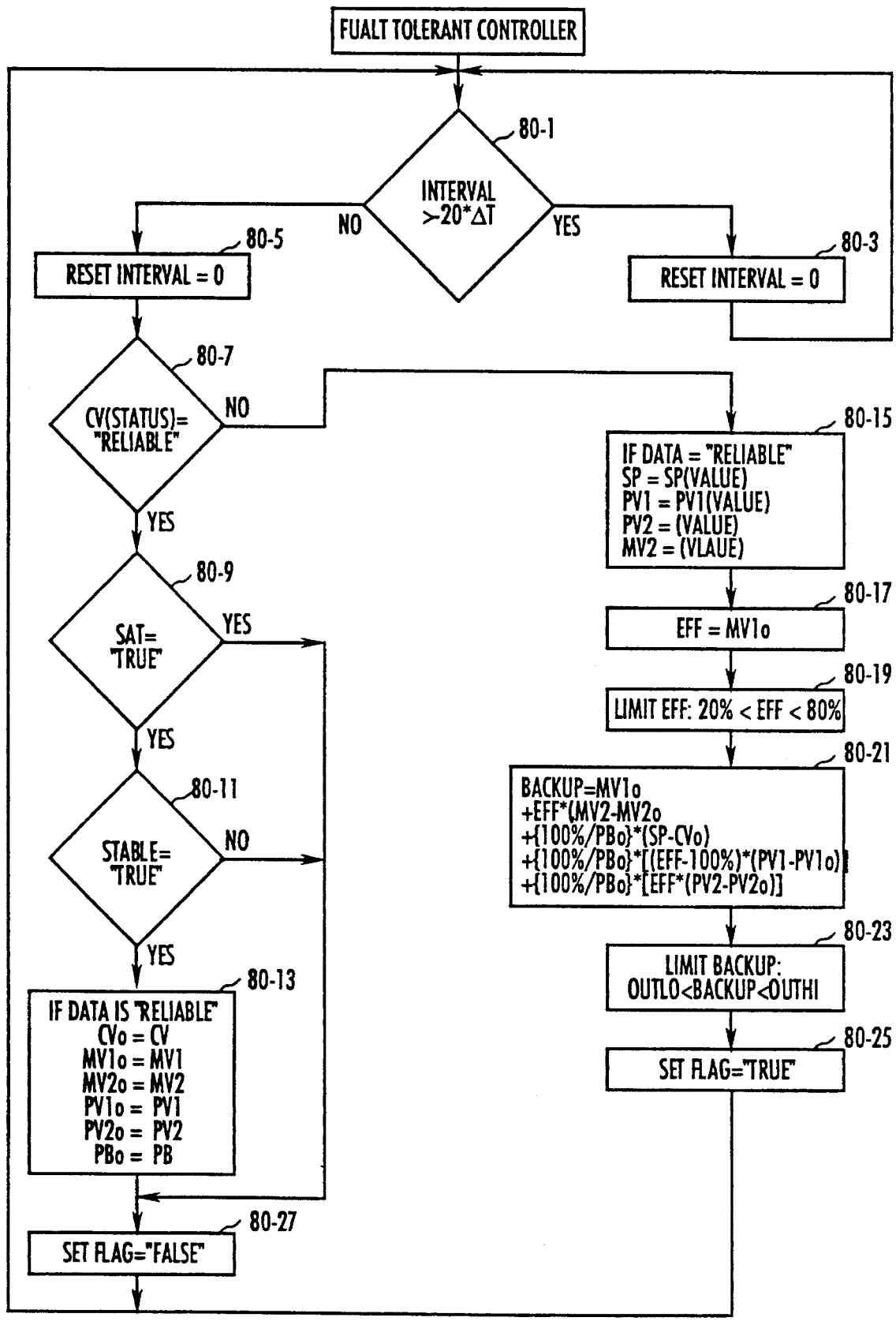
FIG. 80 shows steps in operating a fault tolerant controller.

FIG. 80 illustrates processing in a fault tolerant controller object. As shown in function block 80-1, if the interval previously discussed has not expired, function block 80-3 merely updates the interval and no further processing takes place. However, if the interval has expired, fault tolerant control processing occurs. First, the interval is reset to zero as shown in function block 80-5. Next, a reliability status of the control variable is tested in function block 80-7. When the status of the control variable is reliable, fault tolerant control processing then checks to determine if the output is saturated as shown in function block 80-9. If this is the case, the output is considered stable and no further fault tolerant processing occurs. If the output is not saturated, then the routine moves to function block 80-11 which checks the status of the STABLE variable previously calculated by the process monitor as discussed relative to FIGS. 79A and 79B. If the STABLE variable is not "true", no further processing takes place. However, if the STABLE variable is "true", function block 80-13 determines if the data is reliable. If so, it sets the reference variables of the control variable, primary and secondary manipulated variables MV1 and MV2, primary and secondary process variables PV1 and PV2, and the proportional band PB equal to the current corresponding values of the variables. Thus, the fault tolerant controller receives the most up-to-date values of these variables. The flag is set to FALSE as shown in function block 80-27 and control is transferred to function block 80-1 to test the interval.

In function block 80-7, if the control variable status is determined to be unreliable, the fault tolerant control processing then examines the data. If the data is reliable, the setpoint, the primary and secondary process variables, and the secondary manipulated variable are set equal to the current values in function block 80-15. In function block 80-17, efficiency variable EFF is set equal to the reference primary manipulated variable stored in the object, limited in value to between 20 and 80% rather than over the full 0–100% range as indicated in function block 80-19. Function block 80-21 then calculates the backup value which will be transmitted to output switch 78-7. The equation for calculating the backup variable is shown in function block 80-21. As the equation indicates, the backup variable is a combination of the primary manipulated variable stored in the object as modified by the secondary manipulated variables in percentages of the stored proportional band. Function block 80-23 shows that the backup is limited to fall between the low and high outputs specified in the object for the process being controlled. In function block 80-25 the flag is then set "true" to direct output switch 78-7 to route the backup signal to its output. Fault tolerant control processing then returns to function block 80-1.

Figure 81:
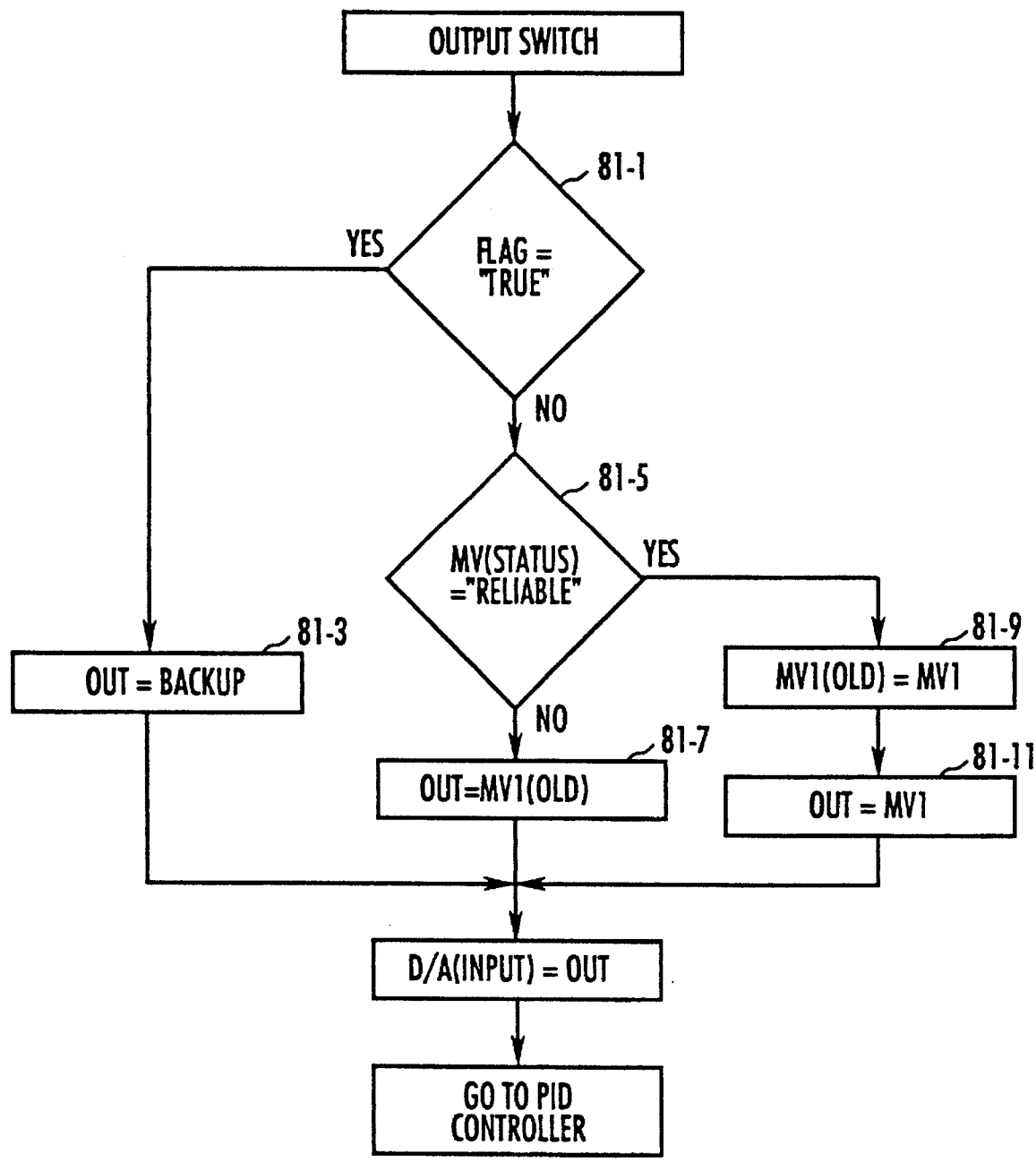
FIG. 81 shows steps in switching a manipulating and backup variable.

FIG. 81 illustrates output switch processing. In FIG. 81, if the flag is true in function block 81-1, the output signal is set to be the backup on the switch as determined in function block 81-3. However, if the flag has not been set true by fault tolerant controller 78-5, and function block 81-5 determines if the status of the control variable is not reliable. If the control variable is not reliable, the output at the switch is then routed to a previous or old value of the manipulated variable, as shown in function block 81-7. If the status of the manipulated variable is shown in function block 81-5 to be reliable, the old manipulated variable is replaced with a new manipulated variable and the output is set equal to the new manipulated variable in function blocks 81-9 and 81-11. Otherwise an old value of the manipulated variable is used. This terminates processing of the switch.

As a result of the above described processing, it is possible for a process control loop to maintain operation in a degraded state even if the feedback variable has become unreliable, an output is unstable or an error is outside of allowable limits.

Figure 73:
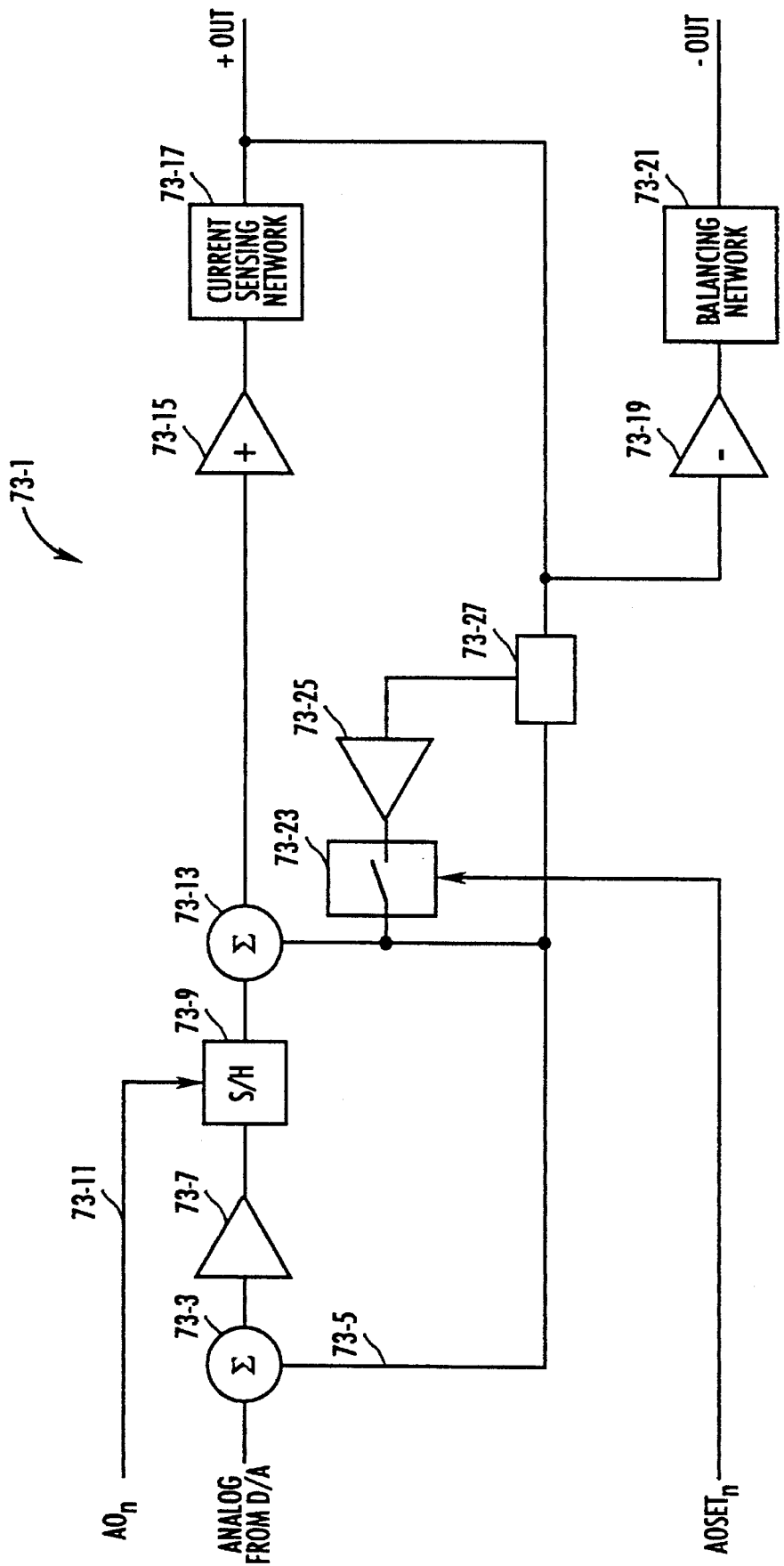
FIG. 73 shows one embodiment of the invention with a balanced output.

FIG. 73 shows a block diagram of a first embodiment of a universal analog output circuit. In analog output circuit 73-1, an analog output from a D/A converter is provided to summing node 73-3 where it is summed with feedback signal 73-5, which is based on the positive output of the analog output device 73-1. The output of the summing junction is routed through buffer 73-7 to sample and hold circuit 73-9. Sample and hold circuit 73-9 samples the buffered analog signal in accordance with signal 73-11, $AO_n$. The output of sample and hold circuit 73-9 then serves as an input to summing junction 73-13 which also receives feedback signal 73-5.

Figure 74:
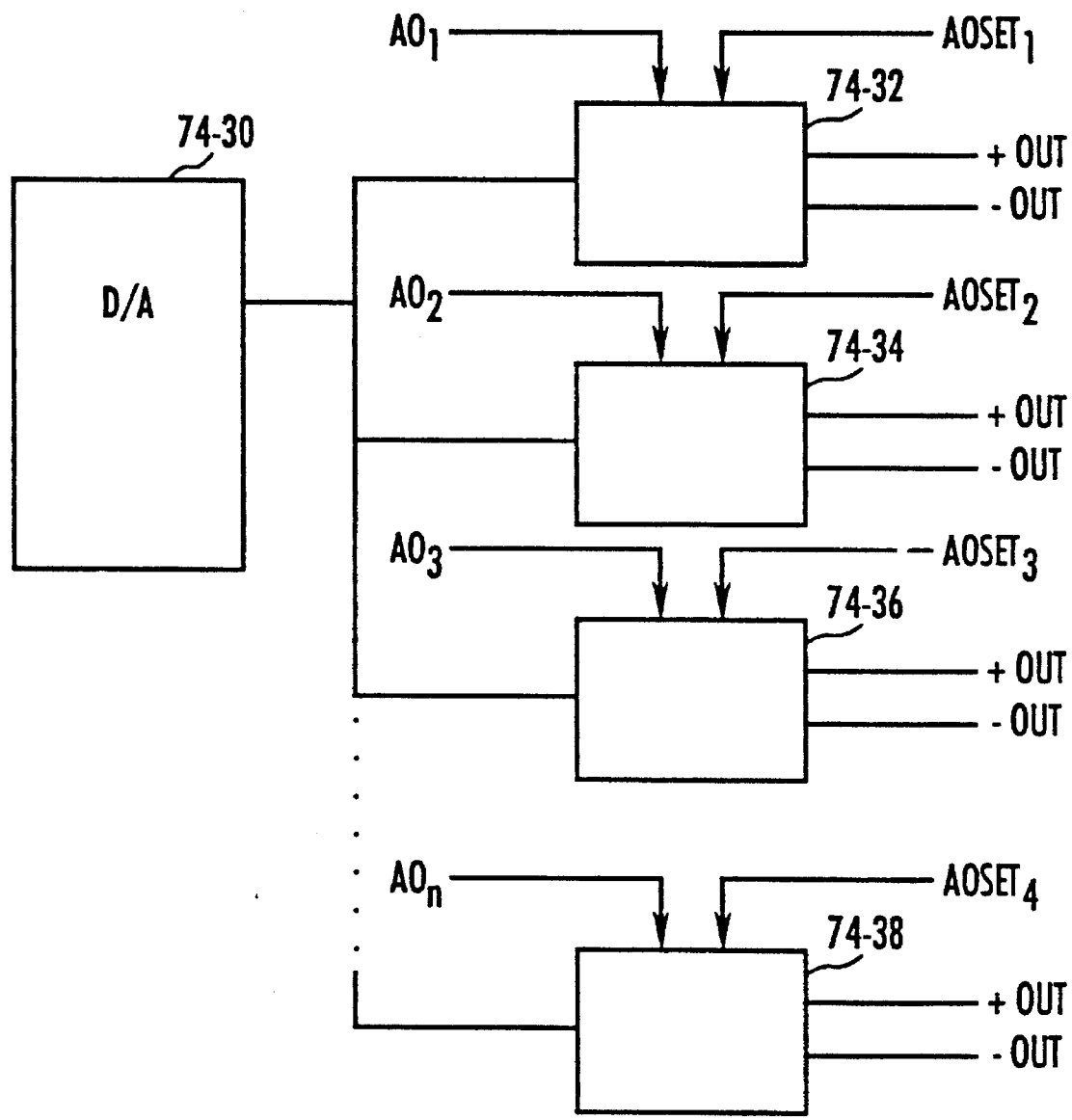
FIG. 74 shows multiple units according to the embodiment with balanced outputs driven by a single source.

Because sample and hold circuit 73-9 is responsive to signal 73-11, $AO_n$, it is possible to reduce overall system cost by connecting one D/A converter to multiple analog output circuit units as shown in FIG. 74. In FIG. 74, single D/A converter 74-30 is connected to analog output circuit units 74-32, 74-34, 74-36 and 74-38. These four units are for illustration purposes only, as any number of units may be employed compatible with the drive capabilities of the D/A converter 74-30. Each of units 74-32 through 74-38 are the same as the analog output circuit 73-1 shown in FIG. 73. Since each unit 74-32 through 74-38 is connected to a different $AO_n$ signal, proper sequencing of the $AO_n$ signals allows the output of D/A converter 74-30 to be applied sequentially or simultaneously to various analog output units. Thus, the incorporation of sample and hold circuit 73-9 connected to command signal $AO_n$ as an integral part of the feedback network in FIG. 73 provides an inherent multiplexing capability.

Returning to FIG. 73, the output of summing junction 73-13 is provided to amplifier 73-15 which is connected to current sensing circuit 73-17. The output of current sensing network 73-17 forms the positive output of the analog output circuit 73-1. Depending on the requirements of the device to be driven, this output can be either a voltage or a current. The output of the current sensing network 73-17 is further routed to inverter amplifier 73-19 which is connected to balancing network 73-21. Balancing network 73-21 operates to produce at the negative output of analog output circuit 73-1, a mirror image of the signal appearing at the positive output. Thus, if the positive output is a positive going 5 volt signal, the negative output will be a negative going 5 volt signal resulting in a 10 volt differential output signal. Similarly, if the positive output is a 5 mA current source, the negative output will be a 5 mA current sink.

The output from current sensing network 73-17 is also used to generate feedback signal 73-5. Since summing junction 73-3 is a voltage summing node, feedback signal 73-5 must be a voltage. When the positive output of the analog output circuit 73-1 is a voltage signal, the signal $AOSET_n$ routed to switch 73-23 opens the switch. As a result, amplifier 73-25 is removed from the circuit and the voltage output from current sensing network 73-17 is routed only through feedback circuit 73-27 to generate feedback signal 73-5. When the positive output from the analog output circuit 73-1 is a current output, the signal $AOSET_n$ closes switch 73-23, inserting amplifier 73-25 into the circuit. This results in generating a feedback signal 73-5 based on amplifier 73-25 and feedback network 73-27. Thus, feedback signal 73-5 is a voltage feedback even though the positive output of analog output unit 73-1 is a current signal.

Figure 75:
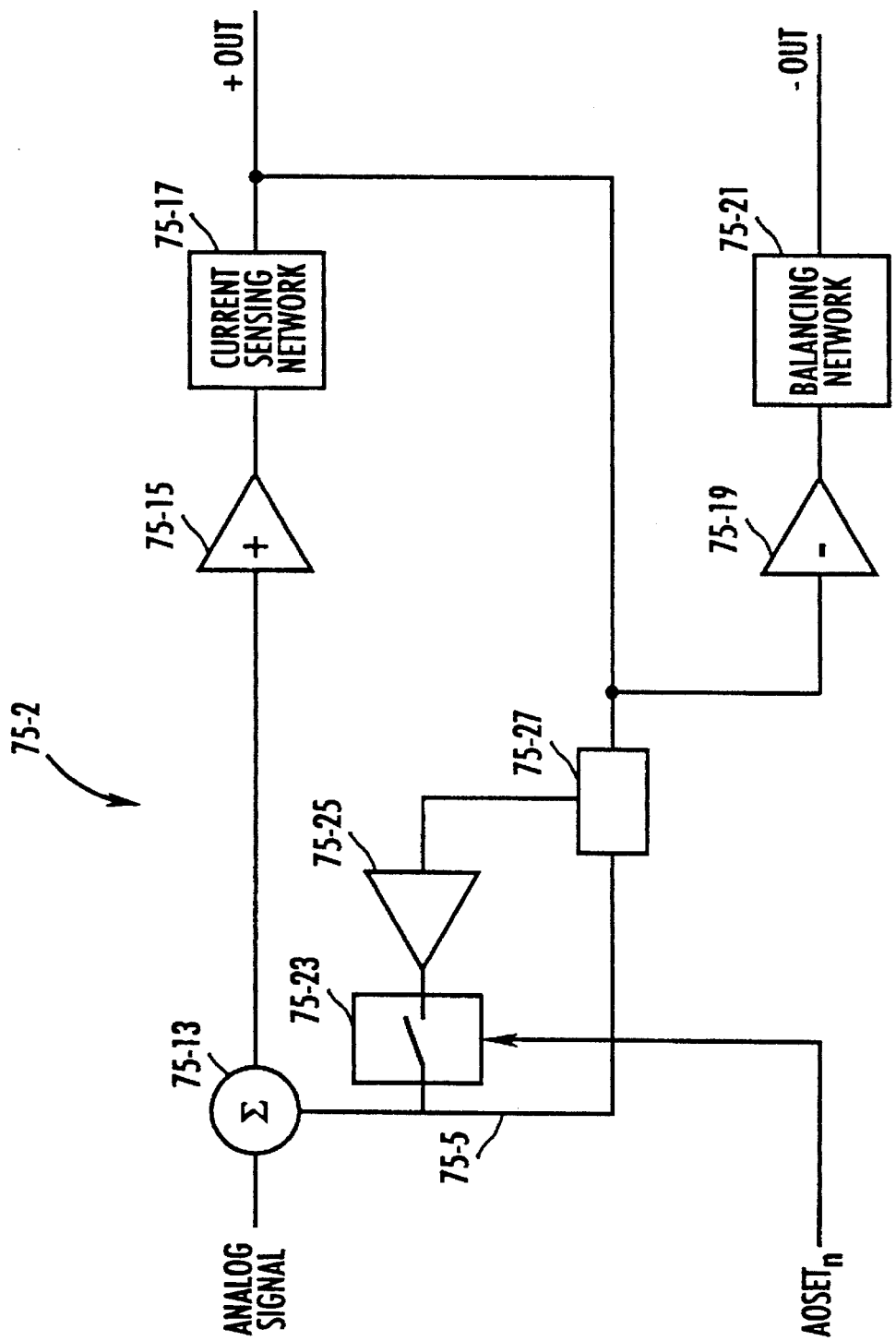
FIG. 75 shows a second embodiment of the invention with a balanced output.

As shown in FIG. 75, the same approach to creating a balanced differential output signal can be used to form an analog output unit 75-2 without the sample and hold circuitry. Thus, the same current sensing network 73-17, balancing network 73-21, and feedback network 73-27 previously described can be used in fully analog systems such as servos, audio systems, or other analog control loops.

Figure 76:
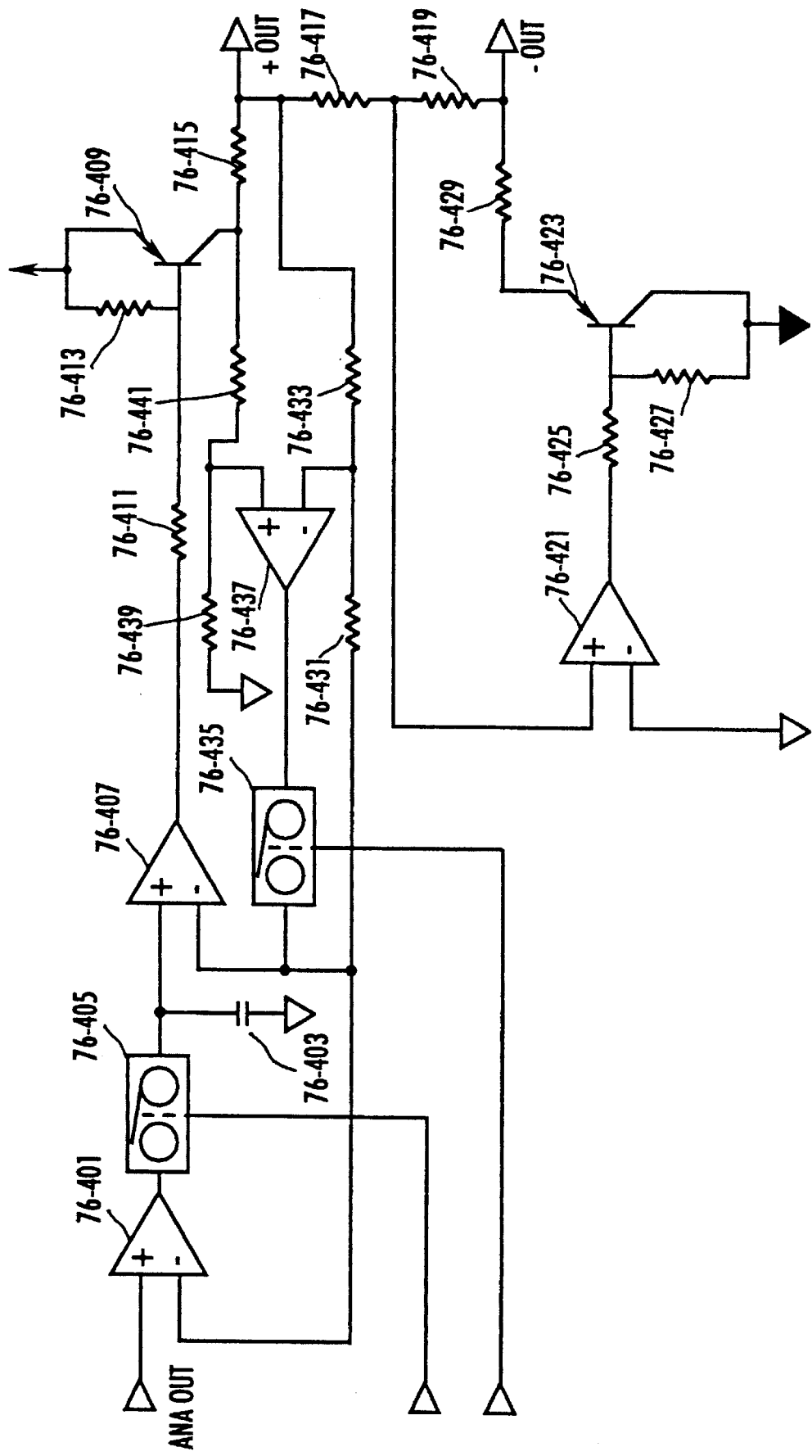
FIG. 76 is a schematic diagram of the first embodiment with a balanced output.

FIG. 76 is a schematic version of the block diagram discussed in FIG. 73. In FIG. 76, a voltage, e.g. from a D/A converter, applied to ANAOUT is buffered by amplifier 76-401 and stored on capacitors 76-403 when switch 76-405 is closed. Capacitor 76-403 is also connected to common ground ACOM. When switch 76-405 is open, the voltage stored on the capacitor is held until switch 76-405 is again closed. At that time a new voltage will be stored on capacitor 76-403. It should also be noted that other known sample and hold discharge circuits may be employed to remove the voltage on capacitor 76-403 prior to sampling a new voltage.

Voltage stored on capacitor 76-403 is buffered by amplifier 76-407 whose output is connected to a common emitter output stage formed by transistor 76-409 and resistors 76-411 and 76-413. The common emitter configuration is employed to take advantage of the high collector to base reverse breakdown voltage. As configured, misapplication of large voltages to the output will not destroy the circuit even though control will be lost for the duration of the misapplied voltage. The collector of transistor 76-409 is applied to current sensing resistor 76-415, whose output forms the positive output of the analog output device. The positive output voltage is sensed through resistor 76-417 and feedback resistor 76-419 by amplifier 76-421 configured in a standard inverting configuration. Amplifier 76-421 drives a negative output stage formed by transistor 76-423 and resistors 76-425 and 76-427. This output stage is also configured as a common emitter stage having complementary characteristics to the circuit driving the positive output. Resistor 76-429 completes the mirror image circuit forming the negative output. Thus, the output from the system is the difference between the positive output and the negative output. It should be noted that by connecting a load between the positive and negative output of the analog output device, the signal to the load is independent of ground loop currents or noise induced on common ground. This is a direct result of the balanced impedance nature of the outputs whereby induced noise, including ground loop currents, appears as differential voltage of zero (0) volts across the load.

If the analog output circuit is a voltage driver, the voltage across the load (the differential between the positive output and the negative output) remains constant and the output current is a variable function of the load. On the other hand, if the analog output is configured as a current driver, the output current to the load (the current source by the positive output and the current sunk by the negative output) remains constant and the voltage is a variable function of the load. Signal AOSETn is set to open or close a switch 76-435 depending on the nature of the output.

For voltage output applications, the positive output voltage is fed back to amplifier 76-401 through resistors 76-431 and 76-433. Signal $AOSET_n$ connected to switch 76-435 is set such that switch 76-435 is open. Thus, the output from amplifier 76-437 is out of the circuit and the control loop is closed through resistors 76-431 and 76-433. The feedback is routed both to amplifier 76-401 and amplifier 76-407. Thus, if switch 76-405 remains open, loop control is still maintained based on the stored voltage on capacitor 76-403 and the feedback to amplifier 76-407. The feedback provides fast storage response times and an accurate output voltage level. In current output applications, $AOSET_n$ is activated to cause switch 76-435 to close. This puts amplifier 76-437 and resistors 76-439 and 76-441 into the circuit as an non-inverting amplifier. Rather than sampling the output voltage directly, the feedback is a voltage that is the result of the current flowing through output resistor 76-415. The voltage drop across resistor 76-415 is sensed by amplifier 76-437 and delivered through switch 76-435 to amplifiers 76-401 and 76-407 as the feedback signal. Since this feedback voltage is a direct function of the output current through resistor 76-415, the output voltage is adjusted both at the positive output and the negative output to cause the required amount of output current to be driven at the output. Thus, the transfer functions for the circuit are as follows:

voltage output (switch 76-435 open): V out=$2 \times V_m$ current output (switch 435 closed) I out=$V_m$ divided by the value of resistor 76-415;

where $V_m$=the voltage across capacitor 76-403.

Finally, the positive and negative outputs are topologically identical. That is, they have the same output configuration, both using common emitter transistor drivers, which are the inverse of each other. Thus, the impedance looking into either stage is nearly identical (balanced) with respect to the circuit common or common ground.

Thus the circuit provides balanced differential output impedance for voltage outputs and balanced differential output impedance for current outputs in addition to allowing the selection of either a balanced voltage output or a balanced current output. The balanced output design provides high common mode noise rejection and the common emitter output configuration provides high normal mode voltage protection.

In order to reduce overall energy consumption, systems, such as facilities management systems, perform load rolling and demand limiting, which attempt to manage load induced energy consumption over time. The energy consumption is managed, for example, with a processor and a meter, and energy consuming load devices, or loads, are selectively deactivated, or shed. According to one aspect of the invention, load shedding can be a high level feature of a first node which operates to shed loads or elements of loads controlled by one or more other nodes of the system. It is also possible for a node to manage energy consumption from multiple sources. For example, in one embodiment a node supporting load shedding features monitors four energy meters. The nodes which support operation of the loads and load elements receive load shedding commands from the node supporting the load shedding feature. In response, the nodes receiving the commands deactivate the selected nodes.

Figure 77:
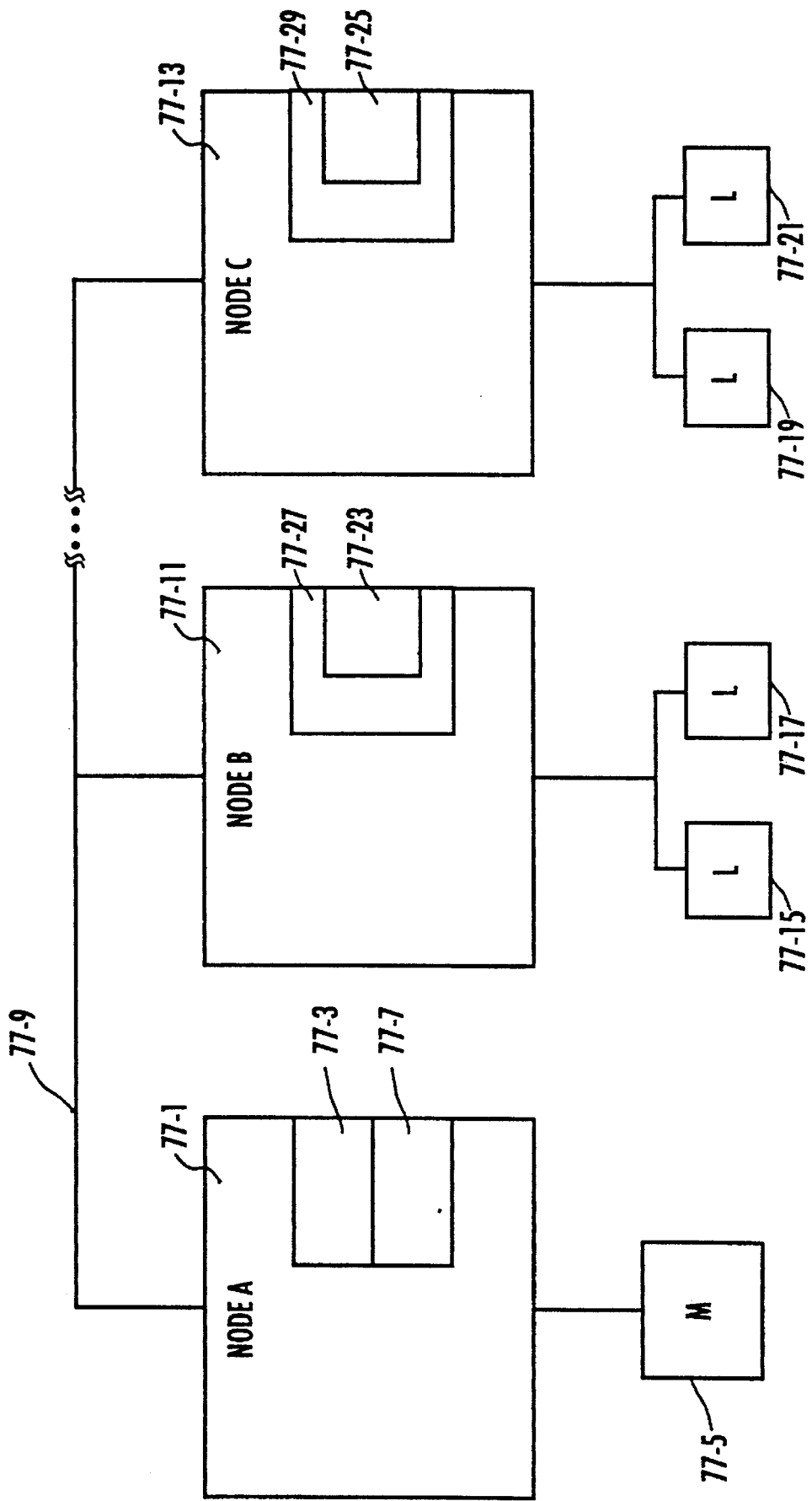
FIG. 77 shows a configuration of a system with distributed load shedding and localized restore tasks.

Dependance on communications between the node supporting the load shedding feature and the nodes supporting the loads is eliminated by incorporating a restore task into each of the load specific nodes. For example, in FIG. 77, first node 77-1 contains a high level load rolling software feature 77-3 which is responsive to system energy consumption monitored by meter 77-5. Based on the level of energy consumption monitored, load rolling feature 77-3 determines the required reduction in energy consumption. This is compared against energy consumption values in load table 77-7 to identify one or more currently active loads which can be shed to achieve the desired energy reduction. Load rolling feature 77-3 then issues a command on high speed N1 bus 77-9 which is read by other nodes 77-11 and/or node 77-13. It should be noted that the communication protocol used between the nodes is not a factor according to this aspect of the invention. For example, the command from first node 77-1, could be directed to one or more specific nodes or could be broadcast to all nodes on the high speed bus 77-9.

Nodes receiving load shed commands from load rolling features process the commands and deactivate the loads identified. For example, second node 77-11 would deactivate one or both of loads 77-15 and 77-17 while third node 77-13 would deactivate either or both of nodes 77-19 and 77-21. First node 77-1 could also issue commands to shed loads from more than one node, if that is required to achieve the desired energy consumption and does not violate any other rules programmed to prohibit deactivating specific combinations of loads.

In addition to deactivating the loads, second and third nodes 77-11 and 77-13 perform local processing to restore the loads to operation at an appropriate time. Performing such processing locally relieves this responsibility from first node 77-11 containing the load rolling feature. This allows node 77-1 additional time for processing other tasks and improves system reliability by assuring the load is restored, even if the node which deactivated the load loses communication with the node containing the load rolling feature. Because load restore processing is localized in the node controlling the load, load restoration is independent of the feature and failure of the communications link 77-9 or first node 77-1 or downloading new-information into first node 77-1 before the load is restored does not preclude the load from being restored to operation.

Localized load restore processing is accomplished by defining objects with attributes that follow shed and restore characteristics rather than by incorporating these characteristics into the load shedding process, as in previous systems. Localized restore processing distributes processing of high level load shedding features. For example, attributes 77-23, 77-25 of software objects 77-27, 77-29 in nodes 77-11 and 77-13 describe the shedding and restoration characteristics of loads 77-15, 77-17 and 77-19, 77-21, respectively. Typically, such restoration and shedding characteristics include maximum off times, minimum on times after activation of the load and certain safety features. For example, a cooler turned off by a load shedding command may be reactivated if a monitored temperature exceeds a predetermined level. Thus, load shed processing is distributed on the network because the node initiating the load shedding is not required for restoring the shed load to operation, unless the node initiating the shedding also controls the particular load being shed. Since the loads again become operational, other features can also direct or monitor the same loads, even if the node initiating the load shedding goes off line at anytime.

In a related aspect of the invention, demand limiting features programmed into nodes seek to maintain energy consumption levels below predetermined targets during known time intervals of peak demand. This reduces system operating costs by reducing energy consumption during such demand periods when a utility charges premium rates. During, for example, a 15 minute interval, demand limiting might evaluate energy consumption over the last 14 minutes and assume that for the next 1 minute in the future, consumption will remain constant. The feature then determines the total energy consumption for the 15 minute interval and then, using load tables 77-7, identifies loads which can be shed to maintain the energy consumption level below a predefined, stored target for the interval.

Demand limiting, according to the invention, can employ the same software object approach as described previously for load rolling. This distributes demand limiting processing and allows restoration of the load by a local restore process stored in the node controlling the load. In the case of demand limiting, the load may be restored when an attribute of the software object indicates an operator initiated command to restore the load. It should also be noted that the objects can accommodate immediate restoration or shedding loads if required in emergency situations, such as fire.

Figure 82:
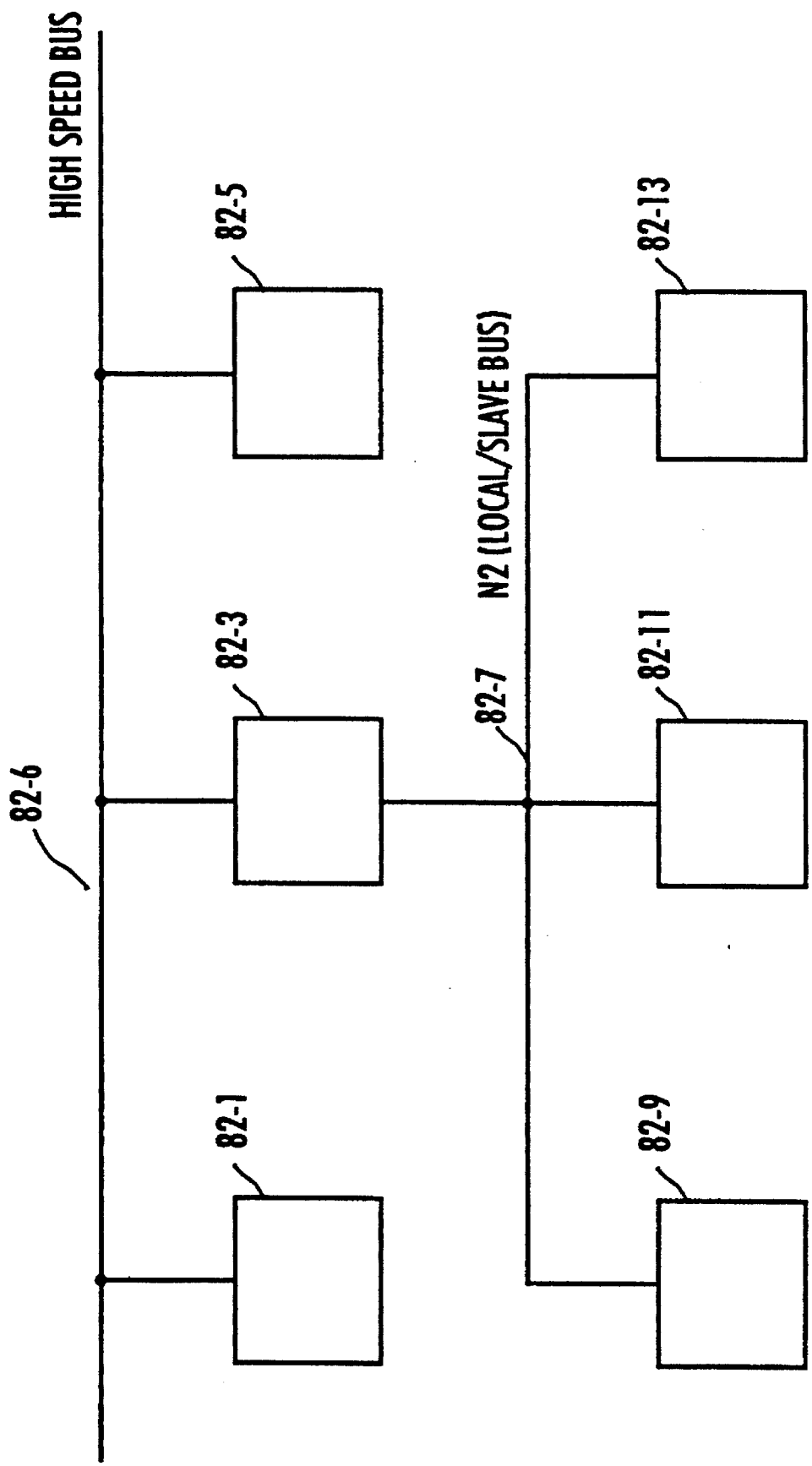
FIG. 82 illustrates nodes operating slave devices over a local or slave bus.

FIG. 82 shows a network configuration with a plurality of nodes 82-1, 82-3, and 82-5 communicating with each other over a high speed bus 82-6. As previously discussed, each of the nodes may operate slave devices 82-9, 82-11, 82-13 over a local bus 82-7. In order to reduce errors introduced by noise on the local bus 82-7, optical coupling can be used. Such optical coupling provides the nodes with significant levels of isolation from signal noise introduced by the slave devices not optically coupled to the bus leads. External noise sources also produce RFI, EMI and other error inducing effects.

Figure 83A:
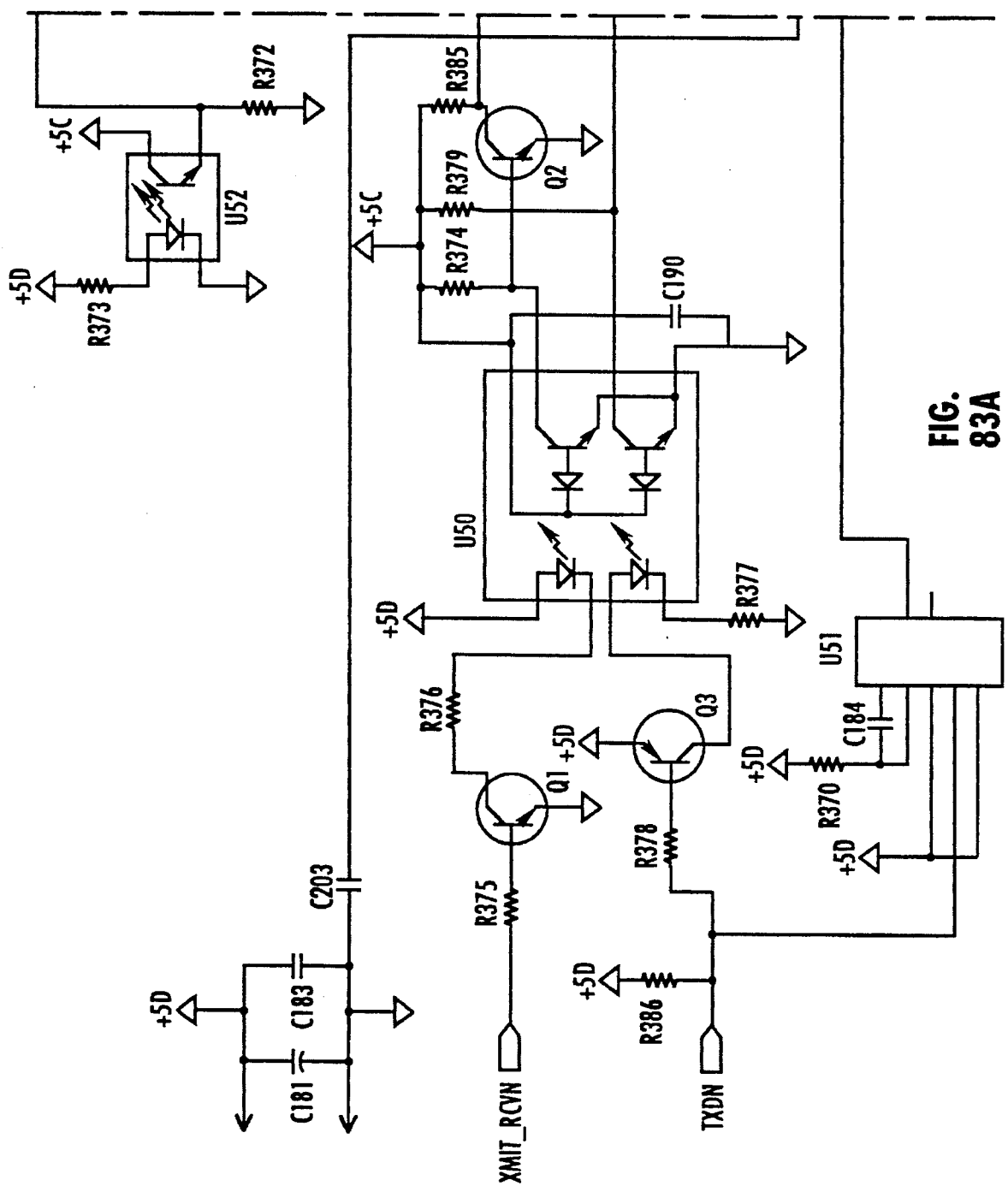
FIGS. 83A and 83B illustrate an optical interface between a node and a bus having slave devices.
Figure 83B:
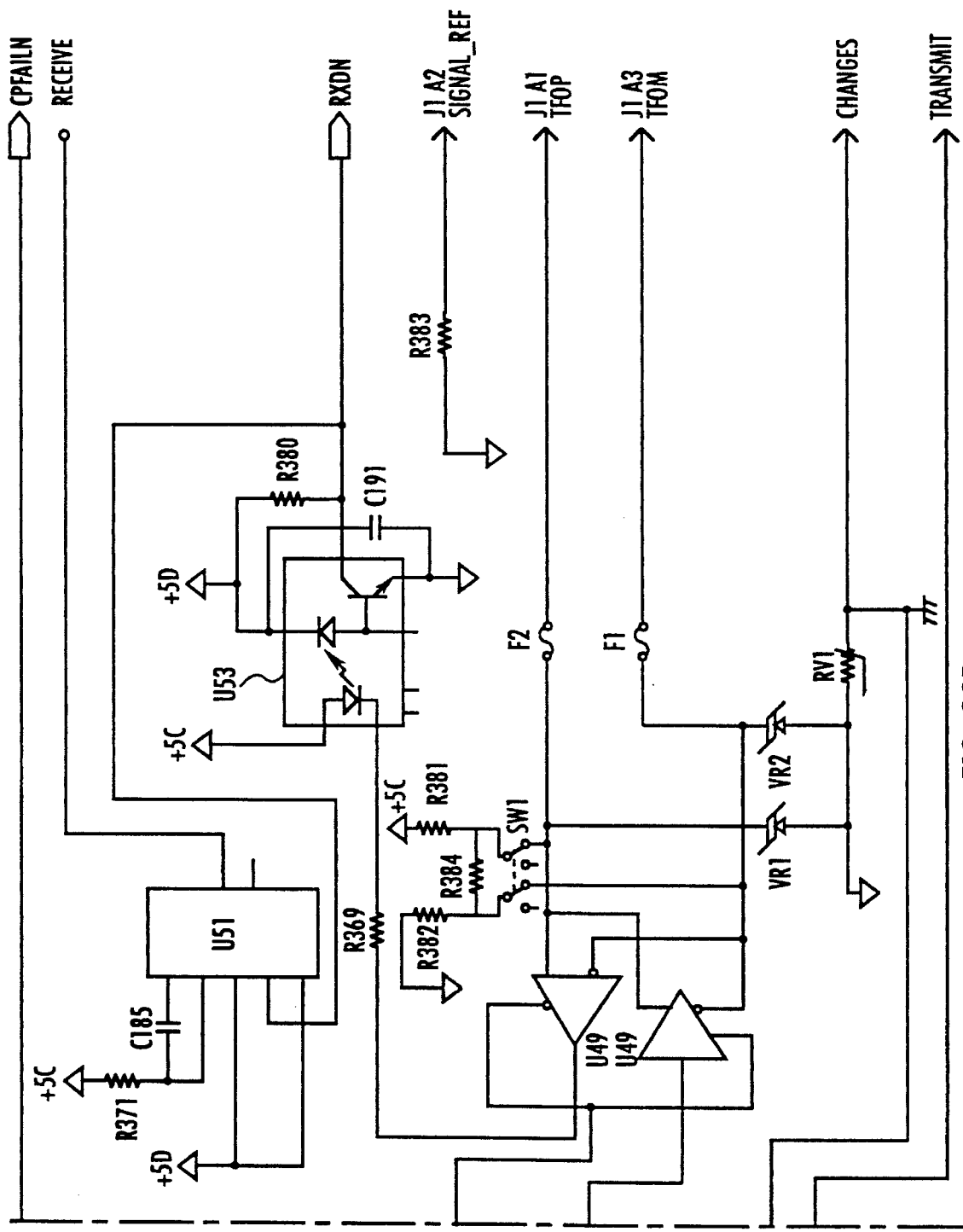

One such optical isolation approach is shown in FIGS. 83A and 83B. The general configuration shown in FIGS. 83A and 83B are consistent with the RS/485 Electronic Industries Association specification. Additional noise isolation is achieved by several techniques shown in FIGS. 83A and 83B.

One such technique is the use of pull up and pull down resistors to apply DC bias when devices are in a high impedance state.. This DC bias is provided by resistor R381 which is connected to a positive 5 volt source, and R382 connected to the communications ground, as shown in FIGS. 83A and 83B. Thus, outputs J1A1 and J1A3 are biased to a DC level where the line drives and receives in device U49 are in the high impedance state. As a result, low level noise appearing on the signal lines does not generate a detectable input.

Differential mode noise is noise showing up on the pair of transmit/receive wires as opposite polarity from one wire to the other. The bias voltage placed on the lines is a means of "swamping out" differential mode noise. It can do this because, without the bias, and with high impedance at all nodes, the lines are practically "floating." That is to say, noise is easily induced onto the line, both in common mode or differential mode. The bias placed on the line can easily "swamp out" the differential mode noise on these lines.

Common mode noise is noise induced on both the lines of the local bus (the reference line is not included in this discussion, since data signals are never sent on that wire) in equal magnitudes with respect to earth ground. Since these noises are "looking" for a path to earth ground the lines from earth ground are isolated with the opto couplers. The circuits handle up to 2500 volts before an optocoupler would "break down" and let noise pass through. The opto isolators are protected with the tanszorbs and MOV circuitry. Therefore, common mode noises greater than [56 V (MOV)+6.5 V (TRANSZORB)]62.5 volts would be shunted directly to earth ground via the MOV and transzorbs.

The optical isolation portion of the node has several optical isolators. Optical isolator U50 has two parts. A first part of the optical isolator is responsive to transmit signal TXDN. This signal drives one portion of the pair of optical isolators in U50. The output of this first portion drives a line transmitter in U49, which as FIG. 83 shows contains a line transmitter and a line receiver. In addition, retriggerable one shot U51 responds to the transmit signal TXDN to source a current to an LED or other indicator which indicates that the node is transmitting data. In the transmit mode, a line transmitter portion of U49 provides signals to the plus and minus lines of the bus which drives the slave devices.

The same plus and minus signal lines connected to the bus provide receive signals which can be received by the line receiver portion of U49, as shown in FIG. 83. The output of the line receiver drives optical isolator U53. U53 then provides receive signals RXDN to the node. The received signals also drive another portion of retriggerable one shot U51. This provides an uninterrupted sourcing current to a light emitting diode or other indicator to show that the node is receiving data. It should be noted that the retriggerable one shots provide uninterrupted current to the transmit and receive indicators, so that the indicators remain constantly illuminated while data transitions are occurring in the transmission or reception of data. This is different from conventional approaches in which the LED or other indicator is flashed as signals are transmitted and received. This flashing introduces noise currents which do not occur in the present invention.

It should be noted that the figure shows +5 C and +5 D power supplies. The +5 C power supply is a communications power supply while the +5 D power supply is a digital power supply. Separate power supplies are used to further reduce the effects of noise. A signal indicating a failure of one of the power supplies is produced by optical isolator U52. This optical isolator has a light emitting portion connected to the communications power supply and a light receiving portion connected to the digital power supply. If the +5 C source goes bad, the POWER LED goes out because of a signal change at the "light receiving" part of the optocoupler. That signal is gated through logic to turn off the power LED. If the +5 D goes bad, the power LED goes out because it is driven by the +5 D power supply. The optocoupler isolates both supplies from each other. Thus, a failure of either power supply will produce an indication of a failure in the node. This is distinguished from conventional approaches in which a failure of the communications power supply would not be recognized in the receive mode and would only be recognized in the transmit mode from the absence of transmissions. In addition, by using the +5 D supply on the light receiving portion of optical isolator U52, additional noise immunity is achieved. This is because the communication supply is further isolated from the failure indicating signal. The +5 D supply may have high frequency noises present due to the use of crystals and fast logic switching of high-speed CMOS gates; the +5 C supply may have noises on it which were brought in from the outside world on the local bus. These noises may be up to 2500 volts, peak, with no effect to the operation of the system.

Finally, the present invention is distinguished from conventional systems by its use of a single pair of signal lines for both transmission and reception of data on the bus driving the slave devices.

Finally, it should be noted that indicia defining the operating instructions for causing the system to function as described herein may be stored in EPROM or other suitable storage medium for use by the processors. The operating instructions may also be contained on other storage media such as a magnetic storage media having indicia defining the operating instructions for conveying the operating instructions into volatile memory should a volatile memory be desired for sequencing such a processor. The magnetic storage medium may therefore be retained for future use should the volatile memory suffer a power outage. Such storage media and processors are well known in the art and therefore have not been described in greater detail herein.

While specific embodiments of the invention have been described and illustrated, it will be clear that variations in the details of the embodiments specifically illustrated and described may be made without departing from the true spirit and scope of the invention as defined in the appended claims.

What is claimed is:

1. A computerized node controlling at least one slave device connected to a slave device bus having a pair of signal lines, the computerized node communicating with the slave devices over the slave device bus and being optically isolated from the slave device bus, the node having a mode output for providing a mode select signal, a transmit output and a receive input, the node comprising:

a transmit optical isolator connected between the transmit output of the node and a line driver connected to the pair of signal lines;

a receive optical isolator connected between the receive input of the node and a line receiver connected to the pair of signal lines; and a mode optical isolator having a mode input coupled to the mode output, the mode optical isolator activating at least one of the line driver or the line receiver in response to the mode select signal, the mode select signal being indicative of a transmit mode or a receive mode, the pair of signal lines receiving signals from the slave device bus in the receive mode and transmitting signals to the slave device bus in the transmit mode.

2. The computerized node recited in claim 1, wherein the mode optical isolator controls a power signal to the line driver and line receiver.

3. The node recited in claim 2 wherein the mode optical isolator responsive to the mode select signal has a control output controlling operation of both the line driver and the line receiver.

4. The node recited in claim 3 comprising a buffer circuit between the control output of the mode optical isolator responsive to the mode select signal and the line driver and the line receiver.

5. The node recited in claim 1 wherein the node has separate communications and digital power supplies.

6. The node recited in claim 5 wherein the node has a power failure indicator responsive to both the communications and digital power supplies.

7. The node recited in claim 6 wherein the power failure indicator is driven by a power failure optical isolator having a first portion connected to the communications supply and a second portion connected to the digital supply.

8. The node recited in claim 7 wherein the first portion of the power failure optical isolator is a light emitting portion and the second portion is a light receiving portion.

9. The node recited in claim 1 further comprising a retriggerable one shot coupled to the transmit output, the one shot sourcing an uninterrupted current to an indicator during the transmit mode.

10. The node recited in claim 1 comprising a retriggerable one shot coupled to the receive input, the one shot sourcing an uninterrupted current to an indicator during the receive mode.

11. A method of reducing sensitivity of a computerized node to noise induced on a bus connected between the node and at least one slave device controlled by the node, the node having a transmit output, mode select output, and a receive input, the method comprising the steps of:

connecting a transmit optical isolator between the transmit output of the node and a line driver connected to a pair of signal lines of the bus;

connecting a receive optical isolator between the receive input of the node and a line receiver connected to the pair of signal lines of the bus;

connecting a mode optical isolator between the mode select output and the line receiver and the line driver; and in response to a mode select signal at the mode select output from the node, activating at least one of the line receiver and the line driver with the mode optical isolator, the mode select signal being indicative of a transmit mode or a receive mode, the pair of signal lines receiving transmit signals from the node in the transmit mode and the pair of signal lines providing receive signals to the node in the receive mode.

12. The method recited in claim 11 wherein the optical isolator is responsive to the mode select signal to activate both the line driver and line receiver.

13. The method recited in claim 12 wherein the mode optical isolator responsive to the mode select signal controls a power signal to the line driver and receiver.

14. The method recited in claim 13 comprising buffering in a buffer circuit an output of the mode optical isolator responsive to the mode select signal and the line driver and receiver.

15. The method recited in claim 11 wherein the node has a separate communication power supply and a separate digital power supply.

16. The method recited in claim 15 wherein the node has a power failure indicator responsive to both the communications and digital power supplies.

17. The method recited in claim 16 wherein the power failure indicator is driven by a power failure optical isolator having a first portion connected to the communications supply and a second portion connected to the digital supply.

18. The method recited in claim 17 wherein the first portion of the power failure optical isolator is a light emitting portion and the second portion is a light receiving portion.

19. The method recited in claim 11 comprising sourcing an uninterrupted current to an indicator during the transmit mode from a transmit mode output of a retriggerable one shot responsive to the the transmit output.

20. The method recited in claim 11 comprising sourcing an uninterrupted current to an indicator during the receive mode from a receive mode output of a retriggerable one shot responsive to the the receive input.

* * * * *